(12) United States Patent
Mistry et al.

(10) Patent No.: US 9,477,313 B2
(45) Date of Patent: Oct. 25, 2016

(54) USER GESTURE INPUT TO WEARABLE ELECTRONIC DEVICE INVOLVING OUTWARD-FACING SENSOR OF DEVICE

(71) Applicant: Samsung Electronics Company, Ltd., Suwon, Gyeong gi-Do (KR)

(72) Inventors: Pranav Mistry, Cupertino, CA (US); Sajid Sadi, San Jose, CA (US); Lining Yao, Cambridge, MA (US); John Snavely, Seattle, WA (US)

(73) Assignee: Samsung Electronics Co., Ltd., Suwon (KR)

(*) Notice: Subject to any disclaimer, the term of this patent is extended or adjusted under 35 U.S.C. 154(b) by 51 days.

(21) Appl. No.: 14/015,909

(22) Filed: Aug. 30, 2013

(65) Prior Publication Data
US 2014/0139422 A1   May 22, 2014

Related U.S. Application Data

(60) Provisional application No. 61/728,765, filed on Nov. 20, 2012, provisional application No. 61/728,770, filed on Nov. 20, 2012, provisional application No. 61/773,803, filed on Mar. 6, 2013, provisional (Continued)

(51) Int. Cl.
*G06F 3/01* (2006.01)
*G06F 3/0346* (2013.01)
*G06F 3/03* (2006.01)
(Continued)

(52) U.S. Cl.
CPC .............. *G06F 3/017* (2013.01); *G06F 1/163* (2013.01); *G06F 3/014* (2013.01); *G06F 3/0304* (2013.01); *G06F 3/0346* (2013.01); *G06F 3/04815* (2013.01)

(58) Field of Classification Search
CPC ........ G06F 3/017; G06F 3/041; G06F 3/005; G06F 3/014; G06F 3/0346; G06F 17/30032
USPC ........................................... 345/156
See application file for complete search history.

(56) References Cited

U.S. PATENT DOCUMENTS

| 2,473,226 A | 6/1949 | Sheldon |
| 3,062,369 A | 11/1962 | Guy |
| 3,477,285 A | 11/1969 | Krafft |

(Continued)

FOREIGN PATENT DOCUMENTS

| DE | 102008027746 A1 | 12/2009 |
| EP | 1760573 A2 | 3/2007 |

(Continued)

OTHER PUBLICATIONS

International Search Report for International Application No. PCT/KR2013-010538, Feb. 28, 2014.

(Continued)

*Primary Examiner* — Premal Patel
(74) *Attorney, Agent, or Firm* — Baker Botts L.L.P.

(57) ABSTRACT

In one embodiment, a wearable apparatus includes a sensor, a processor coupled to the sensor, and a memory coupled to the processor that includes instructions executable by the processor. When executing the instructions, the processor detects by the sensor movement of at least a portion of an arm of a user; detects, based at least in part on the movement, a gesture made by the user; and processes the gesture as input to the wearable apparatus.

39 Claims, 135 Drawing Sheets

Related U.S. Application Data application No. 61/728,773, filed on Nov. 20, 2012, provisional application No. 61/773,813, filed on Mar. 7, 2013, provisional application No. 61/773,815, filed on Mar. 7, 2013, provisional application No. 61/773,817, filed on Mar. 7, 2013, provisional application No. 61/775,688, filed on Mar. 11, 2013, provisional application No. 61/775,687, filed on Mar. 11, 2013, provisional application No. 61/775,686, filed on Mar. 11, 2013.

(51) Int. Cl.
*G06F 3/0481* (2013.01)
*G06F 1/16* (2006.01)

(56) References Cited

U.S. PATENT DOCUMENTS

| | | |
|---|---|---|
| D221,081 S | 7/1971 | Kahn |
| D224,913 S | 10/1972 | Maroni |
| 3,915,534 A | 10/1975 | Yonkers |
| D249,874 S | 10/1978 | Lawrence |
| 4,427,303 A | 1/1984 | Matthias |
| D282,914 S | 3/1986 | Maron |
| D284,949 S | 8/1986 | Kong |
| 4,636,047 A | 1/1987 | Green |
| D297,121 S | 8/1988 | Porsche |
| D299,028 S | 12/1988 | Hermann |
| D300,678 S | 4/1989 | Barrault |
| D302,664 S | 8/1989 | Dawson, Jr. |
| 4,906,207 A | 3/1990 | Banning |
| D335,263 S | 5/1993 | Willis |
| D347,589 S | 6/1994 | LaBate |
| D351,558 S | 10/1994 | Moon |
| 5,361,169 A | 11/1994 | Deal |
| D355,132 S | 2/1995 | Williams |
| D356,960 S | 4/1995 | Courteault |
| 5,418,760 A | 5/1995 | Kawashima |
| D362,396 S | 9/1995 | Chester |
| D365,550 S | 12/1995 | Houlihan |
| D366,036 S | 1/1996 | Houlihan |
| D372,878 S | 8/1996 | Finnegan |
| D383,985 S | 9/1997 | Davenport |
| D384,661 S | 10/1997 | Burrell |
| D386,696 S | 11/1997 | Walch |
| D401,515 S | 11/1998 | Yida |
| 5,832,296 A | 11/1998 | Wang |
| D404,317 S | 1/1999 | Cameron |
| D410,854 S | 6/1999 | Cheung |
| 5,915,580 A | 6/1999 | Melk |
| D413,817 S | 9/1999 | Ando |
| D416,814 S | 11/1999 | Welsh |
| D422,513 S | 4/2000 | Bodino |
| D433,949 S | 11/2000 | Helleu |
| D434,675 S | 12/2000 | Ando |
| 6,285,757 B1 | 9/2001 | Carroll |
| D453,005 S | 1/2002 | Baumer |
| 6,336,126 B1 | 1/2002 | Bjorklund |
| 6,359,837 B1 | 3/2002 | Tsukamoto |
| D455,356 S | 4/2002 | Saffer |
| D459,352 S | 6/2002 | Giovanniello |
| 6,400,996 B1 | 6/2002 | Hoffberg |
| D460,430 S | 7/2002 | Wada |
| D463,296 S | 9/2002 | Sanomi |
| 6,477,117 B1 | 11/2002 | Narayanaswami |
| D466,487 S | 12/2002 | Wada |
| D466,488 S | 12/2002 | Wada |
| 6,556,222 B1 | 4/2003 | Narayanaswami |
| D474,982 S | 5/2003 | Wilson |
| 6,573,883 B1 * | 6/2003 | Bartlett .......... 345/156 |
| 6,809,774 B1 | 10/2004 | Yamazaki et al. |
| 6,873,575 B2 | 3/2005 | Yamazaki |
| 6,968,508 B2 | 11/2005 | Lucaci |
| D519,858 S | 5/2006 | Migliorati |
| 7,081,905 B1 | 7/2006 | Raghunath |
| D526,215 S | 8/2006 | Calvani |
| D526,912 S | 8/2006 | Calvani |
| D526,973 S | 8/2006 | Gates |
| 7,096,048 B2 | 8/2006 | Sanders |
| D528,928 S | 9/2006 | Burton |
| D529,402 S | 10/2006 | Burton |
| D537,371 S | 2/2007 | Belamich |
| D537,409 S | 2/2007 | Suzuki |
| D537,738 S | 3/2007 | Ohki |
| 7,187,908 B2 | 3/2007 | Fujisawa |
| D543,122 S | 5/2007 | Lafever |
| D545,305 S | 6/2007 | Mulcahy |
| D545,697 S | 7/2007 | Martin |
| D547,211 S | 7/2007 | Dias |
| D550,105 S | 9/2007 | Oberrieder |
| D550,614 S | 9/2007 | Fee |
| D554,636 S | 11/2007 | Tom |
| D558,207 S | 12/2007 | Ikeda |
| D558,208 S | 12/2007 | Ikeda |
| D558,209 S | 12/2007 | Ikeda |
| D564,367 S | 3/2008 | Molyneux |
| 7,382,691 B2 | 6/2008 | Capozzi |
| 7,398,151 B1 | 7/2008 | Burrell |
| 7,404,146 B2 | 7/2008 | Bennetts |
| D574,262 S | 8/2008 | Martinez |
| D574,263 S | 8/2008 | Loth |
| D575,289 S | 8/2008 | Kuo |
| D585,898 S | 2/2009 | Skurdal |
| 7,487,467 B1 | 2/2009 | Kawahara |
| 7,506,269 B2 | 3/2009 | Lang |
| D590,277 S | 4/2009 | Wei |
| D590,727 S | 4/2009 | Wei |
| 7,539,532 B2 | 5/2009 | Tran |
| D596,509 S | 7/2009 | Kume |
| D596,610 S | 7/2009 | Hou |
| D596,959 S | 7/2009 | Rousseau |
| D600,144 S | 9/2009 | Diltoer |
| D602,858 S | 10/2009 | Ellis |
| D604,643 S | 11/2009 | Ahlstrom |
| D610,472 S | 2/2010 | Nashimoto |
| 7,667,657 B2 | 2/2010 | Koshiji |
| D612,269 S | 3/2010 | Leung |
| D615,955 S | 5/2010 | Oh |
| 7,778,118 B2 | 8/2010 | Lyons |
| D626,550 S | 11/2010 | Julien |
| D627,718 S | 11/2010 | Houghton |
| D631,373 S | 1/2011 | Mikkelsen |
| D635,472 S | 4/2011 | Dalla Libera |
| D636,686 S | 4/2011 | Cobbett |
| D636,687 S | 4/2011 | Morrison |
| 7,932,893 B1 | 4/2011 | Berthaud |
| D640,576 S | 6/2011 | Nashimoto |
| D640,936 S | 7/2011 | Teixeia |
| D640,948 S | 7/2011 | Quigley |
| 8,001,488 B1 | 8/2011 | Lam |
| D645,360 S | 9/2011 | Kiser |
| D650,706 S | 12/2011 | Zanella |
| D651,099 S | 12/2011 | Ruffieux |
| D654,431 S | 2/2012 | Stephanchick |
| D659,093 S | 5/2012 | Schmid |
| 8,176,432 B2 | 5/2012 | Klein |
| 8,179,563 B2 | 5/2012 | King et al. |
| 8,179,604 B1 | 5/2012 | Prada Gomez et al. |
| 8,184,070 B1 | 5/2012 | Taubman |
| 8,184,983 B1 | 5/2012 | Ho |
| D661,206 S | 6/2012 | Register |
| D661,275 S | 6/2012 | Roka |
| 8,194,036 B1 | 6/2012 | Braun |
| 8,212,781 B2 | 7/2012 | Wong |
| 8,228,315 B1 | 7/2012 | Starner |
| D664,880 S | 8/2012 | Cobbett |
| D664,881 S | 8/2012 | Cobbett |
| D669,371 S | 10/2012 | Rasumowsky |
| 8,279,716 B1 | 10/2012 | Gossweiler, III |
| 8,289,162 B2 | 10/2012 | Mooring et al. |
| 8,295,879 B2 | 10/2012 | Alameh |
| 8,313,353 B2 | 11/2012 | Purdy |
| D671,858 S | 12/2012 | Cobbett |

(56) References Cited

U.S. PATENT DOCUMENTS

| | | |
|---|---|---|
| D672,255 S | 12/2012 | Zanella |
| D678,081 S | 3/2013 | Cabiddu |
| D680,541 S | 4/2013 | Lee |
| D687,736 S | 8/2013 | Wycoff |
| 8,506,158 B2 | 8/2013 | Keung |
| 8,511,890 B2 | 8/2013 | Andren |
| 8,994,827 B2 | 3/2015 | Mistry |
| 9,030,446 B2 | 5/2015 | Mistry |
| 2001/0017663 A1 | 8/2001 | Yamaguchi |
| 2001/0043514 A1 | 11/2001 | Kita |
| 2002/0068600 A1 | 6/2002 | Chihara |
| 2002/0101457 A1 | 8/2002 | Lang |
| 2002/0115478 A1 | 8/2002 | Fujisawa |
| 2002/0180586 A1 | 12/2002 | Kitson |
| 2003/0025670 A1 | 2/2003 | Barnett |
| 2003/0046228 A1 | 3/2003 | Berney |
| 2003/0123328 A1 | 7/2003 | Guanter |
| 2003/0197740 A1 | 10/2003 | Reponen |
| 2003/0204132 A1 | 10/2003 | Suzuki |
| 2004/0044721 A1 | 3/2004 | Song |
| 2004/0130581 A1 | 7/2004 | Howard |
| 2004/0209642 A1 | 10/2004 | Kim |
| 2004/0209657 A1 | 10/2004 | Ghassabian |
| 2004/0218474 A1 | 11/2004 | Yamazaki |
| 2004/0261031 A1 | 12/2004 | Tuomainen |
| 2004/0263473 A1 | 12/2004 | Cho |
| 2005/0001821 A1 | 1/2005 | Low |
| 2005/0037814 A1 | 2/2005 | Yasui |
| 2005/0114796 A1 | 5/2005 | Bast |
| 2005/0137470 A1 | 6/2005 | Rosenthal |
| 2005/0162523 A1 | 7/2005 | Darrell |
| 2005/0212767 A1 | 9/2005 | Marvit |
| 2006/0026288 A1 | 2/2006 | Acharya |
| 2006/0139320 A1* | 6/2006 | Lang ............... 345/156 |
| 2006/0149652 A1 | 7/2006 | Fellenstein |
| 2006/0170649 A1 | 8/2006 | Kosugi |
| 2006/0197835 A1 | 9/2006 | Anderson |
| 2006/0209218 A1 | 9/2006 | Lee |
| 2006/0224766 A1 | 10/2006 | Malackowski |
| 2006/0253010 A1 | 11/2006 | Brady |
| 2006/0271867 A1 | 11/2006 | Wang |
| 2007/0004969 A1 | 1/2007 | Kong |
| 2007/0018591 A1 | 1/2007 | Noguchi |
| 2007/0100244 A1 | 5/2007 | Lin |
| 2007/0155434 A1 | 7/2007 | Jobs |
| 2007/0156891 A1 | 7/2007 | Abbott |
| 2007/0211042 A1 | 9/2007 | Kim |
| 2007/0236381 A1 | 10/2007 | Ouchi |
| 2007/0271528 A1 | 11/2007 | Park |
| 2007/0279852 A1 | 12/2007 | Daniel |
| 2008/0018591 A1 | 1/2008 | Pittel |
| 2008/0043824 A1 | 2/2008 | Jacobs |
| 2008/0062127 A1 | 3/2008 | Brodersen |
| 2008/0062141 A1 | 3/2008 | Chandhri |
| 2008/0129621 A1* | 6/2008 | Koshiji ............ A61B 5/0002 343/718 |
| 2008/0162834 A1 | 7/2008 | Brokenshire |
| 2008/0171572 A1 | 7/2008 | Choi |
| 2008/0273755 A1 | 11/2008 | Hildreth |
| 2008/0276168 A1 | 11/2008 | Mansfield |
| 2008/0319353 A1 | 12/2008 | Howell |
| 2009/0049412 A1 | 2/2009 | Lee |
| 2009/0096746 A1 | 4/2009 | Kruse |
| 2009/0134838 A1 | 5/2009 | Raghuprasad |
| 2009/0196124 A1 | 8/2009 | Mooring |
| 2009/0217211 A1 | 8/2009 | Hildreth |
| 2009/0234967 A1 | 9/2009 | Yu |
| 2009/0280861 A1 | 11/2009 | Khan |
| 2009/0318779 A1 | 12/2009 | Tran |
| 2010/0029327 A1 | 2/2010 | Jee |
| 2010/0070913 A1 | 3/2010 | Murrett |
| 2010/0124949 A1 | 5/2010 | Demuynck |
| 2010/0125847 A1 | 5/2010 | Hayashi |
| 2010/0169781 A1 | 7/2010 | Graumann |
| 2010/0188249 A1 | 7/2010 | Sievert |
| 2010/0188428 A1 | 7/2010 | Shin |
| 2010/0199232 A1* | 8/2010 | Mistry ............... G06F 1/163 715/863 |
| 2010/0219943 A1 | 9/2010 | Vanska |
| 2010/0245078 A1 | 9/2010 | Nadkami |
| 2010/0250789 A1 | 9/2010 | Collopy |
| 2010/0272258 A1 | 10/2010 | Sadovsky |
| 2010/0289740 A1* | 11/2010 | Kim et al. ............... 345/157 |
| 2010/0289760 A1 | 11/2010 | Jonoshita |
| 2010/0291911 A1 | 11/2010 | Kraft |
| 2010/0295773 A1 | 11/2010 | Alameh |
| 2011/0004574 A1 | 1/2011 | Jeong et al. |
| 2011/0016405 A1 | 1/2011 | Grob |
| 2011/0080339 A1 | 4/2011 | Sun |
| 2011/0102161 A1 | 5/2011 | Heubel |
| 2011/0144543 A1 | 6/2011 | Tsuzuki |
| 2011/0149101 A1 | 6/2011 | Kim |
| 2011/0157046 A1 | 6/2011 | Lee |
| 2011/0161974 A1 | 6/2011 | Kurabayashi |
| 2011/0205067 A1 | 8/2011 | Konishi |
| 2011/0214126 A1 | 9/2011 | Sadovsky |
| 2011/0214158 A1 | 9/2011 | Pasquero |
| 2011/0216060 A1 | 9/2011 | Weising |
| 2011/0221666 A1 | 9/2011 | Newton |
| 2011/0221688 A1 | 9/2011 | Byun |
| 2011/0271076 A1 | 11/2011 | Koning |
| 2011/0289519 A1 | 11/2011 | Frost |
| 2011/0300851 A1 | 12/2011 | Krishnaswamy |
| 2012/0062571 A1 | 3/2012 | Malek |
| 2012/0065814 A1 | 3/2012 | Seok |
| 2012/0075204 A1 | 3/2012 | Murray |
| 2012/0081852 A1 | 4/2012 | Maravilla |
| 2012/0083237 A1 | 4/2012 | Fish |
| 2012/0092383 A1 | 4/2012 | Hysek et al. |
| 2012/0096345 A1 | 4/2012 | Ho et al. |
| 2012/0102504 A1 | 4/2012 | Iyer |
| 2012/0130547 A1 | 5/2012 | Fadell |
| 2012/0172126 A1 | 7/2012 | Padovani |
| 2012/0194551 A1 | 8/2012 | Osterhout |
| 2012/0200494 A1 | 8/2012 | Perski |
| 2012/0210266 A1 | 8/2012 | Jiang |
| 2012/0221968 A1 | 8/2012 | Patterson et al. |
| 2012/0249409 A1 | 10/2012 | Toney |
| 2012/0249590 A1 | 10/2012 | Maciocci |
| 2012/0262379 A1 | 10/2012 | King |
| 2012/0299847 A1 | 11/2012 | Kwon |
| 2012/0317024 A1 | 12/2012 | Rahman |
| 2012/0319950 A1* | 12/2012 | Marks ............... A63F 13/02 345/158 |
| 2012/0322430 A1 | 12/2012 | Fish |
| 2013/0002538 A1 | 1/2013 | Mooring |
| 2013/0007842 A1 | 1/2013 | Park |
| 2013/0016070 A1 | 1/2013 | Starner et al. |
| 2013/0018659 A1 | 1/2013 | Chi |
| 2013/0021374 A1 | 1/2013 | Miao et al. |
| 2013/0031550 A1 | 1/2013 | Choudhury |
| 2013/0069985 A1 | 3/2013 | Wong |
| 2013/0095814 A1 | 4/2013 | Mottes |
| 2013/0104079 A1 | 4/2013 | Yasui |
| 2013/0107674 A1 | 5/2013 | Gossweiler, III |
| 2013/0111395 A1 | 5/2013 | Ying |
| 2013/0120106 A1* | 5/2013 | Cauwels et al. ............... 340/3.1 |
| 2013/0132848 A1 | 5/2013 | Bhatt |
| 2013/0142016 A1 | 6/2013 | Pozzo Di Borgo |
| 2013/0145322 A1 | 6/2013 | Hendricks |
| 2013/0194294 A1 | 8/2013 | Zhao |
| 2013/0197680 A1 | 8/2013 | Cobbett |
| 2013/0197681 A1 | 8/2013 | Alberth |
| 2013/0211843 A1 | 8/2013 | Clarkson |
| 2013/0217978 A1 | 8/2013 | Ma |
| 2013/0222270 A1 | 8/2013 | Winkler |
| 2013/0278504 A1 | 10/2013 | Tong |
| 2013/0290911 A1* | 10/2013 | Praphul et al. ............... 715/863 |
| 2013/0300719 A1* | 11/2013 | Wang ............... G06F 3/03545 345/179 |
| 2014/0059558 A1 | 2/2014 | Davis |
| 2014/0068520 A1 | 3/2014 | Missig |
| 2014/0139454 A1 | 5/2014 | Mistry |
| 2014/0143678 A1 | 5/2014 | Mistry |

(56) References Cited

U.S. PATENT DOCUMENTS

| | | | |
|---|---|---|---|
| 2014/0143737 A1 | 5/2014 | Mistry |
| 2014/0143784 A1 | 5/2014 | Mistry |
| 2014/0143785 A1 | 5/2014 | Mistry |

FOREIGN PATENT DOCUMENTS

| | | |
|---|---|---|
| EP | 2220997 A1 | 8/2010 |
| EP | 2256592 A1 | 12/2010 |
| EP | 2474950 A1 | 7/2012 |
| EP | 2866103 A2 | 4/2015 |
| GB | 2411337 A | 8/2005 |
| JP | A-10-177449 | 6/1998 |
| JP | 2002-041235 A | 2/2002 |
| JP | 2004-184396 A | 7/2004 |
| JP | 2005-244676 A | 9/2005 |
| JP | 2006-279137 A | 10/2006 |
| JP | 2009-005320 A | 1/2009 |
| JP | 2010-267220 | 11/2010 |
| JP | 2011-237953 A | 11/2011 |
| JP | 2012-073830 A | 4/2012 |
| KR | 10-2005-0065197 A | 6/2005 |
| KR | 2012-0028314 A | 3/2012 |
| WO | 2004-012178 A1 | 2/2004 |
| WO | 2004-023289 A2 | 3/2004 |
| WO | 2005-065404 A2 | 7/2005 |
| WO | 2008-045379 A2 | 4/2008 |
| WO | 2012-009335 A1 | 1/2012 |
| WO | 2012-075292 A2 | 6/2012 |
| WO | 2012-099584 A1 | 7/2012 |
| WO | WO 2013012603 A2 | 1/2013 |

OTHER PUBLICATIONS

International Search Report for International Application No. PCT/KR2013-010539, Feb. 26, 2014.
International Search Report for International Application No. PCT/KR2013-010544, Feb. 24, 2014.
International Search Report for International Application No. PCT/KR2013-010546, Feb. 27, 2014.
International Search Report for International Application No. PCT/KR2013-010547, Mar. 7, 2014.
International Search Report for International Application No. PCT/KR2013-010554, Feb. 28, 2014.
International Search Report for International Application No. PCT/KR2013-010555, Feb. 25, 2014.
International Search Report for International Application No. PCT/KR2013-010566, Feb. 28, 2014.
Elliot, Amy-Mae, Zypad WL 1000, Retrieved from Internet, http://www.pocket-lint.com/news/81360-zypad-w1000-futuristic-wearable-computer, Jun. 29, 2007.
Slap Band Watches, Retrieved from Internet, http://www.whatsondeals.com.au/deal/perth/894/stop-the-clock-twice-2-kids-funm-and-funky-slap-band-watches-this-summer-for-only-17-free-delivery-to-your-door-normall.html.
Bohn, Dieter, I'm Watch hands-on pictures and video, Retrieved from Internet, http://www.theverge.com/2012/1/10/2697043/im-watch-pictures-video-release-date-price, Jan. 10, 2012.
Honig, Zach, Pebble Smartwatch Review, http://wwwengadget.com/2013/01/25/pebble-smartwatch-review/, Jan. 25, 2013.
Campbell, Mikey, "Apple patent filing points directly to 'iWatch' Concept with Flexible Touchscreen Display," Retrieved from Internet, http://appleinsider.com/articles/13/02/21/apple-patent-filing-points-directly-to-iwatch-concept-with-flexible-touchscreen-display, Feb. 21, 2013.
Mentor, Microsoft SPOT Watch Smartwatch. Retrieved from Internet, http://www.smartwatchnews.org/2004-microsoft-spot-watch-smartwatch/, Mar. 11, 2013.
Keene, J.. "Sony Smart Watch review," Retrieved from Internet, http://www.theverge.com/2012/3/19/2876341/sony-smartwatch-review, Mar. 19, 2013.

Hughes. N., "New Samsung smart watch will be company's third stab at wrist accessory," Retrieved from Internet, http://appleinsider.com/articles/13/03/21/new-samsung-smart-watch-will-be-companys-third-stab-at-wrist-accessory, Mar. 21, 2013.
Houghton, S., "Smartwatches—Fad or the future," Retrieved from Internet, http://www.trustedreviews.com/opinions/smart-watches-fad-or-the-future, Mar. 25, 2013.
Mogg, T., "Microsoft smartwatch? Computer Giant Reportedly Gathering Components for High-Tech Wristwatch," Retrieved from Internet, http://www.digitaltrends.com/mobile/microsoft-reportedly-gathering-components-for-smartwatch/, Apr. 15, 2013.
Plunkett, L., Report: Xbox Staff Working on Microsoft "Smartwatch", Retrieved from Internet, http://kotaku.com/report-xbox-staff-working-on-microsoft-smartwatch-475322574, Apr. 17, 2013.
Bennett, B., "Sonostar enters the smartwatch arena (hands-on)," Retrieved from Internet, http:reviews.cnet.com/cell-phone-and-smart/sonostar-smartwatch/4505-6448 7-35768972.html, May 21, 2013.
Campbell, M., "Samsung to reportedly debut 'Galaxy Gear' smart watch on Sep. 4," Retrieved from the Internet, http://appleinsider.com/articles/13/08/14/samsung-to-reportedly-debut-galaxy-gear-smart-watch-on-sept-4, Aug. 14, 2013.
Non-Final Office Action for U.S. Appl. No. 14/015,795, Jan. 13, 2014.
Non-Final Office Action for U.S. Appl. No. 14/015,795, Jul. 16, 2014.
Final Office Action for U.S. Appl. No. 14/015,940, Aug. 1, 2014.
Non-Final Office Action for U.S. Appl. No. 14/015,873, Dec. 3, 2014.
Volpe, J.; "Sony SmartWatch 2 unveiled: a water resistant 'second screen' for Android devices." Available at FTP: http://www.engadget.com/2013/06/25/sony-smartwatch-2-water-resistant-android/ pp. 1-18, Jun. 25, 2013.
Office Action for AU Patent Application No. 2013-260687, Apr. 21, 2015.
Notice of Allowance for JP Patent Application 2013-240458 (with English abstract only), Feb. 9, 2015.
Non-Final Office Action for U.S. Appl. No. 14/015,940, Feb. 12, 2015.
Australian Government Patent Examination Report No. 2 for AU Patent Application No. 2013260687, Sep. 24, 2015.
Australian Government Patent Examination Report No. 3 for AU Patent Application No. 2013260687, Dec. 16, 2015.
Office Action for JP Patent Application No. 2013-240458, Oct. 7, 2014.
Response to Non-Final Office Action for U.S. Appl. No. 14/015,795, Apr. 11, 2014.
Response to Non-Final Office Action for U.S. Appl. No. 14/015,795, Oct. 16, 2014.
Supplemental Response to Non-Final Office Action for U.S. Appl. No. 14/015,795, Nov. 11, 2014.
Notice of Allowance for U.S. Appl. No. 14/015,795, Nov. 26, 2014.
1.312 Amendment After Allowance for U.S. Appl. No. 14/015,795, Feb. 2, 2015.
Non-Final Office Action for U.S. Appl. No. 14/015,830, Nov. 15, 2013.
Response to Non-Final Office Action for U.S. Appl. No. 14/015,830, Feb. 18, 2014.
Final Office Action for U.S. Appl. No. 14/015,830, Apr. 15, 2014.
Response to Final Office Action for U.S. Appl. No. 14/015,830, Jul. 15, 2014.
Notice of Allowance for U.S. Appl. No. 14/015,830, Oct. 9, 2014.
Notice of Allowance for U.S. Appl. No. 14/015,830, Jan. 14, 2015.
Non-Final Office Action for U.S. Appl. No. 14/015,873, Dec. 19, 2013.
Response to Non-Final Office Action for U.S. Appl. No. 14/015,873, Mar. 19, 2014.
Final Office Action for U.S. Appl. No. 14/015,873, May 23, 2014.
Response to Non-Final Office Action for U.S. Appl. No. 14/015,873, Mar. 3, 2015.
Final Office Action for U.S. Appl. No. 14/015,873, May 29, 2015.
Appeal Brief for U.S. Appl. No. 14/015,873, Feb. 11, 2016.

(56) References Cited

OTHER PUBLICATIONS

Non-Final Office Action for U.S. Appl. No. 14/015,890, May 22, 2015.
Response to Non-Final Office Action for U.S. Appl. No. 14/015,890, Sep. 22, 2015.
Final Office Action for U.S. Appl. No. 14/015,890, Nov. 17, 2015.
Response to Final Office Action for U.S. Appl. No. 14/015,890, Feb. 17, 2016.
Non-Final Office Action for U.S. Appl. No. 14/015,926, Jan. 29, 2015.
Response to Non-Final Office Action for U.S. Appl. No. 14/015,926, Apr. 29, 2015.
Final Office Action for U.S. Appl. No. 14/015,926, Jun. 17, 2015.
Response to Final Office Action for U.S. Appl. No. 14/015,926, Sep. 17, 2015.
Non-Final Office Action for U.S. Appl. No. 14/015,926, Oct. 7, 2015.
Response to Non-Final Office Action for U.S. Appl. No. 14/015,926, Feb. 8, 2016.
Non-Final Office Action for U.S. Appl. No. 14/015,940, Dec. 30, 2013.
Response to Non-Final Office Action for U.S. Appl. No. 14/015,940, Mar. 31, 2014.
Response to Final Office Action for U.S. Appl. No. 14/015,940, Jan. 2, 2015.
Non-Final Office Action for U.S. Appl. No. 14/015,947, May 11, 2015.
Response to Non-Final Office Action for U.S. Appl. No. 14/015,947, Sep. 10, 2015.
Final Office Action for U.S. Appl. No. 14/015,947, Dec. 8, 2015.
Response to Final Office Action for U.S. Appl. No. 14/015,947, Mar. 8, 2016.
Non-Final Office Action for U.S. Appl. No. 14/015,947, Mar. 24, 2016.
Response to Non-Final Office Action for U.S. Appl. No. 14/015,940, Jun. 12, 2015.
Final Office Action for U.S. Appl. No. 14/015,940, Jul. 30, 2015.
Response to Final Office Action for U.S. Appl. No. 14/015,940, Dec. 16, 2015.
Non-Final Office Action for U.S. Appl. No. 14/015,940, Feb. 19, 2016.
Final Office Action for U.S. Appl. No. 14/015,947, May 11, 2015.
Kim, David et al. "Digits: Freehand 3D Interactions Anywhere Using a Wrist-Worn Gloveless Sensor", Oct. 7, 2012.
European Search Report for EP Appln No. 13193702.1, May 3, 2016.
European Search Report for EP Appln No. 13193638.7, May 4, 2016.
European Search Report for EP Appln No. 13193666.8, Apr. 29, 2016.
Extended European Search Report for EP Appln No. 13193674.2, Apr. 29, 2016.
Extended European Search Report for EP Appln No. 13193561.1, May 9, 2016.
Extended European Search Report for EP Appln No. 13193672.6, May 9, 2016.

* cited by examiner

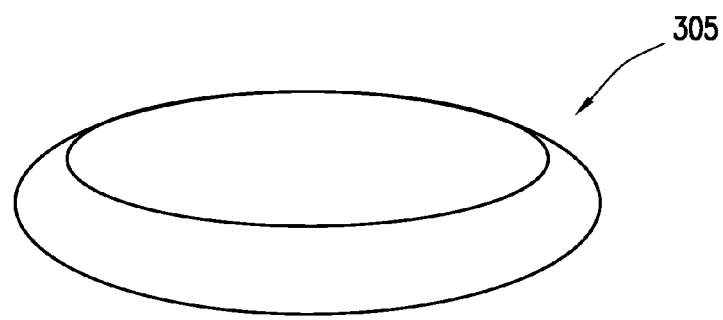
FIG. 3A
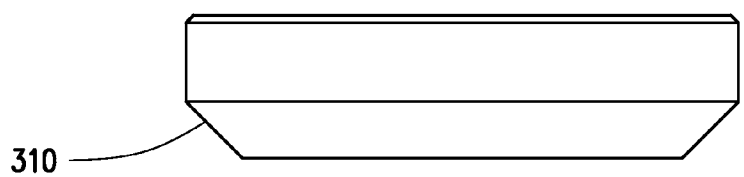
FIG. 3B
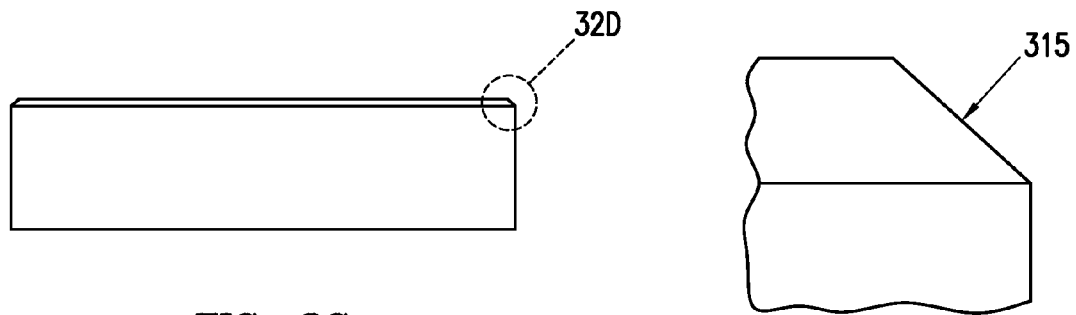
FIG. 3C
FIG. 3D

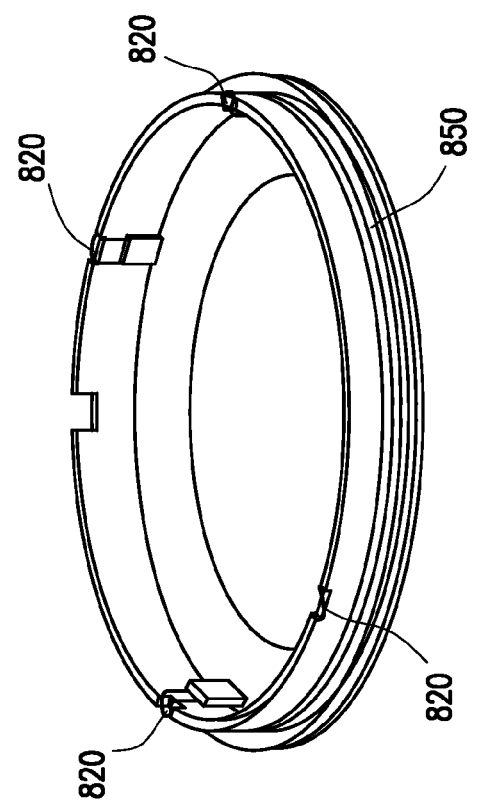
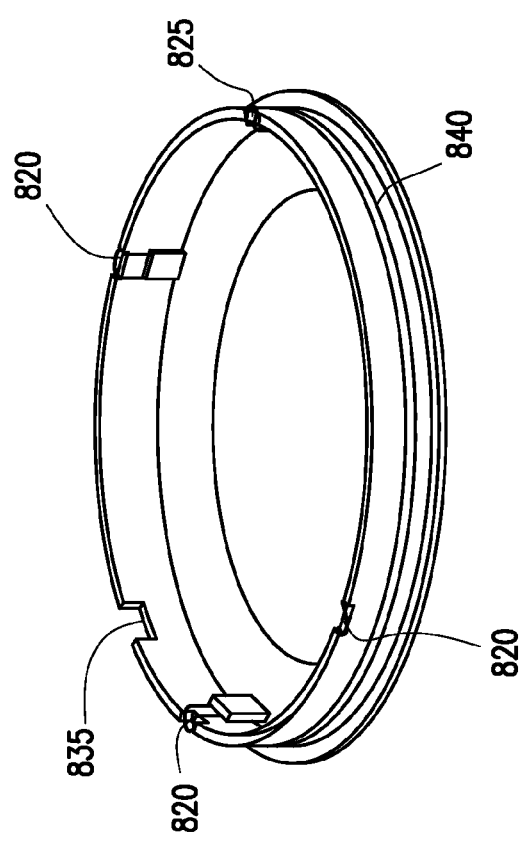
FIG.8C

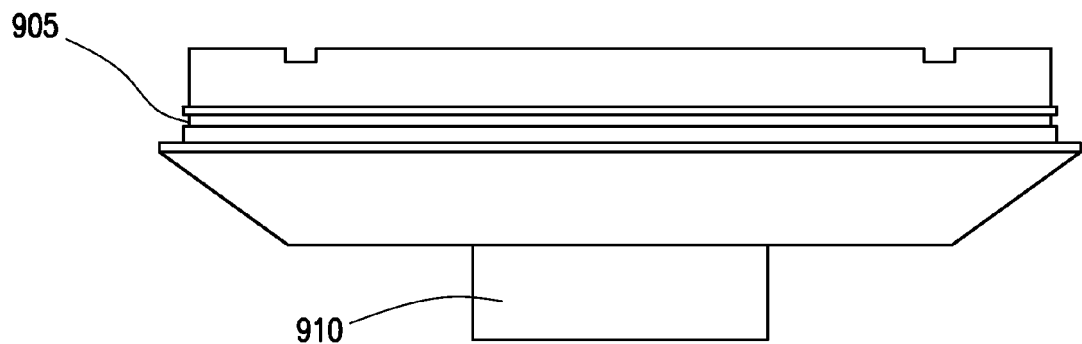
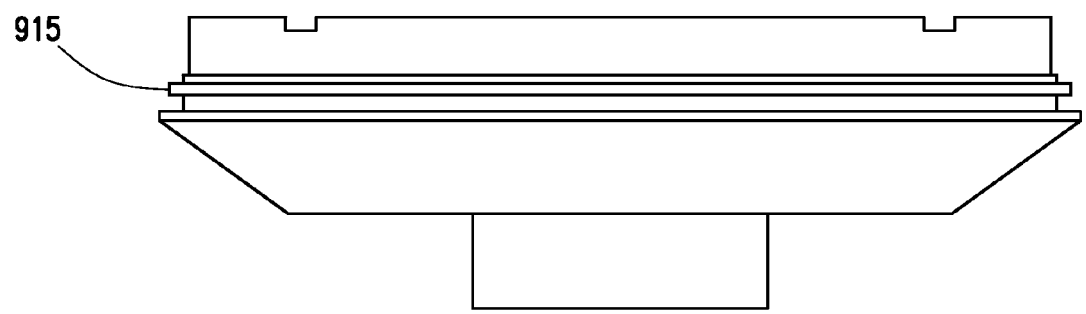
FIG. 9

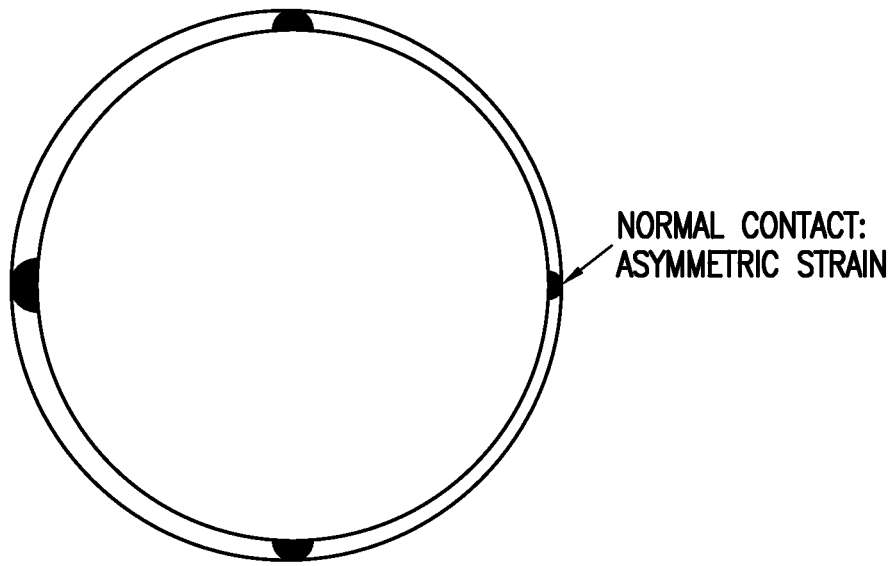
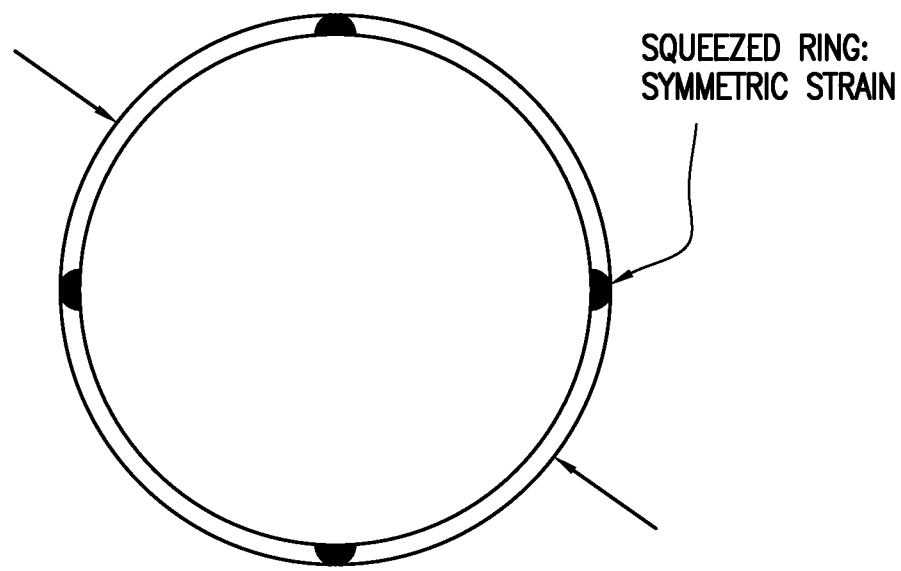
FIG. 10

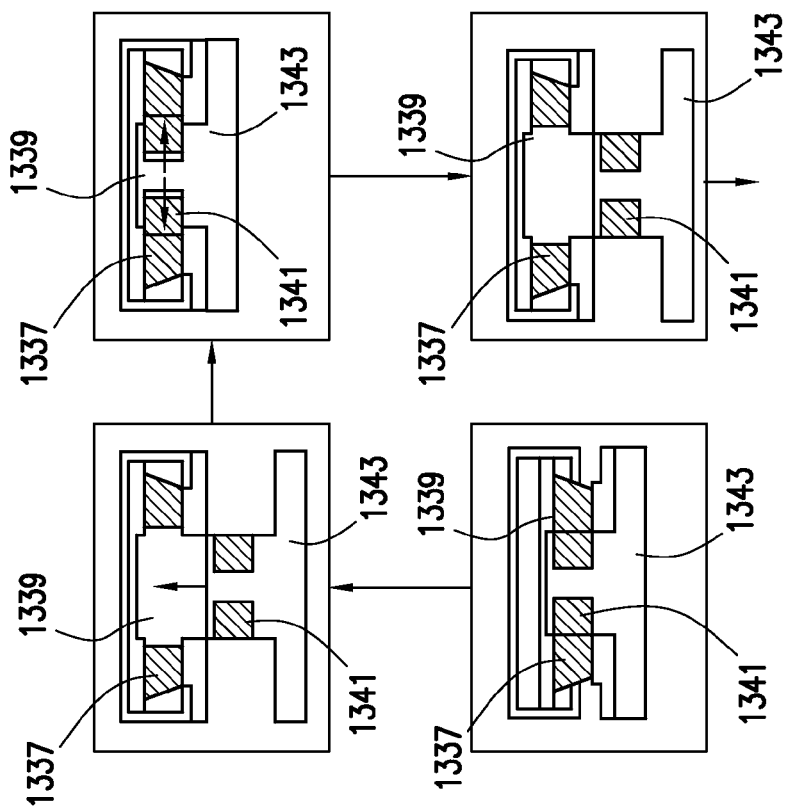
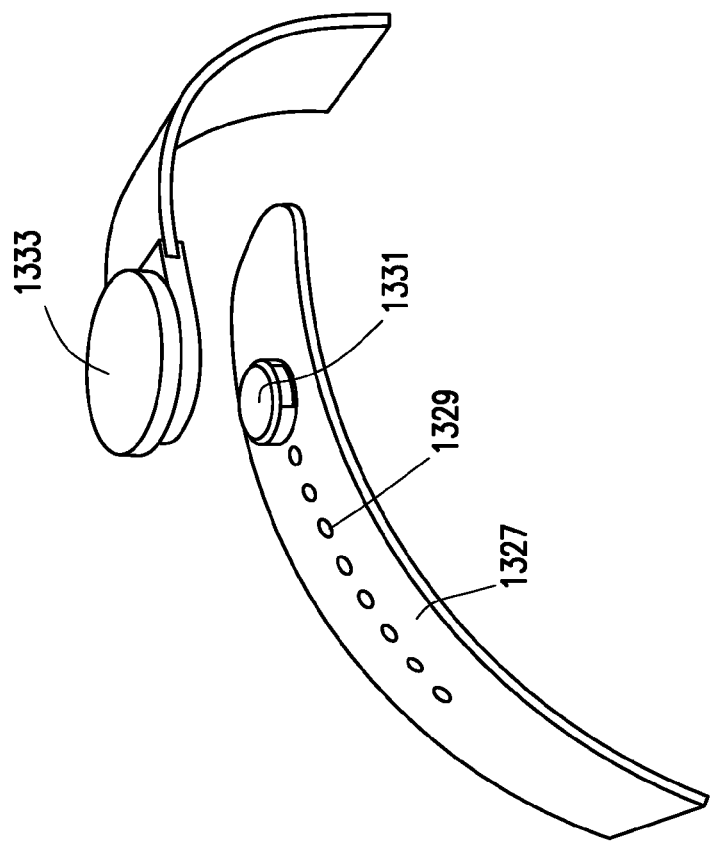
FIG. 13C

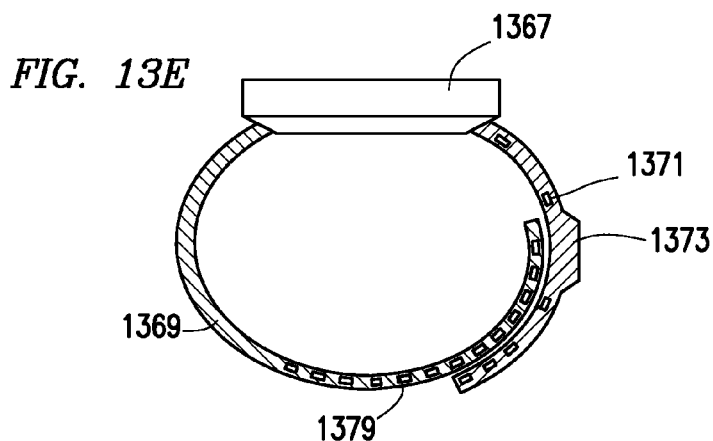
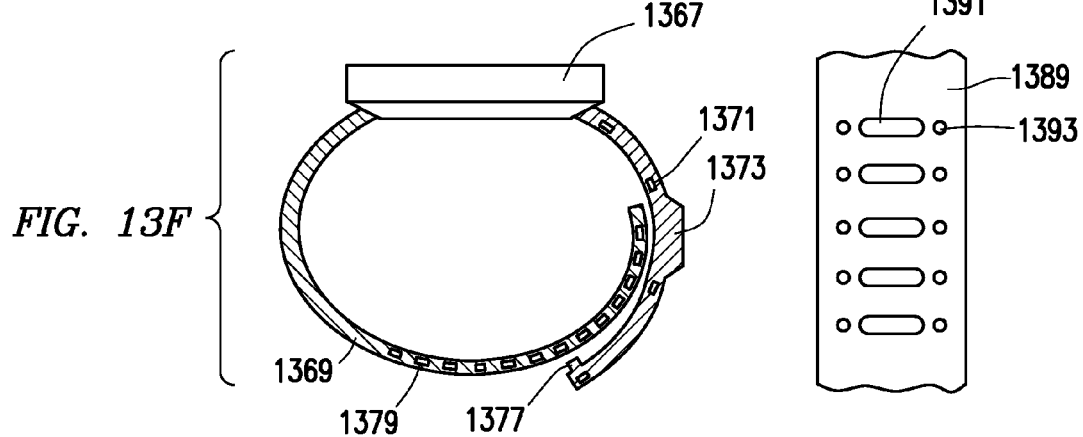
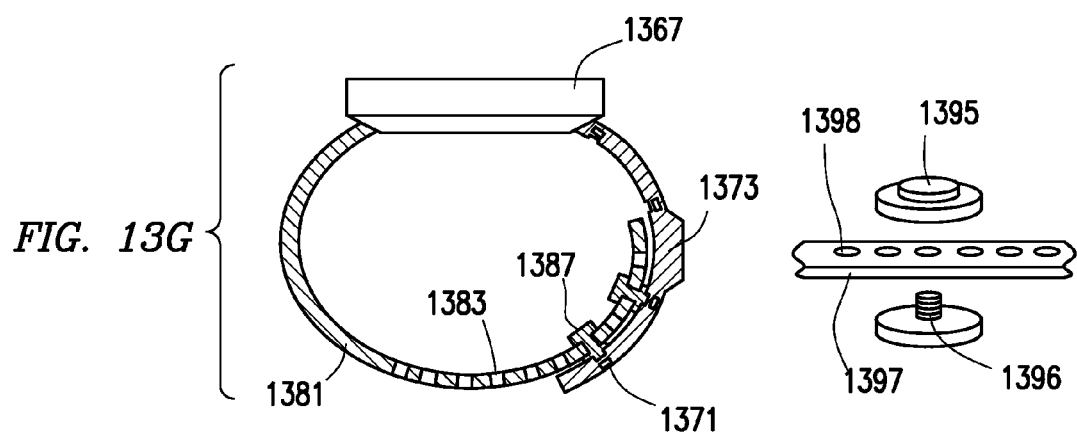
FIG. 13E
FIG. 13F
FIG. 13G

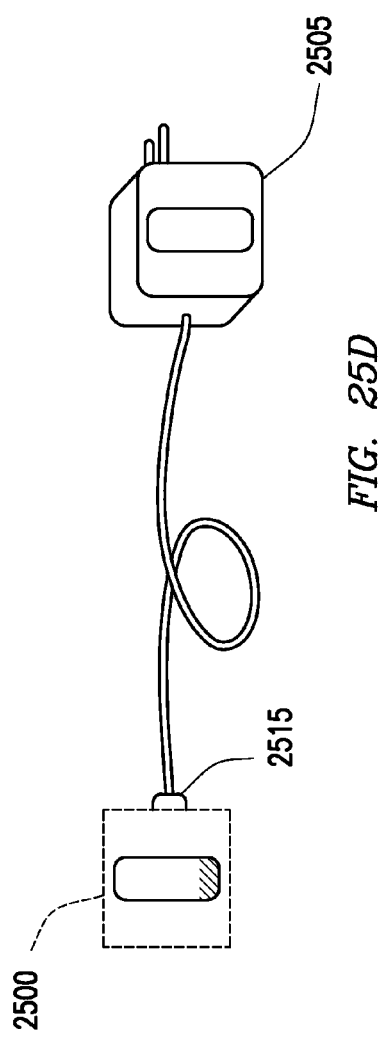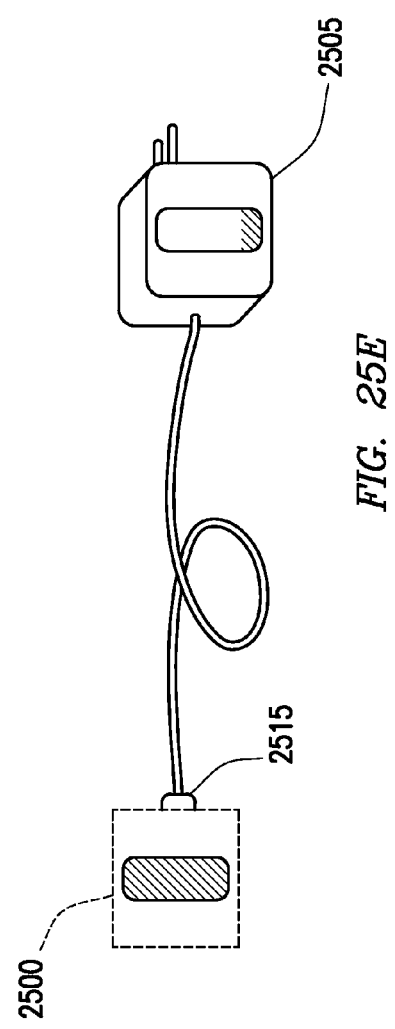

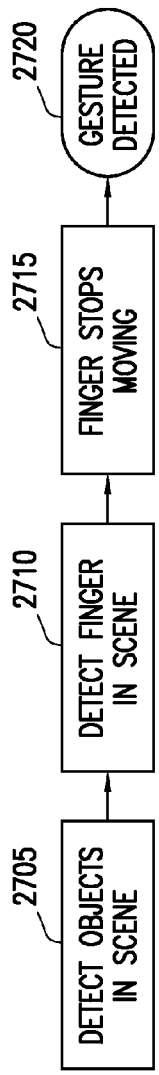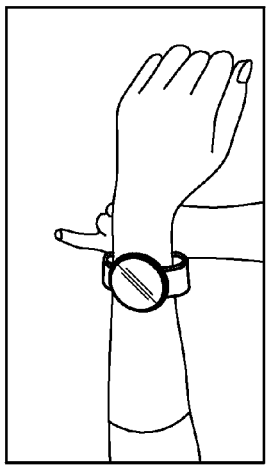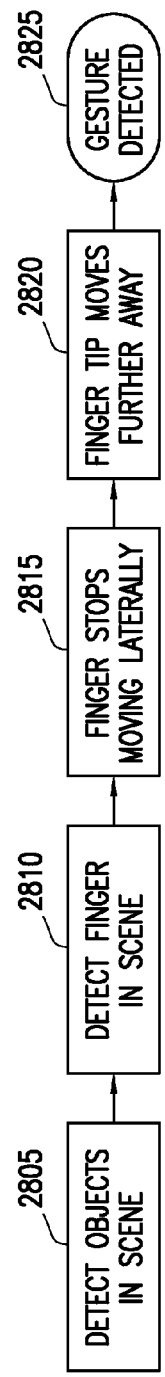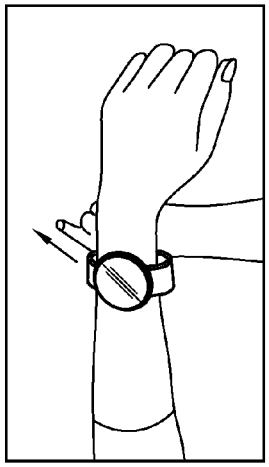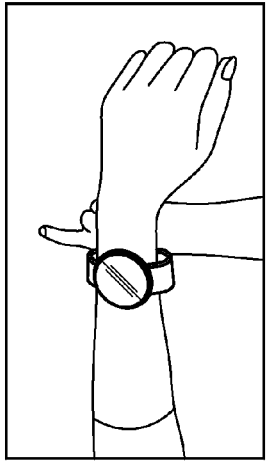
FIG. 27
FIG. 28

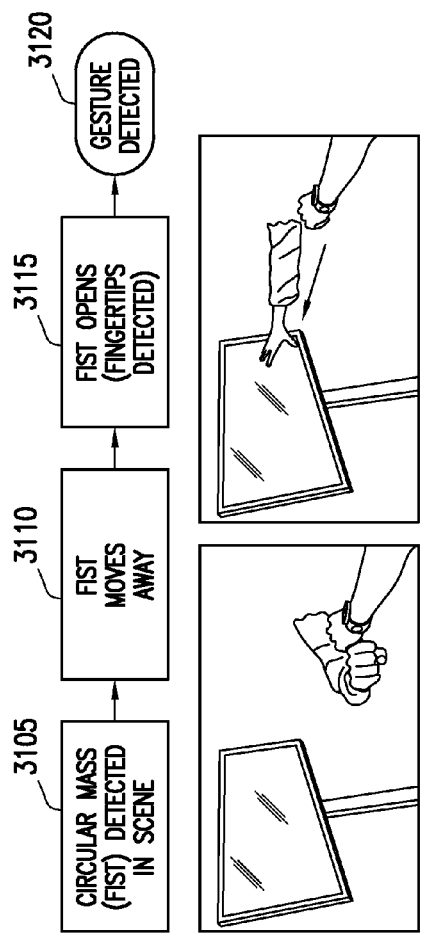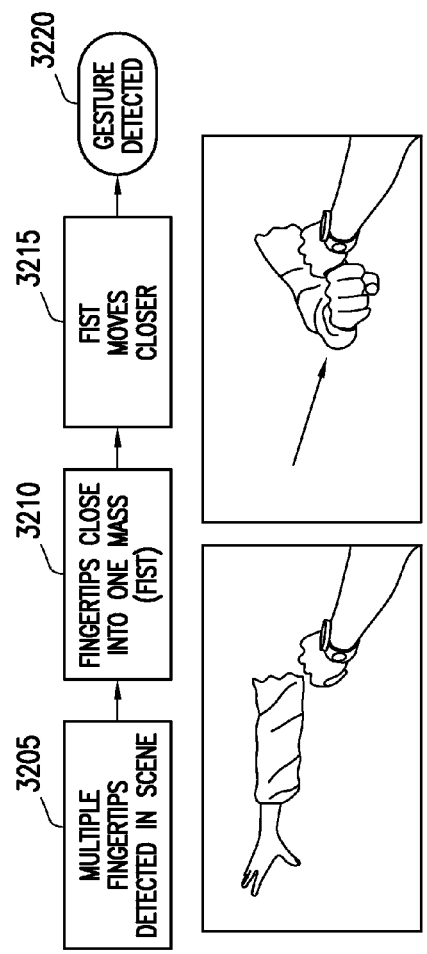

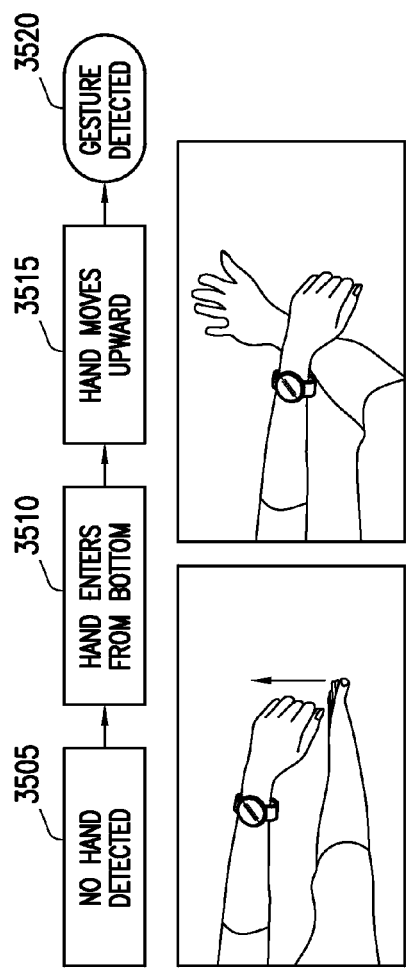
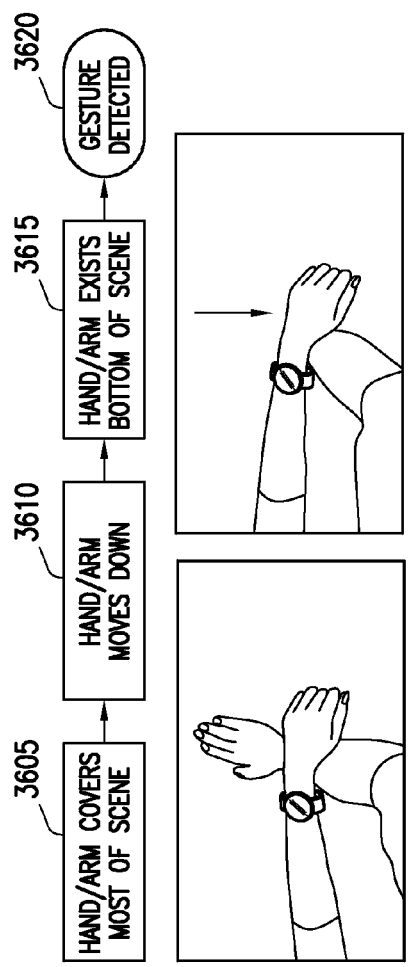
FIG. 35
FIG. 36

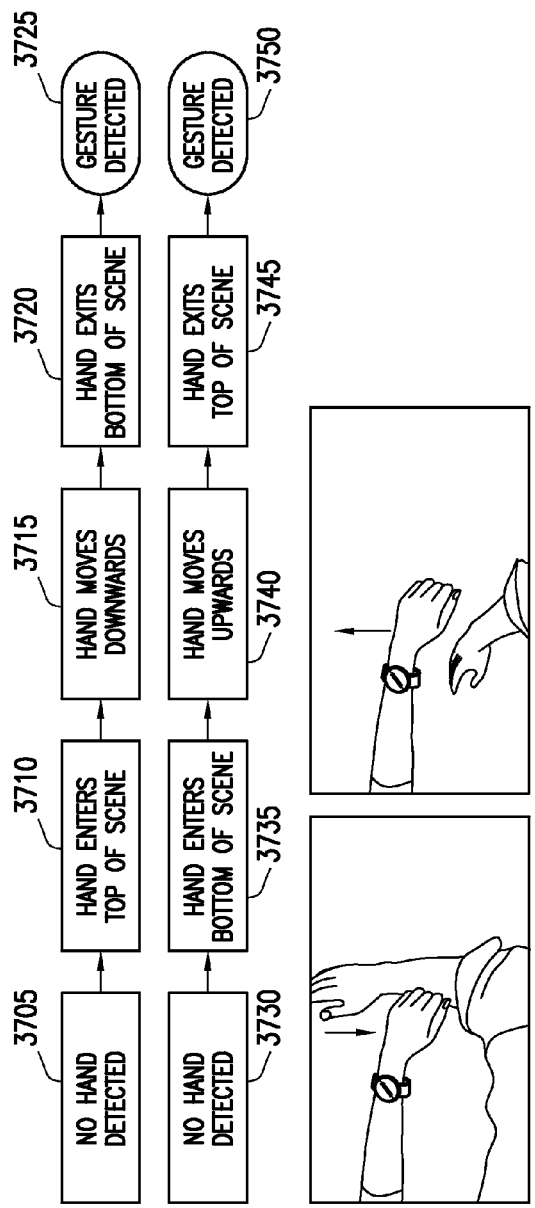
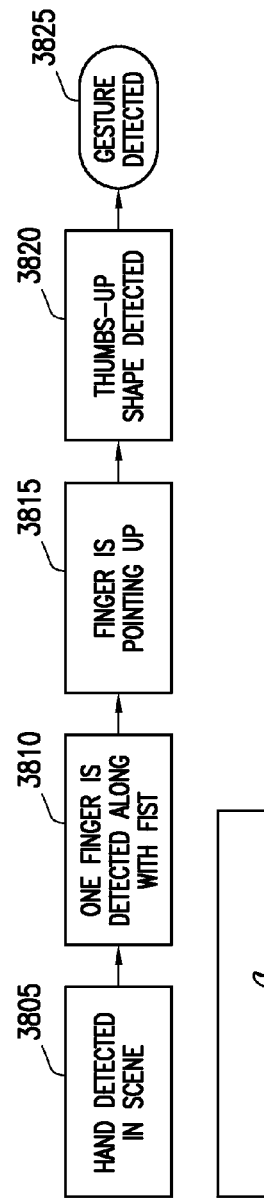
FIG. 37
FIG. 38

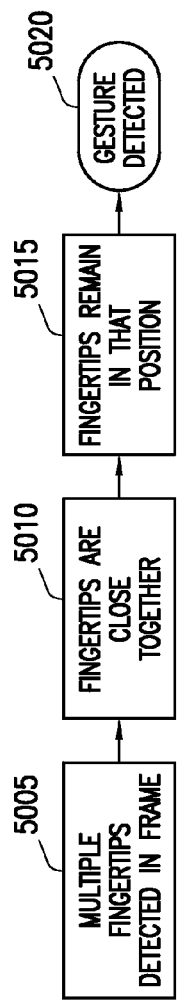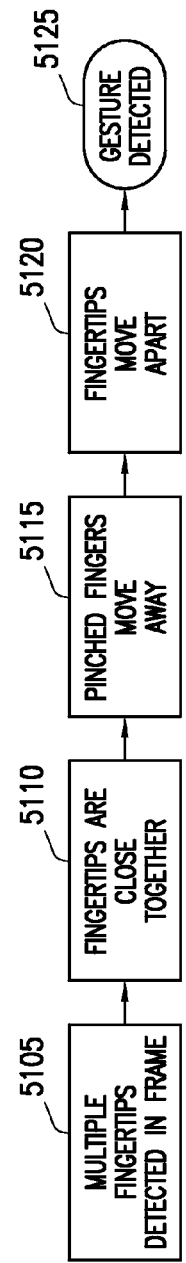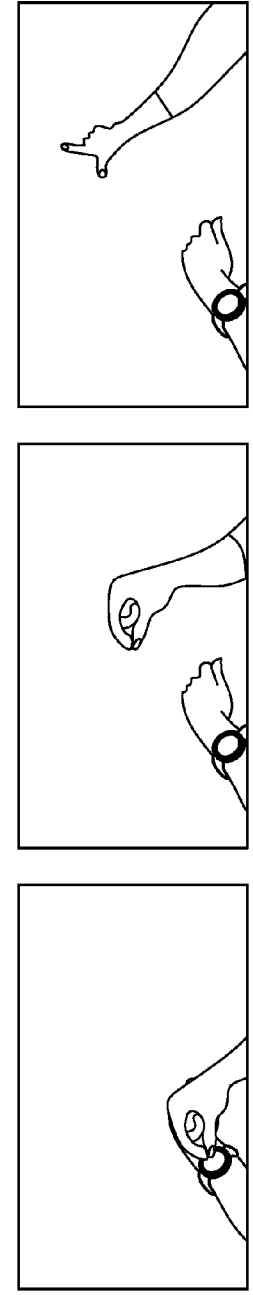
FIG. 50
FIG. 51

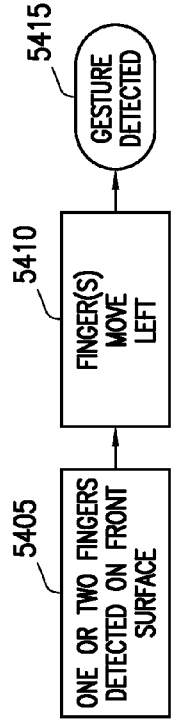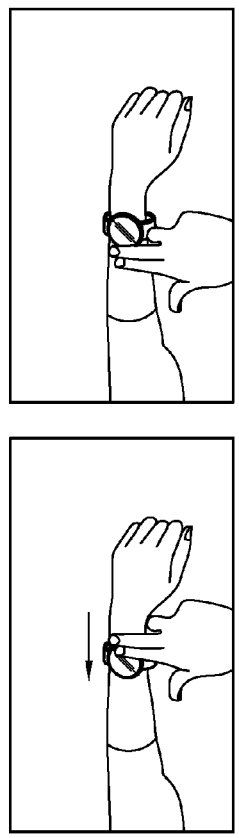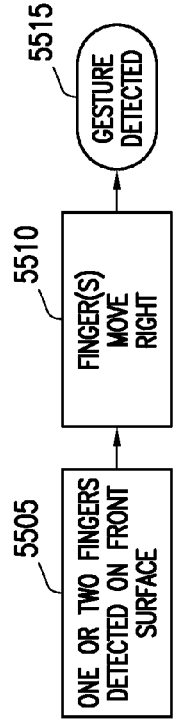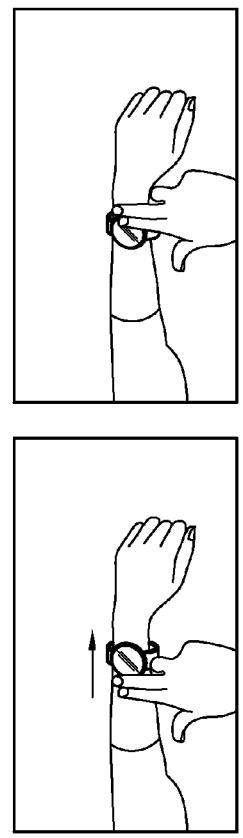
FIG. 54
FIG. 55

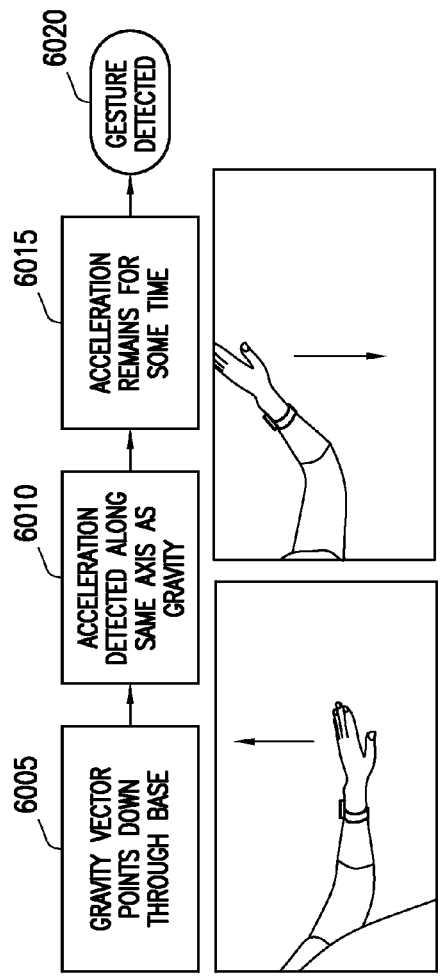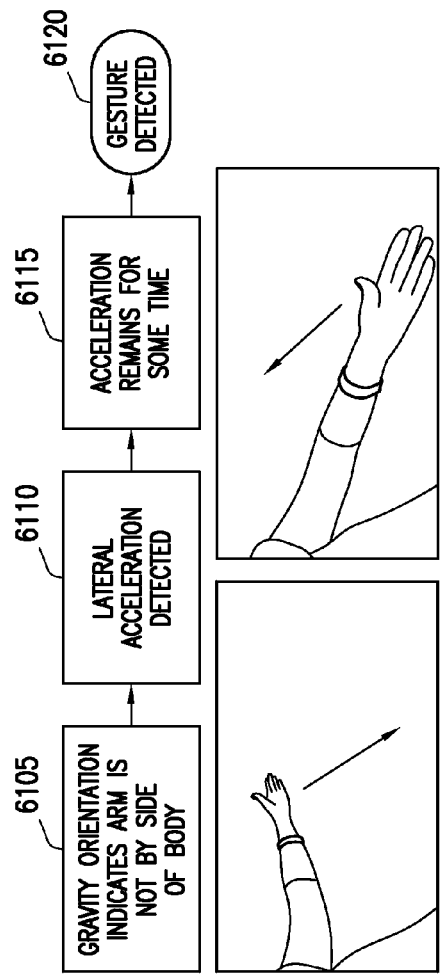
FIG. 60
FIG. 61

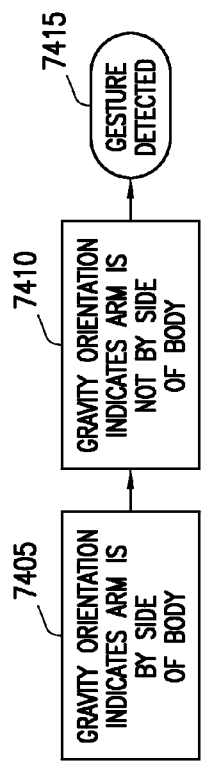
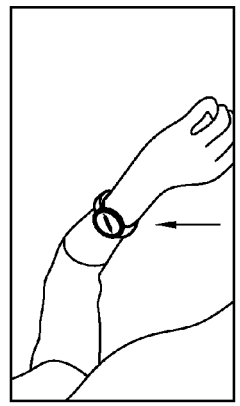
FIG. 74
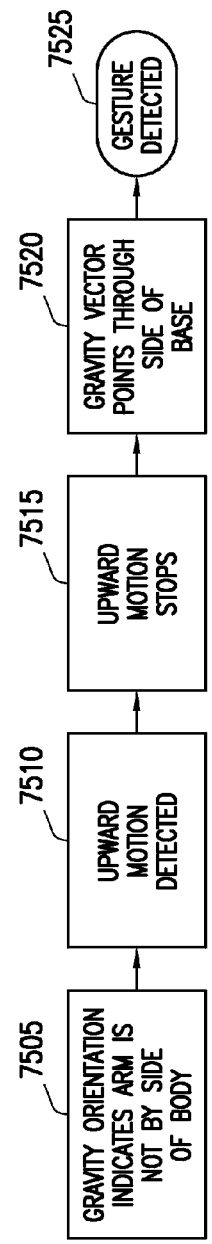
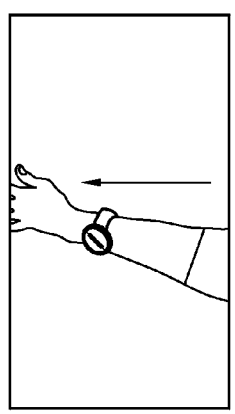
FIG. 75

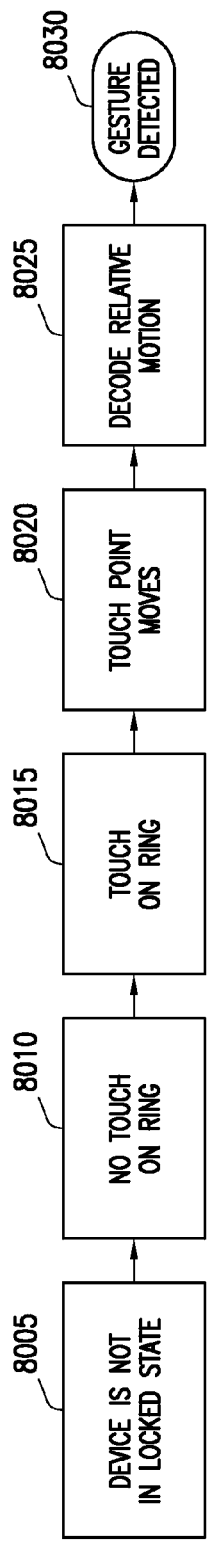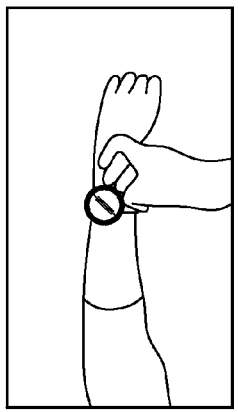
FIG. 80
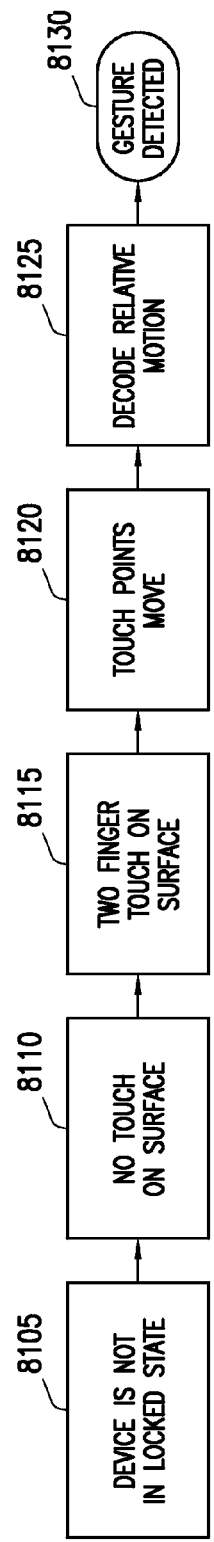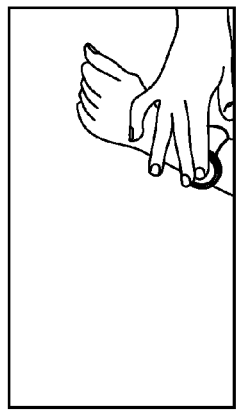
FIG. 81

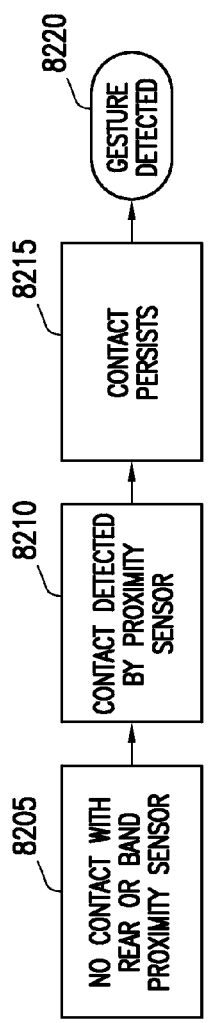
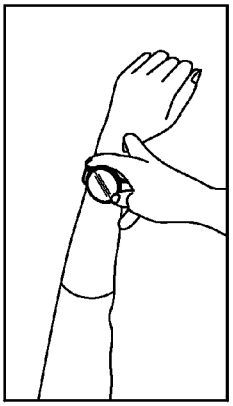
FIG. 82
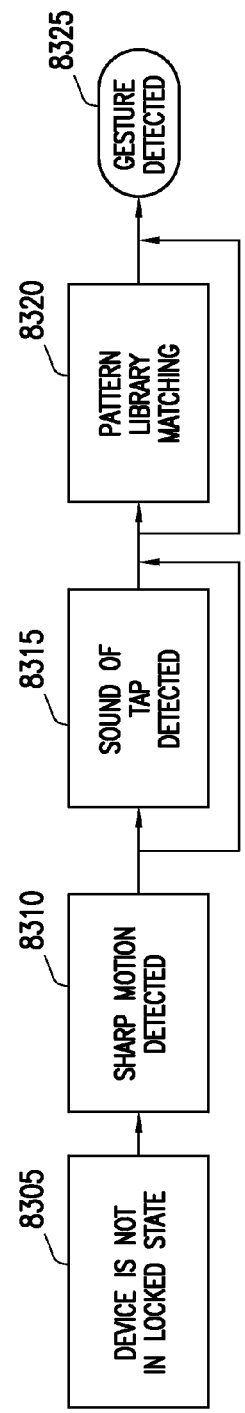
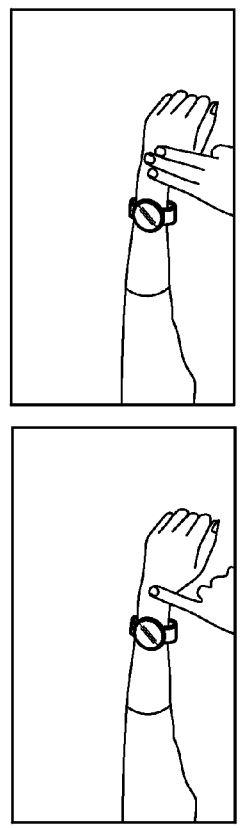
FIG. 83

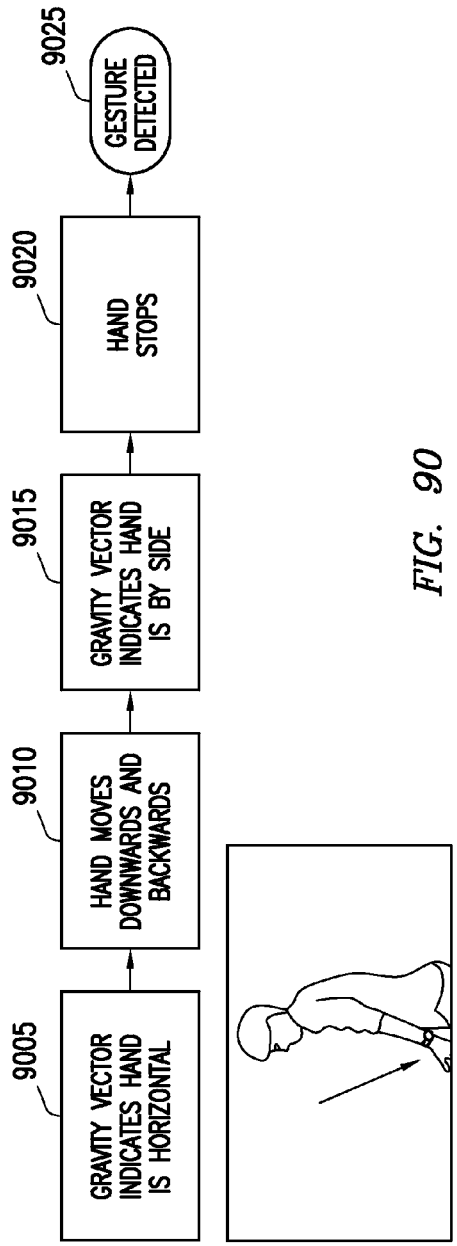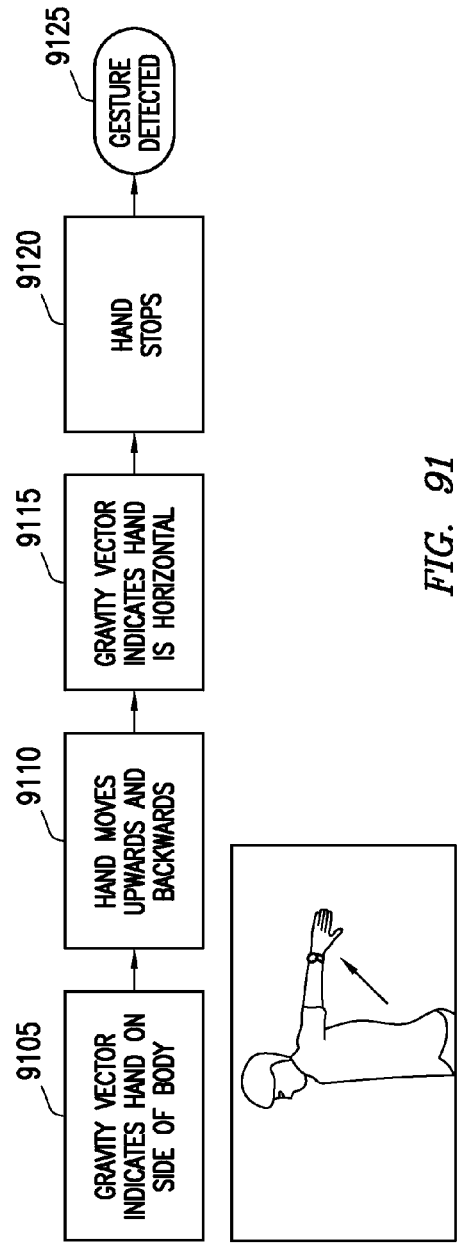
FIG. 90
FIG. 91

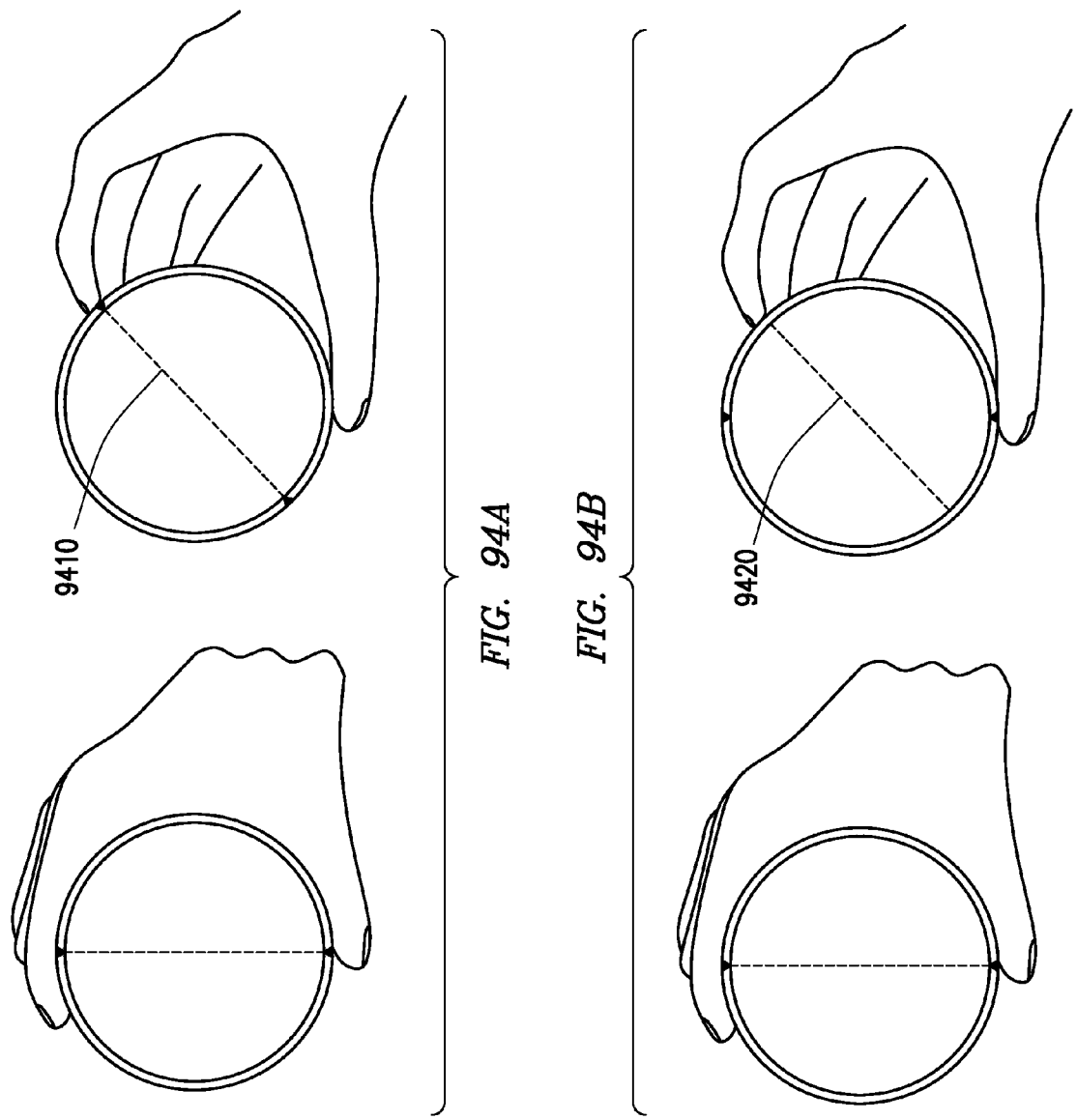

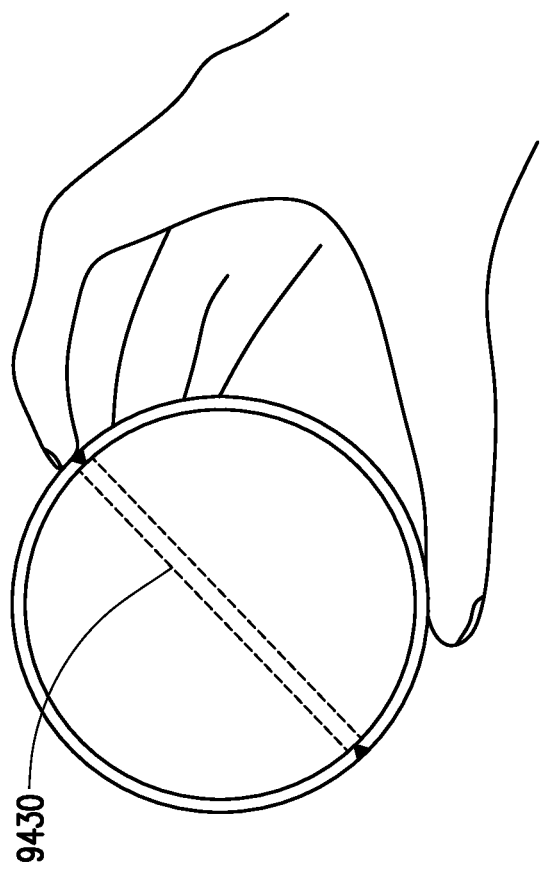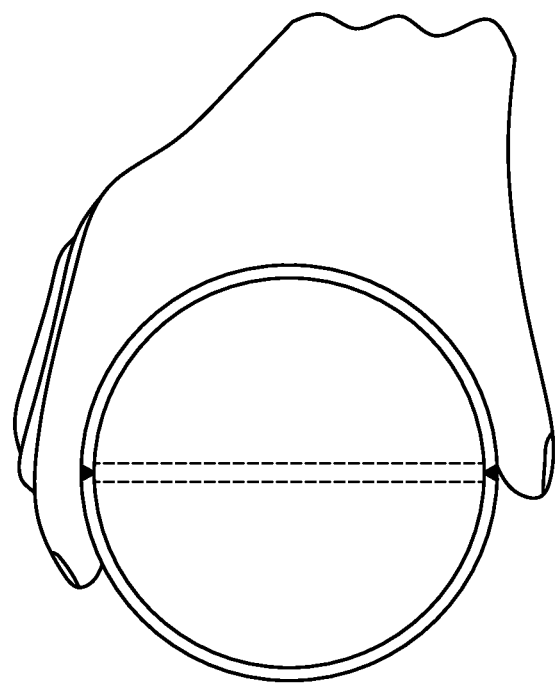
FIG. 94C

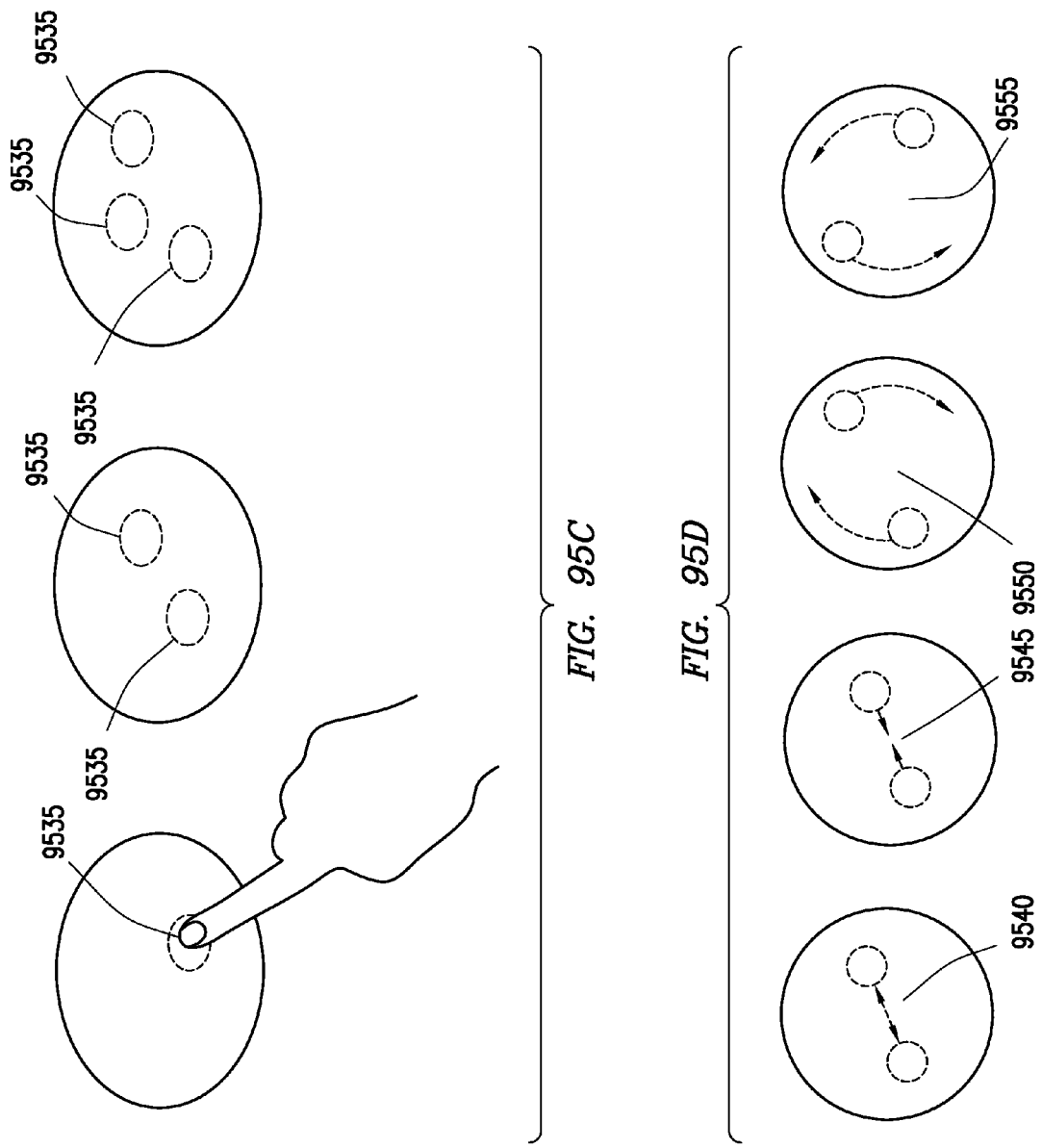

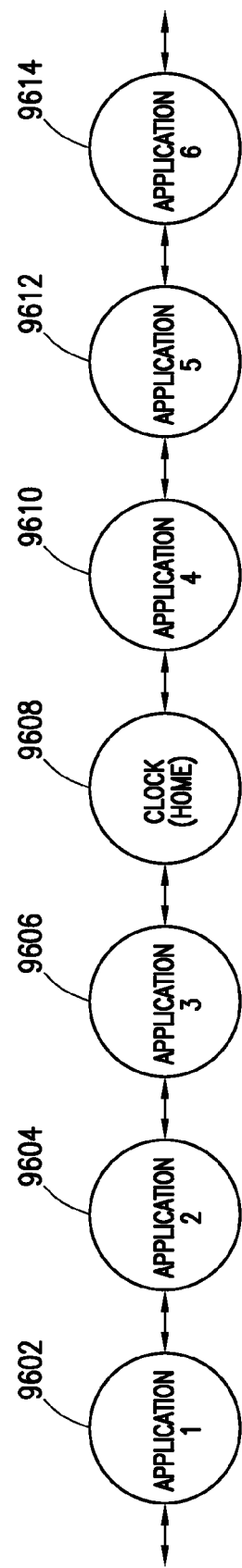
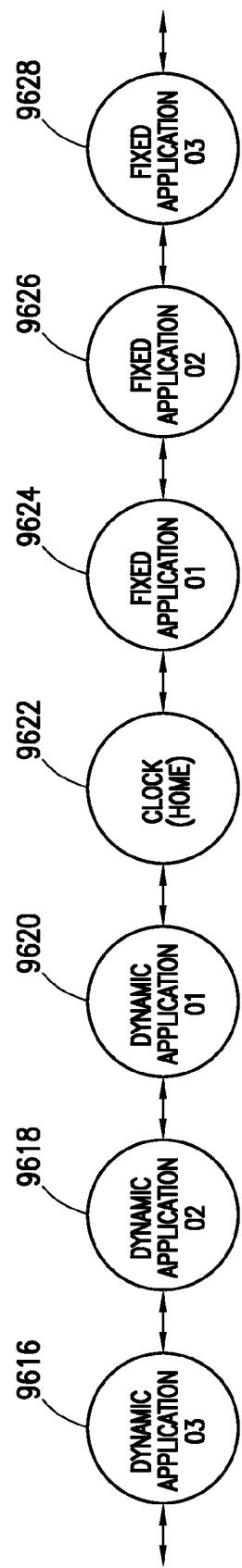
FIG. 96A
FIG. 96B

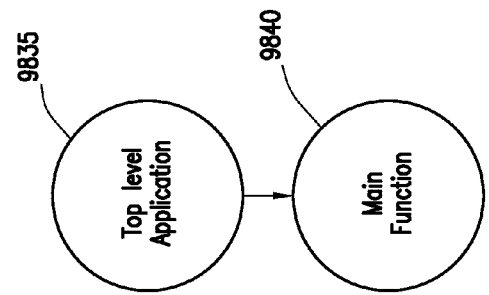
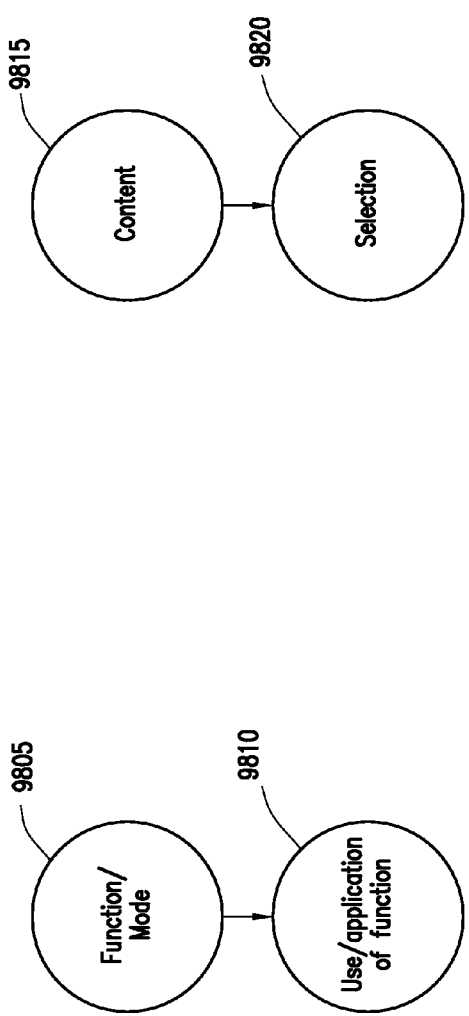
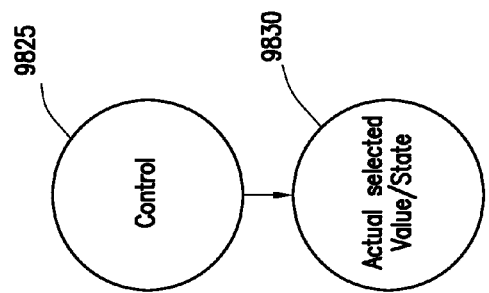
FIG. 98D
FIG. 98B
FIG. 98C
FIG. 98A

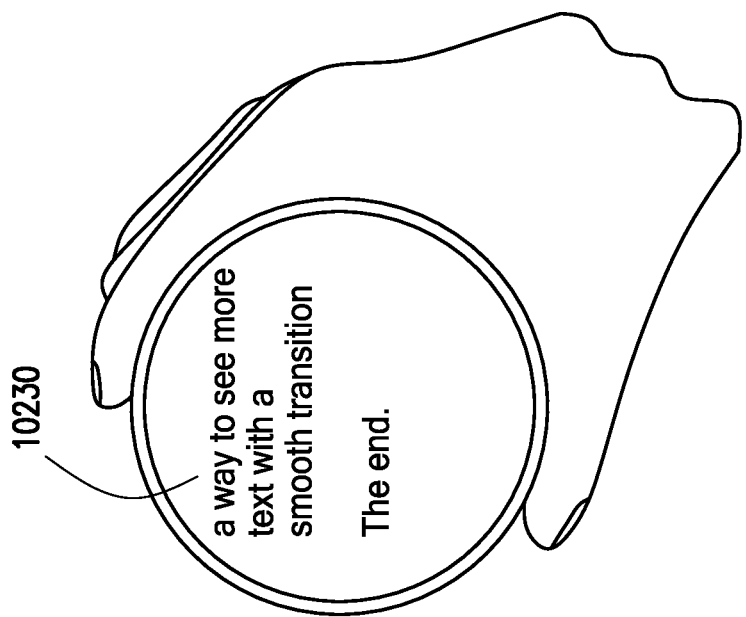
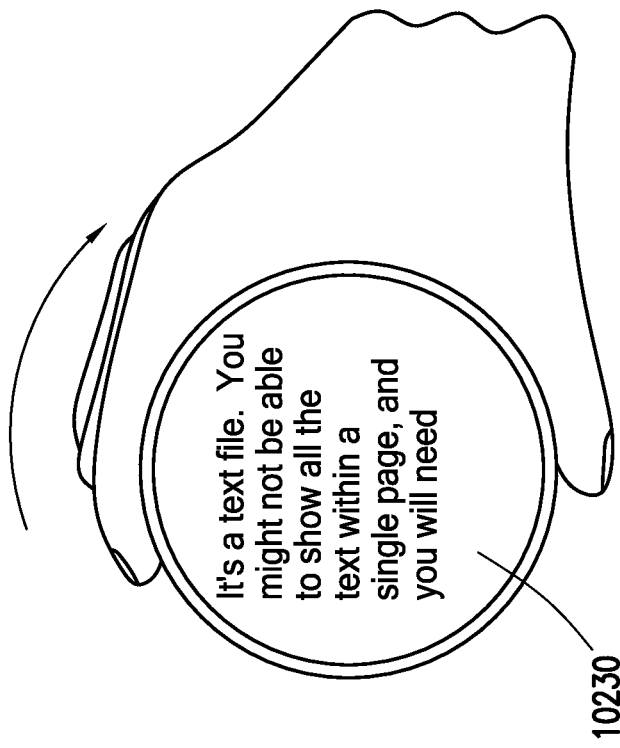
FIG. 102D

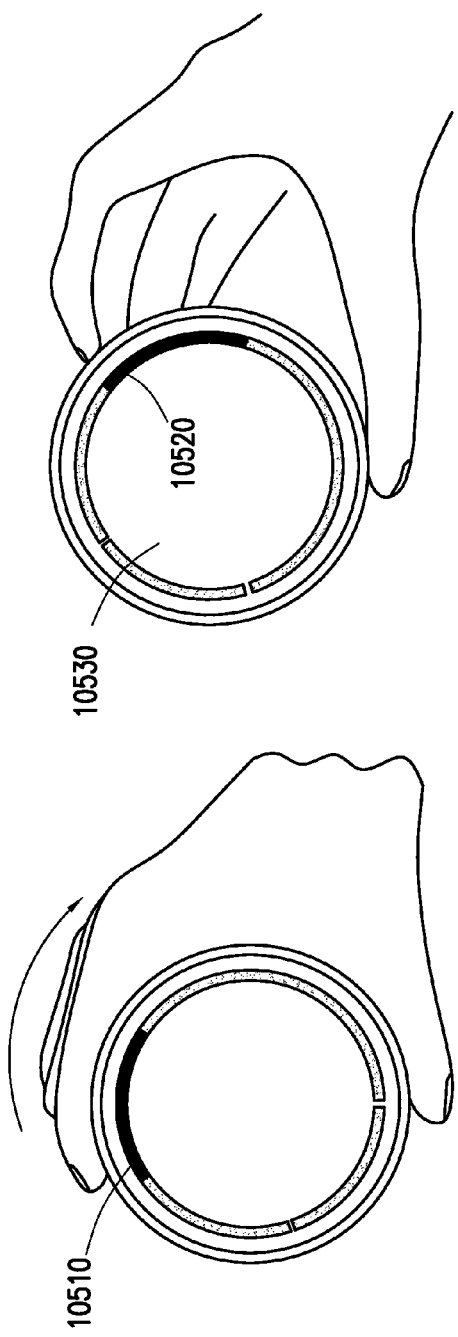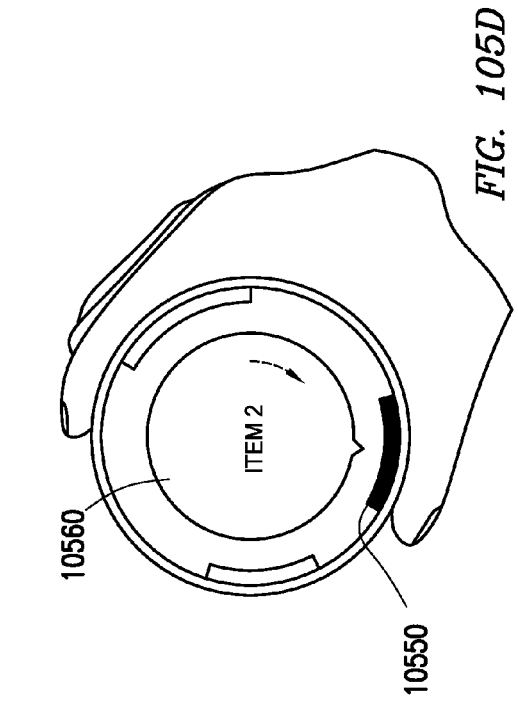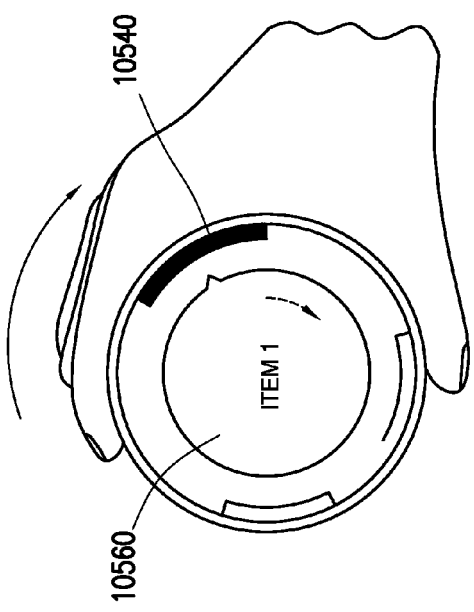

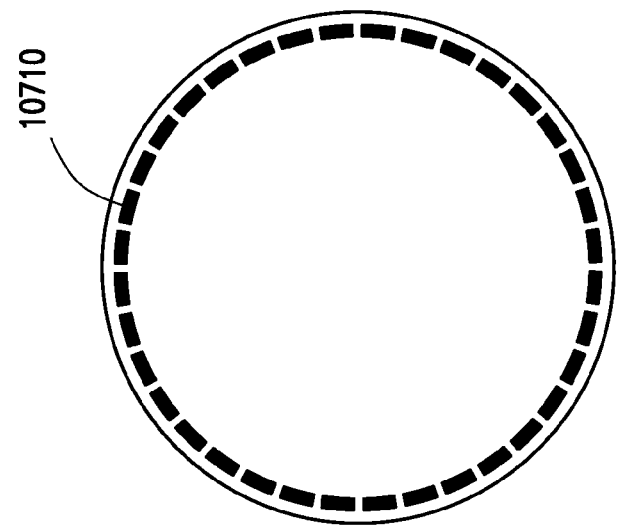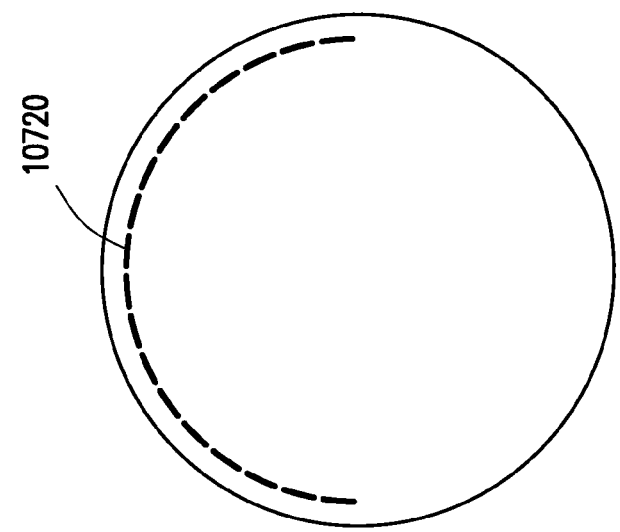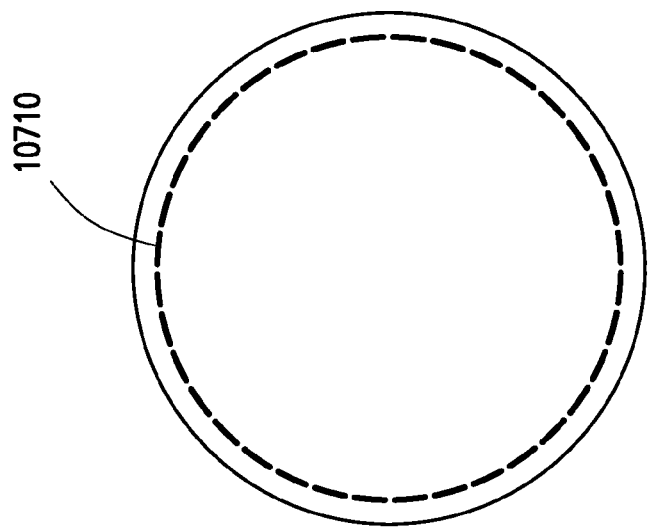
FIG. 107A

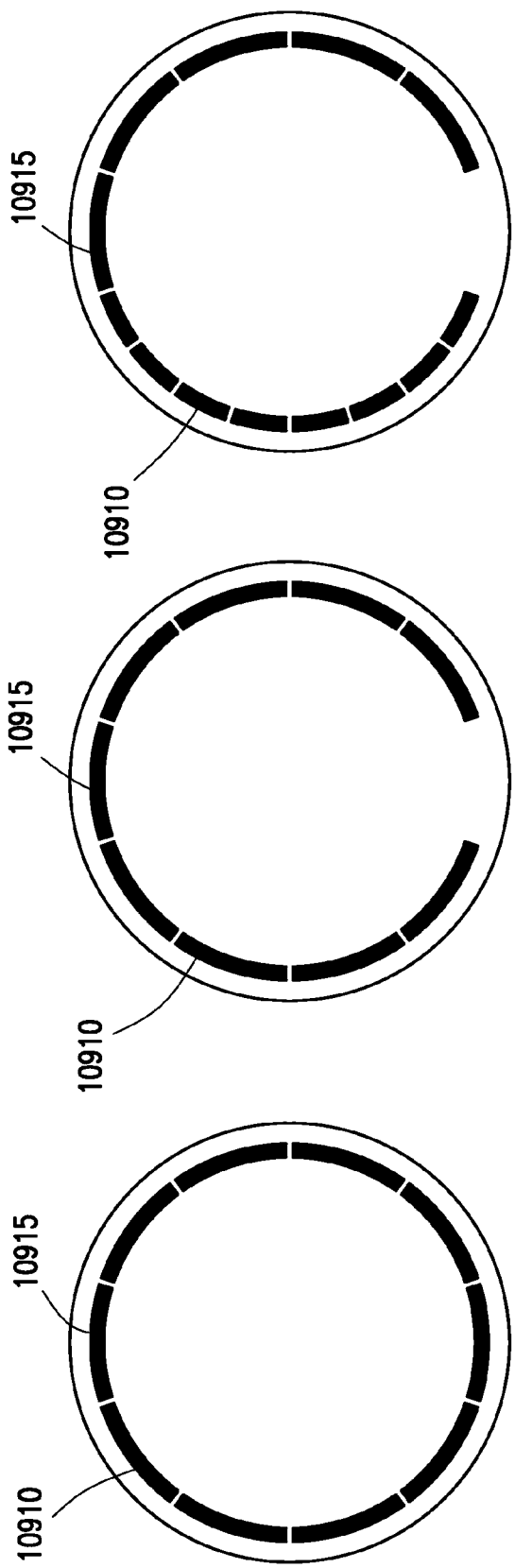

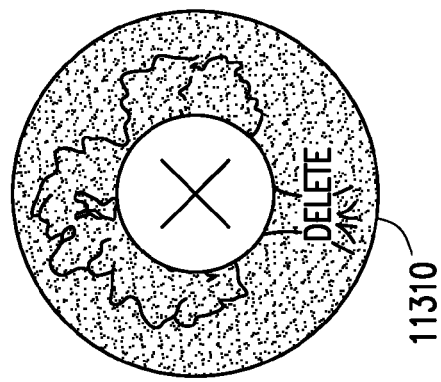
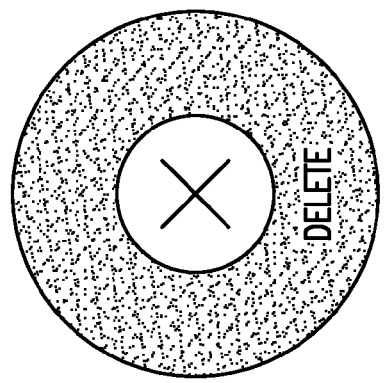
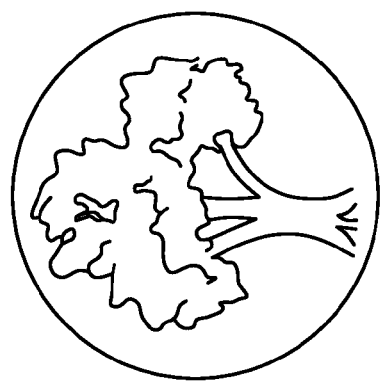
FIG. 113a

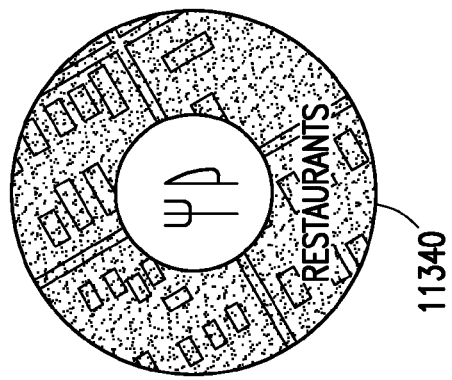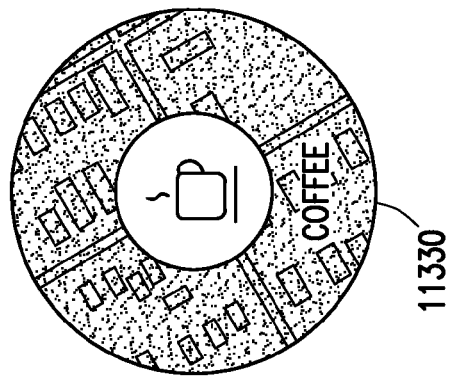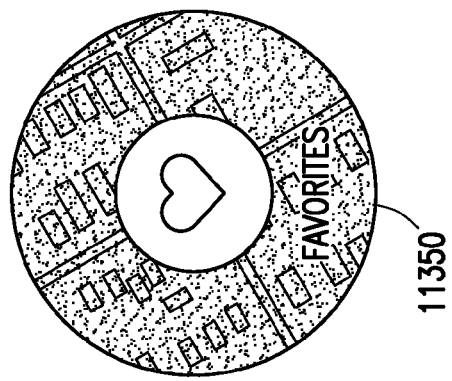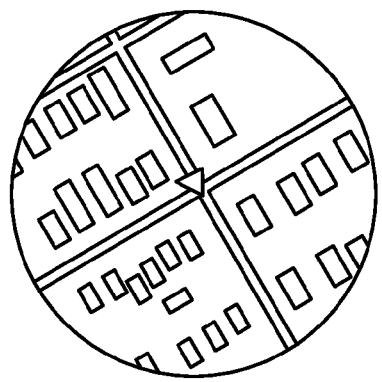
FIG. 113c

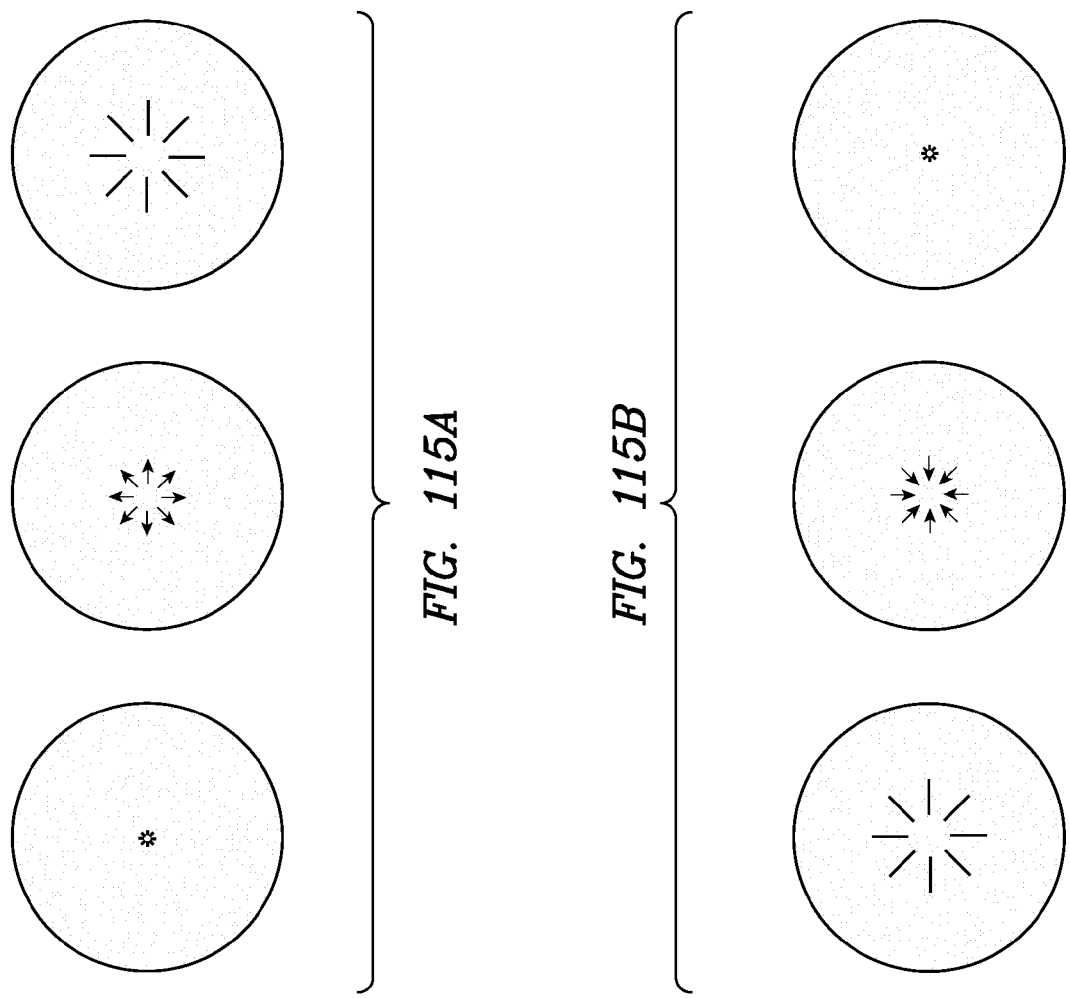

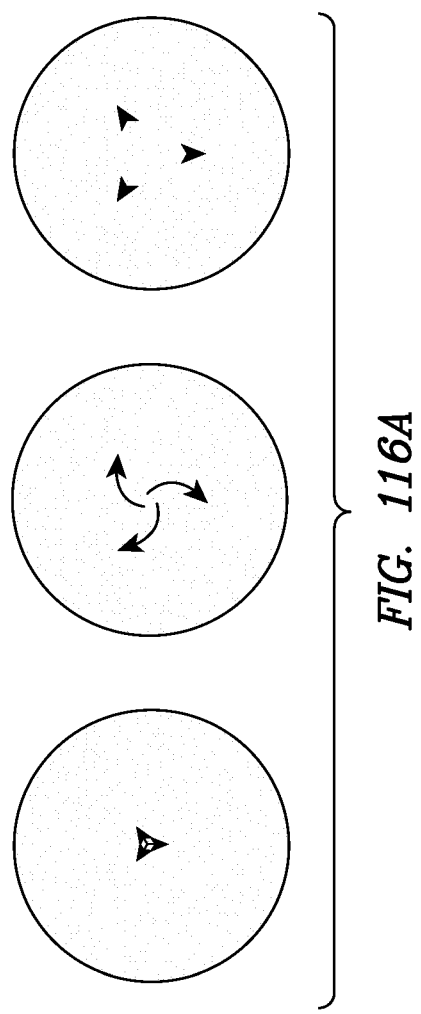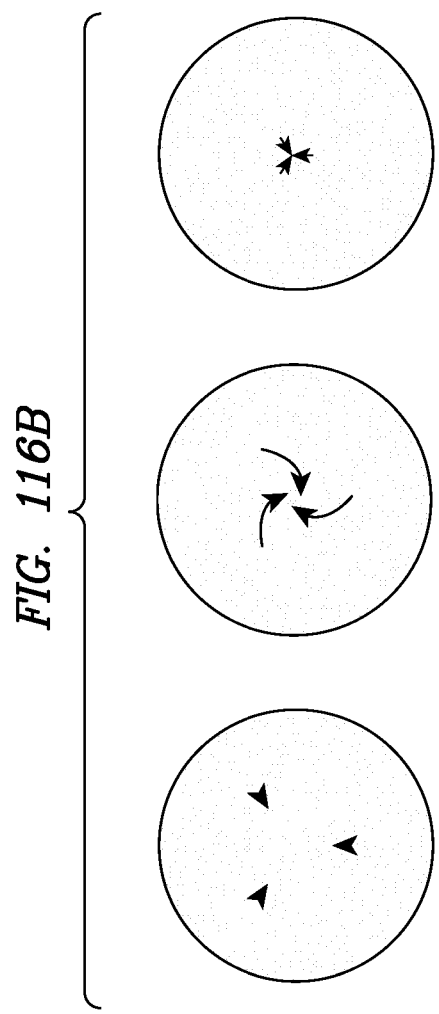
FIG. 116A
FIG. 116B

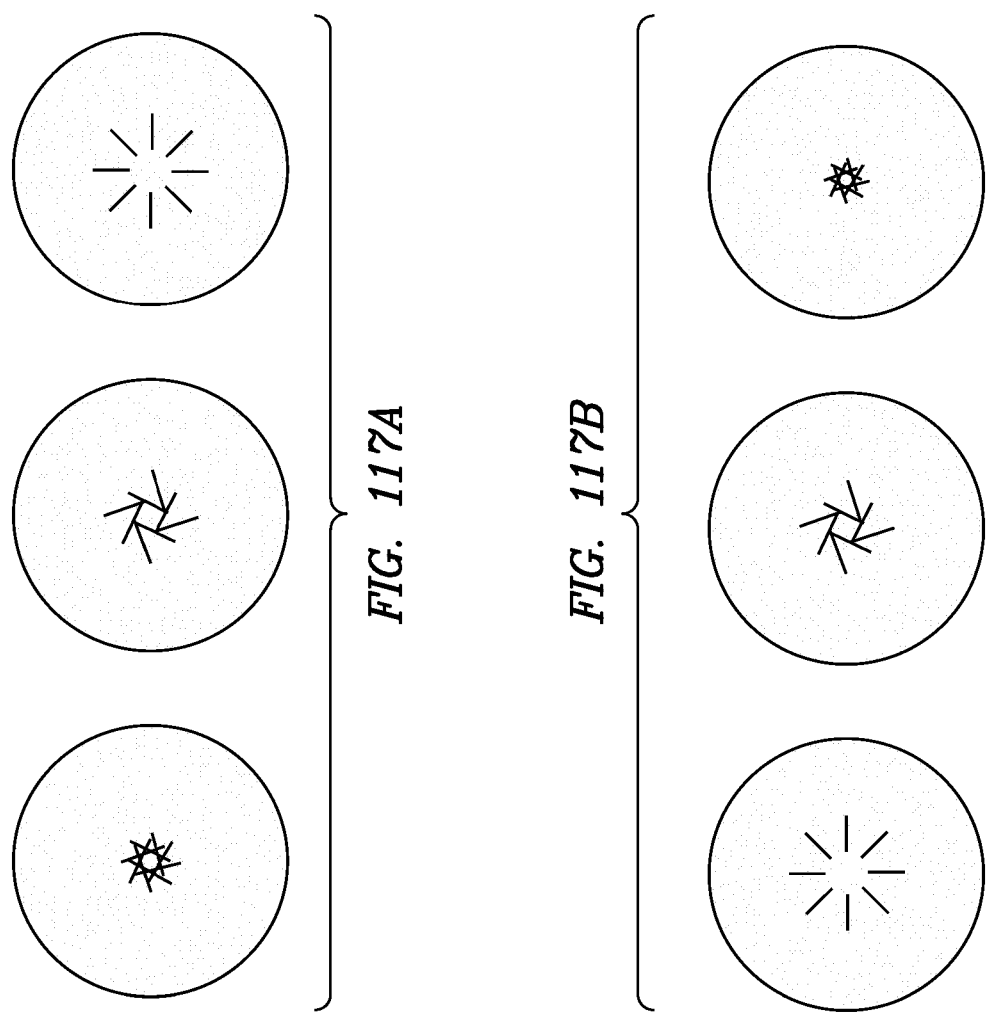

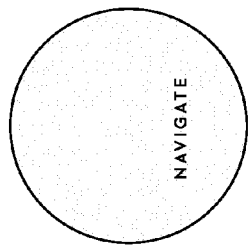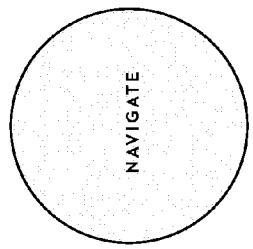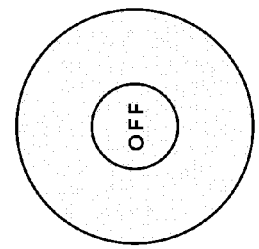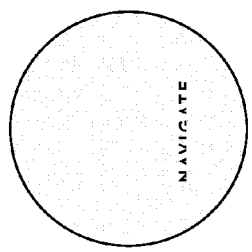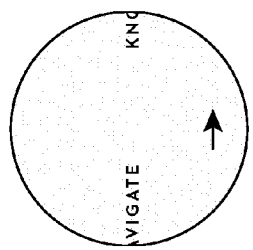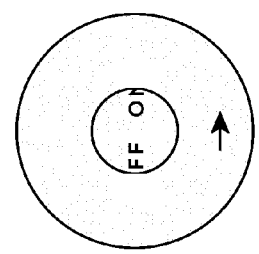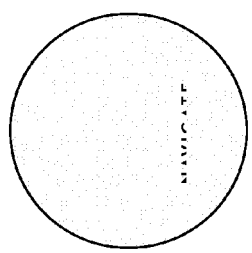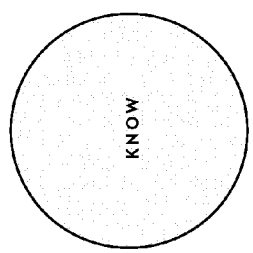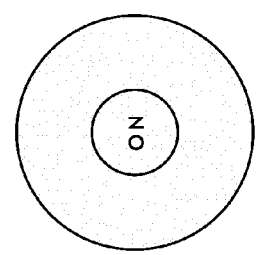
FIG. 118A  FIG. 118B  FIG. 118C

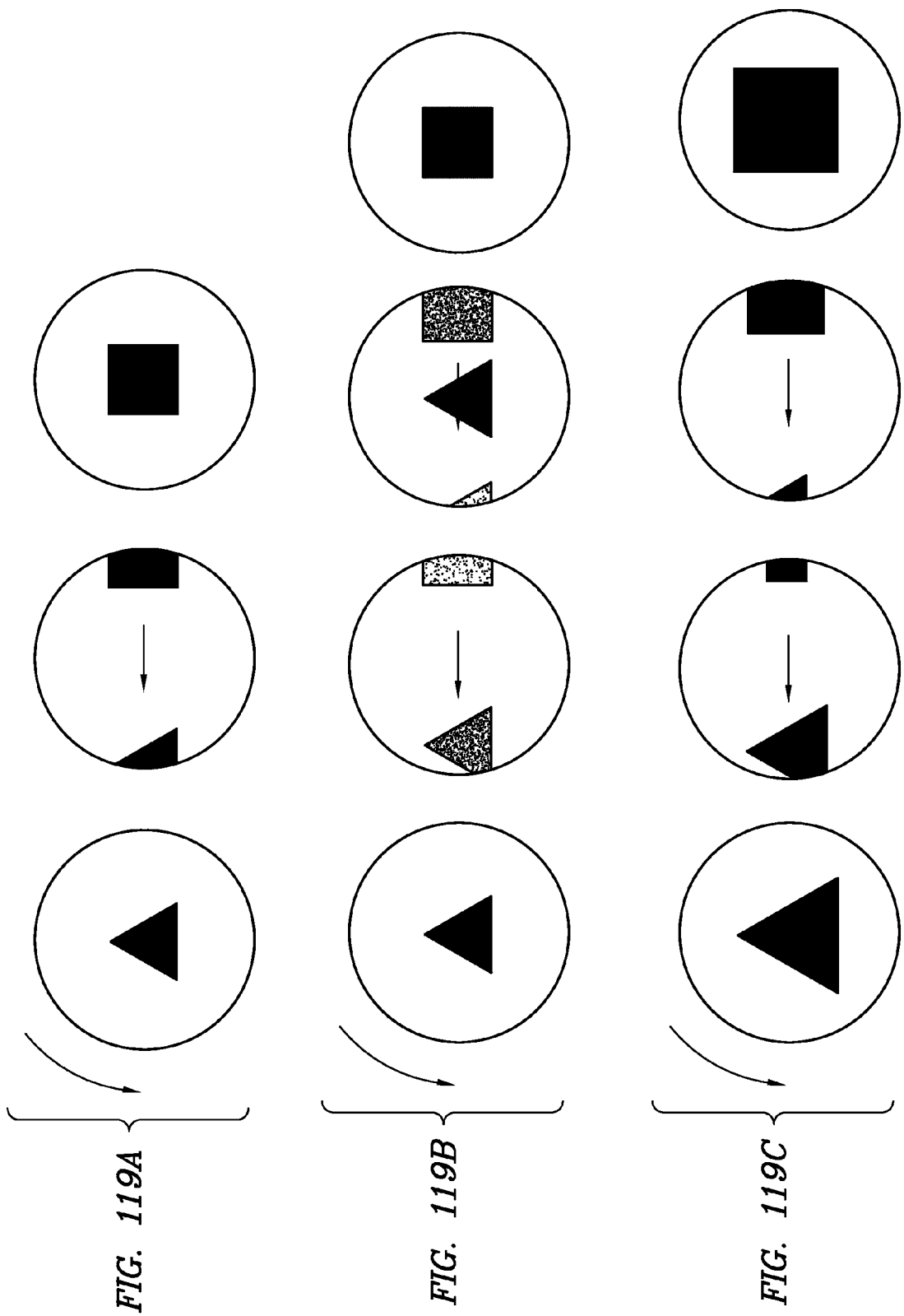

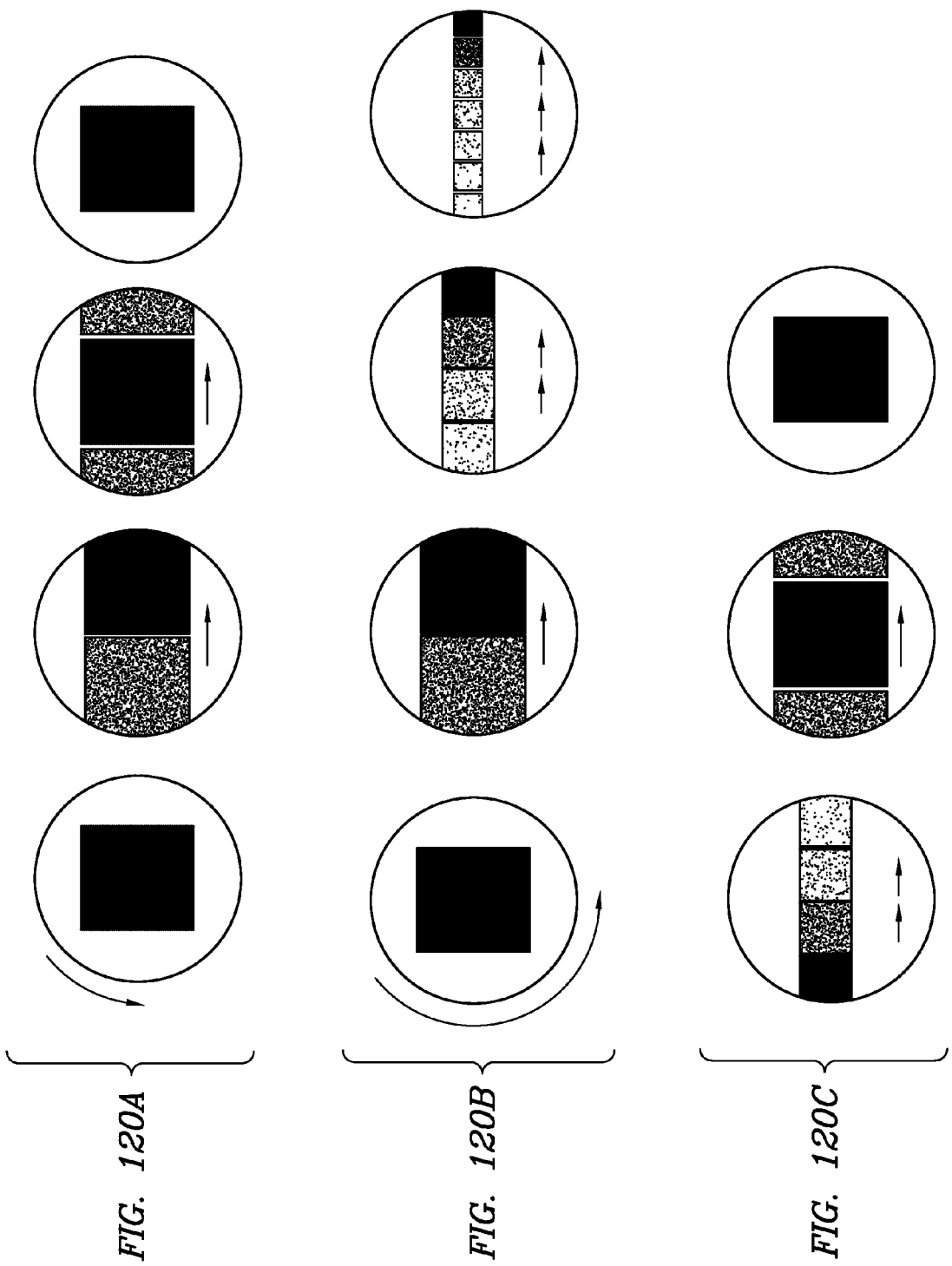

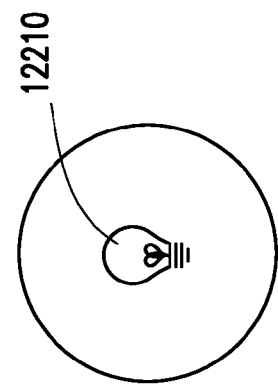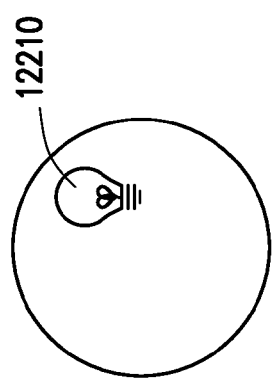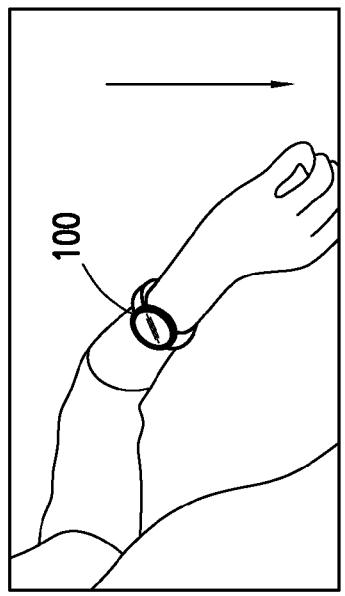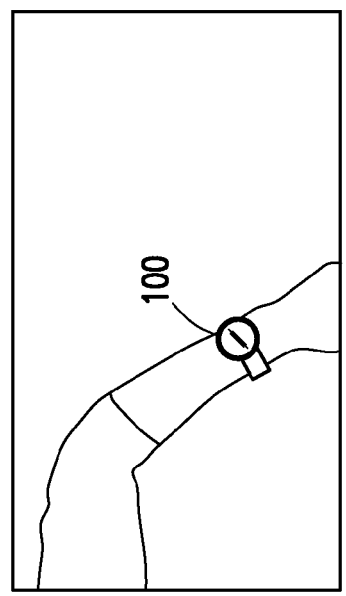
FIG. 122

|  | 1 YEAR | 3 YEAR | 5 YEAR |
|---|---|---|---|
| DEVICE (e.g. WATCH) | ++ | +++ | +++ |
| PHONE | ++ | + | - |
| SERVER | + | ++ | +++ |

FIG. 127

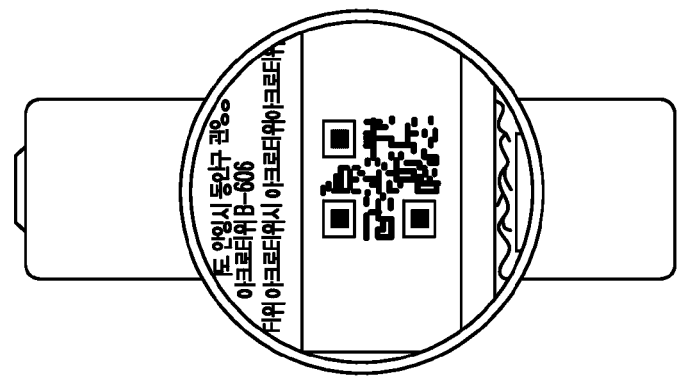
FIG. 131A  BARCODE RECOGNITION
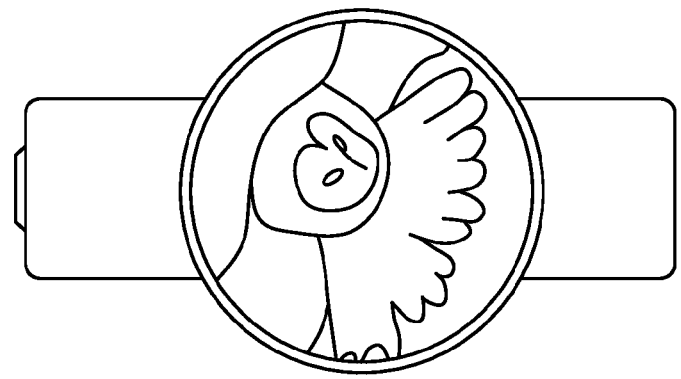
FIG. 131B  IMAGE RECOGNITION
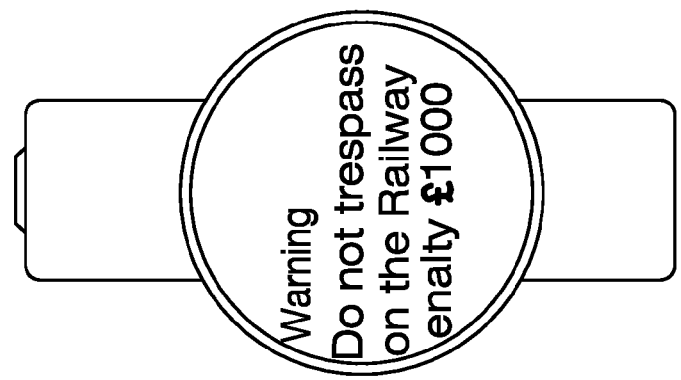
FIG. 131C  OCR AND TRANSLATE
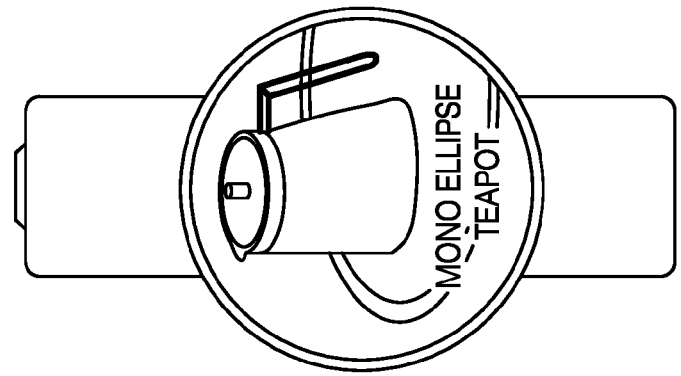
FIG. 131D  OBJECT RECOGNITION

USER GESTURE INPUT TO WEARABLE ELECTRONIC DEVICE INVOLVING OUTWARD-FACING SENSOR OF DEVICE

PRIORITY

This application claims the benefit, under 35 U.S.C. §119(e), of U.S. Provisional Patent Application No. 61/728,765, filed 20 Nov. 2012, U.S. Provisional Patent Application No. 61/728,770, filed 20 Nov. 2012, U.S. Provisional Patent Application No. 61/773,803, filed 6 Mar. 2013, U.S. Provisional Patent Application No. 61/728,773, filed 20 Nov. 2012, U.S. Provisional Patent Application No. 61/773,813, filed 7 Mar. 2013, U.S. Provisional Patent Application No. 61/773,815, filed 7 Mar. 2013, U.S. Provisional Patent Application No. 61/773,817, filed 7 Mar. 2013, U.S. Provisional Patent Application No. 61/775,688, filed 11 Mar. 2013, U.S. Provisional Patent Application No. 61/775,687, filed 11 Mar. 2013, and U.S. Provisional Patent Application No. 61/775,686, filed 11 Mar. 2013, which are all incorporated herein by reference.

TECHNICAL FIELD

This disclosure generally relates to an wearable electronic device.

BACKGROUND

Mobile electronic devices provide a user with access to computing capabilities even as the user moves about various locations. Examples of mobile electronic devices include mobile phones, media players, laptops, tablets, PDAs, or hybrid devices that include functionality of multiple devices of this type.

Mobile electronic devices may be part of a communication network such as a local area network, wide area network, cellular network, the Internet, or any other suitable network. A mobile electronic device may use a communication network to communicate with other electronic devices, for example, to access remotely-stored data, access remote processing power, access remote displays, provide locally-stored data, provide local processing power, or provide access to local displays. For example, networks may provide communication paths and links to servers, which may host applications, content, and services that may be accessed or utilized by users via mobile electronic devices. The content may include text, video data, audio data, user settings or other types of data. Networks may use any suitable communication protocol or technology to facilitate communication between mobile electronic devices, such as, for example, BLUETOOTH, IEEE WI-FI (802.11a/b/g/n/ac), or TCP/IP.

BRIEF DESCRIPTION OF THE DRAWINGS

FIGS. 3A-3E illustrate example form factors of a device.
FIGS. 8A-8C illustrate example outer elements about a device body.
FIG. 9 illustrates an example sealing ring of a device.
FIG. 10 illustrates an example retention ring of a device.
FIGS. 13A-13I illustrate example embodiments for fastening or affixing a band of a device.
FIGS. 25A-25E illustrate example embodiments of energy storage and charging in a device and a charging unit.
FIGS. 27-92 illustrate example gestures for use with a device.
FIGS. 94A-94C illustrate example user inputs to a device.
FIGS. 95A-95D illustrate example user touch input to a device.
FIGS. 96A-96B illustrate example graphical user interface models of a device.
FIGS. 98A-98G illustrate example graphical user interface models of a device.
FIGS. 102A-102D illustrate example screens of a graphical user interface of a device.
FIGS. 105A-105D illustrate example menus of a graphical user interface of a device.
FIGS. 107A-107C illustrate example menus of a graphical user interface of a device.

FIGS. 109A-109C illustrate example menus of a graphical user interface of a device.

FIGS. 113A-C illustrate examples of overlay and background content in a graphical user interface of a device.

FIGS. 115A-115B illustrate example visual transition effects in a graphical user interface of a device.

FIGS. 116A-116B illustrate example visual transition effects in a graphical user interface of a device.

FIGS. 117A-117B illustrate example visual transition effects in a graphical user interface of a device.

FIGS. 118A-118C illustrate example visual transition effects in a graphical user interface of a device.

FIGS. 119A-119C illustrate example visual transition effects in a graphical user interface of a device.

FIGS. 120A-120C illustrate example visual transition effects in a graphical user interface of a device.

FIG. 122 illustrates an example use of a physical model in a graphical user interface of a device.

FIG. 127 illustrates example delegation models including a device.

FIGS. 131A-131D illustrate example modes of a device.

DESCRIPTION OF EXAMPLE EMBODIMENTS

Figure 1:
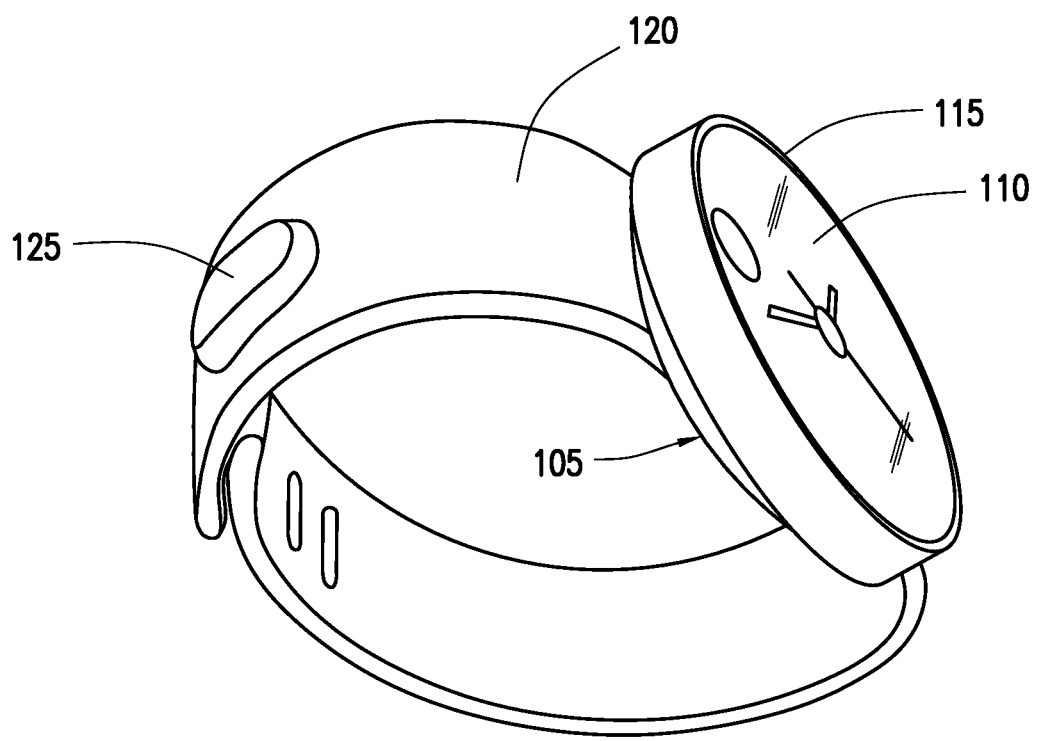
FIG. 1 illustrates an example embodiment of an wearable electronic device.

FIG. 1 illustrates an example embodiment of an wearable electronic device 100. Device 100 includes a body 105 containing all or some of the circuitry, structure, and display of device 100. For example, body 105 may include all or some of the processing components, data storage components, memory, sensors, wiring, or communication components of device 100. In particular embodiments, device 100 may include a display. The display may take any suitable form or shape, such as for example a circular shape, as illustrated by circular display 110. As used herein, where appropriate, "circular display" includes substantially circular displays or circular-like displays, such as for example elliptical displays. In particular embodiments, device 100 may include an element about the display. As used herein, an element about the display includes a rotatable element encircling the display or the body on or in which the display sits. As an example, an element may be an outer ring 115 about a circular display 110. In particular embodiments, the element about the display may move relative to the display or body. For example, outer ring 115 may rotate relative to the body of device 100, as described more fully below. In particular embodiments, device 100 may include a band 120 attached to body 105. In particular embodiments, device 100 may include a sensor module, such as for example camera module 125 housing a camera, affixed in or to body 105 or band 125, as described more fully below.

Figure 2:
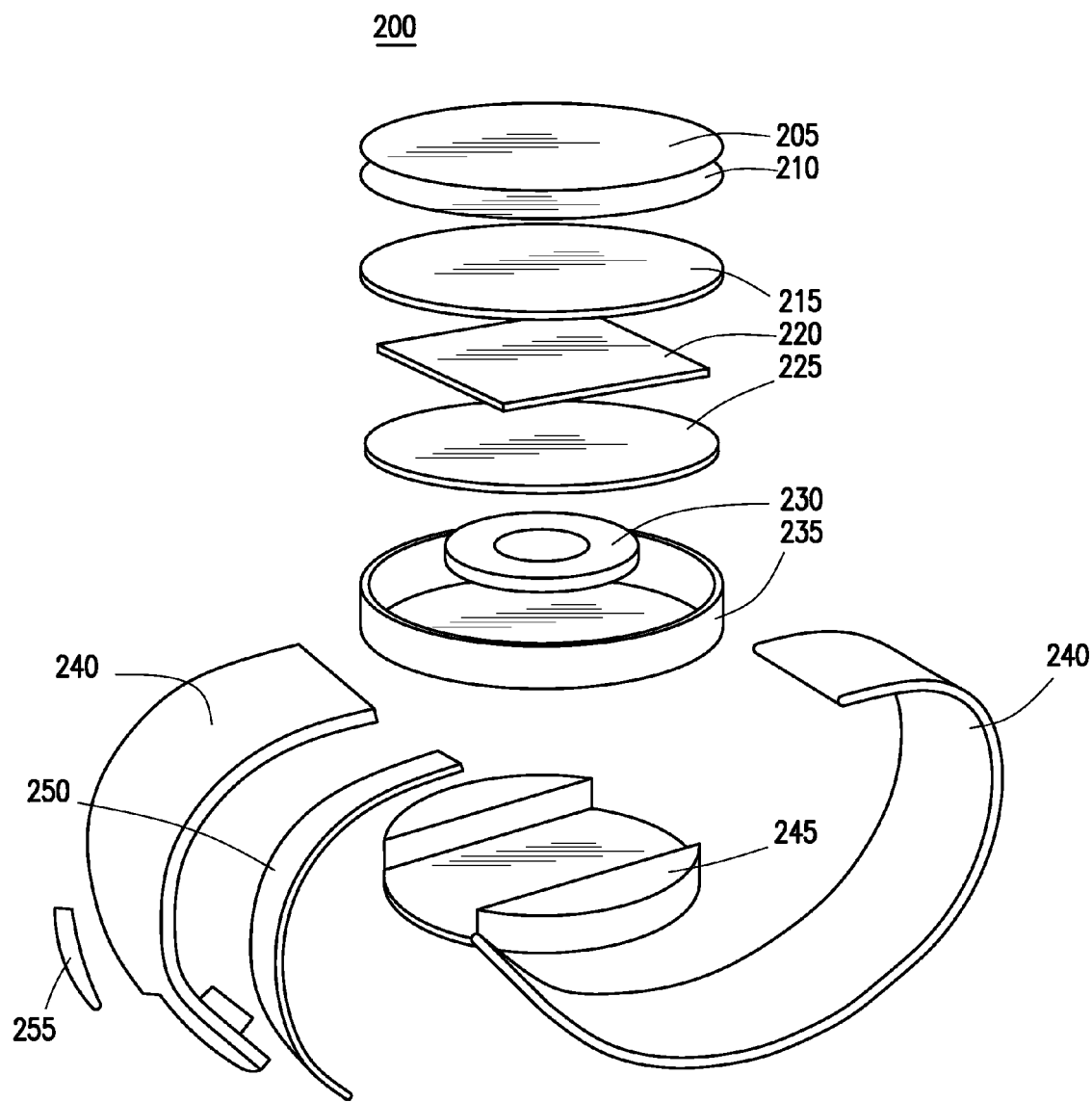
FIG. 2 illustrates an example stack-up of a device.

Particular embodiments of an wearable electronic device include a stack-up that allows some or all of the processing and display system to fit inside the body of the device, which may be encompassed by an element, such as an outer ring, that provides at least one way for the user to interact with the device. In addition or the alternative, particular embodiments may include external components incorporated into the band for additional functionality, as described more fully herein. FIG. 2 illustrates an example stack-up 200 of an wearable electronic device. As illustrated in FIG. 2, some or all of the components of stack-up 200 may adopt the form of the device, which is circular in the example of FIG. 2. Stack-up 200 may include a layer of protective glass (or other suitable transparent, solid material) 205. Other components may be laminated to protective glass 205, or be attached to base 245. In addition or the alternative, protective layer 205 may be mechanically connected to outer ring 235, or any other suitable component of the body of the device. Directly beneath protective glass 205 may be a touch-sensitive layer 210. Touch-sensitive layer 210 may be composed of any suitable material and be of any suitable type, such as for example resistive, surface acoustic wave, capacitive (including mutual capacitive or self-capacitive), infrared, optical, dispersive, or any other suitable type. Touch-sensitive layer 210 may be applied directly to protective glass 205, laminated onto it, or physically affixed to. Touch-sensitive layer 210 may be a fully two-dimensional touch surface, or may be composed of touch-sensitive regions, such as a number of capacitive buttons or areas. Touch-sensitive layer 210 may be connected to processor board 215 via a flexible connector at the edge of the touch surface, as described more fully herein Below the touch-sensitive layer 210 may be a circular display 215, which may be laminated or mechanically affixed to any of the preceding or forgoing layers. In particular embodiments, lamination may reduce glare and improve display legibility by reducing internal reflections. As described more fully below, display 215 may have an outer inactive area that may be symmetric or asymmetric. Display 215 may be positioned such that it is axially centered relative to protective layer 205 for a visually symmetric presentation. Display 215 may be of any suitable type, such as for example light-emitting diode (LED), organic light emitting diode (OLED), or liquid crystal display (LCD). In particular embodiments, display 215 may be flexible. In particular embodiments, display 215 may be partially transparent. In particular embodiments, display 215 may be translucent.

Below display 215 may be battery 220, which in particular embodiments may be positioned so that base 245 may be reduced in diameter without affecting the size of the battery. Battery 220 may be of any suitable type, such as for example lithium-ion based. Battery 220 may adopt the circular shape of the device, or may adopt any other suitable shape, such as a rectangular form, as illustrated. In particular embodiments, battery 220 may "float" in the device, e.g. may have space above, below, or around the battery to accommodate thermal expansion. In particular embodiments, high-height components such as for example haptic actuators or other electronics may be positioned in the additional space beyond the edge of the battery for optimal packing of components. In particular embodiments, connectors from processor board 225 may be placed in this space to reduce the overall height of the device.

Below battery 220 may be processor board 225. Processor board 225 may include any suitable processing components, such as for example one or more processing units, drive units, sense units, caches, memory elements, or integrated circuits. Processor board 225 may include one or more heat sensors or cooling units (such as e.g., fans) for monitoring and controlling the temperature of one or more processor board components. In particular embodiments, body 105 of the device may itself act as the heat sink Below the processor board may be an encoder 230, encircled by one or more outer rings 235. As described more fully below, encoder 230 may be of any suitable type, and may be part of outer ring 235 or may be a separate component, as illustrated in FIG. 2. In particular embodiments, outer ring 235 may provide the haptic feel of the detent of the outer ring or position sensing of the outer ring 235. When encoder 230 is a mechanical encoder separate from the device body, as illustrated in FIG. 2, the encoder may support the outer ring 235. For example, in particular embodiments encoder 230 is mounted to base 245, and the connections to base 245 or to band 240 may pass through some portion of the encoder, such as, for example, the center of the encoder. In particular embodiments, processor board 225 and one or more layers above may be attached to a central post passing through encoder 235. The post may transfer mechanical forces on components of the device to the post, which may allow components such as the processor board and the display to be supported by the post rather than by the encoder, reducing strain on the encoder. In particular embodiments, outer ring 235 attaches to the moveable portion of the encoder via prongs or other suitable connections.

The device body may conclude with a base 245. Base 245 may be stationary relative to the one or more rotatable components of the device, such as outer ring 235. In particular embodiments, base 245 connects to band 240, described more fully herein. Connections may be mechanical or electrical, such as for example part of the circuitry linking wired communication components in band 240 to processing board 225. In particular embodiments, connectors are positioned to avoid the encoder and the anchor points for the bands. In particular embodiments, band 240 may be detachable from base 245. As described more fully herein, band 240 may include one or more inner connectors 250, one or more optical sensing modules 255, or one or more other sensors. In particular embodiments, the interior of the device, or portions of that interior, may be sealed from the external environment.

Figure 3E:
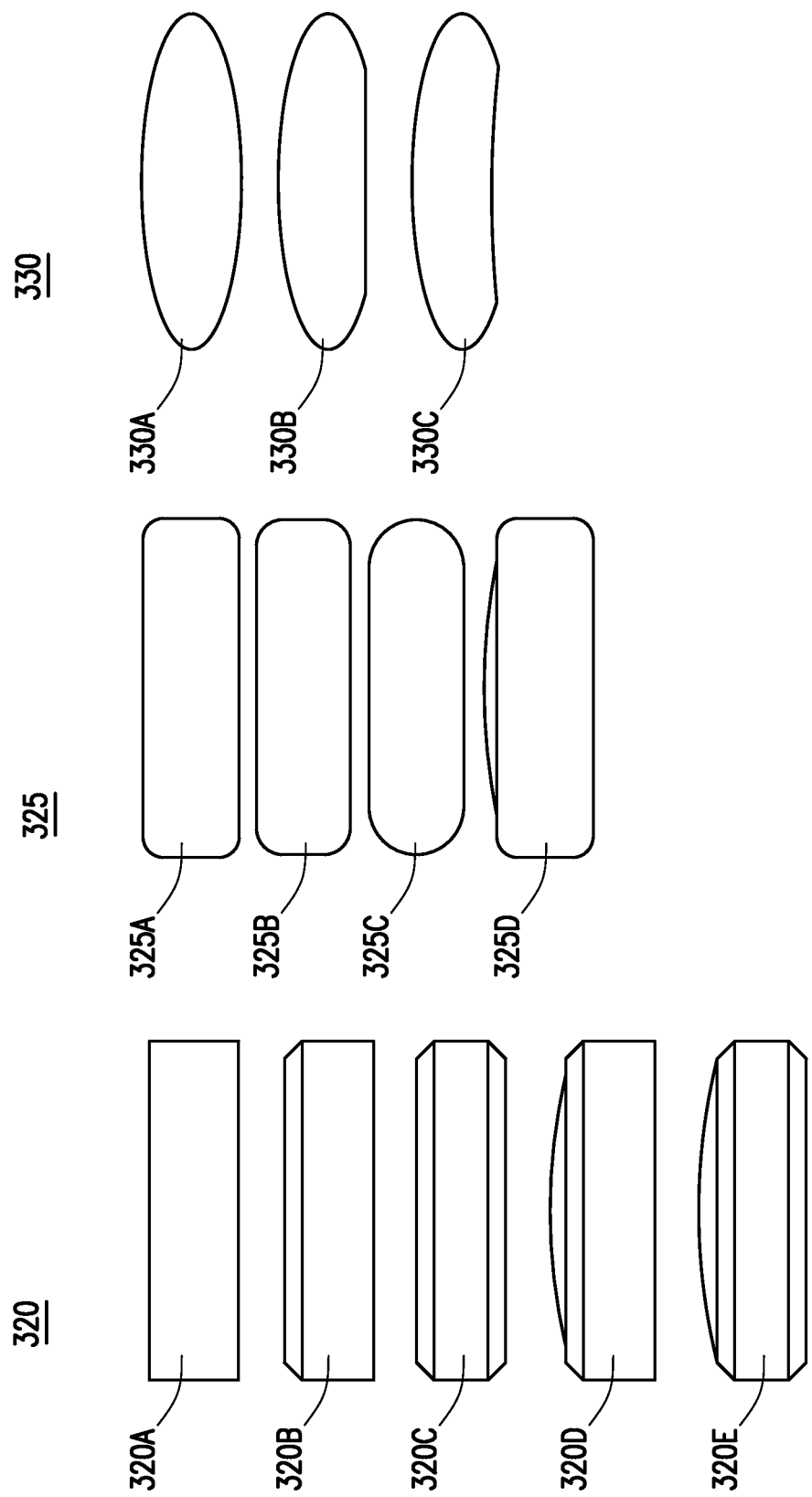

While this disclosure describes specific examples of components in stack-up 200 of wearable electronic device 100 and of the shape, size, order, connections, and functionality of those components, this disclosure contemplates that a wearable device, such as device 100, may include any suitable components of any suitable shape, size, and order connected or communicating in any suitable way. As merely one example, battery 220 may be placed more toward the bottom of the stack up than is illustrated in FIG. 2. As another example, the body of the device may take any suitable form factor, such as elliptoid or disc-like as illustrated by the example of FIG. 3A, tapered on one end as illustrated by the example of FIG. 3B, or beveled or rounded at one or more edges as illustrated by the example of FIGS. 3C-3D illustrating beveled edge 315. FIG. 3E illustrates additional example form factors of the device body, such as for example bodies 320A-E having a polygonal shape with a flat protective covering or display or a curved protective covering or display. As another example, bodies 325A-D have a partially-curved shape with a flat protective covering or display or a curved protective covering or display. Bodies 330A-C have a curved shape. One or more internal components of the device body, such as for example one or more internal components, may take any form factor suitable for the body in which they sit.

Figure 4A:
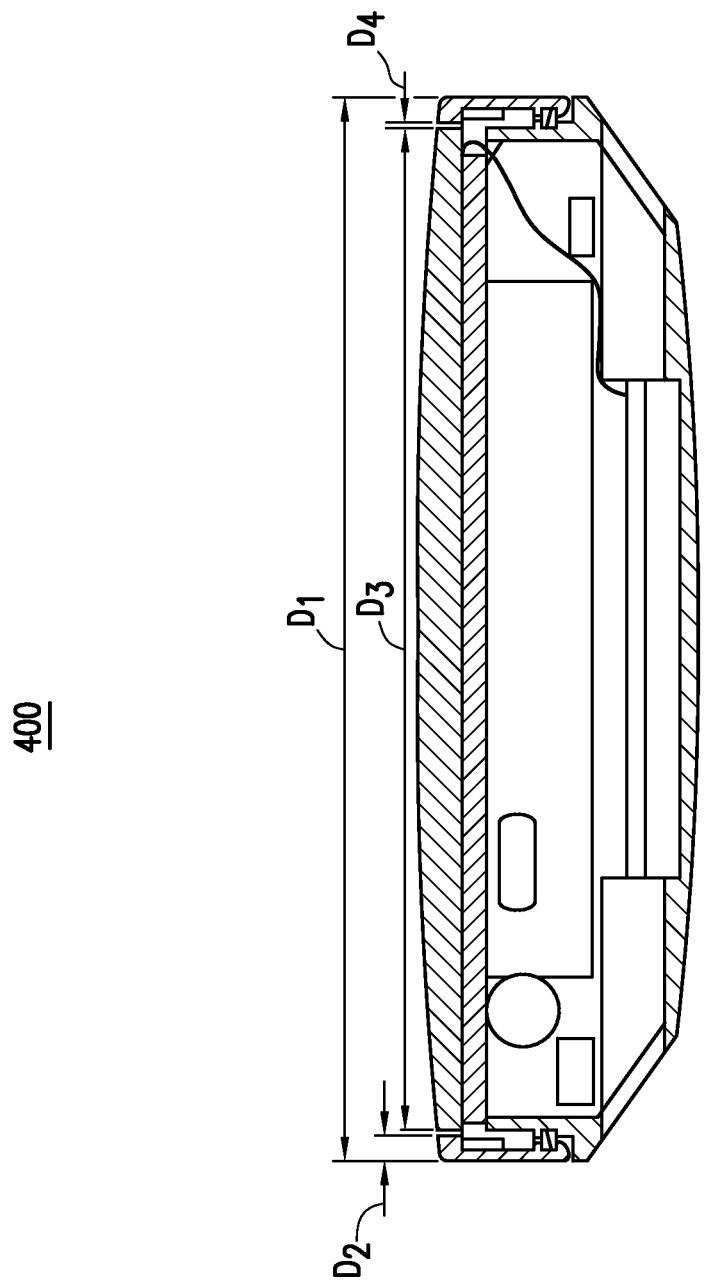
FIG. 4A illustrates an example cross-section of a device body.
Figure 4B:
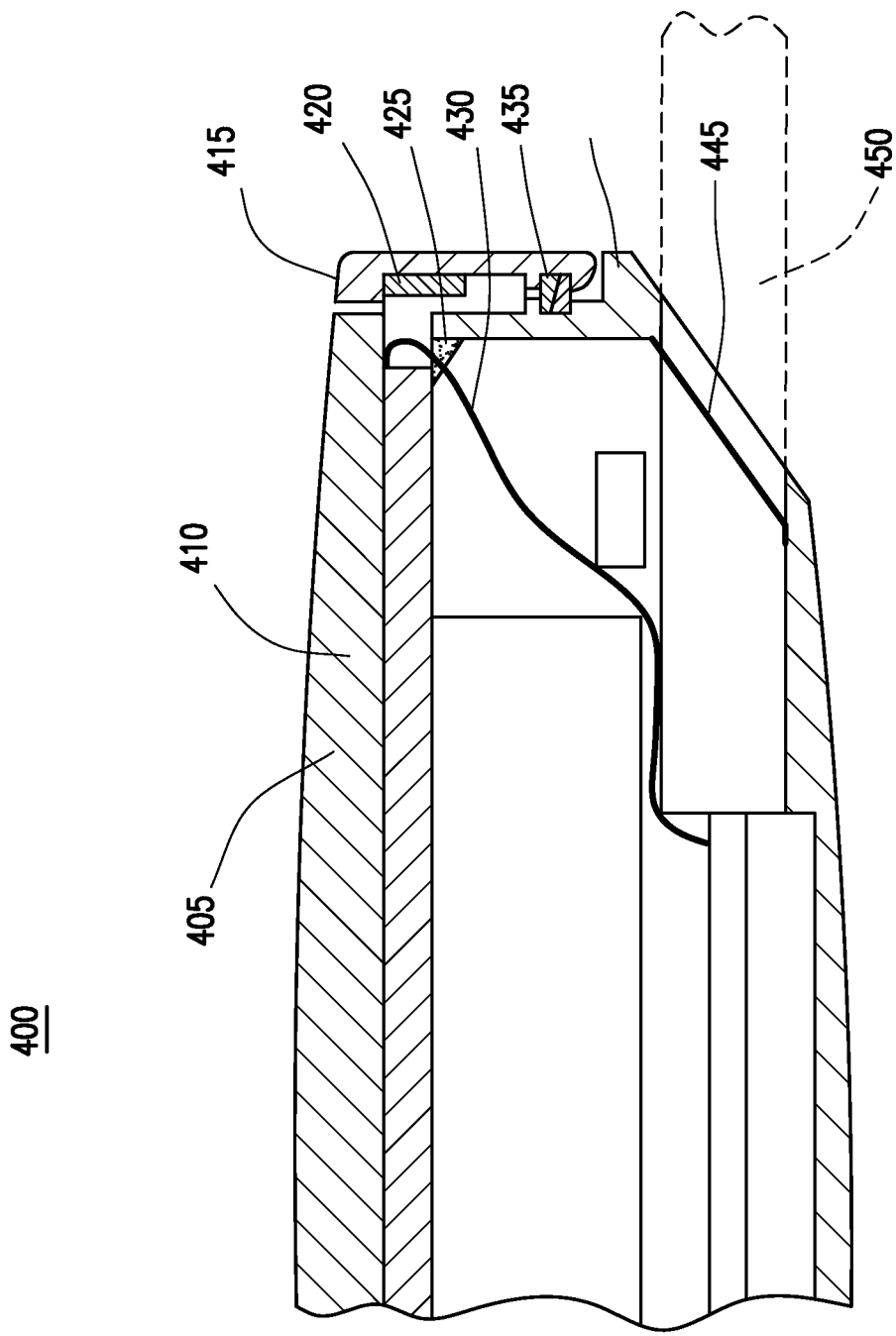
FIGS. 4B-C illustrate example connections between components of a device.
Figure 4C:
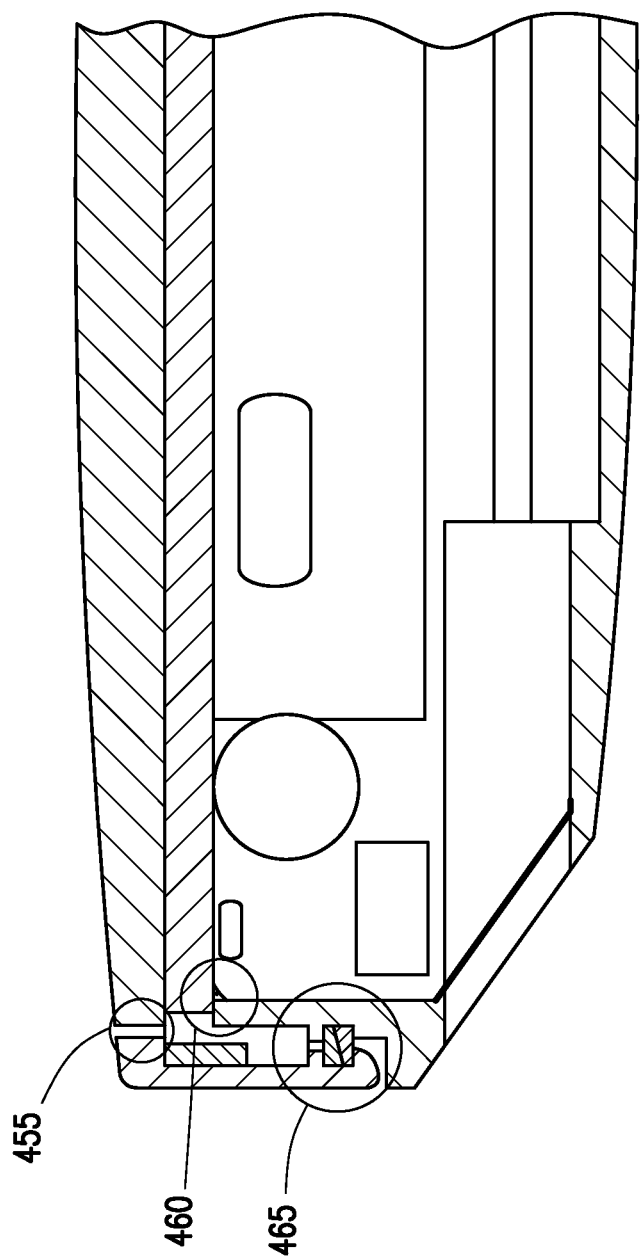
Figure 5B:
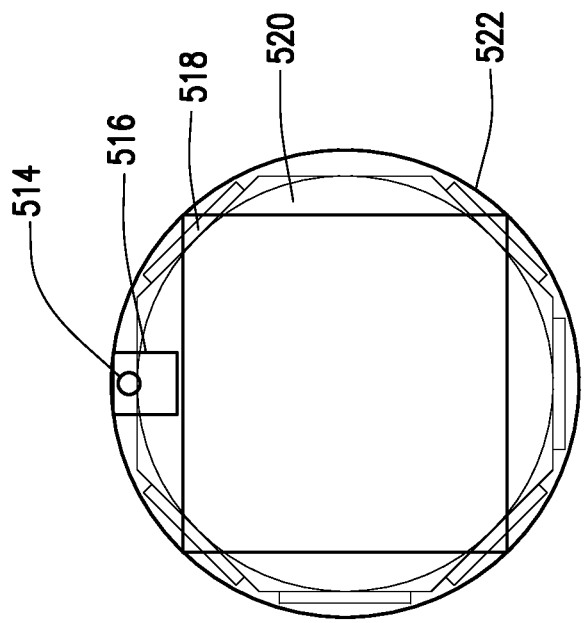
FIGS. 5A-5F illustrate example displays of a device.
Figure 5A:
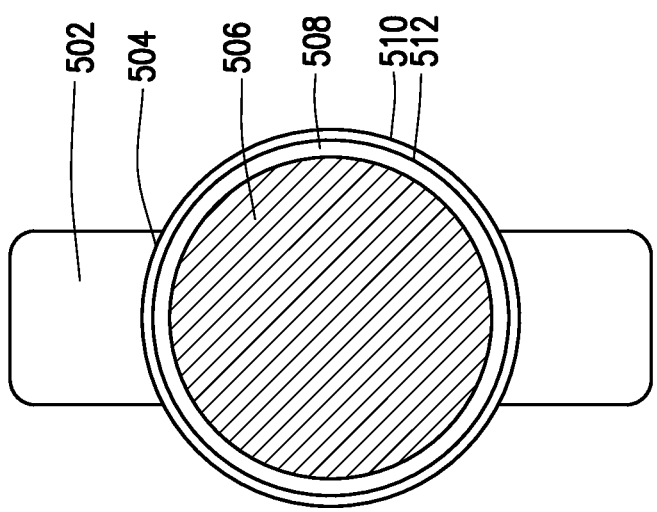

FIG. 4A illustrates an example cross section of a device body. As illustrated, the device body has a width of D1, such as for example approximately 43 millimeters. Particular embodiments may include a slight gap D4 between the outer ring and the OLED display, such as for example a gap of up to 0.3 millimeters. Likewise, there may also be a distance between the outer ring and a glass protective covering (which may have a width D3, such as for example approximately 42.6 millimeters), such as for example 0.2 millimeters. In particular embodiments, the gap between the glass protective covering and the outer ring is greater than the gap between the display and the outer ring. The outer ring (which may include serration) may have a width D2 of, for example, 1.0 millimeter. FIGS. 4B-4C illustrate example set of connections between components of the device. FIG. 4B illustrates a touch glass 405 above a display 410. The display is attached to the top of inner body 440 with, for example, adhesive sealant 425. Display flexible printed circuit 430 couples the display to the electronics within the device body. Adhesive sealing membrane 445 may be used to connect band 450 to the device, and one or more retention rings 435 may be used to connect outer ring 415 to the inner body 440. In particular embodiments, the retention rings may inhibit twisting of the outer ring on its vertical axis and provide physical spacing between the outer ring and the glass covering. A layer of protective glass may sit on the top of the inner body, providing an environmental seal. In particular embodiments, a retention ring may also provide an environmental seal for the inner body. For example, FIG. 5C illustrates an example retention ring 465 attaching an outer ring to the device body and provides an environmental seal between the outer ring and the inner body. In addition or the alternative, flock-type material, possibly coated with a hydrophobe such as, for example, TEFLON, may be used to prevent water and dirt intrusion into the cavity. As another example, the outer ring may be sealed to the inner body with a ring of metal or plastic, preventing air (and thus water vapor or other particles) from moving through the cavity between the outer ring and the inner body. Gap 455 allows the outer ring to move, such as for example by rotation, relative to the inner device body. Adhesive sealant 460 attaches the display to the body and provides an environmental seal between the display and components of the inner body.

In particular embodiments, the display of the device has a circular or elliptical form, and houses a circular display unit, such as for example an LCD display, and an OLED display. The display unit may be mounted such that the visible area is centrally located within the display module. Should the display unit have an offset design, one or more appropriate maskings may be used to obscure part of the display to produce a circular and correctly placed visual outline.

In particular embodiments, a display module has an outer ring that is part of the user interface of the device. The outer ring may rotate while the band holds the bottom and inside part of the device stable. FIG. 5A illustrates an example of a top-view of the device's display relative to other device components. Outer ring 510 may be attached to the front surface 512 of device 508, or it may be independent of front surface 512. In particular embodiments, display 506 does not rotate regardless of rotation of outer ring 510 surrounding display 506. That may be achieved by attaching display 506 to the portion 504 of display module that is affixed to band 502, or by programming displayed content to remain static while the display unit rotates. In the latter case, displayed content is rotated such that the visual vertical axis of the image displayed by the display unit remains parallel to the band at all times.

A display module may additionally incorporate one or more sensors on or near the same surface as the display. For example, the display module may include a camera or other optical sensor, microphone, or antenna. One or more sensors may be placed in an inactive area or of the display. For example, FIG. 5B illustrates device 522 with a camera module 516 placed coplanar with the battery below display 520, with optical opening 514 positioned under the clear section of display 520. Camera module 516 may be placed between gird line connectors 518 for display 520. Any camera or other suitable sensors may be placed coplanar with the display, such as antenna 524 of FIG. 5C, which is placed is inactive area 526. In addition or the alternative, sensors may be placed below or above the display, may be placed in any suitable location in or on the outer body of the device, may be placed in any suitable location in or in the band of a device, or any suitable combination thereof, as described more fully herein. For example, a front-facing-camera maybe placed under the display, on the display, or above the display.

Figure 5D:
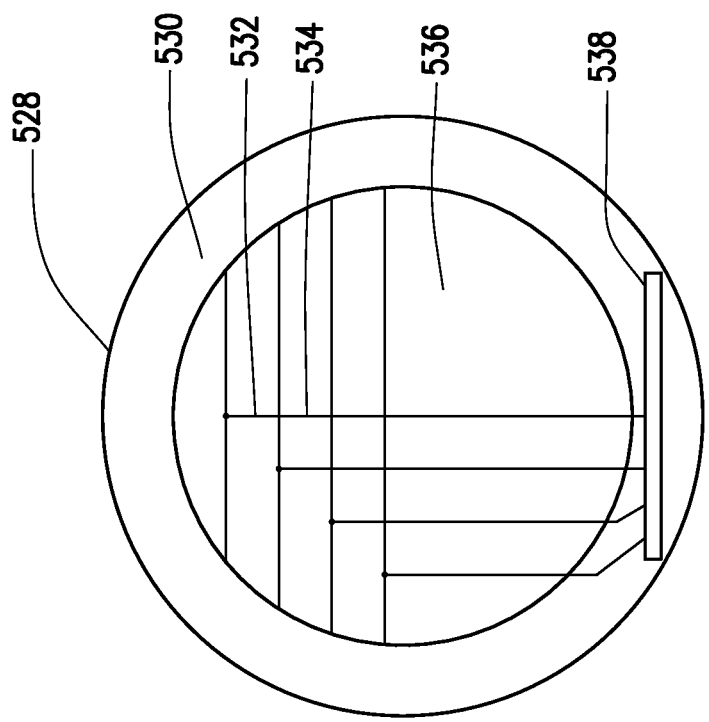
Figure 5C:
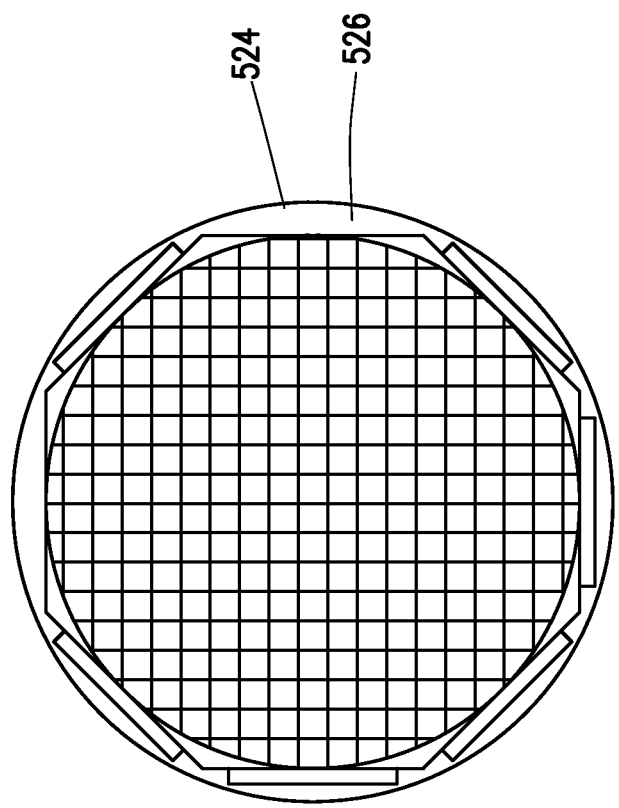

In particular embodiments, the packaging of a circular display includes an inactive area, as illustrated in FIG. 5D. In a traditional display, row drive lines powering the display are routed to the nearest lateral edge, then either routed down along the inactive areas, or connected directly to the driver integrated chips along that edge. A number of approaches may be taken to reduce the amount of inactive area for the display. For example, particular embodiments reduce the size of the inactive area by rerouting grid control lines powering the display to one edge of the display. FIG. 5D illustrates grid control lines 532 routed to one edge of display 536 and connected to a connector 538 routing the lines to the processing center of device 528. In that configuration, inactive area 530 may be minimized.

Figure 5E:
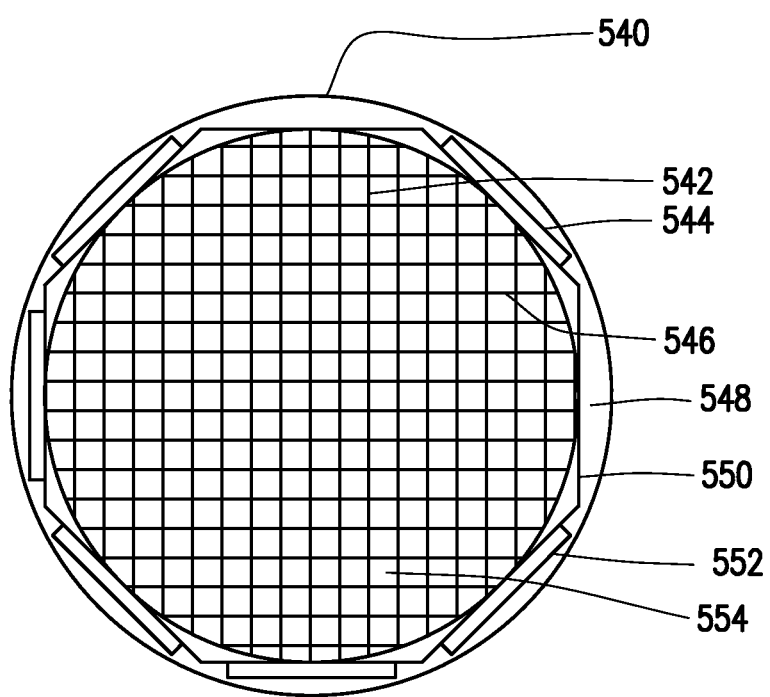

FIG. 5E illustrates another example embodiments for reducing the inactive area of a display 554 of device 540 by creating a polygonal-type display outline, with a circular area masked in the center by one or more masks 550. Connectors 552 are arranged in a polygonal design. Rows 546 and columns 542 of grid lines are routed to the nearest connector 552. In particular embodiments, connectors 552 connect to a flexible circuit behind the display that carries the driver chip. Due to the reduced density of connection, the electronics of FIG. 5E may be easier to connect to a flexible printed circuit board (FPC board) and thus increases yield. In addition, by moving the driver integrated circuit to the back of the display, one or more inactive areas 548 can be further reduced while allowing the integrated circuit to remain on a stable and flat surface. This design is particularly suited to OLED displays, but may be used with LCDs, given that a backlight unit (BLU) may be laminated on to the device before the FPC board is connected. While the above example illustrates a polygonal arrangement of connectors, any suitable arrangement of connectors may be used as long as all pixels are reached by grid lines.

Figure 5F:
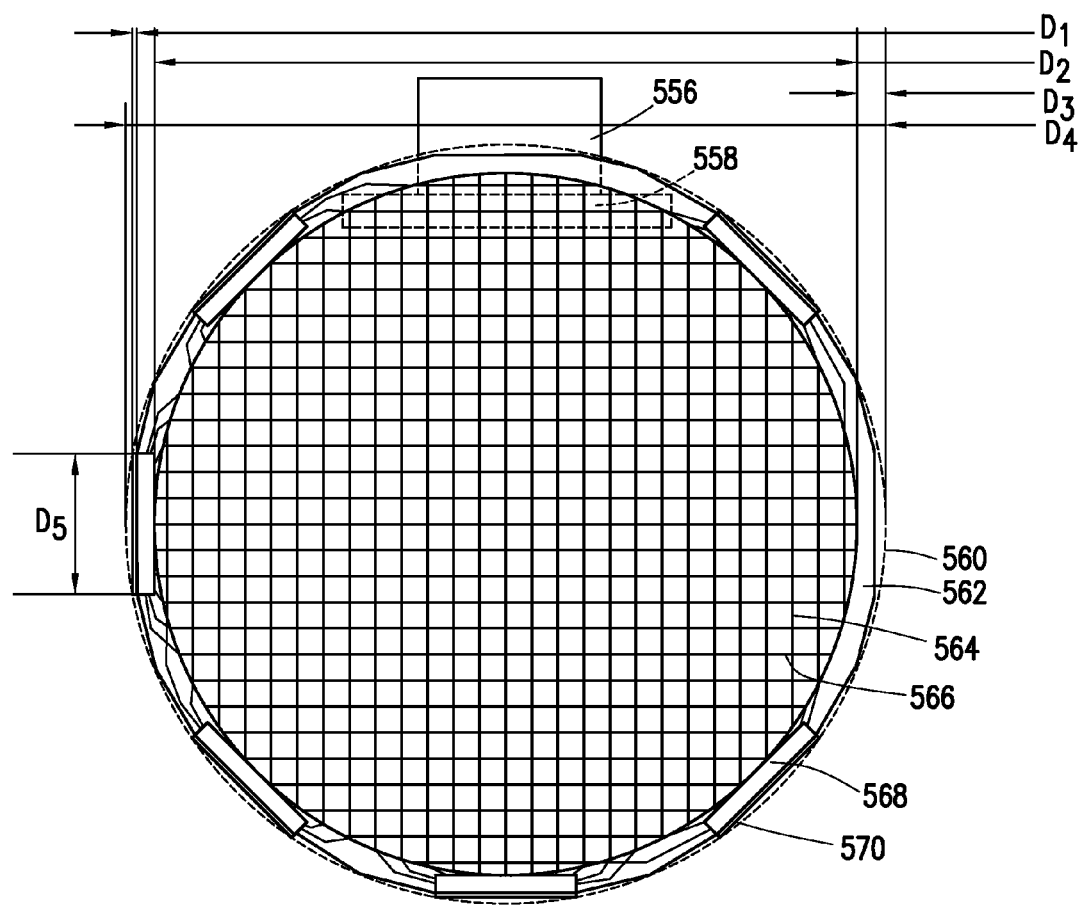

FIG. 5F illustrates an example physical arrangement and sizing of a display of a device. The device has a diameter of D4, such as for example approximately 41.1 millimeters. The device includes one or more inactive areas having a width D3, such as for example approximately 1.55 millimeters. The device includes a visible area with a diameter D2, such as for example approximately 38 millimeters. The device includes connectors 568 for column lines 564 and row lines 566. Connectors 568 may be coupled to the device by one or more FPC bonds 570, which have a width of D1, such as for example approximately 0.2 millimeters. Connectors 568 may have a width D5, such as for example approximately 6 millimeters. Display connector FPC 556 may be used to connected the electronics of the display, such as for example circuitry from connectors 568, to driver chip 558, which may be below the display or on the back of the device body.

Figure 6A:
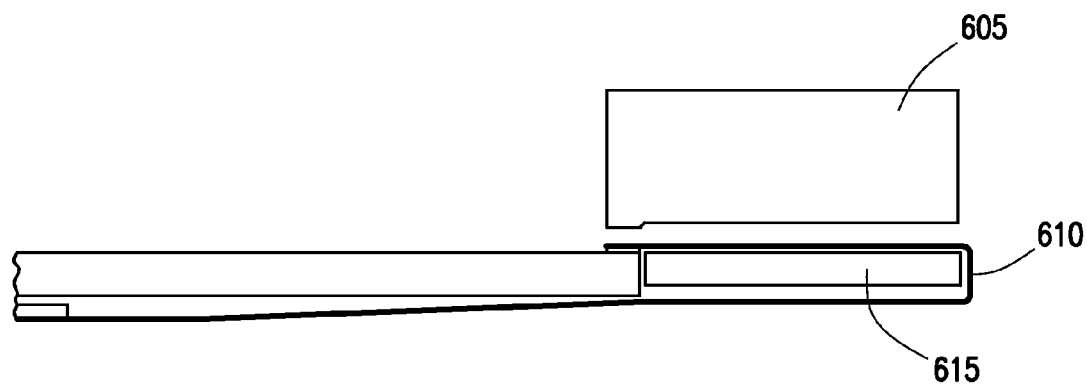
FIGS. 6A-C illustrate example cross-sectional views of a device display.
Figure 6B:
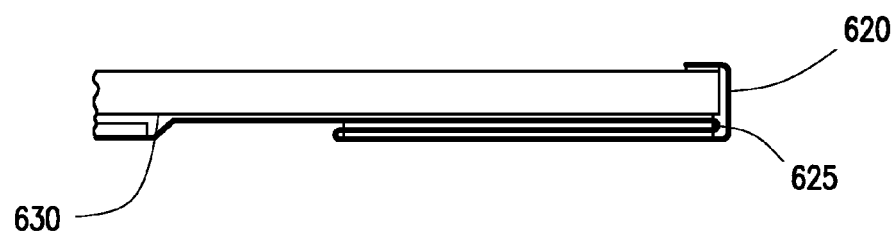
Figure 6C:
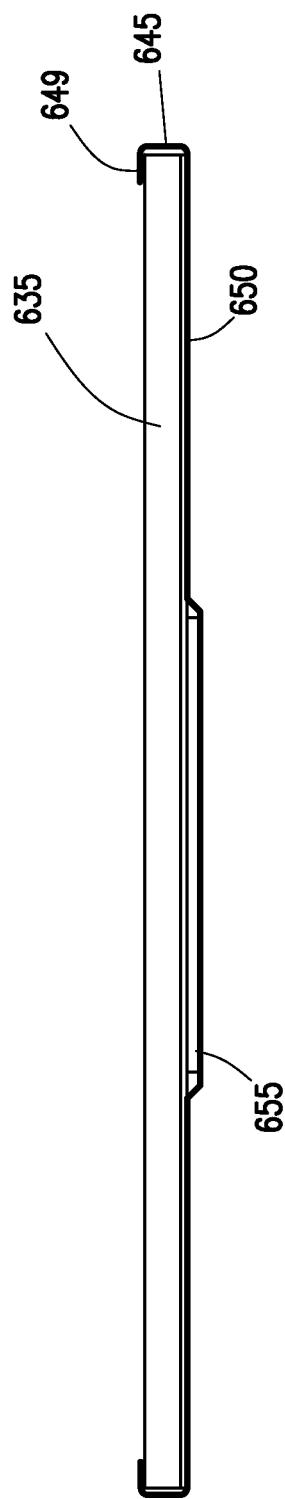

FIGS. 6A-C illustrate example cross-sectional views of a device display, including manufacturing of the device. In FIG. 6A, hotbar knife 605 is used to solder the flexible printed circuit(s) 610 coupling the electronics of the display to processing electronics of the device. A support 615 may be used to stabilize the FPC 610 during this process. FIG. 6B illustrates the connected FPC 620, which has been folded over (portion 625) and glued to the back of the display using adhesive 630. FIG. 6C illustrates an example finished display. FPC 645 has been laminated to the back of protective display glass 635, and is bent over the front of glass 635 and is attached to the front of glass 635 via microbond 649. Adhesive 650 connects the FPC 645 to the device. The FPC pass over driver chip 655, which is connected to device by adhesive 650.

In particular embodiments, all processing and RF components are located within the body of the device, which may create a challenge in allowing RF signals to pass out of the device. The FPC board may additionally be attached to sides of the polygon where there is no connection to the display itself to allow the mounting of strip line, stub, ceramic, or other antennae (or other suitable sensors) in the same plane as the display, as illustrated in FIG. 5C. As the antenna of FIG. 5C is coplanar with the display, interference from the dense mesh of wiring (e.g. as illustrated in FIG. 5E) from the display is reduced.

In particular embodiments, a display may be shielded from electromagnetic interference with the main processor board using a metal shield. In particular embodiments, the metal shield may also be used as a heat sink for the battery, and thus may improve charge or discharge rates for the battery.

Figure 7A:
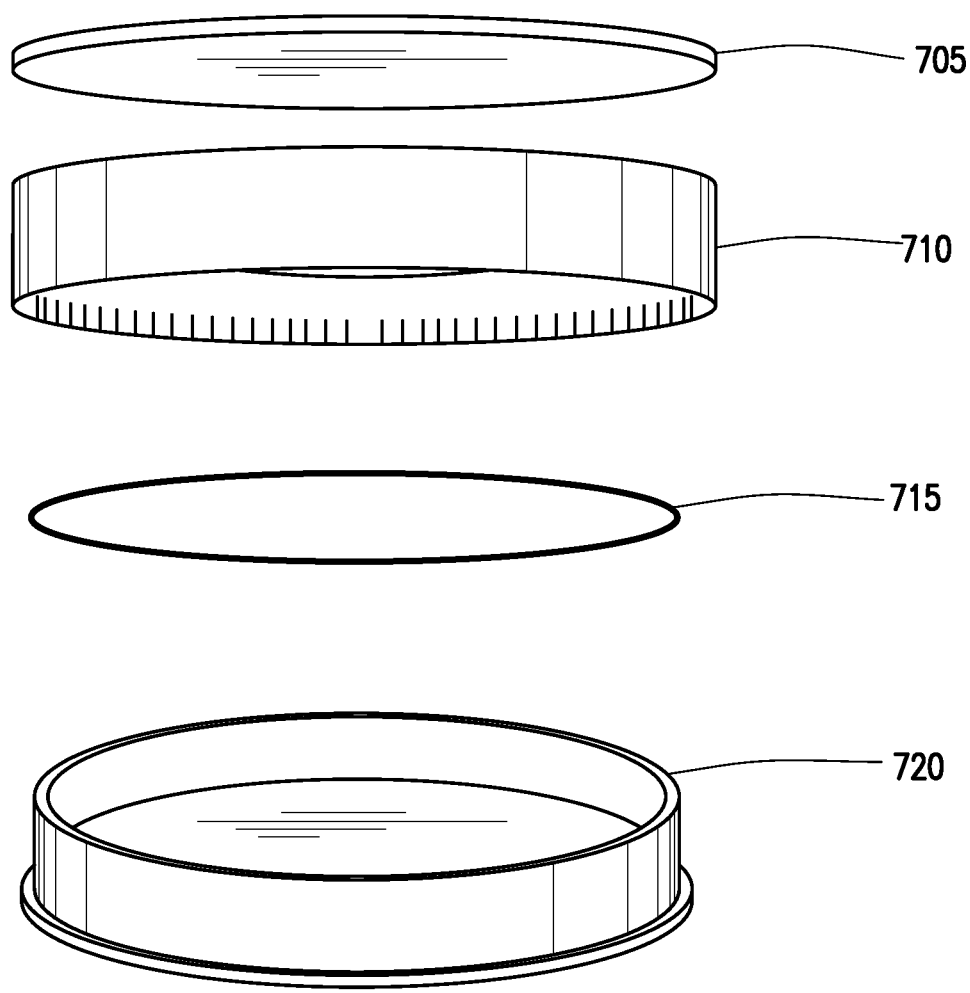
FIGS. 7A-7D illustrate example outer elements about a device body.
Figure 7B:
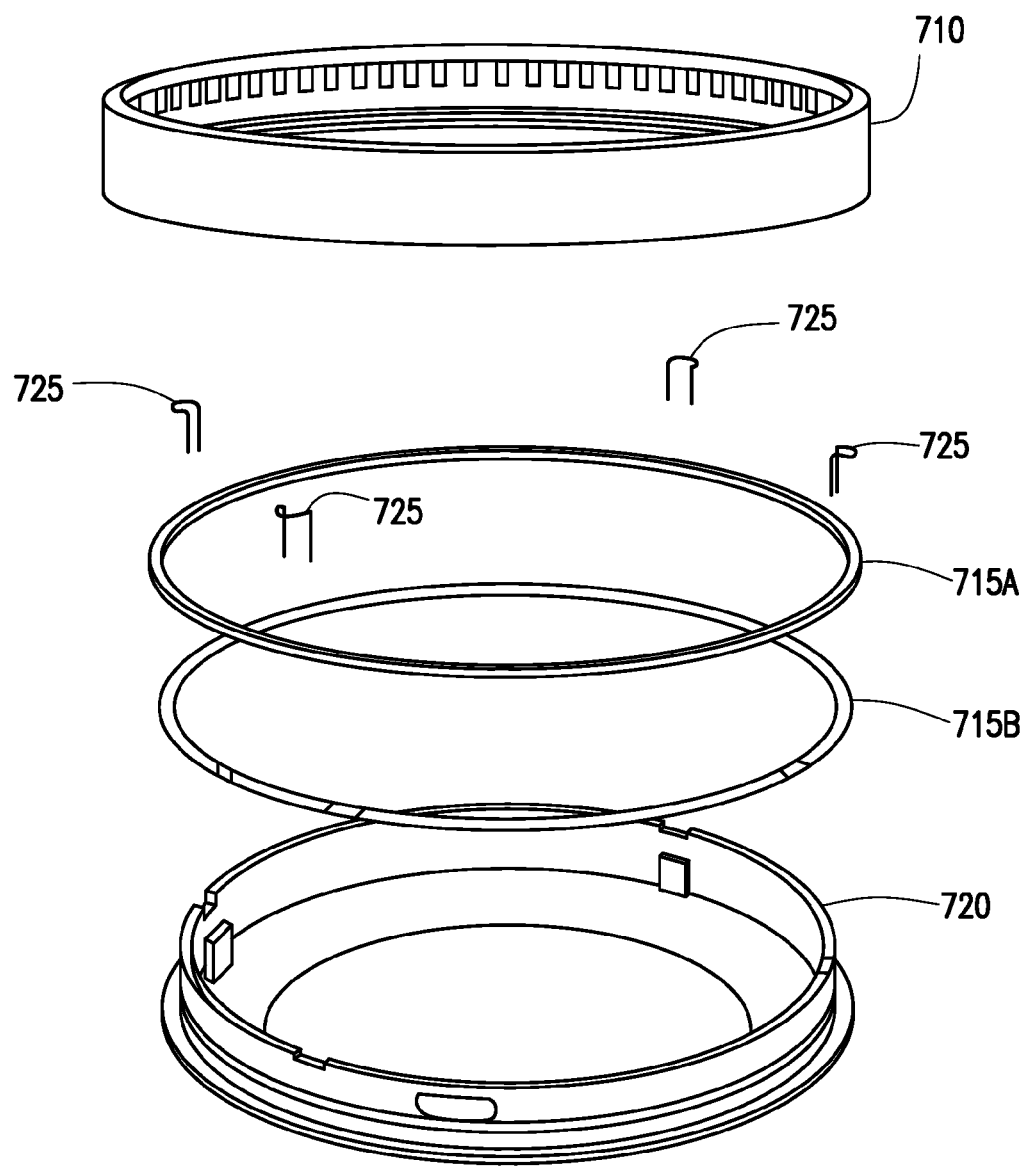
Figure 7C:
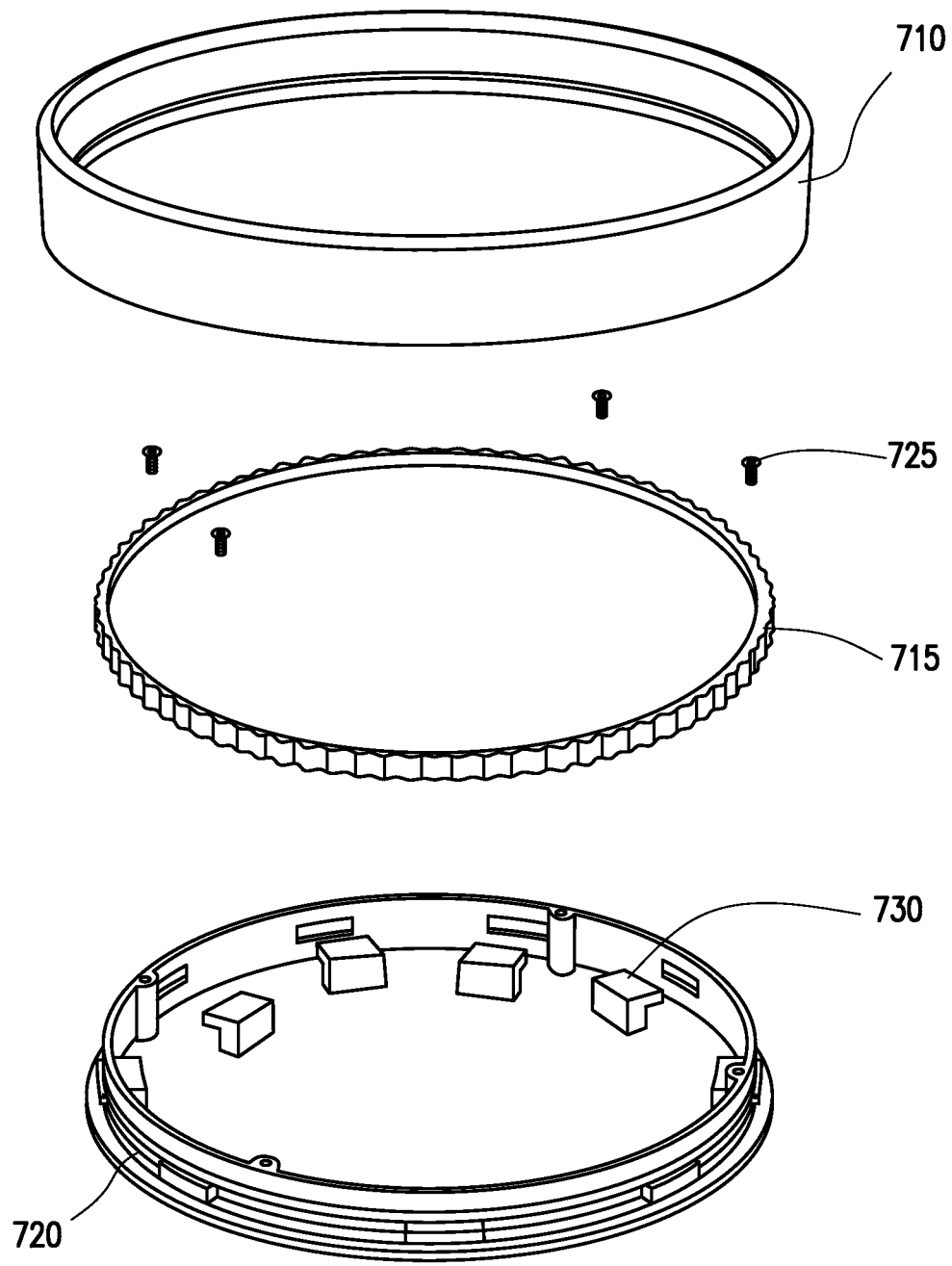
Figure 7D:
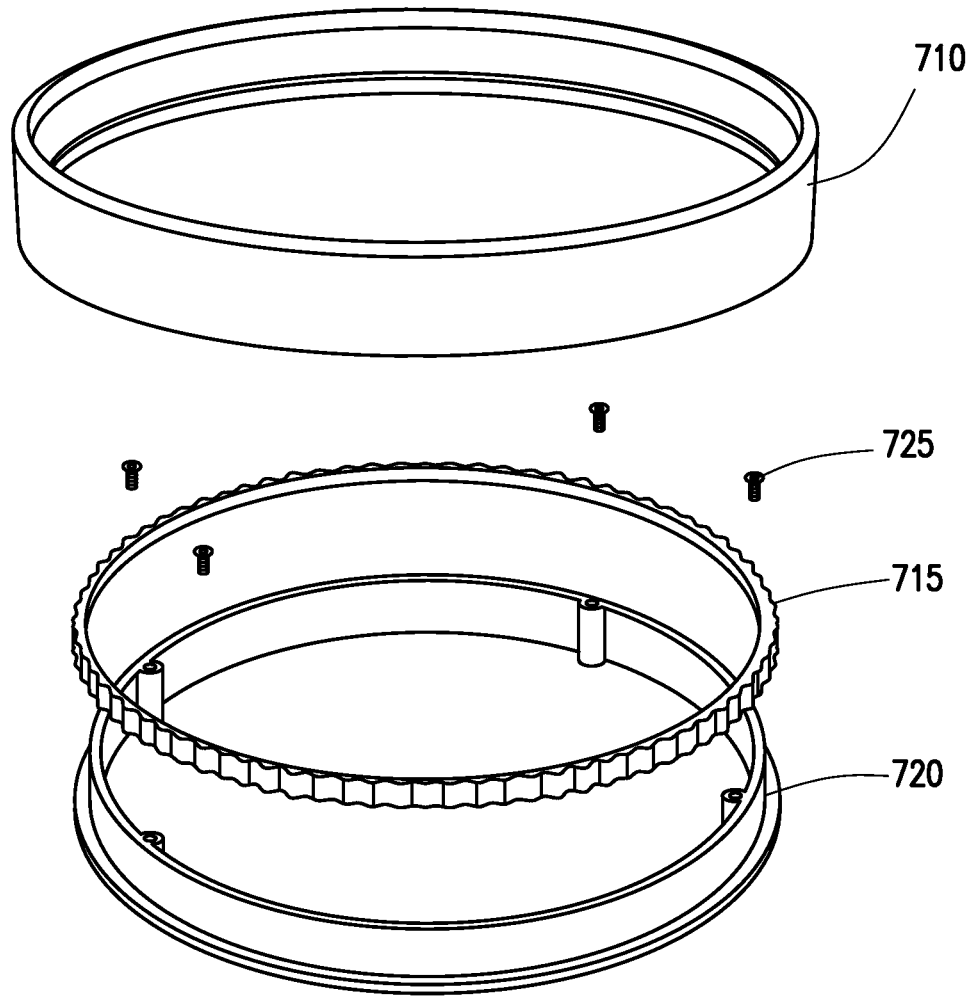

In particular embodiments, an wearable electronic device may include one or more outer elements (which may be of any suitable shape) about the device body. FIG. 7A illustrates an outer element by an example outer ring 710 about a display 705. Outer ring may be composed of any suitable material, such as for example stainless steel or aluminum. In particular embodiments, outer ring 710 may be rotatable in one direction, both directions, or may be used in both configurations based on e.g. a switch. In particular embodiments, one outer ring 710 may rotate in one direction while a second outer ring 710 rotates in the opposite direction. Outer ring 710 may be coupled to base 720 of the device by a retention ring 715. FIG. 7B illustrates outer ring 710 attached to base 720 either by a Delrin ring 715A or by a sprint steel retention ring 715B. Springs or clips 725 affix the rings to base 720. FIGS. 7C-D illustrate retention ring 715 affixed to base 720 via screws 725 screwed into corresponding posts of base 720. The device may include fasteners/spacers 730, as illustrated in FIG. 7C.

In particular embodiments, detents or encoders (which may be used interchangeably, where suitable) of an outer element may provide a user with haptic feedback (e.g. a tactile click) provided by, for example, a detent that allows the user to determine when the element has been moved one "step" or "increment", which may be used interchangeably herein. This click may be produced directly via a mechanical linkage (e.g. a spring mechanism) or may be produced electronically via a haptic actuator (e.g. a motor or piezo actuator). For example, a motor may provide resistance to motion of a ring, such as for example by being shorted to provide resistance and unshorted to provide less resistance, simulating the relative high and low torque provided by a mechanical detent system. As another example, magnetic systems may be used to provide the haptic feel of a detent. For example, a solenoid mechanism may be used to disengage the detent spring or escapement as needed. The spring or escapement provides the actual mechanical feedback. However, this arrangement allows the device to skip a number of détentes as needed, while re-engaging the detent at exact intervals to create the sensation of detents, such as those that have changed size. As another example, a rotatable outer element (such as, for example, the outer ring) may be magnetized, such as by an electromagnetic used to attract the ring at "detent" positions, increasing torque and simulating detent feedback. As another example, a rotatable outer element may have alternating north-south poles, which repels and attracts corresponding magnetic poles in the device body. As another example, a permanent magnet may be used to lock the ring in place when the electromagnet is not in use, preventing freewheeling. As another example, instead of an electromagnet, an easily-magnetizable ferromagnetic alloy may be used within a solenoid. This allows the electromagnetic field of the solenoid to "reprogram" the magnetic orientation of the core, thus maintaining the effect of the magnetic actuation even when the solenoid itself is disengaged. While this disclosure provides specific examples of detents, detent-like systems, and encoders, this disclosure contemplates any suitable detents, detent-like systems, or encoders.

Figure 8A:
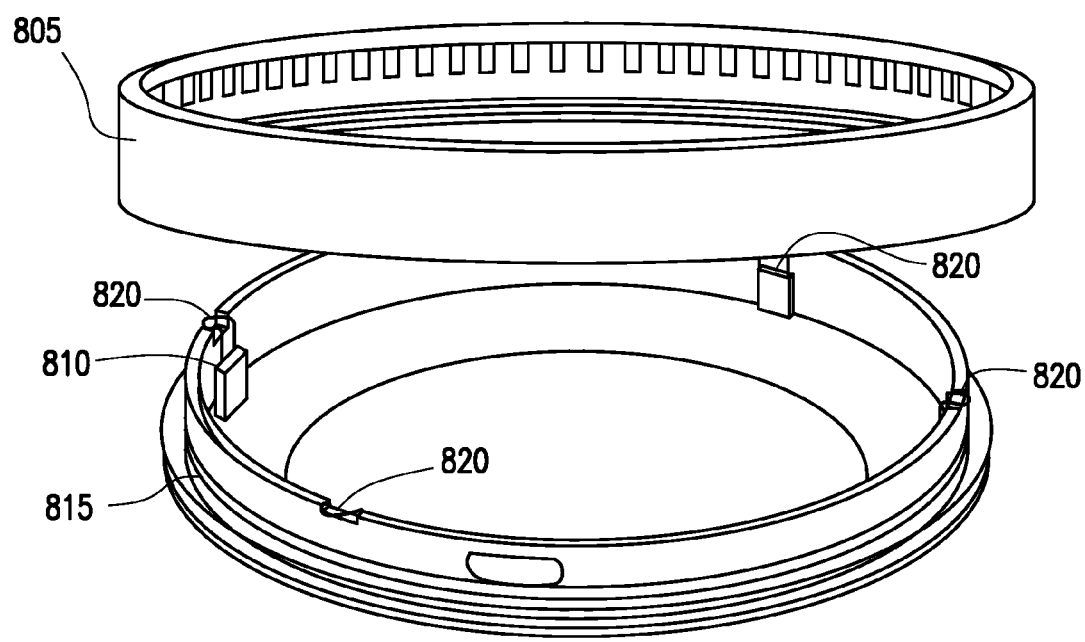
Figure 8B:
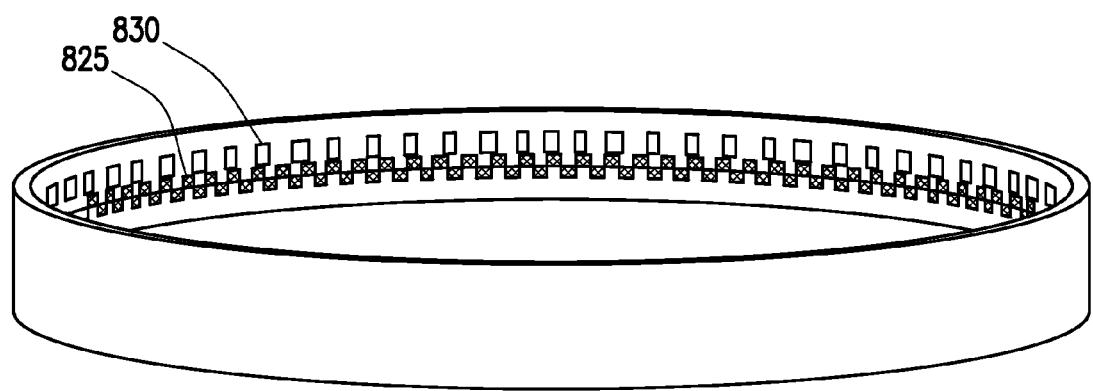

FIG. 8A illustrates an outer ring 805 with notches for a spring-based detent system etched onto the inner surface of outer ring 805. Springs 820 attached to spring posts 810. Retention ring 815 may be made of Delrin, steel, or any other suitable material, and may be segmented or solid/continuous. FIG. 8B illustrates an example outer ring having small notches 830 that engage a spring-loaded element to provide haptic feedback from the illustrated detent. In the case of an electronic feedback system, the feedback may be produced in rapid synchrony with the motion of the ring, and must have a sufficient attack and decay rate such that successive movements of the ring are distinguishable from each other. In particular embodiments, an outer ring may be freely (e.g. continuously) rotatable, without any clicking or stepping. In particular embodiments, a ring may be capable of both continuously rotating and rotating in steps/increments, based on, for example, input from a user indicating which rotational mode the outer ring should be in. The ring may also or in the alternative rotate freely in one direction and in increments in the other. Different functionality may occur based on the rotational mode used. For example, rotating in continuous mode may change a continuous parameter, such as e.g. volume or zooming, while rotation in incremental mode may change a discrete parameter, such as e.g. menu items or contacts in a list, as described more fully herein. In particular embodiments, when rotating freely the ring may provide haptic feedback to the user, for example a force applied such that the ring appears to rotate in viscous media (e.g. the more quickly the ring is rotate the more it resists rotation). In particular embodiments, an outer ring may be depressed or raised in the direction of the axis the outer ring rotates about, such as for example as part of a gesture or to change rotational modes. In particular embodiments, an outer ring may have touch-sensitive portions.

In particular embodiments, an encoder or detent may be used to determine the position of the outer ring relative to the device body. Particular embodiments utilize an encoder that is affixed to the device body, as illustrated by encoder 230 of FIG. 2. In particular embodiments, the encoder is part of the inner surface of the outer ring itself, as illustrated by printed optical elements 825 in FIG. 8B. In those embodiments, the outer ring acts as the rotating part of the encoder directly. An optical encoder pattern is printed onto the inner surface, and is read out by an optical module on the processing board. The encoder on the interior of the outer ring should have sufficient optical contrast for detectors, and may be etched on the outer ring via e.g. printing or laser-etching. The inner and outer rings may be environmentally sealed with a low-friction ring (such as for example, ring 840 of FIG. 8C) made of a material such as Teflon or Delrin that maintains a tight fit while preventing contaminants from entering the inner part of the device. In particular embodiments, a lip on the inner ring may engage a similar lip on the outer ring, allowing the two rings to be joined while still allowing free rotation. A larger lip at the bottom of the inner ring provides further sealing by deflecting environmental hazards from below. As illustrated in FIG. 9, in particular embodiments, sealing ring 915 may fit into groove 905 of the base, which may include a grip area 910.

In particular embodiments, a retention ring connecting the outer ring to the body of the device may have strain gages to detect pressure on the outer ring. As an example, FIG. 10 illustrates a retention ring connected to four strain gauges (which are also connected to the inner body) that are symmetrically placed around the ring. As used herein, the four strain gauges may be an electronic component detecting strain. As a result of the symmetric placing, normal motion or contact with the outer ring will place mostly asymmetric strain on the outer ring, because the ring merely moves relative to the device in the plane of the ring, and thus one end compresses and the opposite end elongates, as illustrated by the top ring of FIG. 10. In contrast, squeezing a larger portion of the outer ring will likely produce a symmetric strain on opposite pairs of strain gauges (e.g. due to elongation of the ring under pressure). The relative difference in strain between the two pairs of strain gauges thus differentiates intentional squeezing of the outer ring from regular motion of or contact with the outer ring. While this disclosure describes specific examples of the number and placement of strain gauges in the retention ring, this disclosure contemplates placement of any suitable number of strain gauges in any suitable component of the device to detect pressure on the component. As one example, strain gauges may be placed on the band of the device or in the outer ring.

When strain is placed on a component containing strain gauges or any other suitable strain or pressure detection system, the detected strain may result in any suitable functionality. For example, when strain is placed on the outer ring, such as for example by a user squeezing the outer ring, feedback may be provided to the user. That feedback may take any suitable form, such as tactile feedback (e.g. vibration, shaking, or heating/cooling), auditory feedback such as beeping or playing a particular user-defined tone, visual feedback (e.g. by the display of the device), or any other suitable feedback or combination thereof. Functionality associated with squeezing a ring is described more fully herein, and this disclosure contemplates any suitable functionality resulting from strain or pressure placed on and detected by any suitable components.

Figure 11:
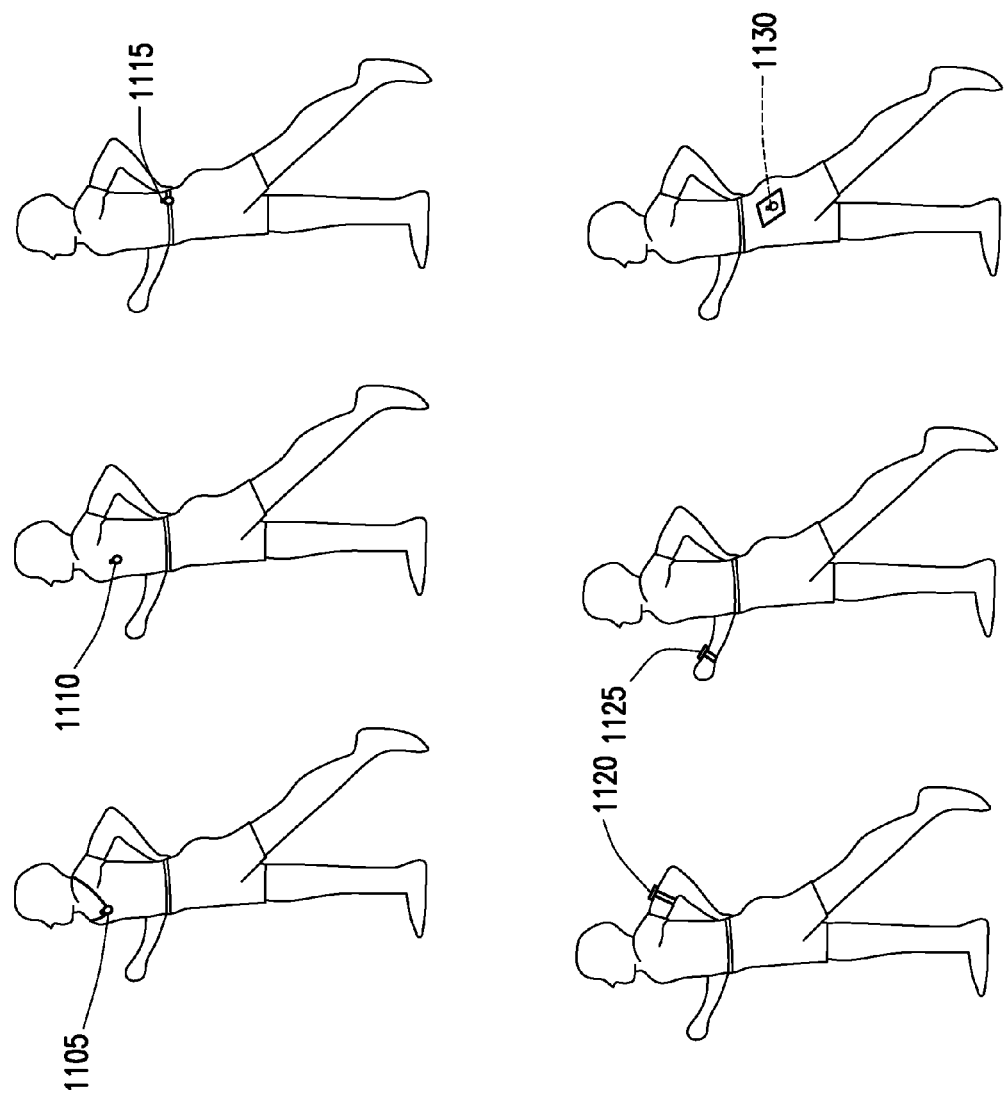
FIG. 11 illustrates various example embodiments for wearing a device.

An wearable electronic device may be attached to a band to affix the device to the user. Here, reference to a "band" may encompass any suitable apparatus for affixing a device to the user, such as for example a traditional band 1405 that can be worn around the arm, wrist, waist, or leg of the user, as illustrated by way of example in FIG. 14A; a clip 1415 for affixing to a piece of clothing, as illustrated by way of example in FIG. 14B; a necklace or bracelet 1420 configuration, as illustrated by way of example in FIG. 14C; a keychain 1425 or other accessory configuration to secure the device, for example, in the user's pocket, as illustrated by way of example in FIG. 14D; or any other suitable configuration. Each of those embodiments may include a camera 1410 located on the device, on the band, or on the body. FIG. 11 illustrates various embodiments for wearing the device, such as for example around a neck as illustrated in 1105; pinned to clothing (such as, for example, the chest as illustrated by 1110); on a belt as illustrated in 115; on an appendage (such as, for example, an arm as illustrated in 1120); on the wrist as illustrated in 1125, or in a pocket as illustrated in 1130. While this disclosure describes specific examples of bands and ways of affixing devices to a user, this disclosure contemplates any suitable bands or ways of affixing a device to a user.

Figure 12A:
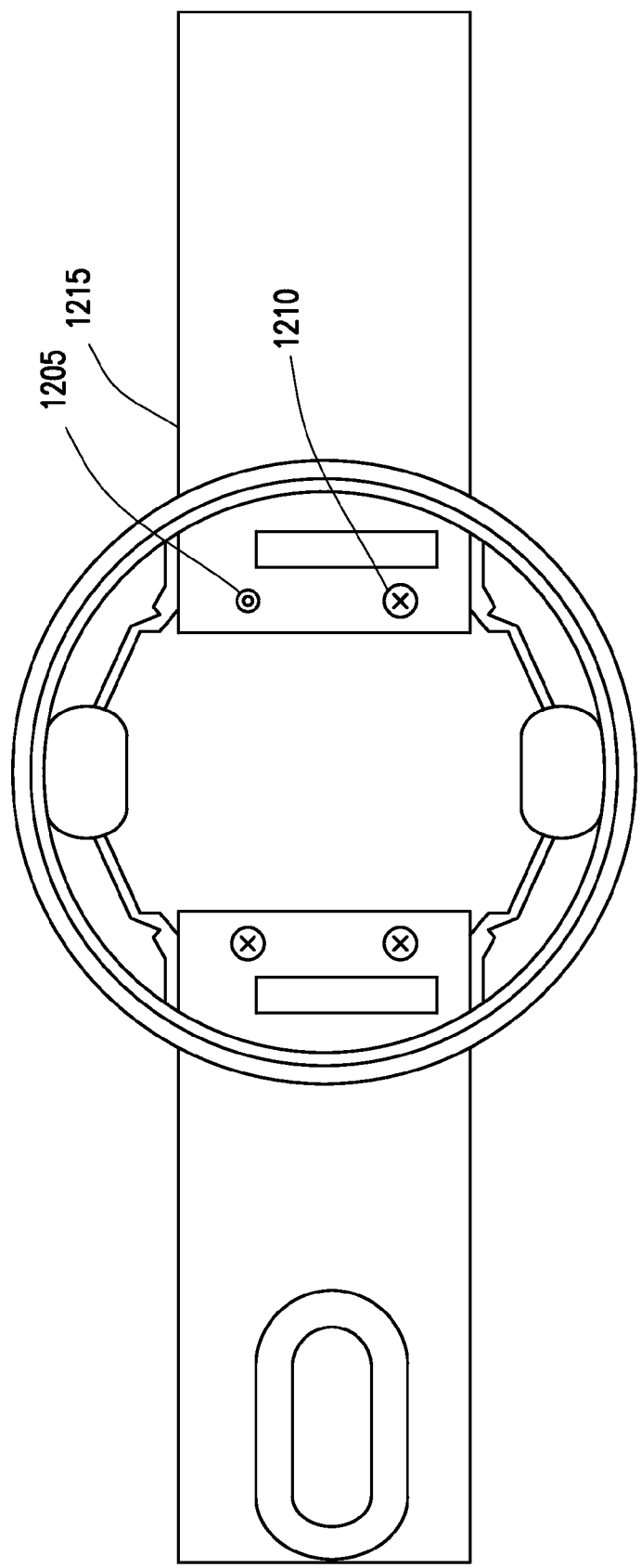
FIGS. 12A-12B illustrate a band attached to a body of a device.
Figure 12B:
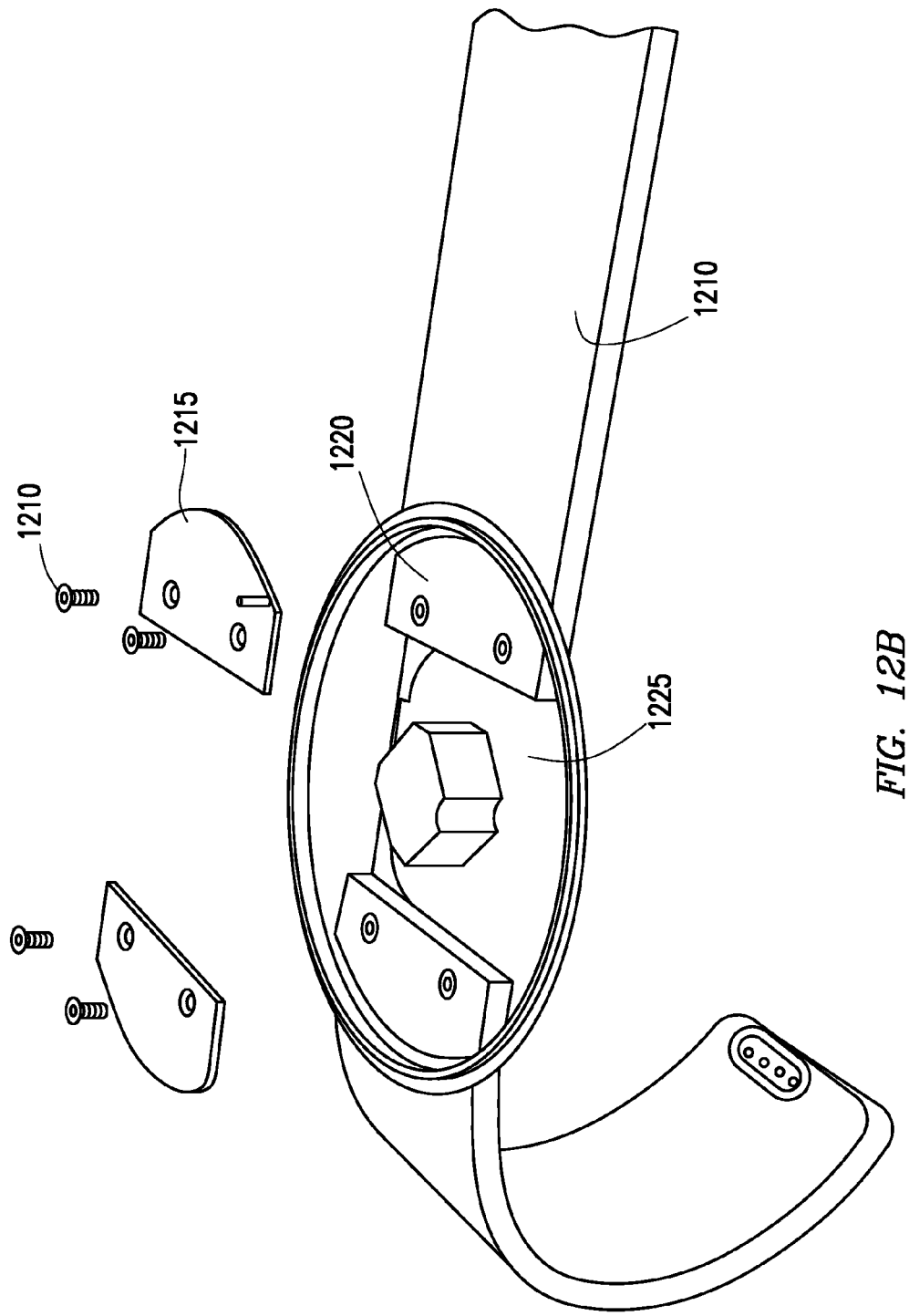

In particular embodiments, sensors and corresponding electronics may be attached to a band, where appropriate. For example, the bands of FIGS. 14A-14C may be suitable for housing an optical sensor. All illustrated, particular embodiments may be suited for including a touch-sensitive area. This disclosure contemplates any suitable bands including any suitable sensors or electronics, such as for example communication components (such as antennae), environmental sensors, or inertial sensors. In particular embodiments, the band may be detachable from the device, and may communicate remotely with the device when not attached to the device. In particular embodiments, wiring associated with electrical components in the band may also be housed in the band, for example to minimize the volume of the device or to minimize electromagnetic interference with internal device components. For example, devices that may cause high levels of internal EMI (for example, camera or communication systems), that may require additional volume (for example, battery or speaker), that may require the environmental seal of the main body (for example, power/data connector), or that may require additional contact with the skin of the user (for example, biometric sensors) may benefit by housing at least some of electronics in a band of the device. In particular embodiments, when wiring is contained in a band, a display module may be attached to the band such that electronic connections made to or via the band do not twist when the outer ring is rotated. The module may use a connector that is user-removable, such that the display module or device body can be removed and attached by the user at will. As an example attachment of a band to a device, a band 1215 as illustrated in FIG. 12A may be attached to the body by being placed over one or more posts 1205 and then affixed to those posts using fasteners (e.g. screws) 1210. In particular embodiments, in addition to fasteners and posts a retention plate 1215 may be used to secured the band to device 1225, as illustrated in FIG. 12B. This disclosure contemplates any suitable interface between the band and the device. For example, a USB interface may be provided between the band and the body of the device, to for example communicate data between the device and the band or components of the device and components of the band. In particular embodiments, an interface may enable a user of the device to easily detach, attach, or change the band of the device.

Figure 13A:
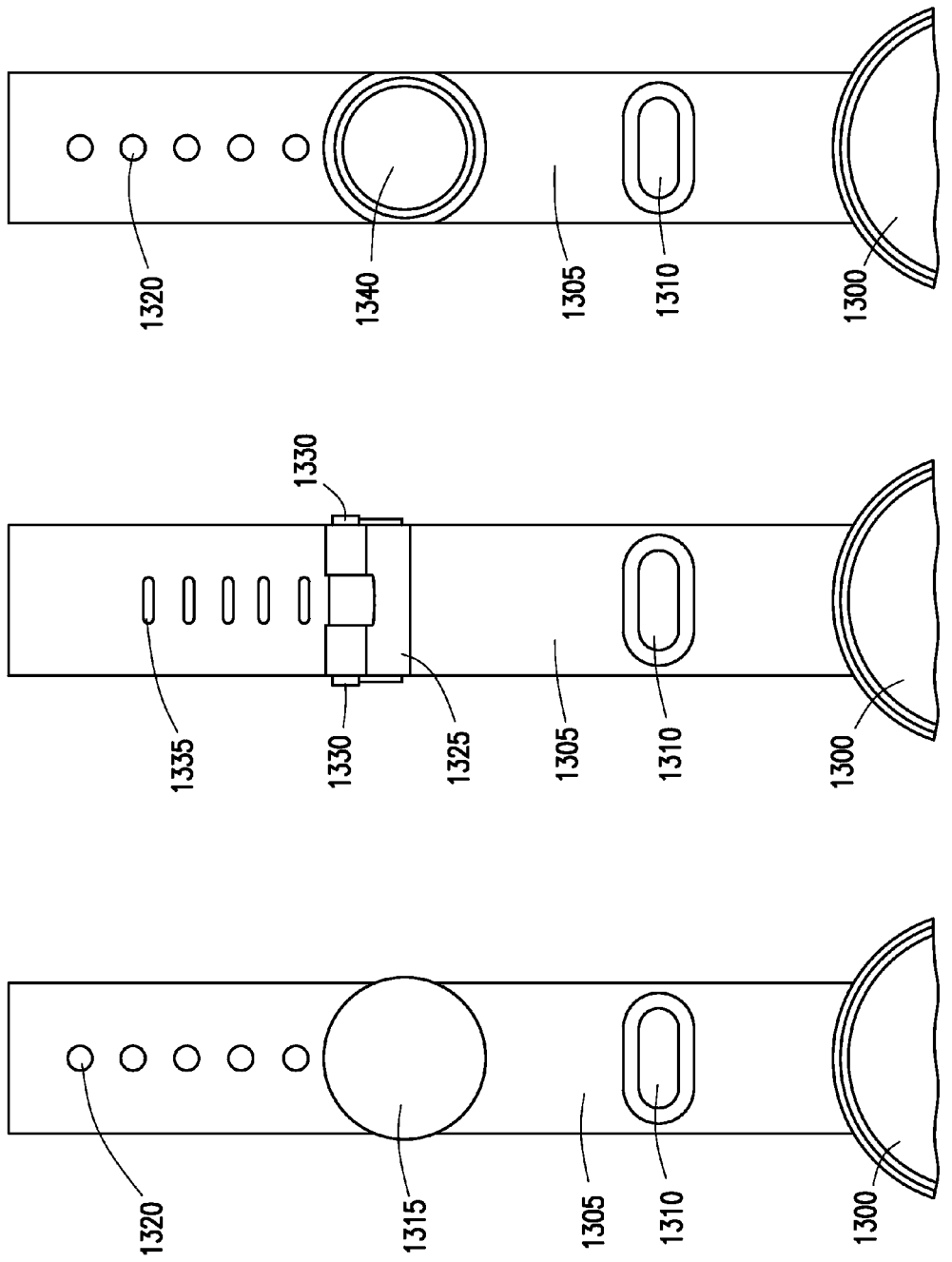
Figure 13B:
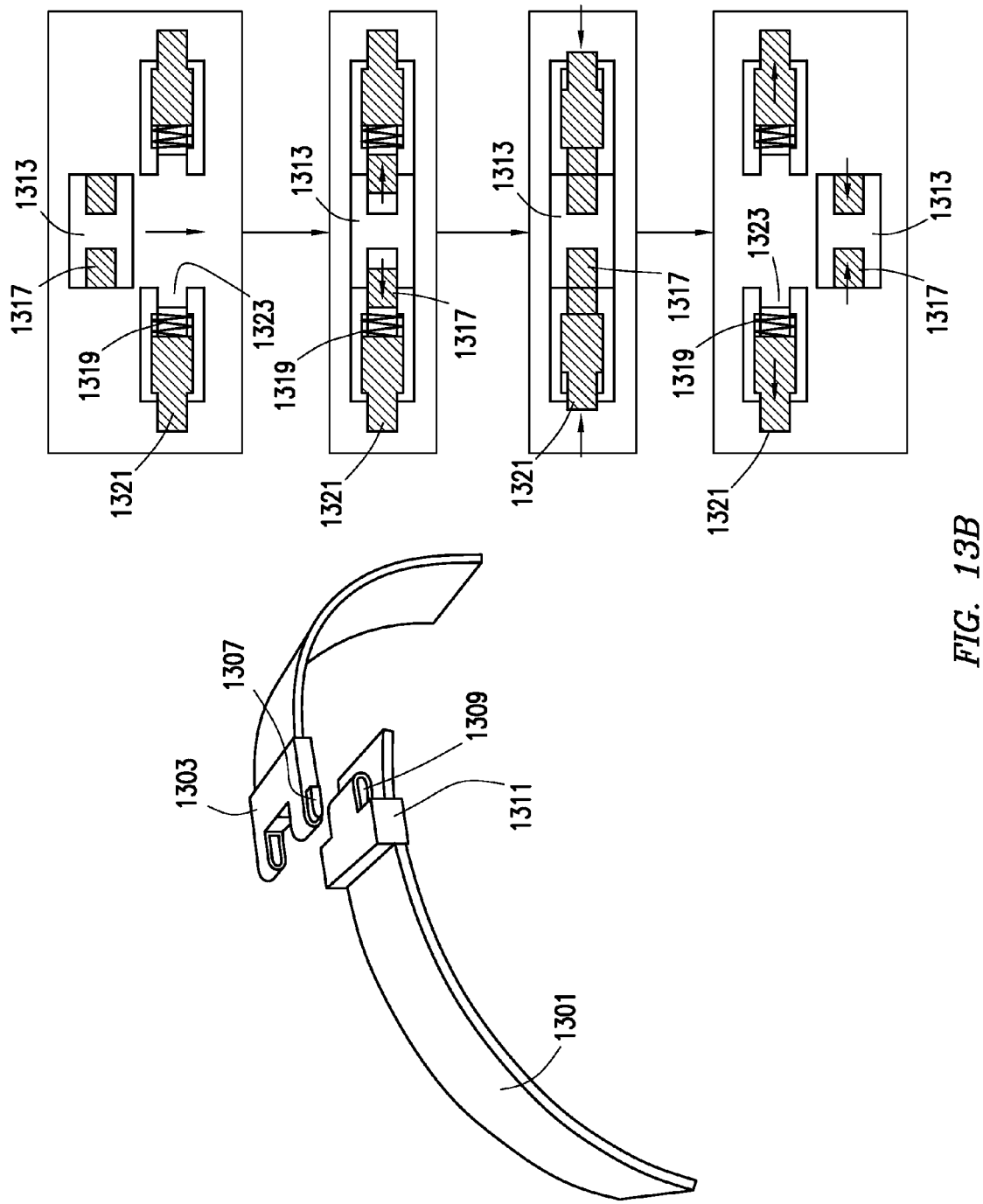
Figure 14A:
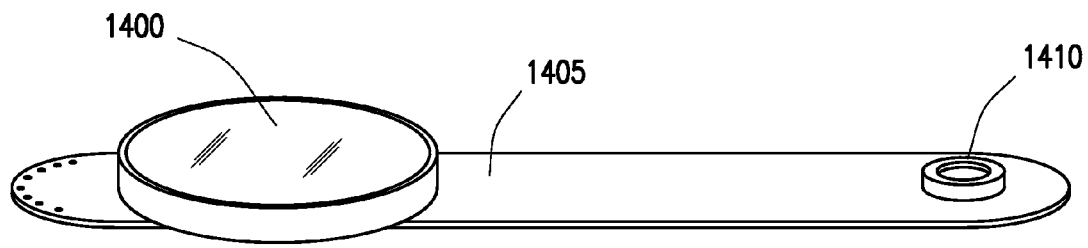
FIGS. 14A-D illustrate example camera placements on a device.
Figure 14B:
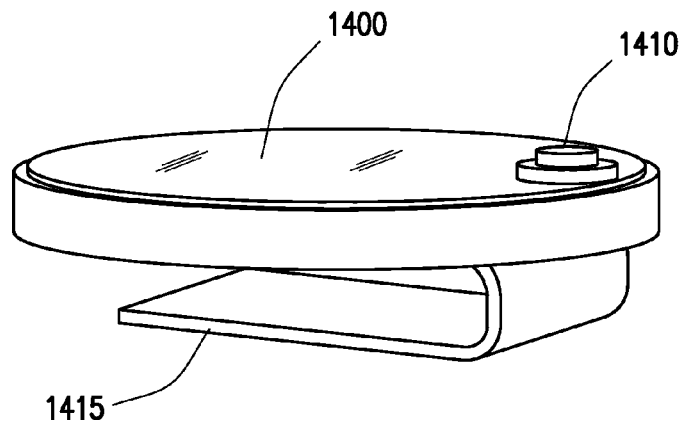
Figure 14C:
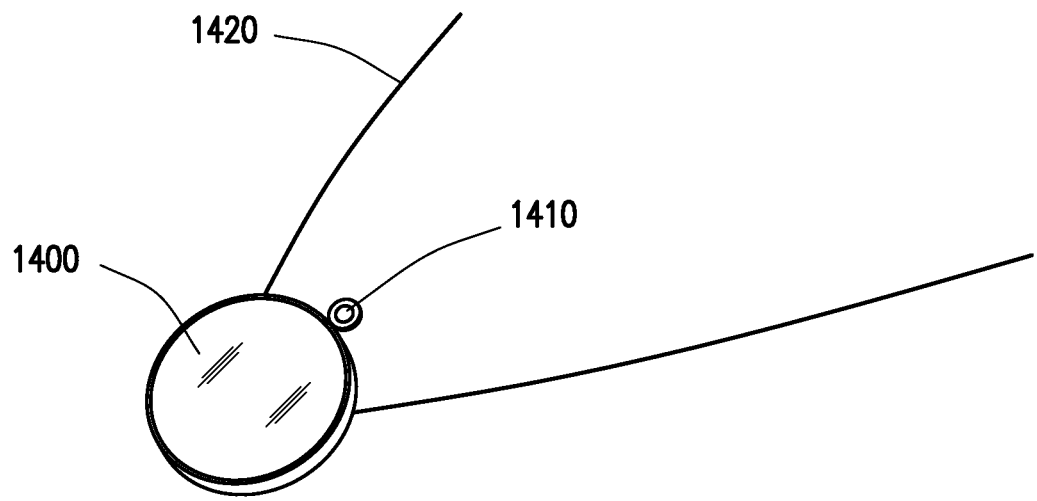
Figure 14D:
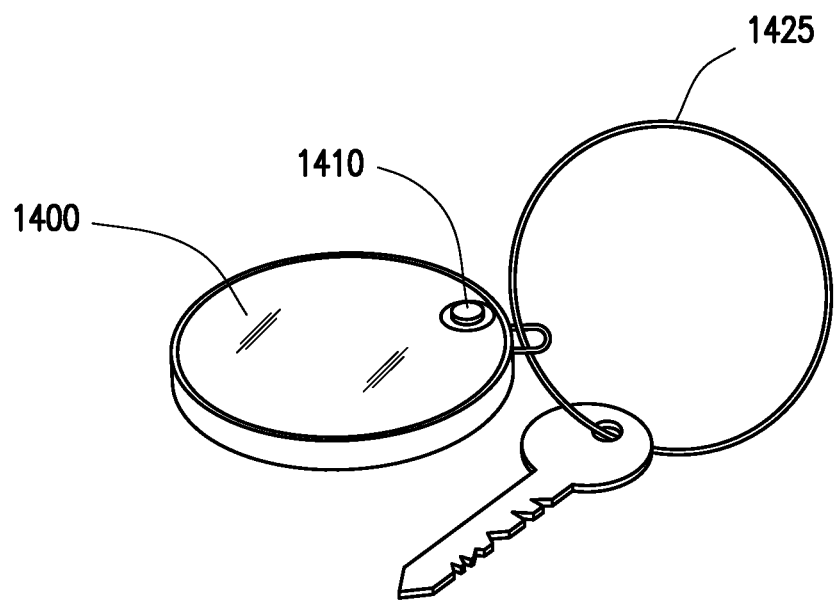

This disclosure contemplates any suitable structure for connecting a band as illustrated in FIG. 14A to itself, for example when worn by a user. For example, FIG. 13A illustrates example structures for fastening band 1305 having a camera module 1310 to a wearer of device 1300. Fasteners may include one or more snaps 1315, holes 1320 and 1335 and corresponding components, clasps 1340, or clips 1325 with push buttons 1330. FIG. 13B illustrates an example mechanism for affixing band 1301 to a wearer using clips 1311 and 1303. Components 1309 insert in the cavity on the other side of components 1307 to fasten band 1301. FIG. 13B further illustrates example internal mechanisms for clips 1303 and 1311. Component 1317 of clip 1313 (corresponding to clip 1311) may include one or more magnetic portions, which may be attracted to magnets in cavity 1323. For example, component 1317 may include a magnetic portion at its outer edge, and a magnet of opposite polarity may be placed in front of spring 1319 to attract the magnet of component 1317. Components 1317 may then fill cavity 1323, fastening clip 1313 to clip 1303 by coupling of the magnets. Once inserted, components 1321 may be used to engage springs 1319, which force components 1317 out of cavity 1323. Clip 1313 may be detached from clip 1303. In addition to magnets on components 1317 and in cavity 1323, magnets may also be placed within clip 1313, for example to assist removal of clip 1313 when springs 1319 are engaged or to prevent components 1317 from sliding in and out of clip 1313 when not fastened to clip 1303. For example, one or more magnets may be placed in the center of clip 1313 equidistant from components 1317 and in the same plane as components 1317, attracting magnets of each component (and thus, the components themselves) toward the center of clip 1313.

FIG. 13C illustrates example structure for affixing a band 1327 using fasteners 1333 and 1331, for example through the use of cavity 1329 and components 1337 and 1341. FIG. 13C illustrates the internal structure of fasteners 1331 and 1333. Fasteners 1339 (corresponding to fastener 1333) includes components 1337. When fastener 1343 (corresponding to fastener 1331) is inserted into fasteners 1339, components 1341 attach to components 1337, and may be secured by extending over a lip of fastener 1339. When fastener 1339 is pulled upwards the lip increasingly forces components 1337 out, moving components 1341 past the lip of fastener 1339 and enabling fastener 1339 to be removed from fastener 1343. In particular embodiments, magnets may be placed in or on fasteners 1333 and 1331 to fasten them together. For example, a magnet may be placed at the edge of each of component 1341 and 1337. When fastener 1343 is brought into fastener 1337 (or vice versa) the magnets attract and secure component 1341 to component 1337. In addition, a magnet may be placed in fastener 1343, for example to assist removal of component 1341 from component 1337 or to prevent components 1341 from sliding in and out of fastener 1343 when not affixed to fastener 1339. For example, one or more magnets may be placed in the center of fastener 1343 equidistant from components 1341 and in the same plane as components 1341, attracting magnets at the end of each component (and thus, the components themselves) toward the center of fastener 1343.

Figure 13D:
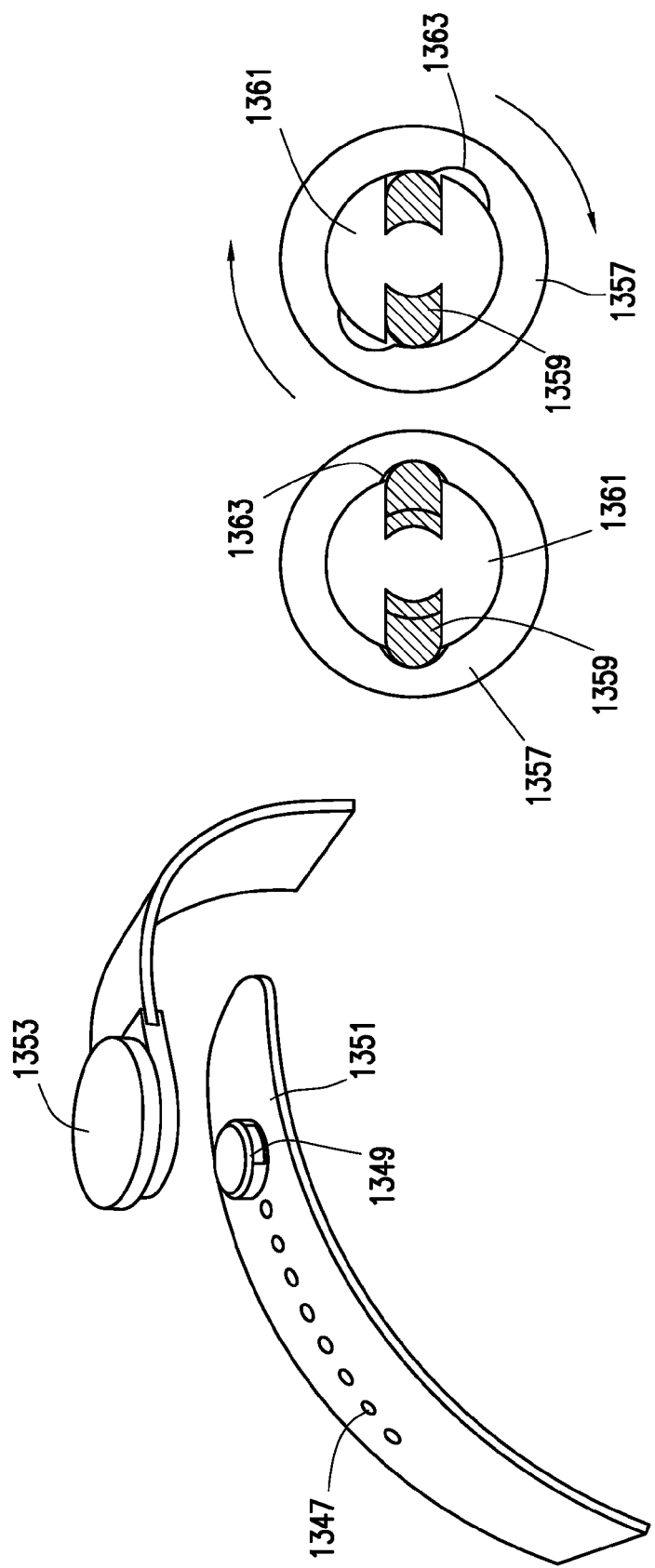

FIG. 13D illustrates an alternative arrangement for affixing band 1351 using fasteners 1349 and 1353. When affixed, fastener 1357 (corresponding to fastener 1353) may be twisted, disengaging components 1359 (which may be rounded) from cavities 1363, and enabling fastener 1361 (corresponding to fastener 1349) to be removed from fastener 1357, and vice versa. In particular embodiments, one or magnets may be used to affix fasteners 1357 and 1361 to each other and/or remove fasteners 1357 and 1361 from each other. For example, magnets may be placed in cavities 1363 and at the outer (convex) edge of components 1359, attracting components 1359 into cavities 1363 and securing fastener 1361 to fastener 1357. As another example, magnets may be placed on the inner edge of components 1359 (i.e., on the concave surface of components 1359), attracting components 1359 into fastener 1361, for example to assist removal of components 1359 from cavities 1363 or to prevent components 1359 from sliding in and out of fastener 1361 when not affixed to fastener 1357. Corresponding magnets may also be placed on the surfaces of fastener 1361 that are in contact with components 1359 when those components are not extended into cavities 1363. In other words, those magnets may attract (and, in particular embodiments, ultimately make directed contact with) magnets on the concave surface of components 1359, securing components 1359 to fastener 1361.

Figure 13H:
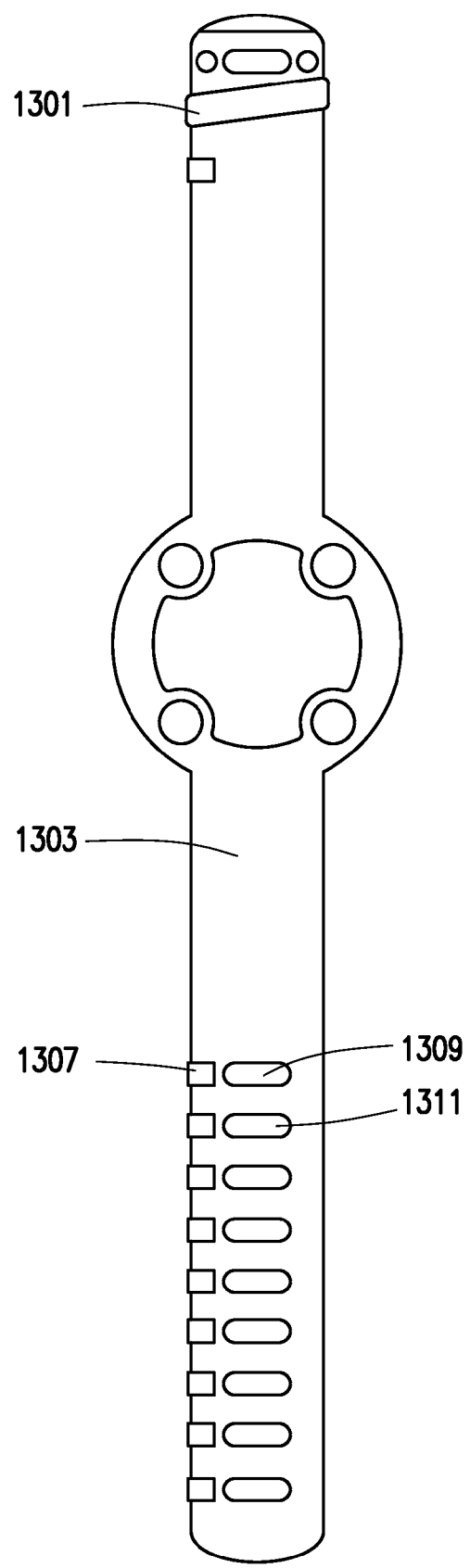
Figure 13I:
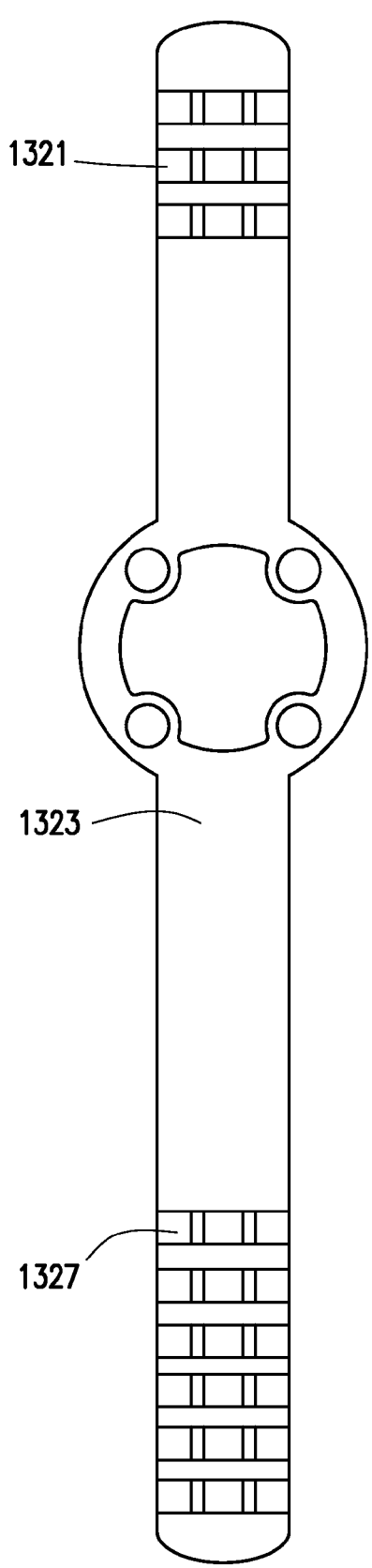

FIGS. 13E-13G illustrate example embodiments of affixing a band 1369 with camera module 1373 to itself, for example when worn by a user of device 1367. In FIG. 13E, one or more magnets 1371 on one side of band 1369 may be attracted to one or more magnets 1379 on the other side of band 1369. Magnets may be strips of magnetic material partially crossing a band, as illustrated by magnetic strip 1307 in FIG. 13H, may be strips of magnetic material fully cross the band, as illustrated by strips 1321 and 1327 in FIG. 13I, or may be areas of magnetic material 1393 as illustrated in FIG. 13F. In addition to magnets 1371 and 1379, band 1369 may include holes 1391 and one or more posts 1377 for securing band 1369 to the wearer of device 1367. FIG. 13G illustrates fasteners 1387 (e.g. screws 1396) affixing to fasteners 1371 (e.g. nut with covering 1395) to affix band 1381 to a wearer of device 1367 using holds 1383 (1398).

In particular embodiments, a band containing electrical components may also incorporate a traditional physical contact connector, as illustrated by connector 250 of FIG. 2. The connector may allow for connectivity with the device, for example, for charging, system updates, debugging, or data transfer. Such a connector may be of the pogo variety or may be plated surfaces to which a charging cable can interface by contact. Such connectors may be plated in precious metals to prevent corrosion from exposure to moisture from the environment and the human body. In particular embodiments, physical connectors may be used only for power, and data may be transferred using short-range communication modalities, such as BLUETOOTH, near field communication (NFC) technology, or WI-FI.

In particular embodiments, a band may be used to house flexible batteries (such as, e.g., lithium-based batteries) to increase the energy storage of the device. As energy storage capacity may be tied to total volume, batteries internal to the band increase the storage capacity for volume-limited wearable devices without impacting the total size of the device body.

Figure 15:
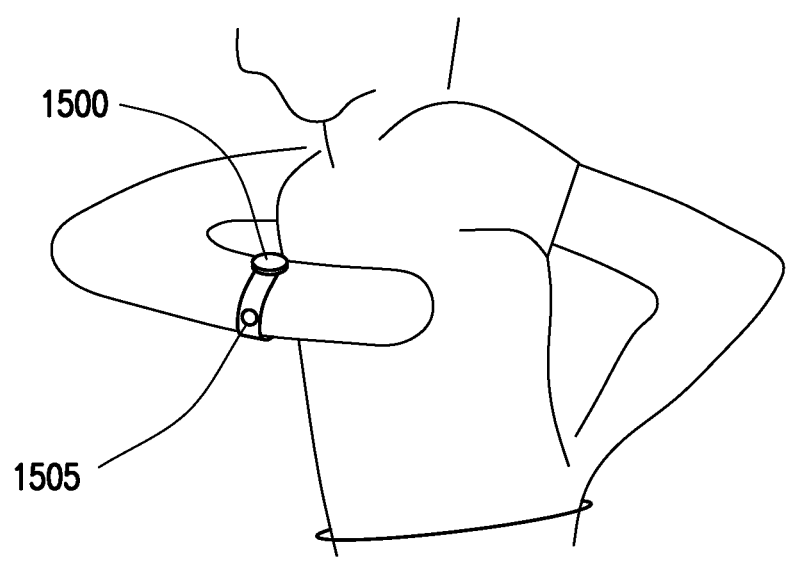
FIG. 15 illustrates an example device with a band and optical sensor.

As described more fully below, an wearable electronic device may include one or more sensors on or in the device. For example, an wearable electronic device may include one or more optical sensors or depth sensors. Optical sensors may be placed in any suitable location, such as for example on the face of the device, on a band facing outward from the user's body, on a band facing opposite the face, on a band facing toward the user's body, or any suitable combination thereof. FIG. 15 illustrates a device 1500 with a band having an outward-facing optical sensor 1505. Placement of an optical sensor on the band may reduce the number of high-frequency signals inside the case, allowing for lighter shielding within the device body and thus weight and volume savings. FIGS. 14A-14D illustrate example camera placements for different embodiments of an wearable electronic device. In particular embodiments, electronics such as that for processing camera input may be located in the band as well, for example in a "volcano" shape housing the camera, as illustrated by housing 125 in FIG. 1. In particular embodiments, other sensors may be placed near an optical sensor, such as for example in the same housing as the optical sensor on the band of the device. For example, a depth sensor may be used in conjunction with an optical camera to enhance display or detection of a device's environment, or to determine which object a user is pointing at or interacting with via a gesture.

In particular embodiments, placement of an optical sensor on the band may be adjustable by the user within a predetermined range. In particular embodiments, placement of an optical sensor on the band may be optimized such that the sensor is conveniently aimable by the user. For example, as illustrated by FIG. 15 if the user wears the device about the user's wrist, optical sensor 1505 may be placed in an outward-facing fashion such that the optical sensor aims outward from the user's body when the user's palm is roughly parallel to the ground.

Figure 16:
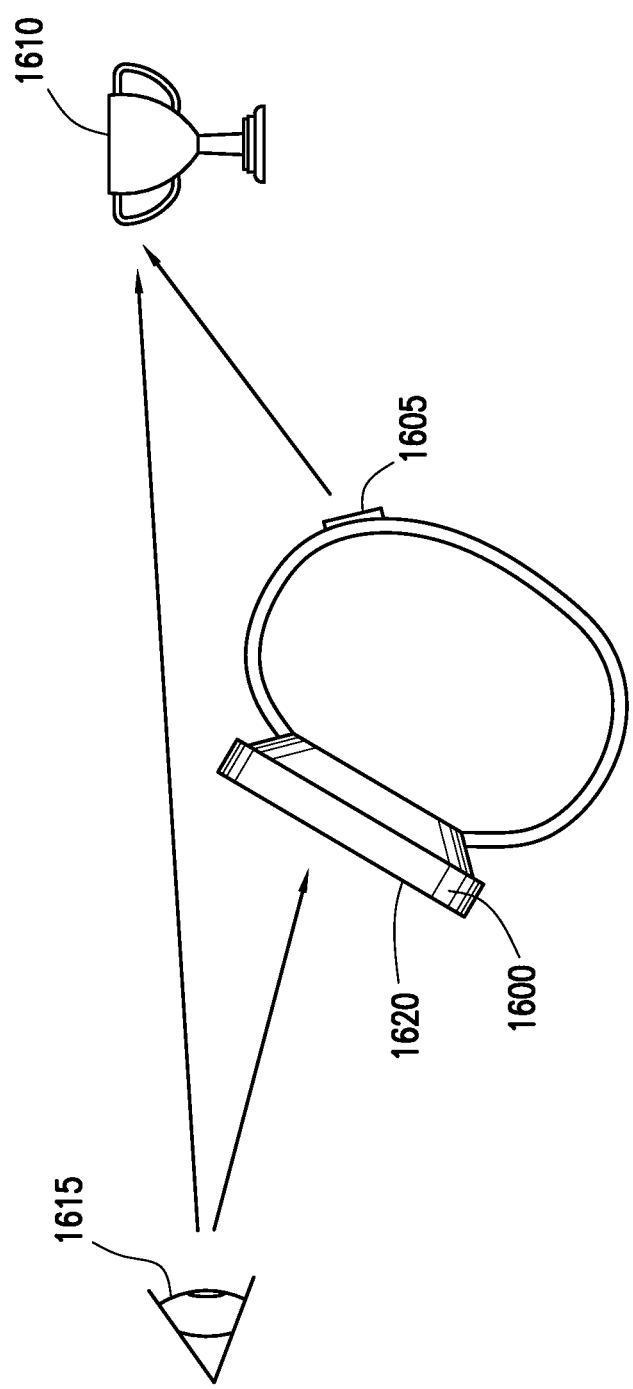
FIG. 16 illustrates an example viewing triangle including a user, a device, and an object.

In particular embodiments, placement of an optical sensor may be such that the user may view the display of the device while the sensor is pointing outward from the user's body. Thus, the user may view content captured by the optical sensor and displayed by the device without blocking the user's view of the physical scene captured by the sensor, as illustrated by the viewing triangle in FIG. 16. A display 1620 of a device 1600 may have an associated viewing cone, e.g., the volume within which the display can be reasonably viewed. In FIG. 16, user 1615 (1) views a real trophy 1610 and (2) views an image of the trophy on display 1620 of device 1600 from within the viewing cone of display 1620 by aiming sensor 1605 at the real trophy. Sensor 1605 has an associated angle of view corresponding to a volume within which images can be reasonably captured by sensor 1605. Note that in the example of FIG. 16, sensor 1605 is placed such that the user can conveniently aim sensor 1605 outward while maintaining display 1620 of device 1600 in a direction facing the user, and can do so without device 1600 blocking the user's view of trophy 1610.

Figure 17:
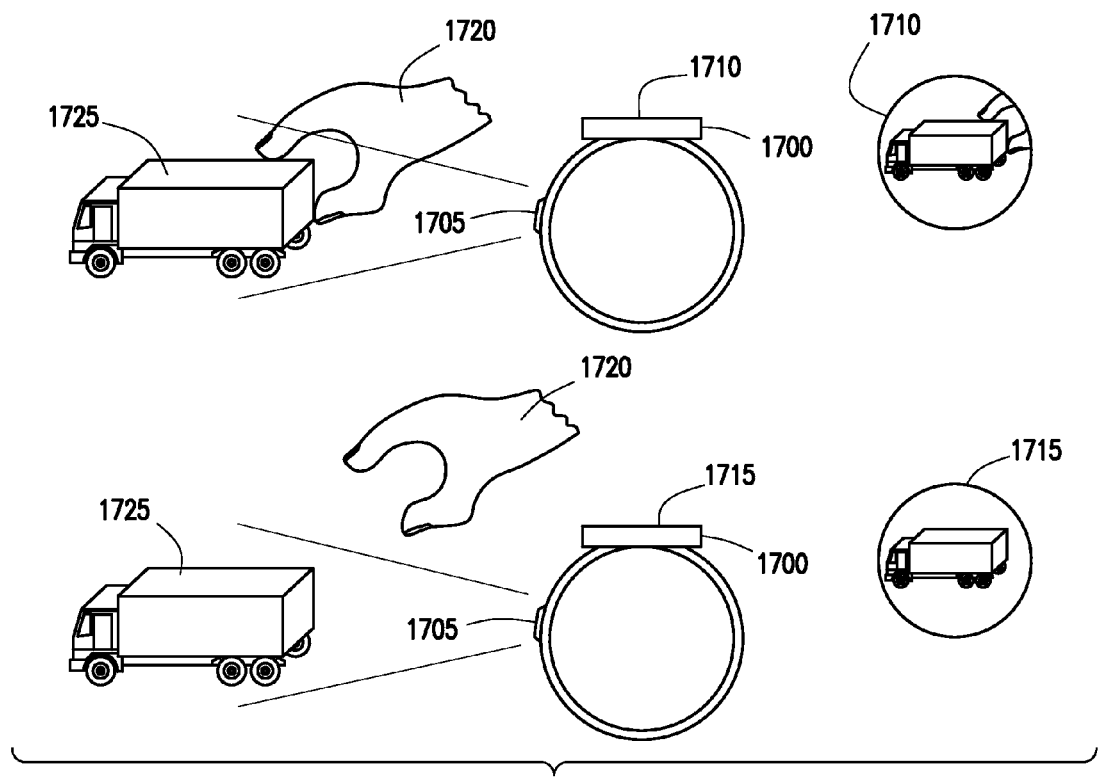
FIG. 17 illustrates an example angle of view for an optical sensor of a device.

FIG. 17 illustrates an example angle of view for an optical sensor. When object 1725 is in the angle of view of optical sensor 1705, a user may view both object 1725 and an image 1710 or 1715 of object 1725 as displayed on device 1700. For example, when the user's hand 1720 is in the angle of view, the user may view object 1725, hand 1720, and an image 1710 of object 1725 and hand 1720 on display 1700 of the device. In contrast, when hand 1720 is not in the angle of view of sensor 1705, hand 1720 is not displayed by image 1715 presented on display 1700. When worn by a user, the device's sensor may capture the user's hand/arm/fingers in the angle of view of the sensor while performing a gesture to be captured by the same or other sensors (e.g. a gesture selecting an object in the angle of view of the device, such as, for example, pinching, tapping, or pulling toward or pushing away). The sensor and display may be oriented such that, when worn by a user, an object to be displayed on the device is in the angle of view of the device while the device does not block the user's view of the object and the user's gaze is within the viewing cone of the device's display. In particular embodiments, a user may interact with the image captured by the sensor or displayed on the device, such as, for example, by tapping on the portion of the display at or near where the image is displayed, by performing a gesture within the angle of view of the sensor, or by any other suitable method. This interaction may provide some functionality related to the object, such as, for example, identifying the object, determining information about the object, and displaying at least some of the information on the display; by capturing a picture of the object; or by pairing with or otherwise communicating with the object if the object has pairing/communicating capabilities.

Figures 18A, 18B:
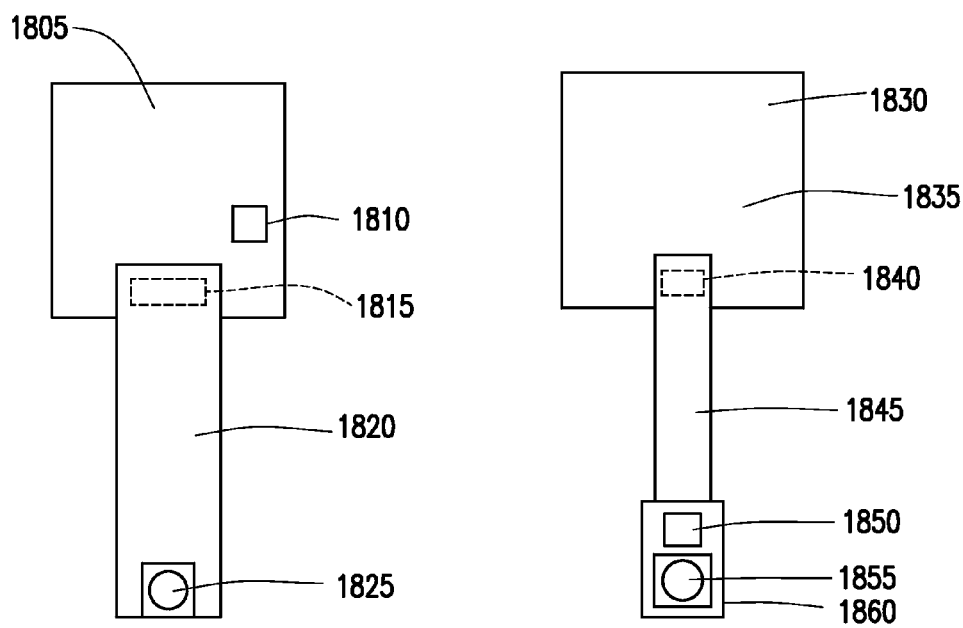
FIGS. 18A-18B illustrate example optical sensors of a device.

In particular embodiments, an optical or depth sensor module (which may be used interchangeably, where appropriate) may communicate with a device via a simple extension of the bus the optical sensor would use if it were directly mounted on the main printed circuit board (PCB), as illustrated in FIG. 18A. In FIG. 18A, optical sensor 1825 transmits data over flexible printed circuits or wiring 1820 to an integrated control 1810, which in the example of FIG. 18A is located in or on device 1805, which houses the main printed circuit board. FIG. 18B illustrates the optical sensor integrated circuit 1850 on or in the optical sensor module 1860, which also houses optical sensor 1855. Communication between the main printed circuit board of device 1830 and electronics in camera module 1860 occur via flexible printed circuit 1845. The arrangement of FIG. 18B may allow an integrated circuit to compress and otherwise process the data and send it via a method that requires fewer signal lines, or that requires a smaller transfer of data. That may be beneficial since the band must flex when the user wears the device, and thus a smaller number of lines may be desirable. Such an approach can reduce the number of lines to one or two signal lines and two power lines, which is advantageous for packaging, molding, and reliability. In particular embodiments, one or more of the electronics described above must be shielded to prevent electromagnetic interference from the long high-frequency cabling. The use of a parallel bus is common is such cases, and may require the use of a larger cable or FPC.

In one embodiment, the camera control integrated circuit may be mounted directly on a small circuit board at the optical module, as illustrated in FIGS. 18A-B. An wearable electronic device may include any suitable sensors. In particular embodiments, one or more sensors or its corresponding electronics may be located on a band of the device, in or on the body of a device, or both. Sensors may communicate with each other and with processing and memory components through any suitable wired or wireless connections, such as for example direct electrical connection, NFC, or BLUETOOTH. Sensors may detect the context (e.g. environment) or state of the device, the user, an application, or another device or application running on another device. This disclosure contemplates an wearable electronic device containing any suitable configuration of sensors at any suitable location of the wearable electronic device. In addition, this disclosure contemplates any suitable sensor receiving any suitable input described herein, or initiating, involved in, or otherwise associated with the provision of any suitable functionality or services described herein. For example, touch-sensitive sensors may be involved in the transition between graphical user interfaces displayed on the device, as described more fully herein. This disclosure further contemplates that functionality associated with the wearable device, activation/deactivation of sensors, sensitivity of sensors, or priority of sensor processing may be user-customizable, when appropriate.

Figure 19:
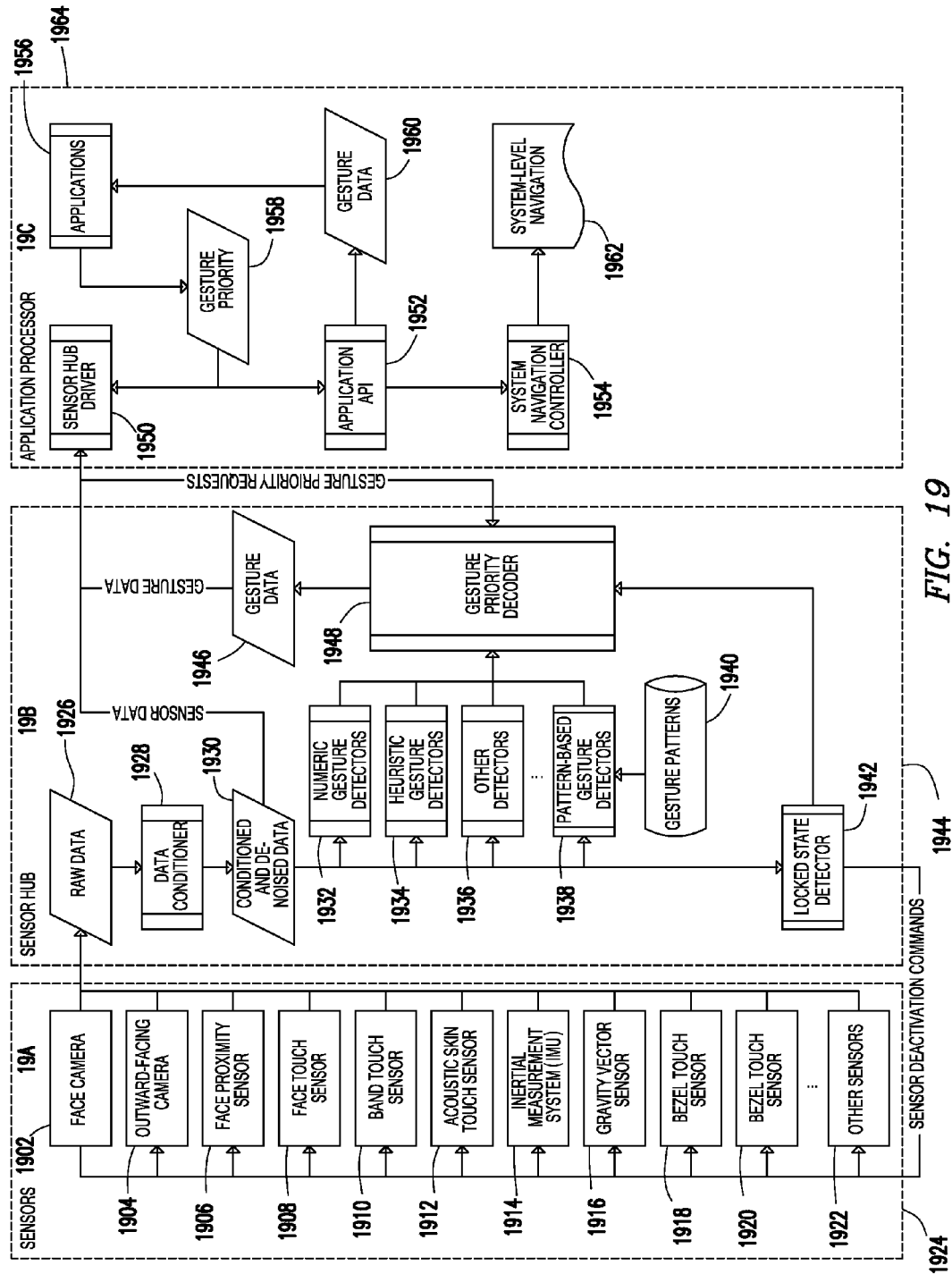
FIG. 19 illustrates an example sensor detection system of a device.

FIG. 19 illustrates an example sensor detection system and illustrates example sensors for an wearable electronic device. Sensors send data in a sensor-specific format to the sensor hub subsystem of the device. For example, sensors 19A illustrated in example sensor module 1924 may include one or more: face-detecting cameras 1902, outward-facing cameras 1904, face proximity sensors 1906, face touch sensors 1908, band touch sensors 1910, acoustic skin touch sensors 1912, inertial measurement system (IMU) 1914, gravity vector sensors 1916, touch sensors 1918 and 1920, and any other suitable sensors 1922. Data from sensors is sent to sensor hub 19B illustrated in example sensor hub module 1944. The data is conditioned and cleaned of noise in steps 1928 and 1930 as needed and transferred to a locked-state detector 1942. Locked state detector 1942 detects when the device is inactive, and disables sensors as needed to conserve power, while monitoring the sensor data for a gesture or other suitable input that may reactivate the device. For example, numeric gesture detectors receive sensor output and compare that output to one or more numeric thresholds to determine an outcome. Heuristic gesture detectors 1934 receive sensor output and make decisions based on one or more decision trees, such as for example ANDing rules applied to more than one threshold. Pattern-based gesture detectors 1938 evaluate sensor input against a predetermined library of gesture patterns 1940, such as for example patterns determined by empirical evaluation of sensor output when a gesture is performed. One or more gesture priority decoders 1948 evaluate output from gesture detectors, locked state detectors, or both to determine which, if any, of the detected gestures should be utilized to provide functionality to a particular application or system-level process. More broadly, in particular embodiments, when the device is active, application-requested or system-requested sensor detectors are activated in turn and provide their data to the sensor priority decoder. In particular embodiments, the priority detector determines which, if any, of a plurality of sensor input to process, and this disclosure contemplates that combined input from multiple sensors may be associated with functionality different than functionality associated with each sensor input individually. The decoder decides when a sensor has been detected with sufficient certainty, and provides sensor data to the sensor hub driver. The driver provides an application programming interface (API) to the end applications and system controllers, which in turn produce necessary output and navigation. For example, FIG. 19 illustrates example sensor hub driver

1950, application APIs 1952, system navigation controllers 1954 for, for example, determining appropriate system functionality (for example, system-level navigation 1962 through a graphical user interface of the device), and application-level gesture priority detectors for applications 1956. While sensor hub 19B and application processor 19C (illustrated in example application processor module 1964) of FIG. 19 are illustrated as separate entities, they may be expressed by (and their functions performed by) at least some of the same or similar components. In particular embodiments, the boundaries delineating the components and functions of the sensor hub and the application processor may be more or less inclusive. The boundaries illustrated in FIG. 19 are merely one example embodiment. As for sensors themselves, functions executed by and components of the sensor hub system and application processor may occur or be in the device body, in the band, or both. Particular embodiments may use more than one sensor hub or application processor, or components therein, to receive and process sensor data.

Sensors may internally produce sensor data, which may be simply filtered or reformatted by, for example, a detector or data conditioner. Raw data may be formatted to an uniform format by the data formatter for ingestion by the Application API. Recognizers may use numeric models (such as decision trees), heuristic models, pattern recognition, or any other suitable hardware, software, and techniques to detect sensor data, such as gesture input. Recognizers may be enabled or disabled by the API. In such cases, the associated sensors may also be disabled if the recognizer is not to receive data from the sensors or is incapable of recognizing the sensor data.

A device may incorporate a database of sensor outputs that allow the same detector to detect many different sensor outputs. Depending on the requests produced by the API, a sensor priority decoder may suppress or pass through sensor output based on criteria supplied. The criteria may be a function of the design of the API. In particular embodiments, recognizers may ingest the output of more than one sensor to detect sensor output.

In particular embodiments, multiple sensors may be used to detect similar information. For example, both a normal and a depth sensing camera may be used to detect a finger, or both a gyroscope and a magnetometer may be used to detect orientation. When suitable, functionality that depends on or utilizes sensor information may substitute sensors or choose among them based on implementation and runtime considerations such as cost, energy use, or frequency of use.

Sensors may be of any suitable type, and as described herein, may be located in or on a device body, in or on a band, or a suitable combination thereof. In particular embodiments, sensors may include one or more depth or proximity sensors (terms which may be used interchangeably herein, when appropriate), such as for example infrared sensor, optical sensors, acoustic sensors, or any other suitable depth sensors or proximity sensors. For example, a depth sensor may be placed on or near a display of a device to detect when, e.g., the user's hand, finger, or face comes near the display. As another example, depth sensors may detect any object that a user's finger in the angle of view of the depth sensor is pointing to, as described more fully herein. Depth sensors also or in the alternative may be located on a band of the device, as described more fully herein. In particular embodiments, sensors may include on or more touch-sensitive areas on the device body, band or both. Touch-sensitive areas may utilize any suitable touch-sensitive techniques, such as for example resistive, surface acoustic wave, capacitive (including mutual capacitive or self-capacitive), infrared, optical, dispersive, or any other suitable techniques. Touch-sensitive areas may detect any suitable contact, such as swipes, taps, contact at one or more particular points or with one or more particular areas, or multi-touch contact (such as, e.g., pinching two or more fingers on a display or rotating two or more fingers on a display). As described more fully herein, touch-sensitive areas may comprise at least a portion of a device's display, ring, or band. Like for other sensors, in particular embodiments touch-sensitive areas may be activated or deactivated for example based on context, power considerations, or user settings. For example, a touch-sensitive portion of a ring may be activated when the ring is "locked" (e.g. does not rotate) and deactivated when the ring rotates freely. In particular embodiments, sensors may include one or more optical sensors, such as suitable cameras or optical depth sensors.

In particular embodiments, sensors may include one or more inertial sensors or orientation sensors, such as an accelerometer, a gyroscope, a magnetometer, a GPS chip, or a compass. In particular embodiments, output from inertial or orientation sensors may be used to activate or unlock a device, detect one or more gestures, interact with content on the device's display screen or a paired device's display screen, access particular data or activate particular functions of the device or of a paired device, initiate communications between a device body and band or a device and a paired device, or any other suitable functionality. In particular embodiments, sensors may include one or more microphones for detecting e.g. speech of a user, or ambient sounds to determine the context of the device. In addition, in particular embodiments a device may include one or more speakers on the device body or on the band.

In particular embodiments, sensors may include components for communicating with other devices, such as network devices (e.g. servers or routers), smartphones, computing devices, display devices (e.g. televisions or kiosks), audio systems, video systems, other wearable electronic devices, or between a band and a device body. Such sensors may include NFC readers/beacons, BLUETOOTH technology, or antennae for transmission or reception at any suitable frequency.

In particular embodiments, sensors may include sensors that receive or detect haptic input from a user of the device, such as for example piezoelectrics, pressure sensors, force sensors, inertial sensors (as described above), strain/stress sensors, or mechanical actuators. Such sensors may be located at any suitable location on the device. In particular embodiments, components of the device may also provide haptic feedback to the user. For example, one or more rings, surfaces, or bands may vibrate, produce light, or produce audio.

In particular embodiments, an wearable electronic device may include one or more sensors of the ambient environment, such as a temperature sensor, humidity sensor, or altimeter. In particular embodiments, an wearable electronic device may include one or more sensors for sensing a physical attribute of the user of the wearable device. Such sensors may be located in any suitable area, such as for example on a band of the device or on base of the device contacting the user's skin. As an example, sensors may include acoustic sensors that detects vibrations of a user's skin, such as when the user rubs skin (or clothing covering skin) near the wearable device, taps the skin near the device, or moves the device up and down the user's arm. As additional examples, a sensor may include one or more body temperature sensors, a pulse oximeter, galvanic-skin-response sensors, capacitive imaging sensors, electromyography sensors, biometric data readers (e.g. fingerprint or eye), and any other suitable sensors. Such sensors may provide feedback to the user of the user's state, may be used to initiate predetermined functionality (e.g. an alert to take particular medication, such as insulin for a diabetic), or may communicate sensed information to a remote device (such as, for example, a terminal in a medical office).

Figure 20A:
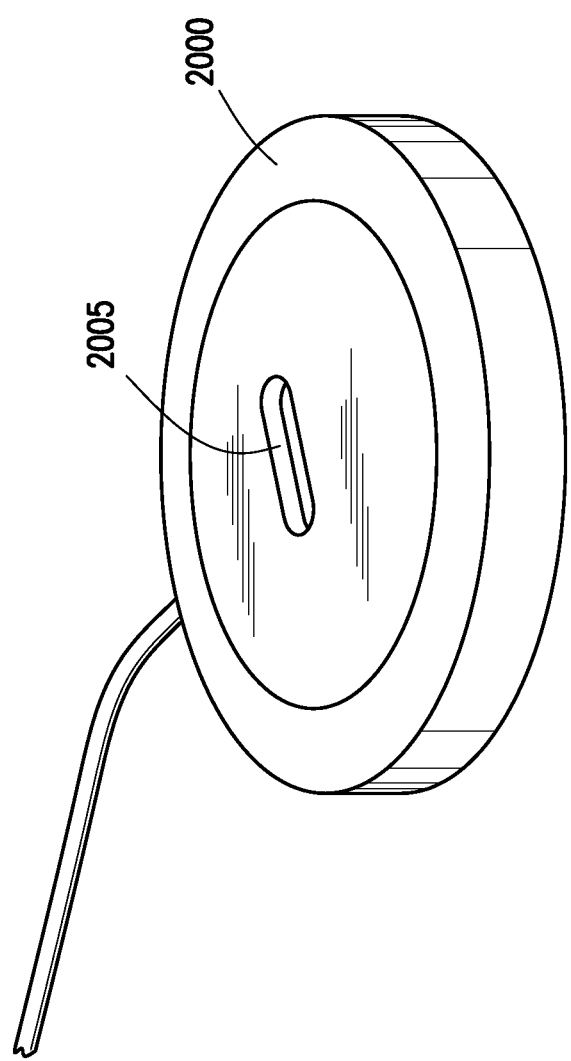
FIGS. 20A-20C illustrate example chargers operable with a device.
Figure 20B:
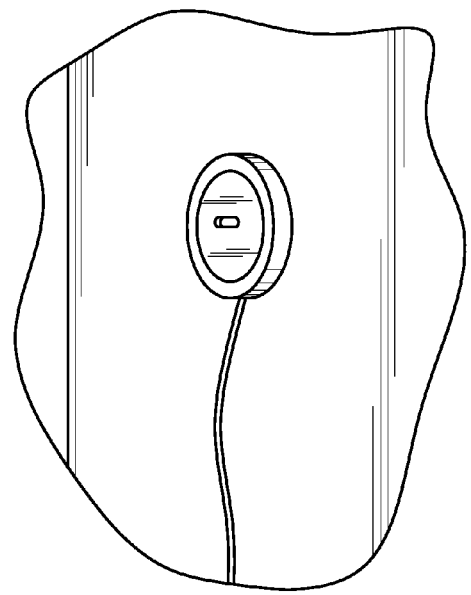
Figure 20C:
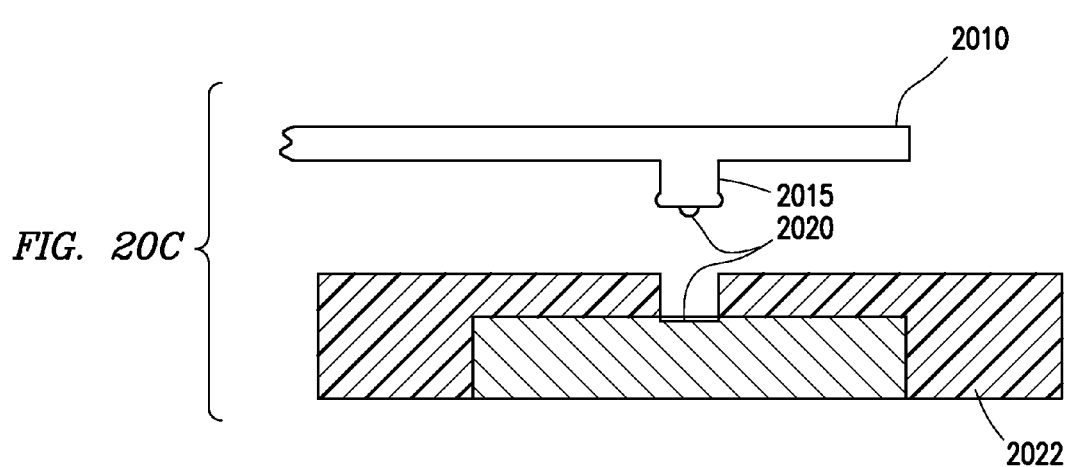

An wearable electronic device may include one or more charging components for charging or powering the device. Charging components may utilize any suitable charging method, such as capacitive charging, electromagnetic charging, trickle charging, charging by direct electrical contact, solar, kinetic, inductive, or intelligent charging (for example, charging based on a condition or state of a battery, and modifying charging actions accordingly). Charging components may be located on any suitable portion of the device, such as in or on the body of the device or in or on the band of a device. For example, FIG. 20A illustrates a charger 2000 with slot 2005 for connecting a charging component with the charger. For example, slot 2005 may use friction, mechanical structures (such as latches or snaps), magnetism, or any other suitable technique for accepting and securing a prong from a charging component such that the prong and charger 2000 make direct electrical contact. FIG. 20C illustrates prong 2015 on band 2010 utilizing pogo-style connectors to create a circuit connection between charger 2022 and band 2010 through contacts 2020. In particular embodiments, prong 2015 may be on charger 2022 and slot 2005 of FIG. 20A may be on the band or body of the wearable device. In particular embodiments, contacts 2020 (such as, for example, pogo-style connectors) may be on the body of the device, which may be used to create a circuit between the band or the charger for charging the device. Charger 2000 of FIG. 20A may be connected to any suitable power source (such as, for example, power from an alternating current (AC) outlet or direct current (DC) power from a USB port on a computing device) by any suitable wired or wireless connection.

Charger 2000 may be made of any suitable material, such as acrylic, and in particular embodiments may have a non-slip material as its backing, such as e.g. rubber. In particular embodiments, charger 2000 may be affixed or attached to a surface, for example may be attached to a wall as illustrated in FIG. 20B. Attachment may be made by any suitable technique, such as for example by mechanically, magnetically, or adhesively. In particular embodiments, an wearable electronic device may be fully usable while attached to the charger. For example, when a charging component is located on the body of the device, the device may sit in the charger while a user interacts with the device or other devices communicate with the device.

Figure 21A:
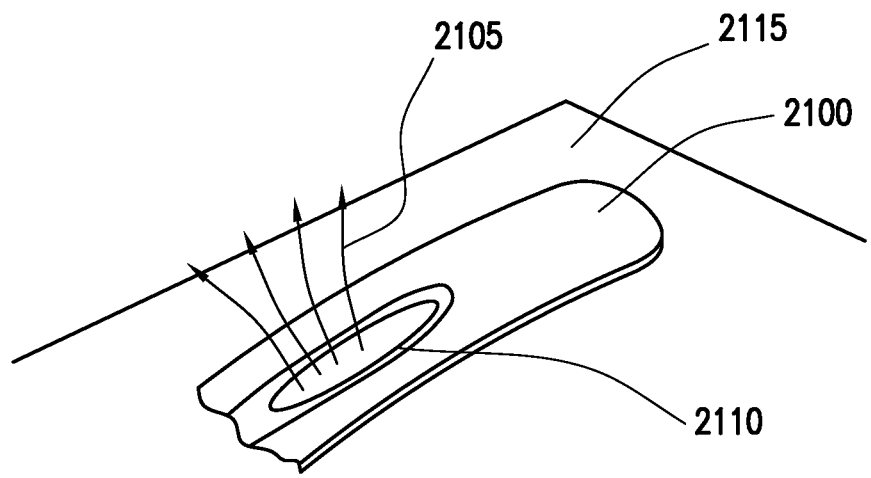
FIGS. 21A-21B illustrate example chargers operable with a device.
Figure 21B:
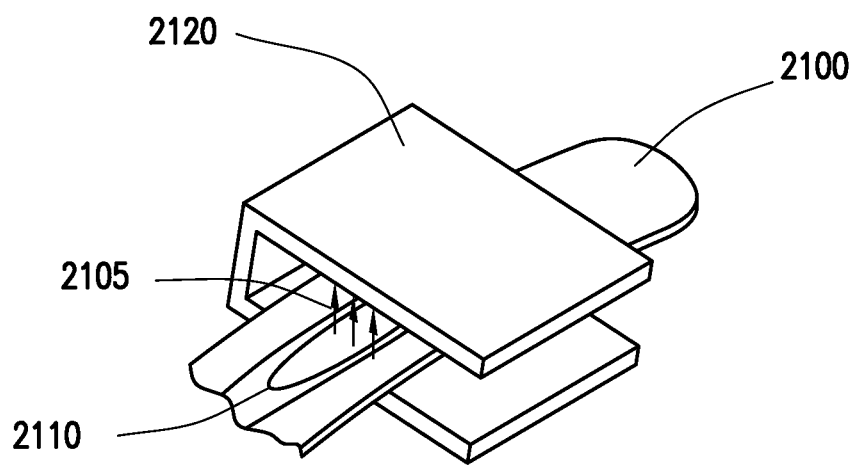

As another example of a charging components in a wearable electronic device, FIGS. 21A-21B illustrate additional example chargers using e.g. inductive charger. As illustrated in FIGS. 21A-21B, a band may include one or more charging coils 2110. As described above, this disclosure contemplates charging coils (or any other suitable charging component) incorporated in or on the body of the device, in alternative to or in addition to on the band of the device. A magnetic field 2105 generated by e.g. charging surface 2115 or charging surface 2120 passes through charging coil 2110. Charging surface 2120 of FIG. 21B may improve the density of the magnetic field 2105 through charging coil 2110 relative to charging surface 2115 and allows more precise placement than charging surface 2115, thus improving the charge transfer rate of the system. This disclosure contemplates that, when suitable, charging may power components on or on the body of the device, components in or on the band, or both.

In particular embodiments, the band or device may implement an antenna for a wireless charging solution. Since wireless charging operates optimally in the absence of ferrous metals, this allows a wider choice of materials for the body of the device, while allowing improved wireless charging transfer capacity by allowing the coil to be held between the poles of a charging driver (as described above) rather than being simply coplanar to the driver. As described above and illustrated in FIG. 2, the active band may also incorporate a traditional internal physical contact connector 250.

In particular embodiments a charging unit with an internal charge reservoir may be associated with a wearable electronic device. When plugged into the wall, the charging unit can charge both an attached device and the charging unit's internal reservoir. When not plugged in, the charging unit can still charge an attached device from its reservoir of power until that reservoir is depleted. When only the charger is connected to a power source without a device, it still charges itself, so that it can provide additional power for the device at a later point. Thus, the charging unit described herein is useful with and without being plugged into a power source, as it also can power any partially-charged device for a while when a person is not able to connect to a power source, for example when travelling, on plane, train station, outdoors, or anywhere a user might need charge for a device but does not have access to a power source. The device can be both in standby or in-use while the charger charges the device, and no modifications to the software or hardware of the target device is needed. Additional benefits of one or more embodiments of the invention may include reducing the number of items one must carry, providing the benefits of both a charger and a power pack, making charger useful to carry when on the move, and reducing the number of cables and connectors one must carry to extend the battery life of their devices. This disclosure contemplates that such a charging unit may be applied to any suitable electronic devices, including but not limited to an wearable electronic device.

Figure 22A:
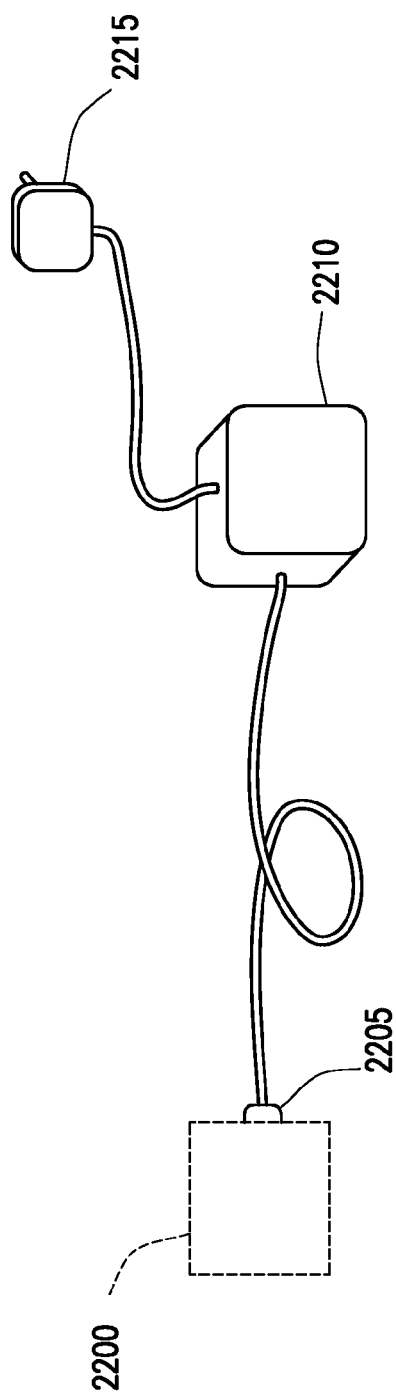
FIGS. 22A-22B illustrate example charging units operable with a device.
Figure 22B:
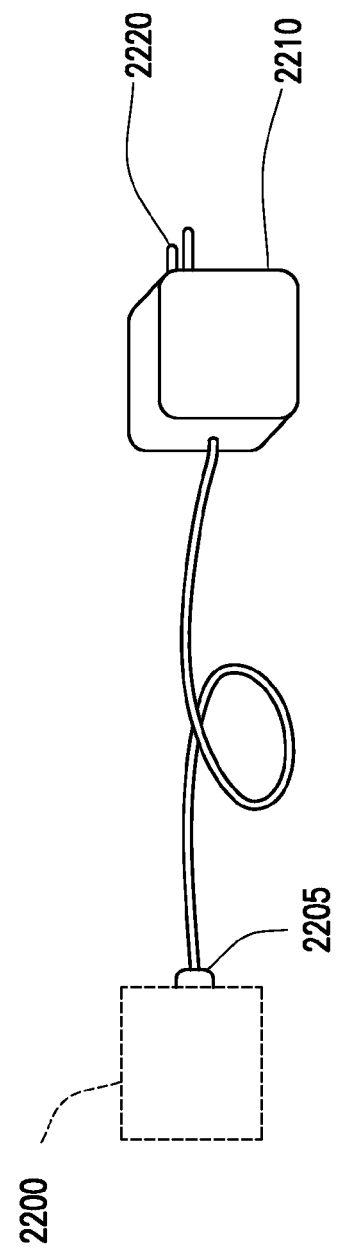

FIGS. 22A-22B illustrate particular embodiments of an example charging unit 2210 with example connections 2205 to device 2200 and connections 2215 and 2220. For example, FIG. 22A illustrates cable connectivity from the charging unit 2210 to device 2200 and to an external power source. As another example, FIG. 22B illustrates charging unit 2210 with cable connectivity from device 2200 and direct connectivity to a power source. This disclosure contemplates any suitable connections between a device, the charging unit, and a power source charging the charging unit. For example, connections both to the device and to the power source may be direct, via cabling, or wireless.

Figure 23:
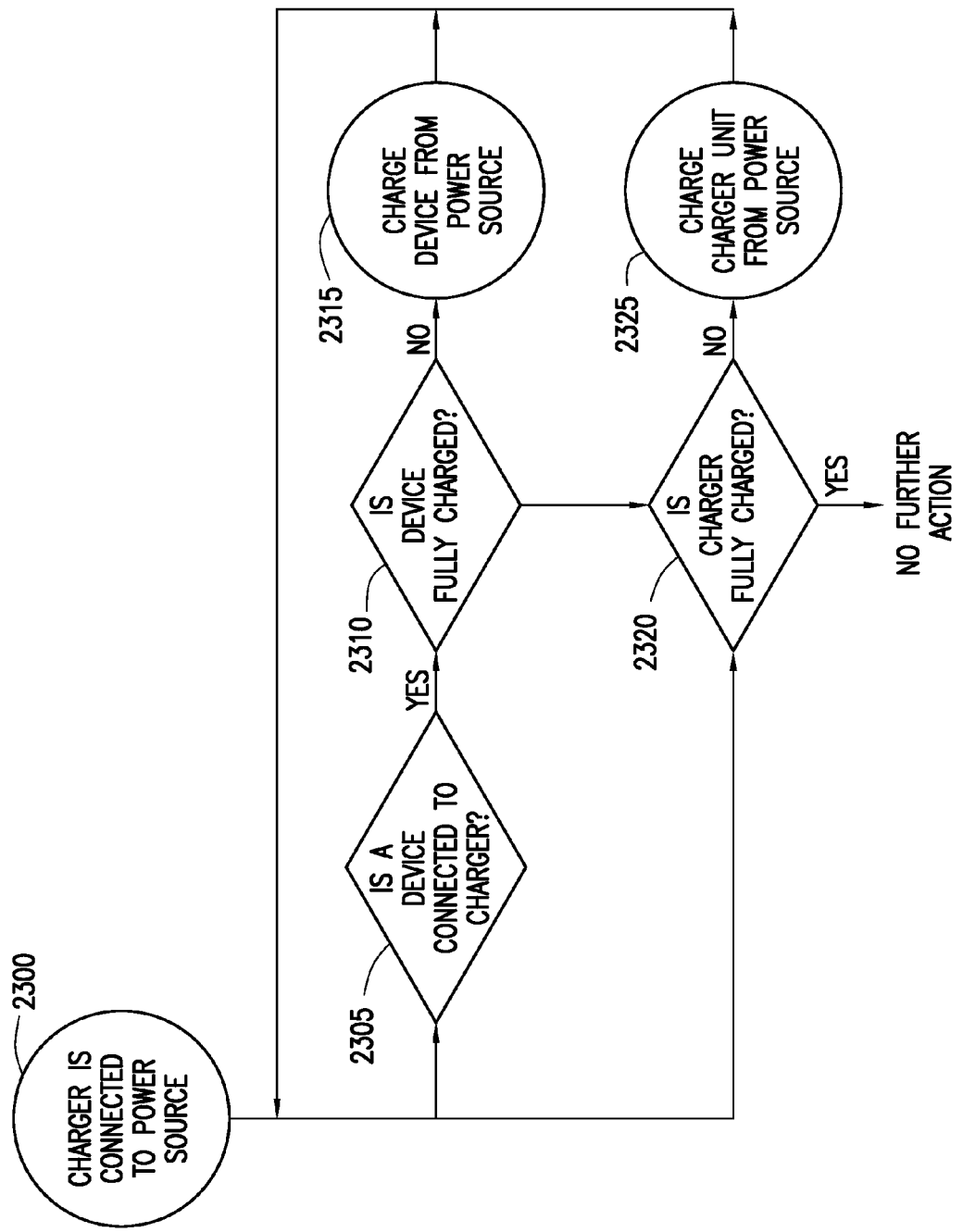
FIG. 23 illustrates an example charging scheme for a charging unit operable with a device.
Figure 24:
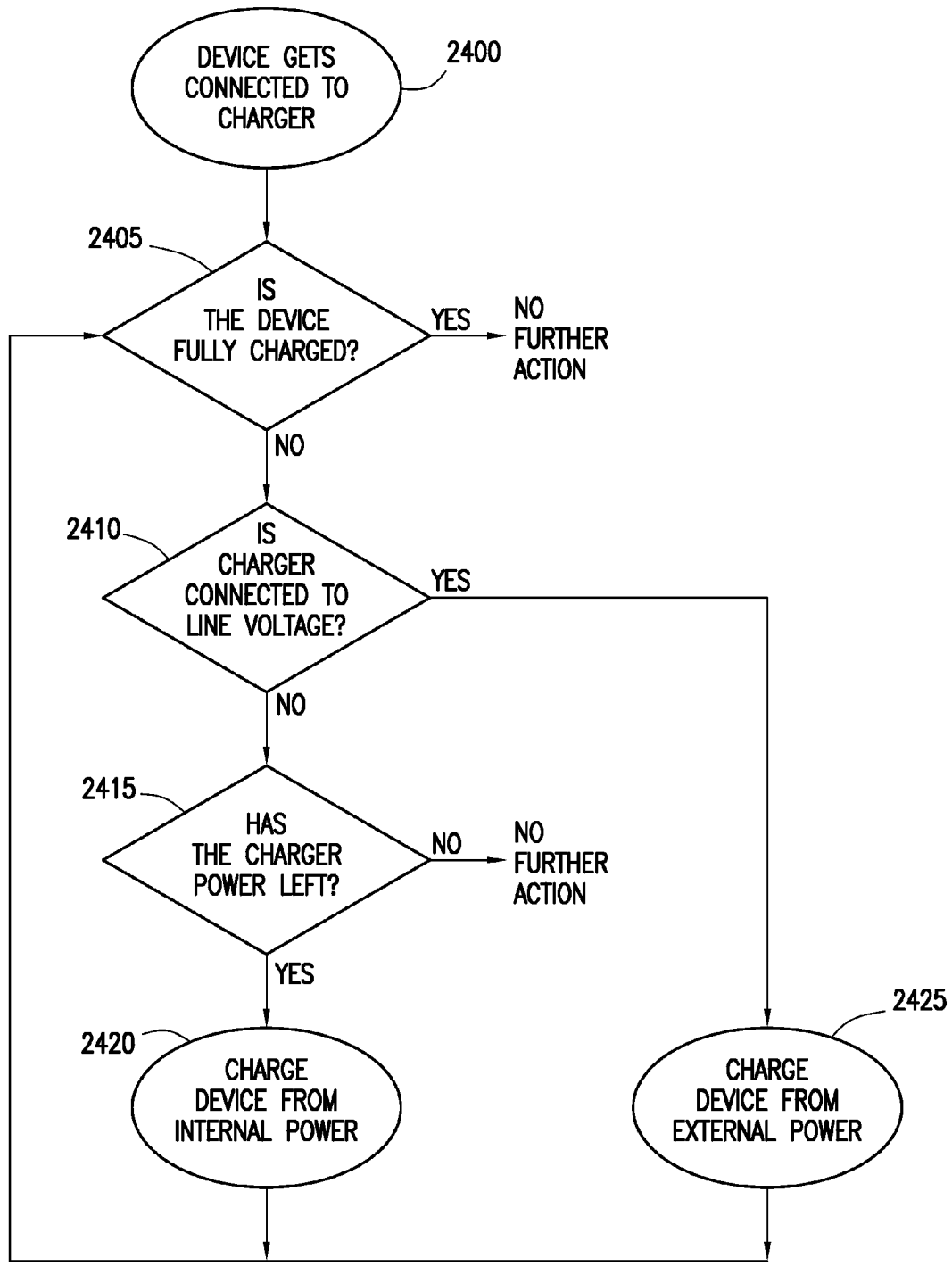
FIG. 24 illustrates an example charging scheme for a charging unit operable with a device.

As described above, a charging unit can charge a device from the charging unit's internal charging reservoir even when not connected to an external power source, and can charge itself, a connected device, or both when connected to an external power source. This disclosure contemplates any suitable scheme for allocating charge between the charging unit and device. Such allocation scheme may depend on the amount of charge internal to the device, internal to the charging unit, the amount of power being consumed by the device, the charging capabilities of an external power source, or any suitable combination thereof. In addition or the alternative, charging threshold may determine which allocation scheme to use. For example, one charging scheme may be used when the device is near full charge and the charging unit has little charge left, and another may be used when the device has little charge left. FIGS. 23-24 illustrate example charging schemes for the charging unit and connected device. For example, as illustrated in FIG. 24, when a device gets connected to a charger as in step 2400, step 2405 determined whether the device is fully charged. If yes, no further charging action is taken. If not, step 2410 determines whether the charger is connected to an external power source, such as for example line voltage. If so, the device is charged from that external source in 2425. If not, step determines whether the charger has any power left, and if so, the device is charged from the charger's internal power source in step 2420 from line voltage rather than the charging unit's reservoir when the charging unit is connected to the line voltage. FIG. 23 illustrates a similar decision tree. If a device is connected to a charger (step 2300) that is connected to a power source (step 2300), then step 2310 determines whether the device is fully charged, and if not, the device is charged from the power source the charger is connected to (step 2315). Similarly, step 2320 determines whether the charger is fully charged, and if not, the charger unit is charged from the power source in step 2325. In particular embodiments, the allocation scheme used may be determined or customized by a user.

Figure 25A:
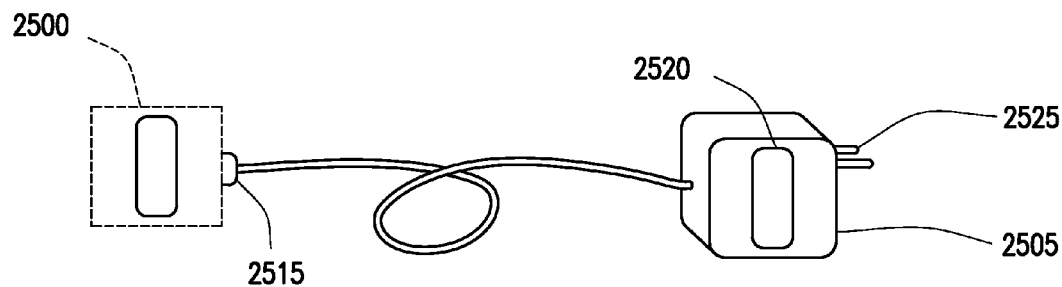
Figure 25B:
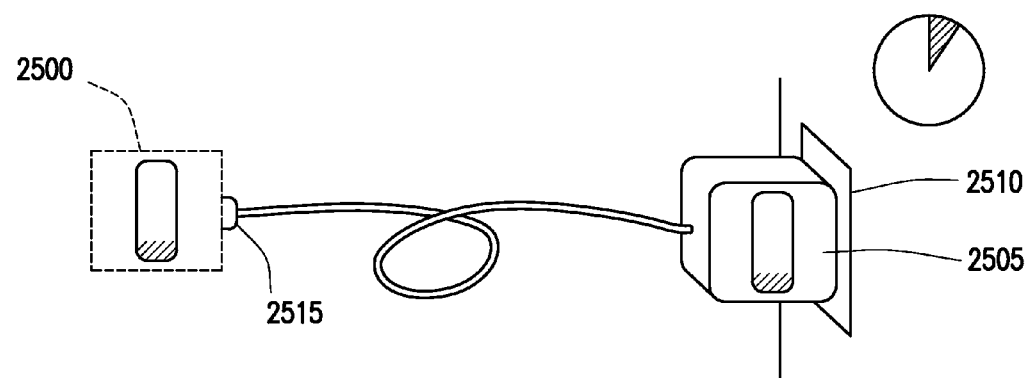
Figure 25C:
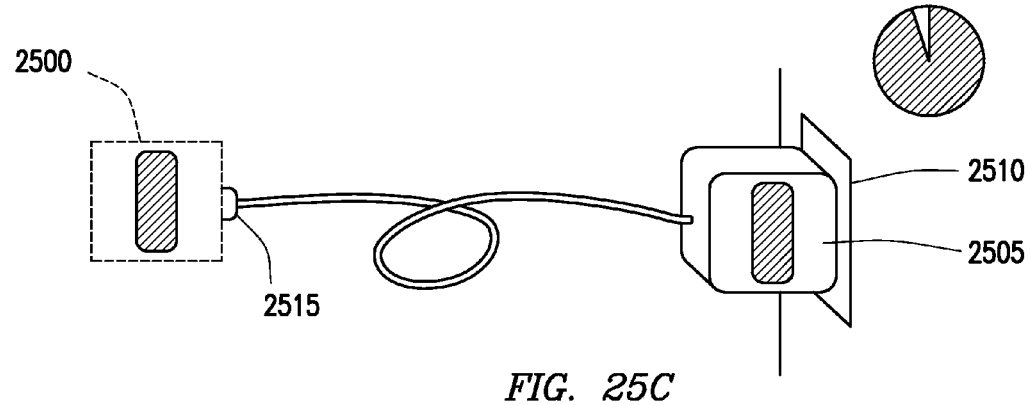

FIGS. 25A-25E illustrate example embodiments of energy storage and charging in a device and a charging unit. In FIG. 25A of the illustrated embodiment, charge reservoir 2500 of the device and charge reservoir 2520 of the charging unit are both depleted. FIGS. 25B-25C illustrate charging the charge reservoir 2500 of the device and charge reservoir 2505 of the device after the charging unit has been connected to external power source 2510. After a short time, both charging unit and the device are charged simultaneously, with charging being distributed such that each is given the same percent of its total charge capacity. Both charging reservoir 2500 of the device and the charging reservoir 2505 of the charging unit are completely charged after some time, as illustrated in FIG. 25C. As described herein, the amount of charge allocated to the device or the charging unit may vary based on any suitable charge allocation scheme. For example, if the power conversion capability of the charging unit is limited, the charging unit's reservoir is nearly full and the device's charge reservoir is nearly empty, or the energy demand of the device is very high, the charging unit may prioritize the charging of the device before charging its internal reserves. As another example, charging of the charging unit may continue until a predetermined threshold charge has been reached.

FIGS. 25D-25E illustrate transfer of charge between the charging unit and the device when the charging unit is not connected to an external power source. As illustrated in FIG. 25D, a device with little charge remaining in its reservoir 2500 is connected to a charging unit with a fully charged reservoir 2505. As discussed above, this disclosure contemplates any suitable charge allocation scheme between the device and the charger when the charger is not connected to an external power source. That allocation scheme may be the same as or different from the allocation schemed used when the charging unit is connected to an external power source. For example, FIG. 25E illustrates an allocation scheme that maximizes the charge of the charging reservoir 2500 of the device. As long as the charging unit still has charge, it continues charging device until the device is fully charged or until the charging reservoir 2505 of the charger is completely empty.

Figure 26:
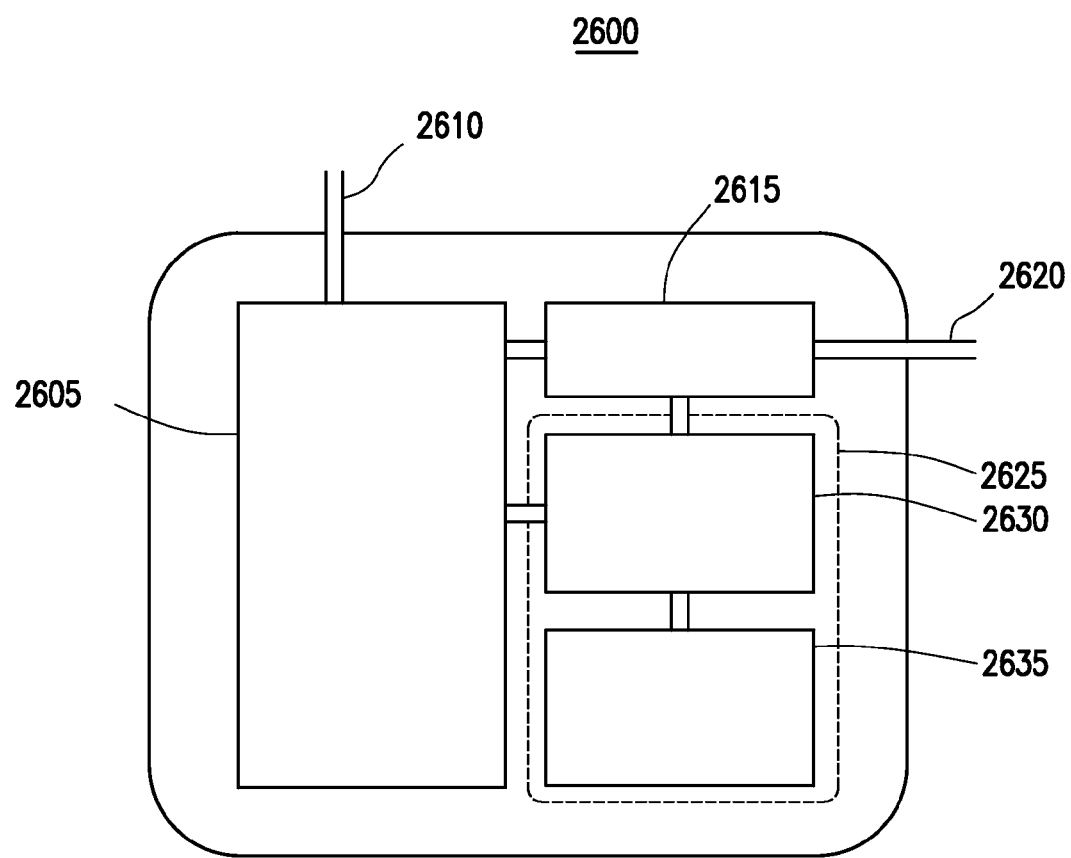
FIG. 26 illustrates an example charging unit architecture.

FIG. 26 illustrates an example internal architecture of an example charging unit 2600. Line voltage converter 2605 produces a lower voltage direct current from the high voltage line current 2610. This voltage is fed both to battery charger/regulator 2630 and connector 2615, to which a device can be connected via connection 2620 for charging. Battery charger 2630 uses available power from line voltage converter 2605 to charge the energy reservoir (battery 2635). It may take an equal share of the power as the device, take a smaller share when the device demand is high (device priority), or take a larger share when internal power reserves are low (charger priority). Those priorities may be user-selectable.

Continuing the example of FIG. 26, when line voltage converter 2605 is not providing power, charger/regulator 2630 produces the appropriate charging voltage from the power on battery 2635. Regulator 2630 may be always on, or it may be switched on by connection to the device, or the press of a button that indicates the user wishes to charge the device. Once activated, regulator 2630 will charge the device until internal reserves are depleted. At that point, some charge may still remain in battery 2635 to improve battery life, but it will not be available to the user. The device may incorporate an emergency mode that allows access to some of this energy to gain a minimal amount of emergency usage time, at the cost of battery lifetime. Regulator 2630 may continue to provide energy until either the device is unplugged, or until the device only draws a minimal amount of energy, indicating completion of charge. Finally, charger/regulator 2630 may include an on-demand display that shows the amount of energy remaining in reserve to the user. Since displays generally use energy, a button or other input may be used to trigger the display for a limited time. While FIG. 26 illustrates an example internal architecture of an example charging unit 2600, this disclosure contemplates any suitable internal architecture of any suitable charging unit described herein, and contemplates that such a charging unit may be of any suitable size and shape.

In particular embodiments, functionality or components of the device (such as e.g. sensors) may be activated and deactivated, for example, to conserve power or reduce or eliminate unwanted functionality. For example, a locked state detector detects when the device is inactivated, and disables sensors as needed to conserve power, while monitoring the sensor data for a gesture or other suitable input that may reactivate the device. A device may have one or more power modes, such as sleep mode or fully active mode. As one example, in particular embodiments the device is arm-worn, and a touch surface of the device may come in contact with objects and persons while in regular use. To prevent accidental activation, an accelerometer or other inertial sensor in the body or band of the device can be used to gauge the approximate position of the device relative to the gravity of the Earth. If the gravity vector is detected towards the sides of the device (e.g. the device is determined by at the user's side or the display is determined not to be pointed at the user) the touch screen can be locked and display disabled to reduce energy use. When the gravity vector is determined to be pointing below the device (e.g. the device is roughly horizontal, resulting in a determination that the user is viewing or otherwise using the device), the system may power up the display and enable the touch screen for further interactions. In particular embodiments, in addition or in the alternative to the direction of the gravity vector waking or unlocking a device, a rate of change of the direction or magnitude of the gravity vector may be used to wake or unlock a device. For example, if the rate of change of the gravity vector is zero for a predetermined amount of time (in other words, the device has been held in a particular position for the predetermined amount of time) the device may be woken or unlocked. As another example, one or more inertial sensors in the device may detect a specific gesture or sequence of gestures for activating a display or other suitable component or application. In particular embodiments, the encoder of the device is robust to accidental activation, and thus can be left active so that the user may change between selections while bringing the device up to their angle of view. In other embodiments the encoder may be deactivated based on context or user input.

In addition or the alternative to power conservation, particular embodiments may lock one or more sensors, particular functionality, or particular applications to provide security for one or more users. Appropriate sensors may detect activation or unlocking of the secure aspects of the device or of another device paired with or communicating with the wearable device. For example, a specific gesture performed with the device or on a touch-sensitive area of the device may unlock one or more secure aspects of the device. As another example, particular rotation or sequence of rotations of a rotatable ring of the device may unlock one or more secure aspects of the device, on its own or in combination with other user input. For example, a user may turn a rotatable ring to a unique sequence of symbols, such as numbers or pictures. In response to receiving the sequence of rotational inputs used to turn the rotatable ring, the display may display the specific symbol(s) corresponding to each rotational input, as described more fully herein. In particular embodiments, the symbols used may be user-specific (such as, e.g., user pictures stored on or accessible by the device or symbols pre-selected by the user). In particular embodiments, different symbols may be presented to the user after a predetermined number of unlockings or after a predetermined amount of time. The example inputs described above may also or in the alternative be used to activate/deactivate aspects of the device, particular applications, or access to particular data. While this disclosure describes specific examples of user input unlocking secure aspects of a device, this disclosure contemplates any suitable input or combination of inputs for unlocking any secure aspect of the device. This disclosure contemplates that input or other suitable parameters for unlocking secure aspects of a device or activating/deactivating components of the device may be user-customizable.

In particular embodiments, an wearable electronic device may detect one or more gestures performed with or on the device. Gestures may be of any suitable type, may be detected by any suitable sensors (e.g. inertial sensors, touch sensors, cameras, or depth sensors), and may be associated with any suitable functionality. For example, one or more depth sensors may be used in conjunction with one or more cameras to capture a gesture. In particular embodiments, several depth sensors or cameras may be used to enhance the accuracy of detecting a gesture or the background associated with a gesture. When appropriate, sensors used to detect gestures (or processing used to initiate functionality associated with a gesture) may be activated or deactivated to conserve power or provide security, as described more fully above. As shown above, FIG. 19 illustrates an example sensor detection system and provides specific examples of gesture detection, processing, and prioritization. In particular embodiments, specific applications may subscribe to specific gestures or to all available gestures; or a user may select which gestures should be detectable by which applications. In particular embodiments, gestures may include manipulation of another device while using the wearable device. For example, a gesture may include shaking another device while aiming, moving, or otherwise utilizing the wearable device. This disclosure contemplates that, where suitable, any of the gestures described herein may involve manipulation of another device. While the examples and illustrations discussed below involve specific aspects or attributes of gestures, this disclosure contemplates combining any suitable aspects or attributes of the gesture and sensor described herein.

In particular embodiments, an wearable electronic device may detect one or more gestures performed with or on the device. Gestures may be of any suitable type, may be detected by any suitable sensors (e.g. inertial sensors, touch sensors, cameras, or depth sensors), and may be associated with any suitable functionality. For example, one or more depth sensors may be used in conjunction with one or more cameras to capture a gesture. In particular embodiments, several depth sensors or cameras may be used to enhance the accuracy of detecting a gesture or the background associated with a gesture. When appropriate, sensors used to detect gestures (or processing used to initiate functionality associated with a gesture) may be activated or deactivated to conserve power or provide security, as described more fully above. FIG. 19. As described more fully above, FIG. 19 illustrates an example sensor detection system and provides specific examples of gesture detection, processing, and prioritization. In particular embodiments, specific applications may subscribe to specific gestures or to all available gestures; or a user may select which gestures should be detectable by which applications. In particular embodiments, gestures may include manipulation of another device while using the wearable device. For example, a gesture may include shaking another device while aiming, moving, or otherwise utilizing the wearable device. This disclosure contemplates that, where suitable, any of the gestures described herein may involve manipulation of another device. While the examples and illustrations discussed below involve specific aspects or attributes of gestures, this disclosure contemplates combining any suitable aspects or attributes of the gesture and sensor described herein.

In particular embodiments, gestures may include gestures that involve at least on hand of the user and an appendage on which the device is worn, such as e.g. the other wrist of the user. For example, in particular embodiments, a user may use the hand/arm on which the device is worn to appropriately aim an optical sensor of the device (e.g. a camera or depth sensor) and may move or position the other arm/hand/fingers to perform a particular gesture. As described herein and illustrated in FIGS. 16-17, in particular embodiments the scene aimed at may be displayed on the device's display, such that a user can view both the real scene, the scene as-displayed on the device, and the user's hand/arm/fingers, if in the angle of view of the. In particular embodiments, the displayed scene may include the hands/fingers/arm used detected by the sensor and used to perform the gesture. FIGS. 27-28 illustrate example gestures in which the user aims an outward-facing (e.g. away from the body of the user) sensor on the device (e.g. on the band of the device, as illustrated in the figures) and moves or positions his other arm/hand/fingers to perform a gesture. For example, in FIG. 27, an outward sensor detects an object in the angle of view of the sensor 2705, an outward sensor (which may be the same sensor detecting the object) detects one or more fingers pointing at the object 2710, and when the pointing finger(s) are determined to be at rest 2715, a gesture is detected 2720. Referring to FIG. 19, raw gesture data captured by the outward-facing camera can be conditioned and cleaned of noise and that data can be sent to the Heuristic Gesture Detector. The Gesture Priority Decoder processes the gesture data and determines when the gesture has been identified with sufficient certainty. When the gesture has been identified, the gesture is sent to the Sensor Hub Driver which provides an API to the end applications and system controllers.

As examples of functionality associated with this gesture, a camera may focus on the object, the object detected and pointed at may then appear on the display, information about that object may appear on the display, and displayed content may be transferred to another device's display (e.g. when the object is another device). FIG. 28 illustrates an example gesture similar to the gesture of FIG. 27; however, the illustrated gesture includes the outward-facing sensor detecting a "tapping" motion of the finger(s) (e.g. that the finger(s) are moving away from the sensor). For example, the gesture of FIG. 28 may include detecting an object in the scene of a camera (or other suitable sensor) in step 2805, detecting the finger in the scene in step 2810, detecting a lack of lateral movement of the finger in step 2815, detecting the finger tip moving further away from the sensor in step 2820, and detecting a gesture in step 2825. The gesture illustrated in FIG. 28 may provide any suitable functionality. For example, the "tapped" object may be selected from the objects displayed on the display screen.

Figure 29:
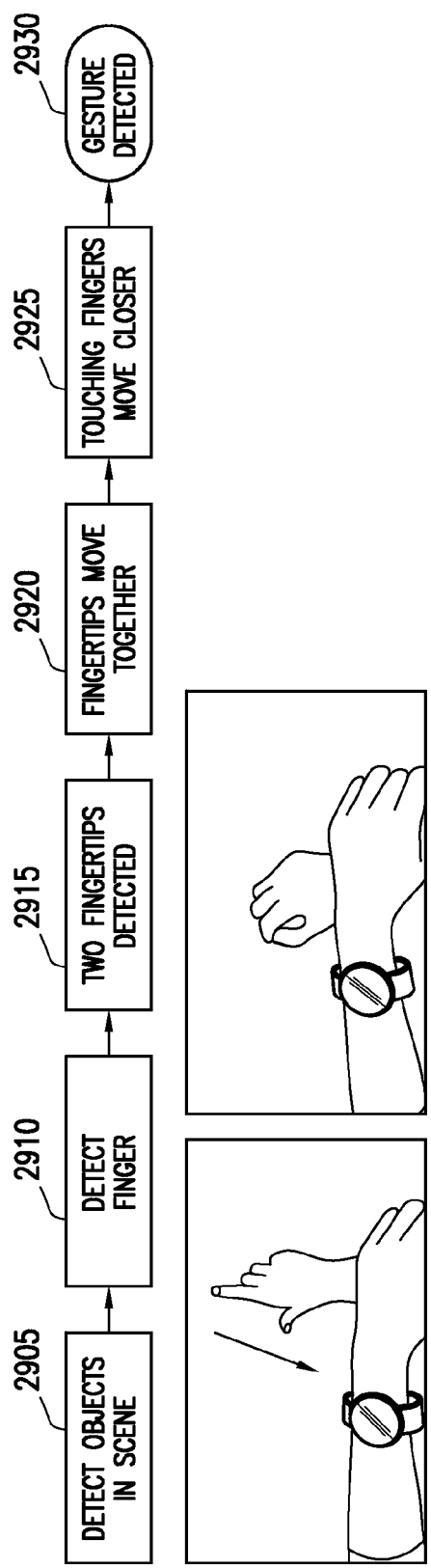
Figure 30:
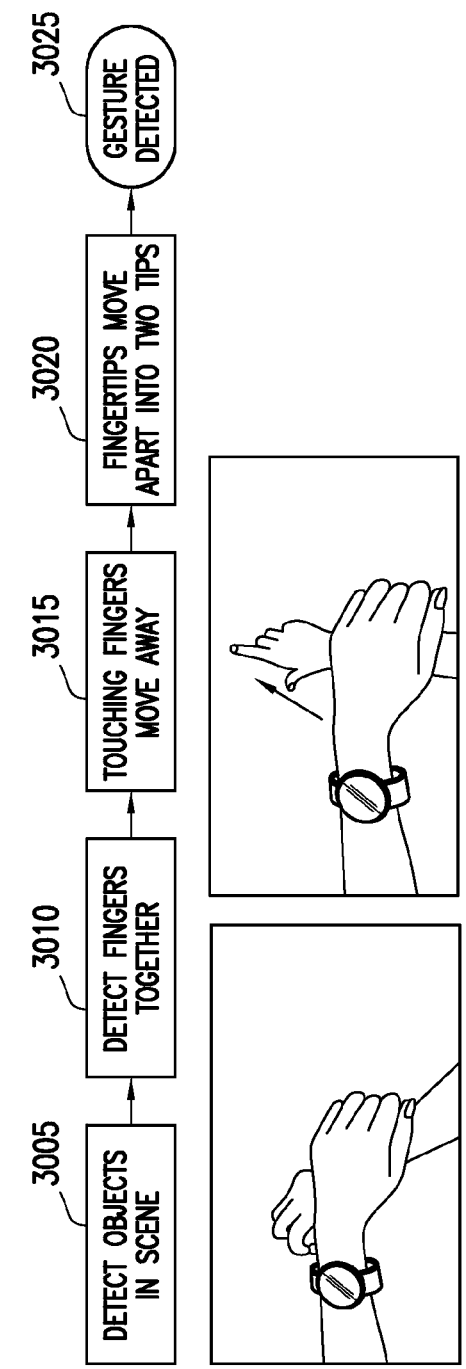

FIGS. 29-30 illustrate example gestures where an object is detected with an outward-facing sensor along with movement of the user's fingers and hand. For example, FIG. 29 illustrates the outward-facing sensor detecting two fingers separated 2915, the two fingers coming together (e.g. in a pinching motion) 2920, and then the pinched fingers moving towards the sensor 2925. The motion of the fingers coming together and moving toward the sensor may occur simultaneously or in sequence, and performing the steps in sequence (or time between steps in the sequence) or simultaneously may each be a different gesture. In FIG. 30, the two fingers illustrated are initially near together 3010, and the outward-facing sensor detects the fingers moving apart 3020 and the hand moving away 3015. As for FIG. 30, the movement of the fingers and the hand may be simultaneous or in any suitable sequence. In addition, aspects of FIGS. 29-30 may be combined to form a gesture. For example, pinching fingers together and moving away from the sensor may be a unique gesture. In particular embodiments, the detected fingers or hand may be manipulating another device, and that manipulation may form part of the gesture. As for all example gestures described herein, this disclosure contemplates any suitable functionality associated with gestures illustrated in FIGS. 29-30.

FIGS. 31-32 illustrate example gestures similar to FIGS. 29-30, except that here all fingers are used to perform the gesture. In FIG. 31, the fingers are detected as initially close together (e.g. in a first) 3105, the first is detected moving away from the sensor 3110, and the sensor detects the first opening 3115. Again, the sequence of steps illustrated may occur in any suitable order. FIG. 32 illustrates the reverse of FIG. 31. FIGS. 31-32 may be associated with any suitable functionality. For example, FIG. 31 illustrates an example of sending all or a portion of content displayed on the device to another device, such as the television illustrated in FIG. 31. Likewise, the gesture in FIG. 32 may pull some or all of the content displayed on another device to the display of the wearable device. For example, the gestures of FIGS. 31-32 may be implemented when the user performs the gestures with the wearable device in proximity of another device, such as a smart phone, tablet, personal computing device, smart appliance (e.g. refrigerator, thermostat, or washing machine), or any other suitable device. The described functionality are merely examples of functionality that may be associated with gestures illustrated in FIGS. 31-32, and this disclosure contemplates that other suitable gesture may perform the described functionality.

Figure 33:
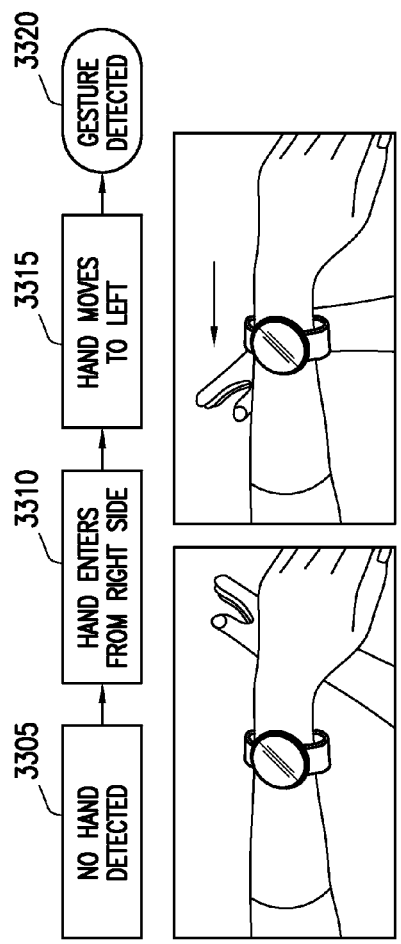
Figure 34:
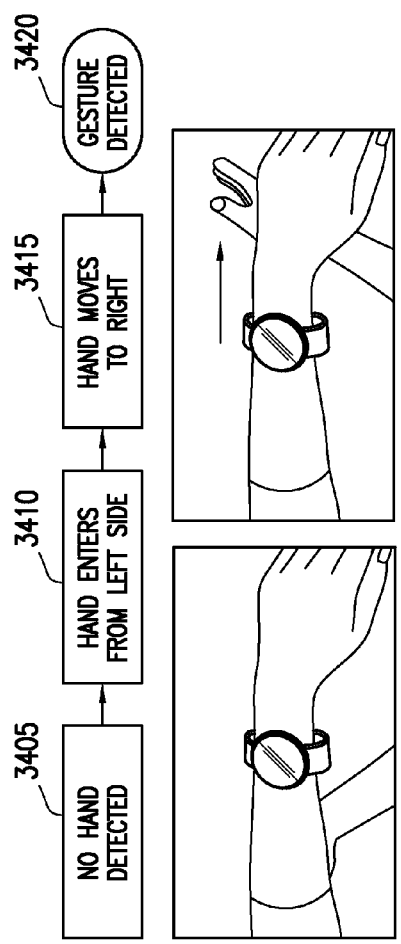

FIGS. 33-37 illustrate an outward-facing sensor detecting a hand or portion of an arm swiping in front of the sensor. In particular embodiments, swiping with the front of the hand may be a different gesture than swiping with the back of the hand. FIGS. 33-34 illustrate the hand being swiped from right to left 3310-3315 and left to right 3410-3415 across the sensor's angle of view, and FIGS. 35-37 illustrate the hand being swiped from bottom to top 3510-3515 (as well as 3735-3740) and top to bottom 3610-3615 (as well as 3710-3715) across the sensor's angle of view. As illustrated, the hand may initially start in the angle of view, pass through the angle of view, and exit the angle of view (as illustrated in FIG. 36); may start outside of the angle of view, pass through the angle of view, and exit the angle of view (as illustrated in FIG. 37); may start out of the angle of view, pass through a portion of the angle of view, and remain in the angle of view (as illustrated in FIGS. 33-35); or may start in the angle of view, pass through a portion of the angle of view, and remain in the angle of view. This disclosure contemplates the hand being swiped at other angles, such as, e.g., entering at a 45 degree angle below and to the right of the device and exiting at a 45 degree angle relative to the top and to the left of the device. Further, this disclose contemplates detecting hand swipes in motions other than a straight line, such as curved swipes or triangular swipes. This disclosure contemplates any suitable functionality associated with any or all of the gestures illustrated in FIGS. 33-37, such as, for example, transitioning among user interfaces displayed on the device or among applications active and displayed on the device, opening or closing applications, or scrolling through displayed content (e.g. documents, webpages, or images). As reiterated elsewhere, this disclosure contemplates any suitable gesture associated with the functionality described in relation to FIGS. 33-37.

Figure 39:
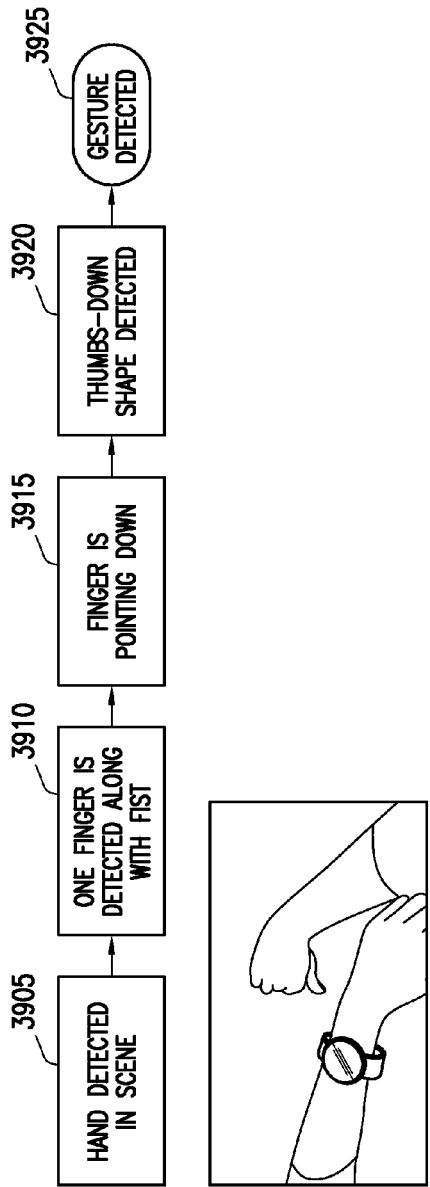

FIGS. 38-39 illustrate example gestures where the outward-facing sensor detects the user's hand in the angle of view 3805 and detects one or more fingers pointing in a direction (along with, in particular embodiments, a portion of the user's hand or arm) 3815. The gesture detected may depend on the fingers detected or direction the detected fingers are pointed. For example, as illustrated in FIG. 38 the finger may be a thumb pointing upwards 3820, and in FIG. 39 the finger may be a thumb pointing downwards 3920. Any suitable functionality may be associated with gestures illustrated in FIGS. 38-39, such as saving or deleting a file locally on the device or on an associated device, or approving or disapproving of changes made to settings or other content.

Figure 40:
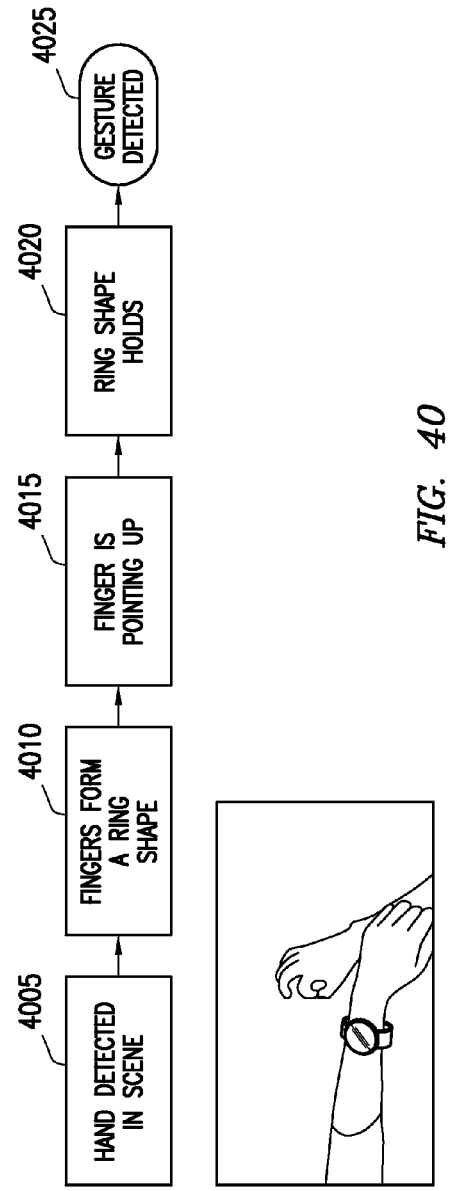

FIG. 40 illustrates an example gesture involving a shape made with multiple fingers or a portion of the hand in the angle of view of the outward-facing sensor. As illustrated in FIG. 40, the shape may be a ring 4010, and the gesture may include fingers not involved in the shape pointing in a specific direction 4015. As illustrated in FIG. 40, a gesture may include holding the shape 4020 (and possibly the other fingers) for a predetermined amount of time.

Figure 41:
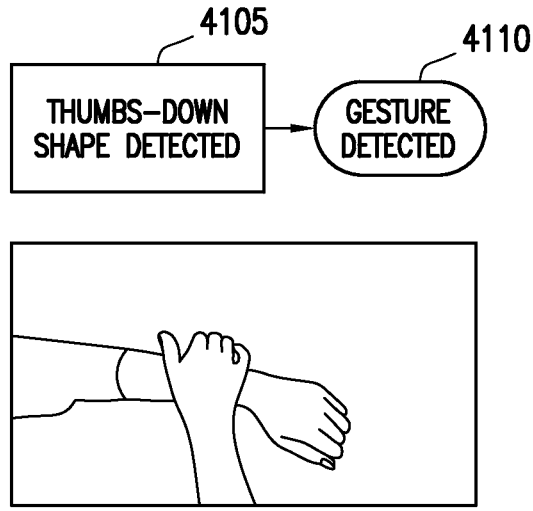
Figure 42:
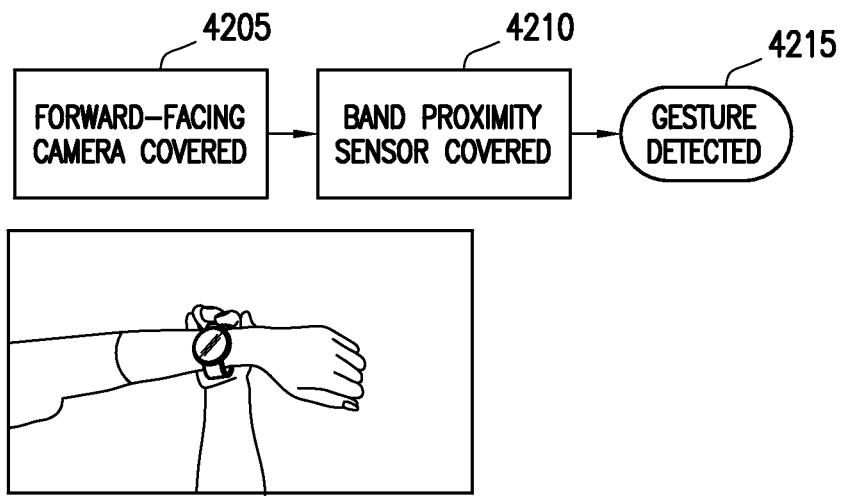

FIGS. 41-42 illustrate example gestures including covering all or a portion of the outward-facing sensor with the user's fingers or hand. Covering the sensor from the top of the device with a thumbs-down type gesture 4105 (as illustrated in FIG. 41) may be a different gesture than covering the sensor from the bottom of the device 4210 (as illustrated in FIG. 42) or the sides of the device. The direction of covering may be detected by, e.g., the shape of the hand when covering the device, the orientation of the hand when covering the device, data from other sensors indicating the direction in which the outward-facing sensor is being covered (e.g. detecting that the display and the outward-facing sensor are covered), or any other suitable technique.

Figure 43:
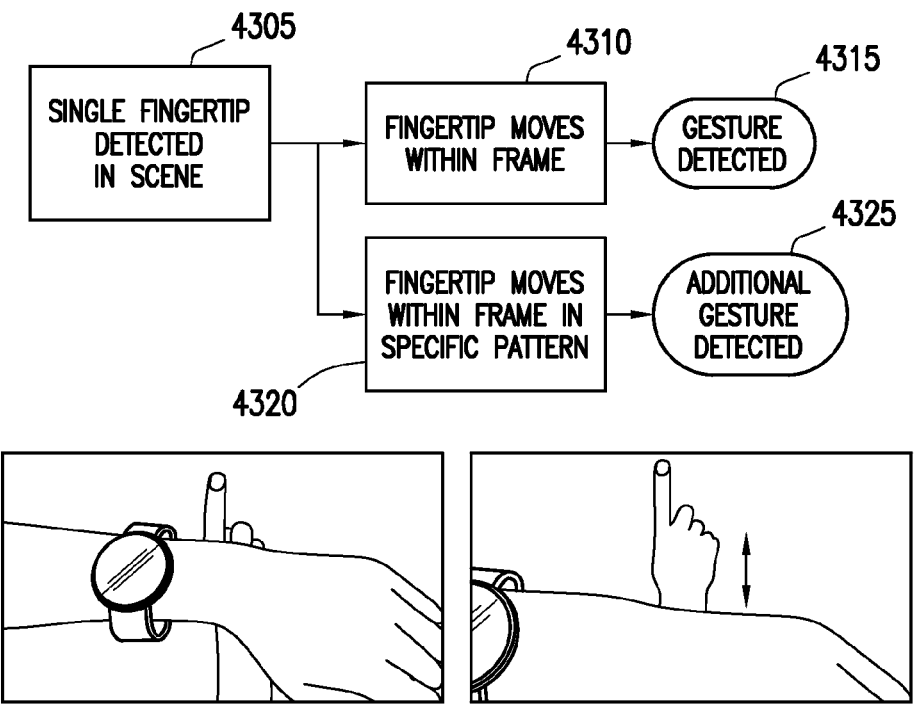
Figure 44:
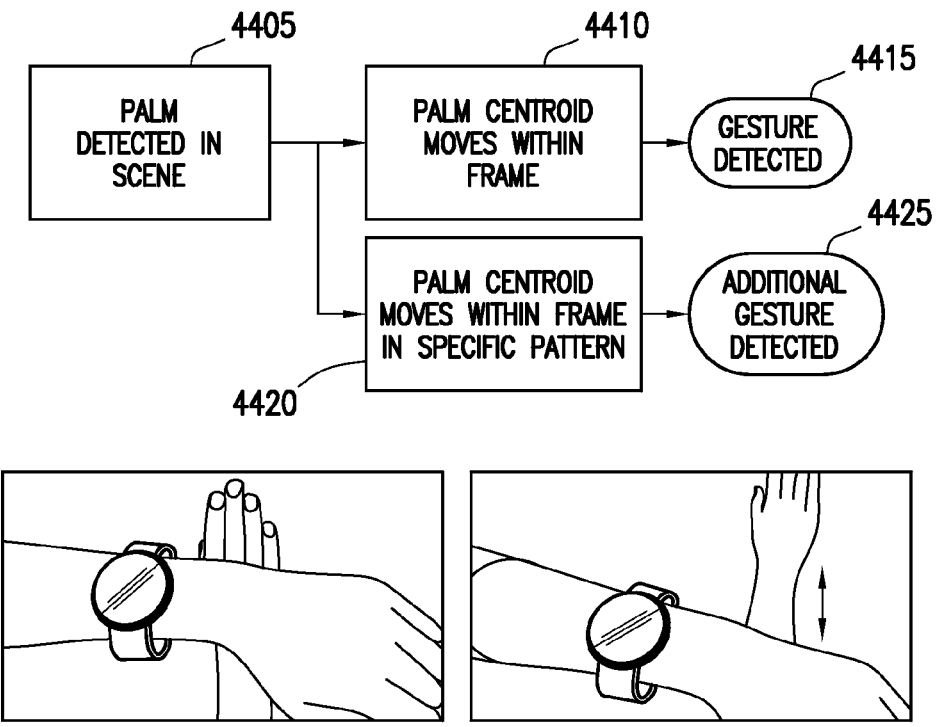

FIGS. 43-44 illustrate example gestures where one or more of the user's fingers or portion of a hand/arm are detected in the angle of view of the outward-facing sensor 4305/4405, and then move within the angle of view (or "frame") to perform a specific gesture 4310/4320/4410/4420. In particular embodiments, a gesture may be any suitable movement or may be movement in a specific pattern. In particular embodiments, a gesture may be associated with the fingers or a portion of the hand/arm detected. For example, a single pointing finger may be associated with a gesture 4305 (as illustrated in FIG. 43) or multiple fingers/a palm may be associated with a gesture 4405 (as illustrated in FIG. 44). In particular embodiments, the direction of the palm (e.g. front, back, at an angle) may be detected and associated with a gesture.

Figure 45:
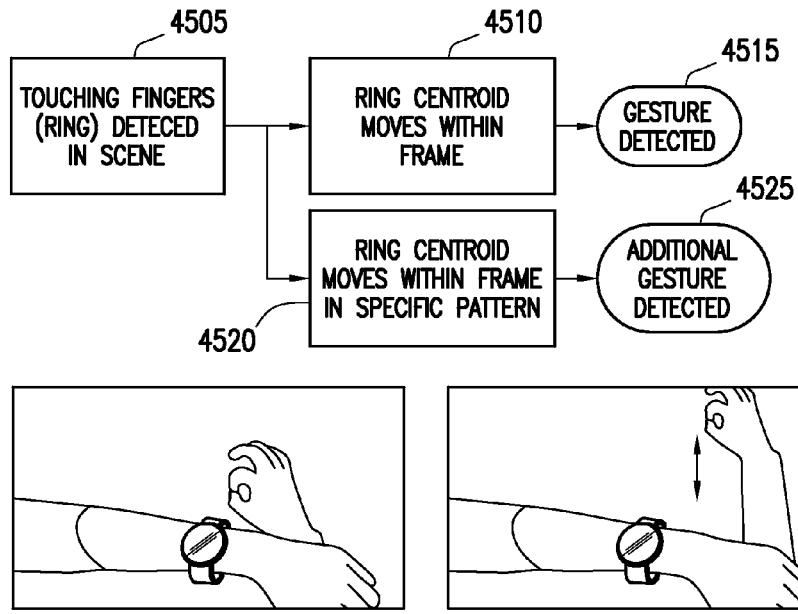

FIG. 45 illustrates an example gesture include detecting a shape with multiple fingers or the hand/arm of the user 4505, and detecting movement of the shape in the angle of view 4510/4520. FIG. 45 illustrates the shape of FIG. 40 moving throughout the outward-facing sensor's angle of view.

Figure 46:
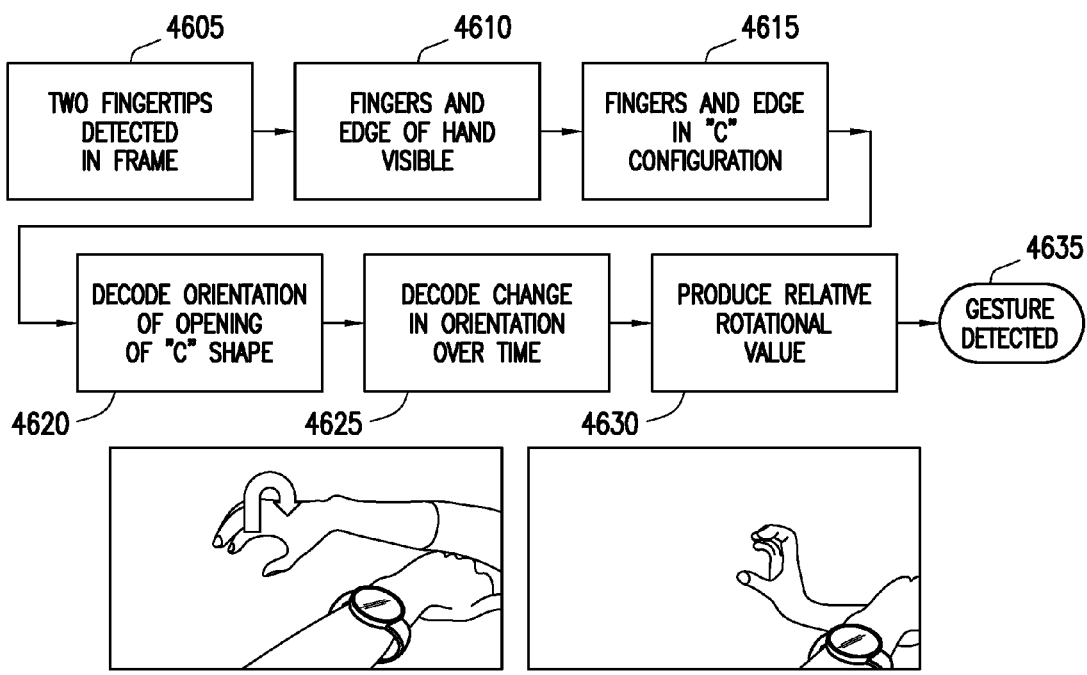

FIG. 46 illustrates an example gesture involving detecting one or more fingers (some or all of a user's hand/arm) and their initial orientation, and subsequently detecting the change in orientation or the rate of change of orientation over time. For example, FIG. 46 illustrates detecting two fingers in a angle of view at step 4605, detecting the fingers and edge of the hand in the angle of view at step 4610, detecting the fingers making a "C" shape at step 4615, decoding an initial orientation of the "C" shape at step 4620, decoding a change in orientation of the "C" shape at step 4625, determining a relative rotational value of the "C" shape at step 4630, and detecting the gesture at step 4635. This disclosure contemplates any suitable shape made with the user's fingers/hand/arm.

Figure 47:
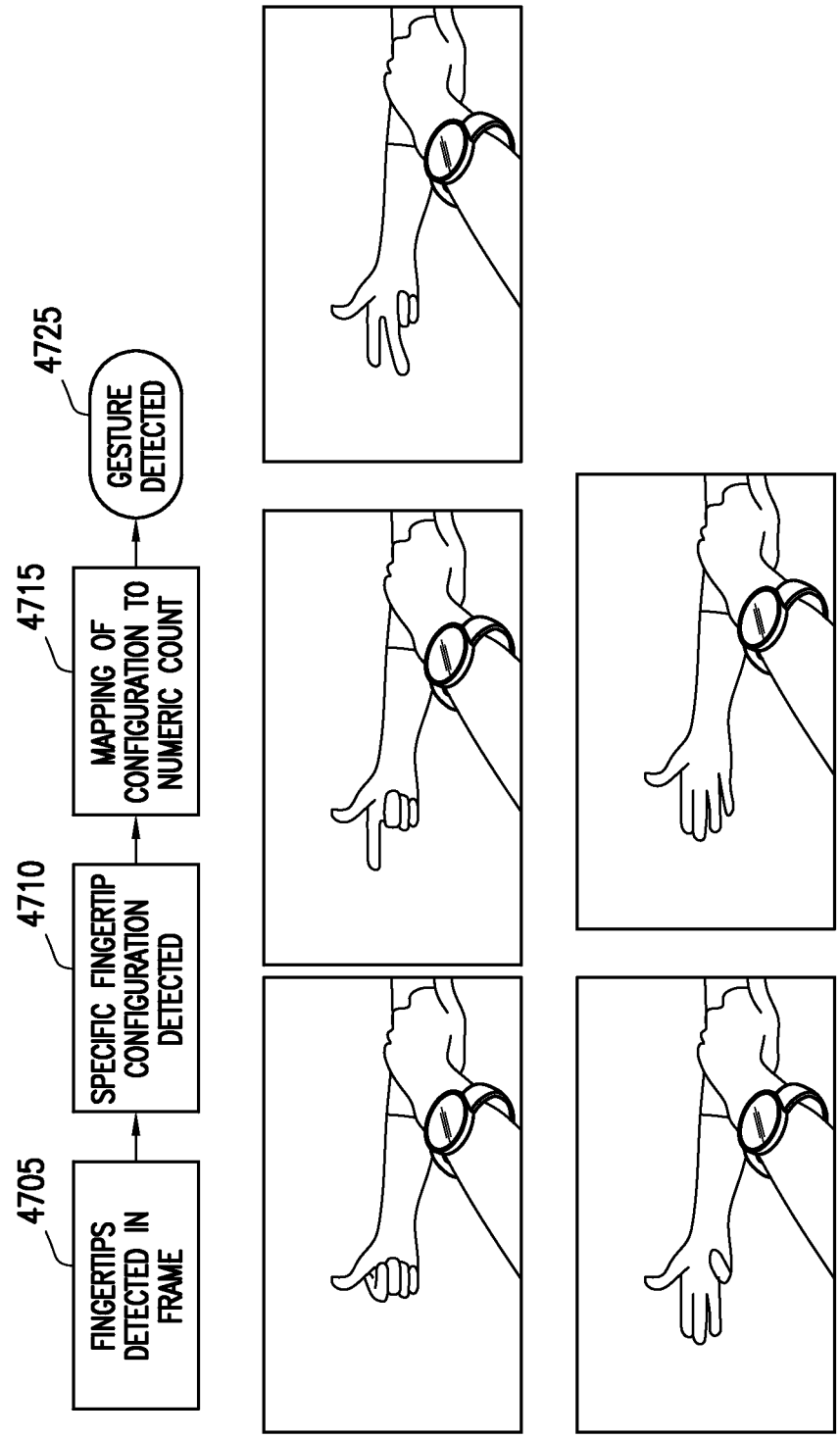

FIG. 47 illustrates an example gesture that involves detecting the number of fingers in a particular position in the outward-facing sensor's angle of view. For example, FIG. 47 illustrates detecting fingertips in an angle of view at step 4705, such as for example one outstretched thumb, an outstretched thumb and a finger, or an outstretched thumb and two fingers. The specific fingertip orientation configuration is detected at step 4710, and the mapping of the configuration to at least a numeric count of the fingers is performed in step 4715 to detect the gesture in step 4725. Each of the displayed images may be a different gesture. This disclosure contemplates any suitable position of the fingers that comprise a gesture. As for all other example gesture described herein, this disclosure contemplates any suitable functionality associated with the gestures. For example, each gesture of FIG. 47 may be associated with a contact to call, e-mail, or text and the detected gesture may activate the call, e-mail, or text to the contact assigned to the gesture. In particular embodiments, the position of the hand/arm/fingers may indicate which method of contact should be used for the contact associated with the gesture.

Figure 48:
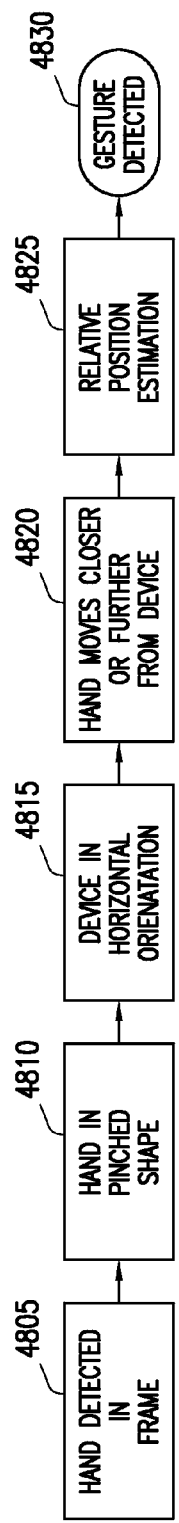
Figure 49:
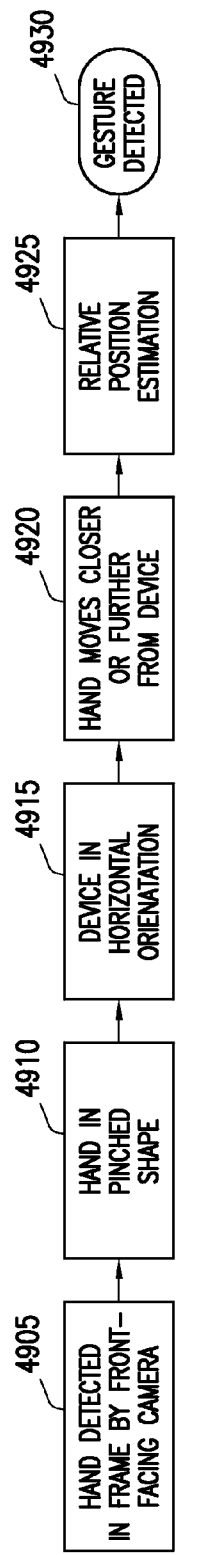

FIGS. 48-49 illustrate example gestures involving dual sensors on the device. For example, FIG. 48 illustrates a sensor on the bottom band portion of the device. That sensors detects the position of the user's other hand relative to the device, and detects separation of the hand from the sensor. In particular embodiments, the gesture may include determining that both hands are moving, such as for example by additional information supplied by one or more inertial sensors in the device or by an inward-facing (e.g. facing the body of the user) camera detecting movement of the device via change in scenery. For example, in FIG. 48 a hand is detected in the angle of view at step 4805. A sensor detects that the hand is in a pinched shape at step 4810 and the same or another sensor detects that the device is in a horizontal orientation in step 4815. A sensor detects the hand moving relative to the device at step 4820 and estimates the relative position at step 4825. The gesture is detected at step 4830. Similarly, FIG. 49 illustrates an example gesture also involving detection of the user's hand in the angle of view and subsequently moving away from a device sensor. However, in FIG. 49 the device sensor is positioned on the top of the device (e.g. a front-facing sensor). As an example, a hand is detected in the angle of view of a front-facing camera in step 4905. The hand is detected in a pinched shape in step 4910, and the device is detected in a horizontal orientation in step 4915. The hand moves closer or further from the device in step 4920, and the relative position estimate is performed in step 4925, at which point the gesture is detected in step 4930.

Figure 52:
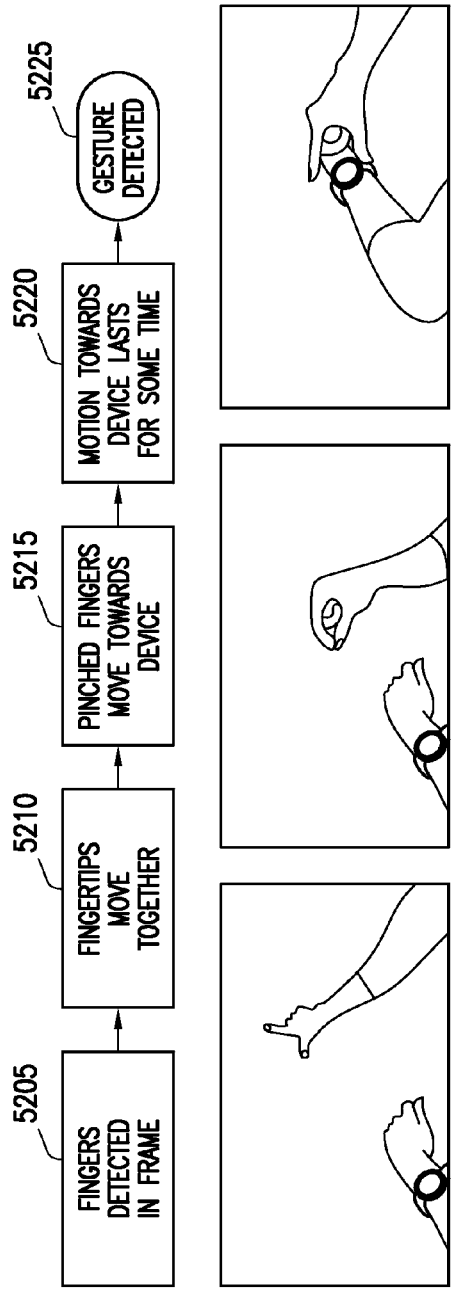
Figure 53:
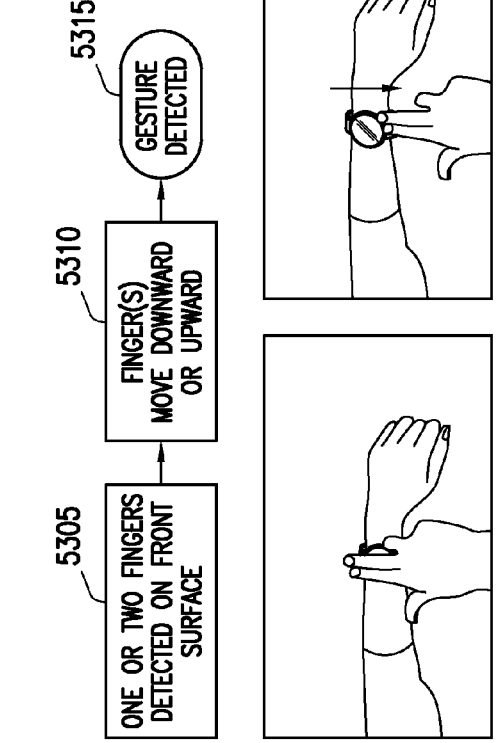
Figure 56:
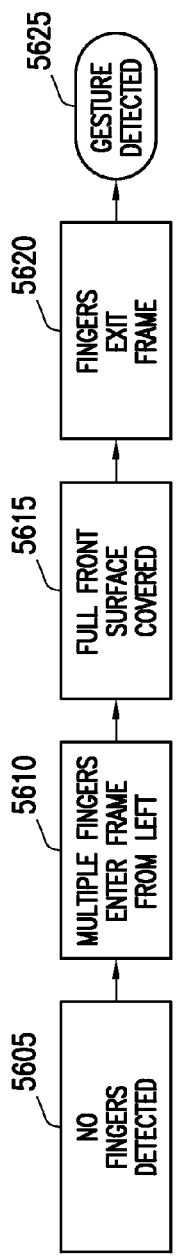
Figure 57:
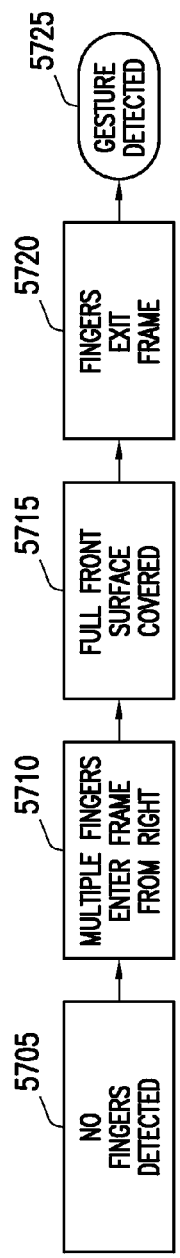

FIGS. 50-58 illustrate example gestures detected by at least one front-facing sensor (e.g. sensor on the top of the device). Any of the gestures of FIGS. 50-58 may be detected by sensors in any other suitable location (e.g. outward-facing, as described above), and any of the gestures detected by a sensor described in another location may be detected by a front-facing sensor, where appropriate. FIG. 50 illustrates an example gesture involving one or more fingertips hovering above the device, and the front-facing sensor detects the fingertips in step 5005, detects the position of the fingertips or motion (or lack of motion) of those fingertips in steps 5010 and 5015 to detect a gesture in step 5020. FIG. 51 illustrates an example gesture in which steps 5105 and 5110 are identical to 5005 and 5010, respectively. However, the detected fingertips move away from the front-facing sensor in step 5115; in particular embodiments, a gesture may include detecting one or more of the fingertips changing position relative to each other, such as for example moving apart as in step 5120. FIG. 52 illustrates the fingertips detected by the sensor in step 5205, the fingertips moving together in step 5210, the fingers moving toward the device in step 5215, and the duration of which the motion lasts in step 5220 to detect the gesture in step 5225. As illustrated in FIG. 53, in particular embodiments a gesture may include detecting a change in relative position of the fingertips in addition to the motion of the fingertips toward the sensor. For example, in step 5305 one or two fingers are detect on the front surface; in step 5310 the fingers are detected moving upward or downward; and a gesture is detected in step 5315. In particular embodiments, the duration of the gesture of FIGS. 50-52 may determine whether a gesture is detected, or different durations may comprise different gestures.

FIGS. 54-57 illustrate example gestures involving motion of one or more fingers or motion of a portion of a hand/arm across the face of the device (and thus across the front-facing sensor). As illustrated, a gesture may depend on the number of fingers used (e.g. two fingers vs. a whole palm); on the direction of motion across the device face (e.g. bottom to top or left to right); on the duration of motion across the device face; on the proximity of the detected fingers or hand/arm to the device face; on the portion of the device face (e.g. all or a portion, and the relative location of the portion (e.g. bottom half)); or whether the detected portions are initially in the front-facing sensor's angle of view, initially out of the angle of view, end in the angle of view, or end out of the angle of view. For example, the gesture of FIG. 54 may include detecting one or two fingers detected on the front surface in step 5405; detecting the fingers moving left in step 5410, and detecting the gesture in step 5415. As another example, FIG. 55 may include detecting one or two fingers detected on the front surface in step 5505; detecting the fingers moving right in step 5510, and detecting the gesture in step 5515. As another example, FIG. 56 may include detecting no fingers in step 5605, detecting multiple fingers entering the angle of view from the left, detecting the front surface covered, detecting the fingers exiting the frame in step 5620, and detecting a gesture in step 5625. As yet another example, FIG. 57 may include detecting no fingers in step 5705, detecting multiple fingers entering the angle of view from the right in step 5710, detecting a covering of the full front surface in step 5715, detecting the fingers exiting the angle of view in step 5720, and detecting a gesture in step 5725. As with all gestures described herein, any suitable combination of those factors (and any other suitable factors associated with the gestures) may be used to determine a gesture or functionality corresponding to the gesture. Any suitable functionality may be associated with a gesture, such as, for example, transitioning between graphical user interface screens, scrolling through displayed content, or scrolling through available applications or devices to communicate/pair with.

Figure 58:
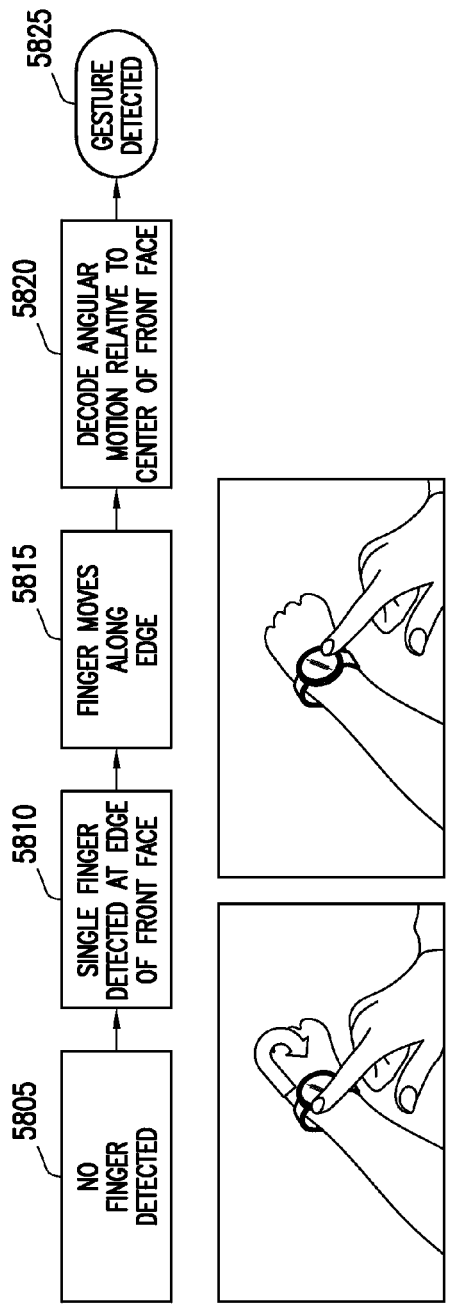
Figure 59:
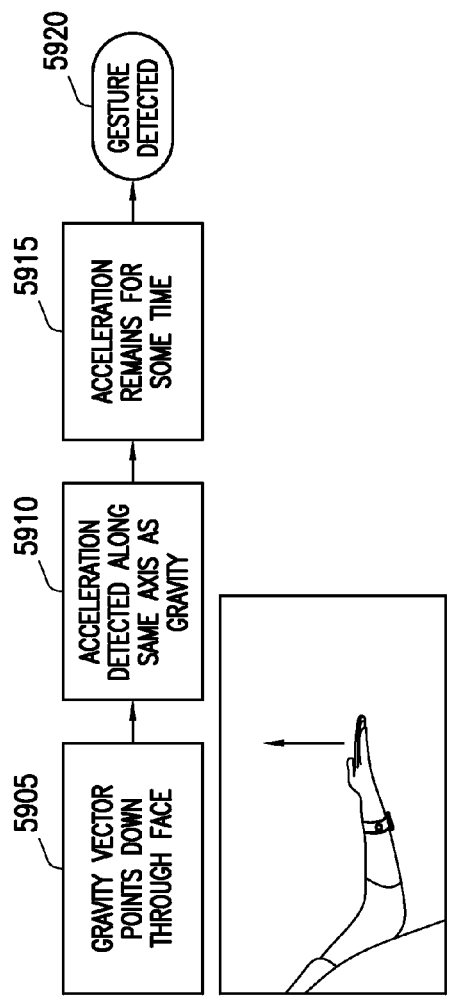

FIG. 58 illustrates an example gesture involving one or more fingers detected on the edge of the device, and may include movement of those fingers around all or a portion of the edge of the device. For example, as illustrated in FIG. 58, a gesture may include detecting no fingers in step 5805, detecting a single finger at the edge of the front face in step 5810, detecting a finger moving along the edge in step 5815, decoding the angular motion of the finger relative to the device in step 5820, and detecting a gesture in step 5825. As an example of functionality associated with this gesture, the movement of the finger may rotate some or all of the displayed content on the device.

Figure 62:
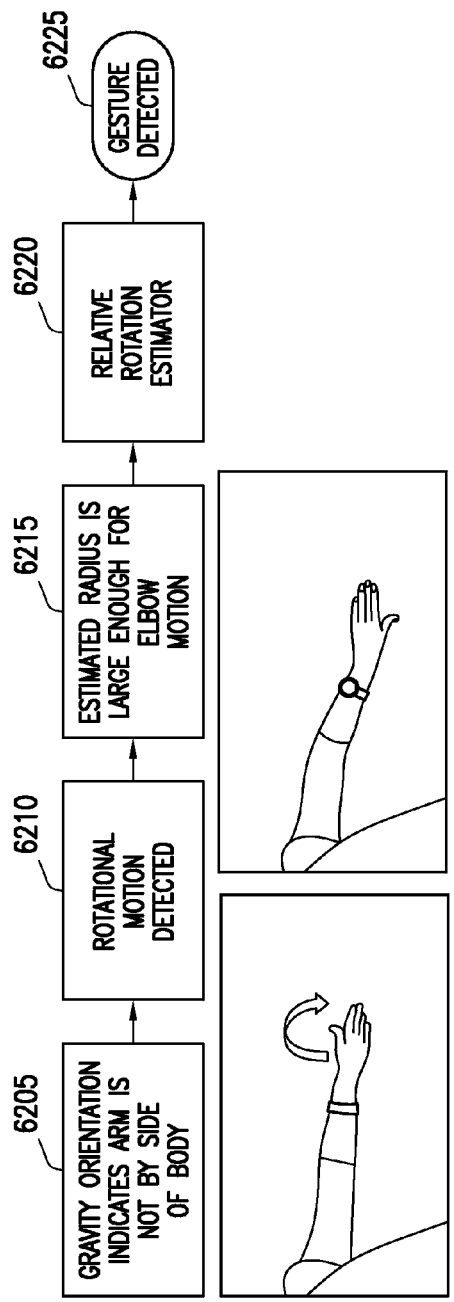
Figure 63:
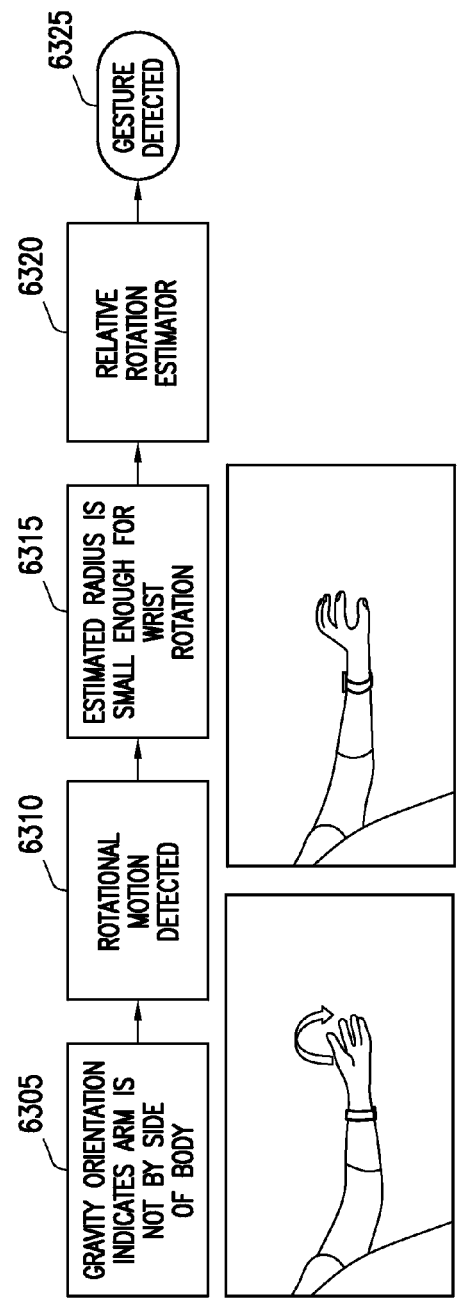
Figure 64:
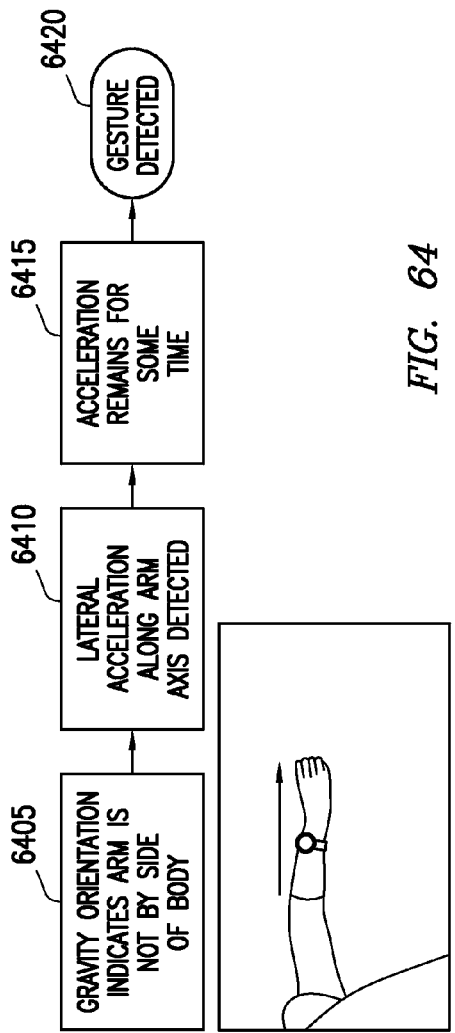

In particular embodiments, a gesture may include a motion of the wearable device, such as, for example, by the arm wearing the device. The motion may be detected by any suitable sensors, such as inertial sensors, orientation sensors, or any suitable combination thereof. FIGS. 59-66 illustrate example gestures involving detection of the gravity vector relative to the device (e.g. pointing in the direction of the device face or pointing down through the base) and detecting subsequent motion of the device relative to that gravity vector. For example, FIG. 59 may include detecting the gravity pointing downward through the face in step 5905, detecting acceleration of the device along the same axis as the gravity vector is pointing in step 5910, detecting that the acceleration of the device remains for some time step in step 5915, and detecting a gesture in step 5920. FIG. 60 is substantially similar to the gesture of FIG. 59, except that the gravity vector points down through the base (rather than the face) in step 6005. FIG. 61 illustrates a gesture that uses a gravity vector to determine orientation/position of the device, for example, that the device is not by the user's body. Motion of the device from the detected orientation (such, as for example, perpendicular to the gravity vector) may be detected, resulting in a gesture. For example, a detected gravity orientation may indicate that an arm is not by the side of the body in step 6105, a lateral acceleration of the device may be detected in step 6110, the acceleration may be detected for some time in step 6115, and a gesture may be detected in step 6120. As FIGS. 59-61 indicate, detecting an aspect of the motion (e.g. duration of acceleration) may trigger a gesture, and ranges of an aspect (ranges of duration of motion) may each correspond to a different gesture. FIGS. 62-63 illustrate rotational motion of a device. As in FIG. 61, detection of the initial orientation or position of the device may be part of the gesture detection. For example, the gesture of FIG. 62 may include detecting that the gravity vector indicates the arm is not by the side of the body in step 6205, detecting some rotational motion in step 6210, estimating that the radius of the rotational motion is large enough for elbow motion in step 6215, estimating the relative rotation in step 6220, and detecting a gesture in step 6225. As another example, the gesture of FIG. 63 may include detecting that the gravity vector indicates the arm is not by the side of the body in step 6305, detecting some rotational motion in step 6310, estimating that the radius of the rotational motion is small enough for wrist motion in step 6315, estimating the relative rotation in step 6320, and detecting a gesture in step 6325. As illustrated in FIGS. 62-63, a gesture may include estimating the type of rotation of the device, such as, for example, rotation primarily from the shoulder (FIG. 62), rotation primarily from the elbow (FIG. 63), or any other suitable rotation. In addition or in the alternative to the radius of rotation, a gesture may include detecting the amount of rotation, duration of rotation, radial acceleration of the rotation, any other suitable aspect of the rotation, or any suitable combination thereof.

Figure 65:
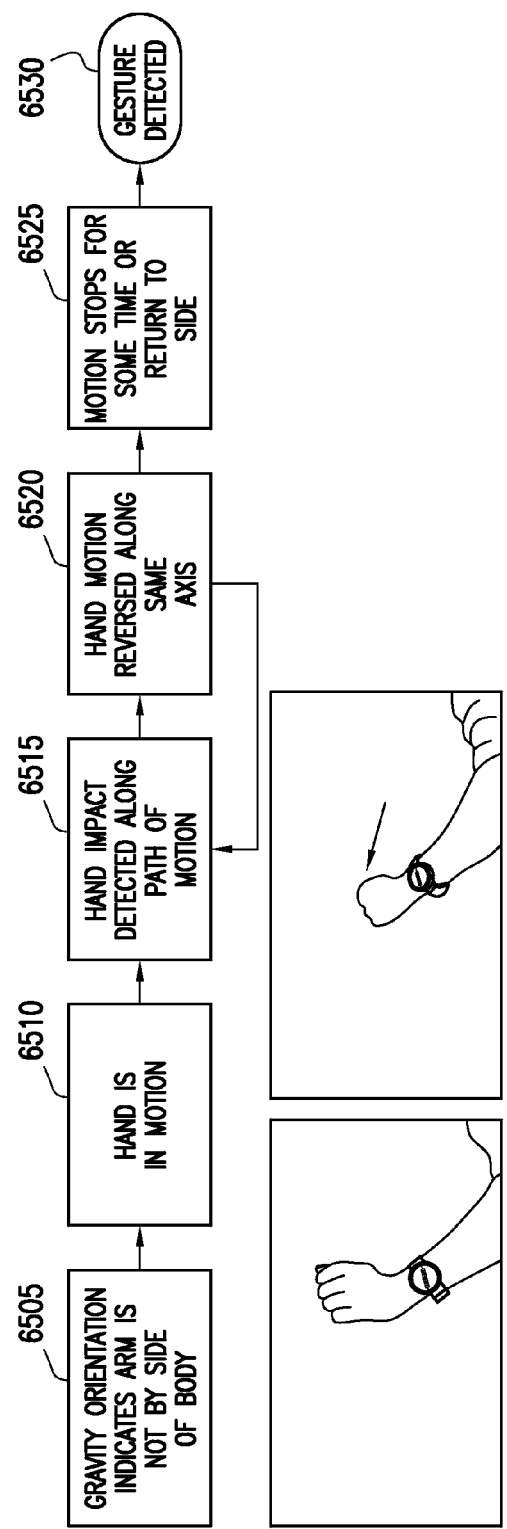

Like for FIGS. 61-63, FIG. 64 indicates a gesture involving detecting the initial orientation or position of the device. For example, the gesture of FIG. 64 may include detecting the gravity vector indicates that the arm is not by the side of the body in step 6405, detecting lateral acceleration of the arm along the axis of the arm in step 6410, detecting that the acceleration remains for some time in step 6415, and detecting a gesture in step 6420. FIG. 65 illustrates that a gesture may include motion of the device along the axis of the appendage wearing the device, such as, for example, the acceleration of the device along that axis. The gesture may include an impact along the path of motion (e.g. caused by the hand stopping or contacting an object) and subsequent reversal of the motion. The back-and-forth motion may repeat until the motion stops or the hand returns to some position, such as, e.g., the user's side. In particular embodiments, different gestures may be based on the number or frequency of the back-and-forth motion. For example, the gesture of FIG. 65 may include detecting the gravity vector indicates that the arm is not by the side of the body in step 6505, detecting that the hand is in motion in step 6510, detecting an impulse (impact) along the path of the motion in step 6515, detecting that the hand reversed motion along the same linear path in step 6520, repeating steps 6515 and 6520 as suitable, detecting that the motion stops for some time in step 6525, and detecting a gesture in step 6530.

Figure 66:
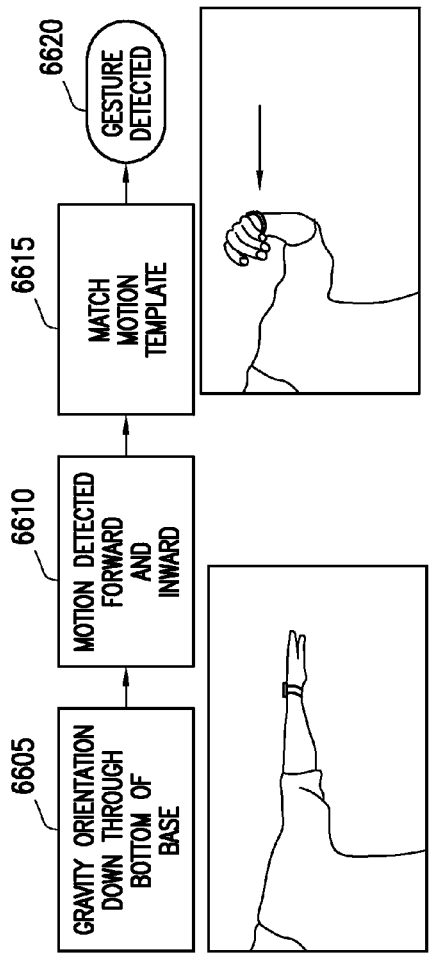
Figure 67:
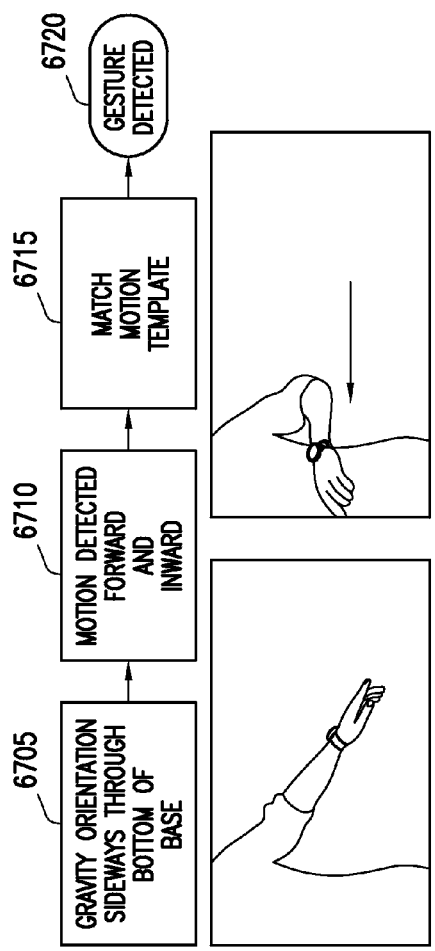
Figure 68:
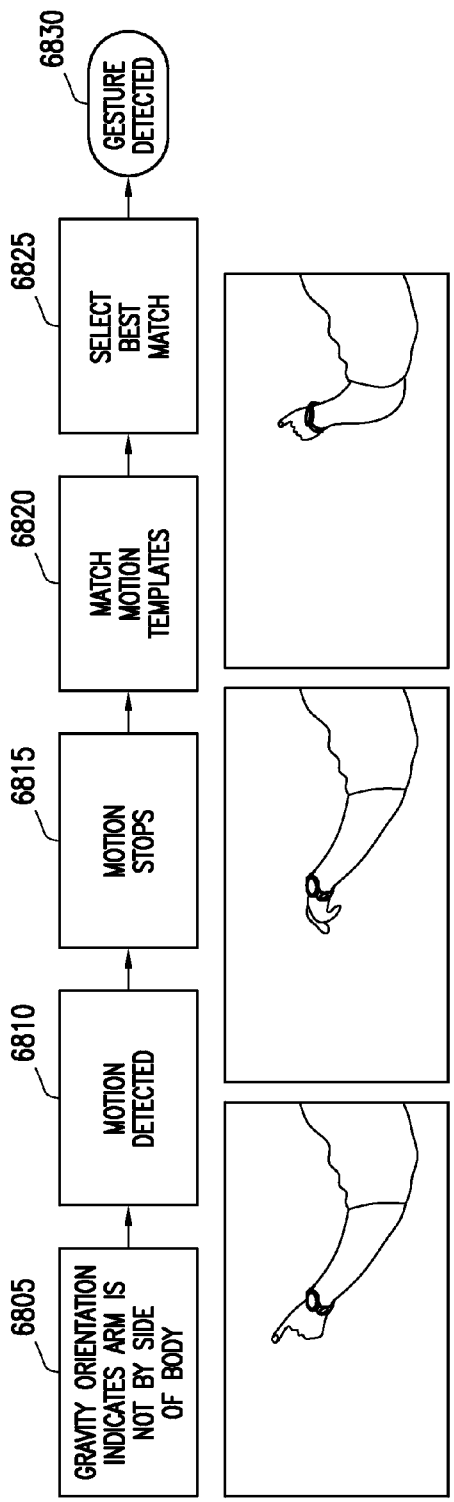

FIGS. 66-68 illustrate example gestures based on detection of motion that matches a predetermined motion template, which may be user-customizable or user-creatable. In particular embodiments, customizable gestures may include an initial position or orientation of the device, motion or aspects of motion in a particular direction, stopping and starting of motion, duration of motion, or any other suitable motion parameter. Some or all of the parameters may be user-customizable, in particular embodiments. In particular embodiments, a detected gesture may be determined by matching the detected motion to the closest available motion template. For example, as illustrated in FIGS. 66-68, a gesture may correspond to a horizontal position or motion of the arm or fingers. For example, as illustrated in FIG. 66, a gesture may include detecting a gravity vector oriented down through the bottom of the base of the device in step 6605, detecting motion forward and inward in step 6610, matching a motion template in step 6615 (for example, using heuristic, numeric, or pattern-based gesture recognition modules of FIG. 19), and detecting a gesture in step 6620. FIG. 67 may include detecting a gravity vector oriented sideways through the bottom of the base of the device in step 6705, detecting motion forward and inward in step 6710, matching a motion template in step 6715 (for example, using heuristic, numeric, or pattern-based gesture recognition modules of FIG. 19), and detecting a gesture in step 6720. FIG. 68 may include detecting a gravity vector indicating an arm is not by the side of the body in step 6805, detecting motion of the device in step 6810, detecting motion stopping in step 6815, matching a motion template in step 6820, selecting the best motion-template match in step 6825, and detecting a gesture in step 6830. While FIGS. 66-68 illustrate specific examples of customizable gestures corresponding to specific motion templates, this disclosure contemplates any suitable gestures (or any aspect thereof) detected by any suitable sensors being customizable by a user of the device.

Figure 69:
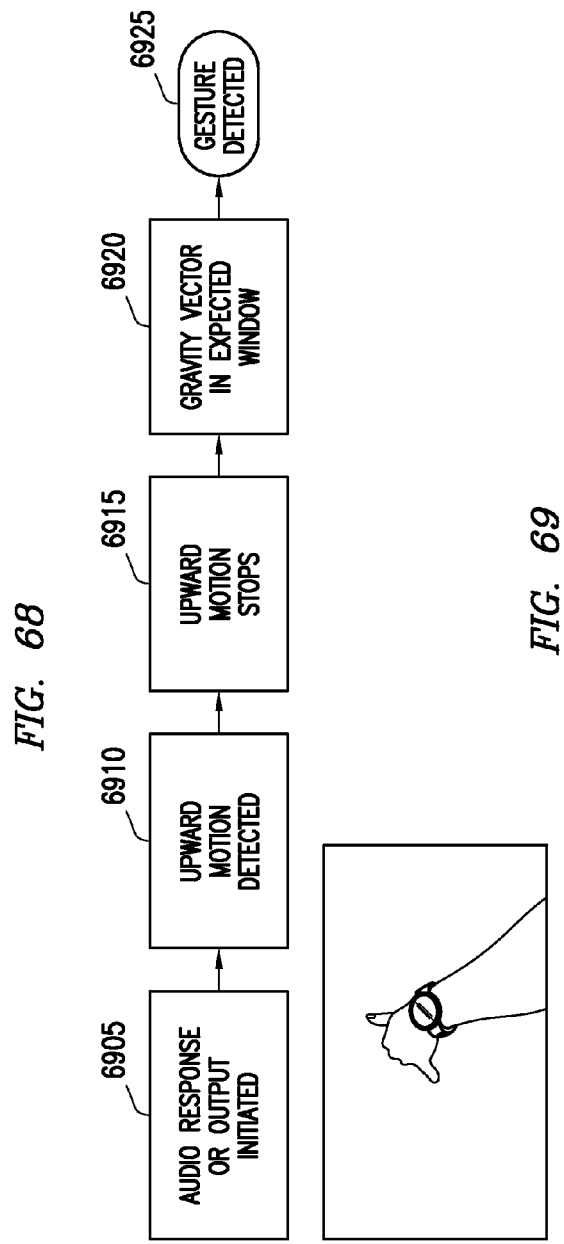
Figure 70:
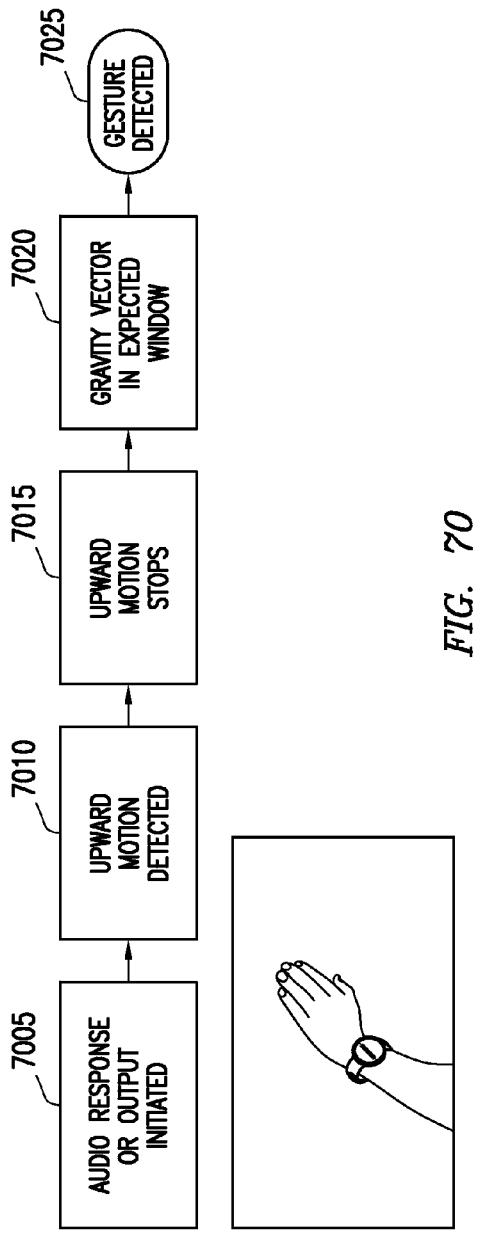
Figure 71:
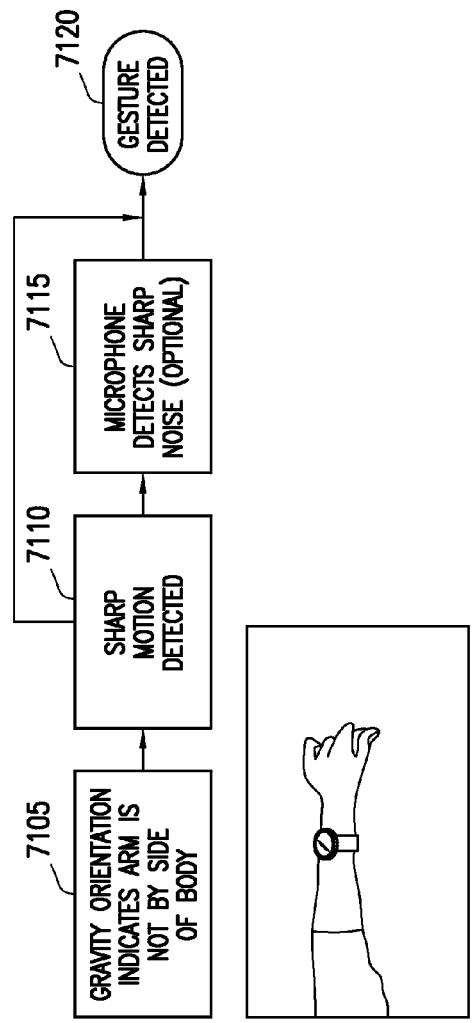

In particular embodiments, gesture may optionally include detecting some non-motion or non-orientation input. For example FIGS. 69-71 illustrate a gesture comprising detection of acoustics, although the gestures illustrated do not require such detection. FIG. 69 illustrates an acoustic output (such as, e.g., ringing from an incoming or outgoing telephone call) or response, followed by some motion of the device (such as the device being brought to a user's face). For example, an audio response or output is initiated in step 6905, upward motion is detected in step 6910, stopping of upward motion is detected in step 6915, the gravity vector is within a predetermined window in step 6920, and a gesture is detected in step 6925. In particular embodiments, a gesture may include detecting the gravity vector in a particular orientation or orientation window, as illustrated. The gesture of FIG. 69 may also include detecting the position of the user's hand/fingers. As an example of functionality that may be associated with the gesture illustrated in FIG. 69, if the fingers are brought near the ear or face in the position indicated, the user may answer or place a telephone call. FIG. 70 and steps 7005-7025 illustrates an example gesture having similar attributes as those described for FIG. 69, but involving different orientation of the user's hand/fingers. FIG. 71 illustrates an example gesture including acoustics generated by the user (e.g. by the user snapping her fingers together), which are detected by a microphone associated with the device. For example, FIG. 71 may include detecting a gravity vector indicating an arm is not by the side of the body in step 7105, detecting a motion with relatively high acceleration in step 7110, detecting a sudden change in one or more acoustic frequencies in step 7115, and detecting a gesture in step 7120. As illustrated in FIG. 71, the snap motion may be detected solely by the motion generated by the snap alone (e.g. by the vibration of the user's hand/skin or by some degree or rate of change of rotation due to the snap), or may be detected by the combination of motion plus an auditory input generated by the snap. In particular embodiments, the auditory confirmation must be detected within a predetermined time of the motion for the gesture to be detected.

Figure 72:
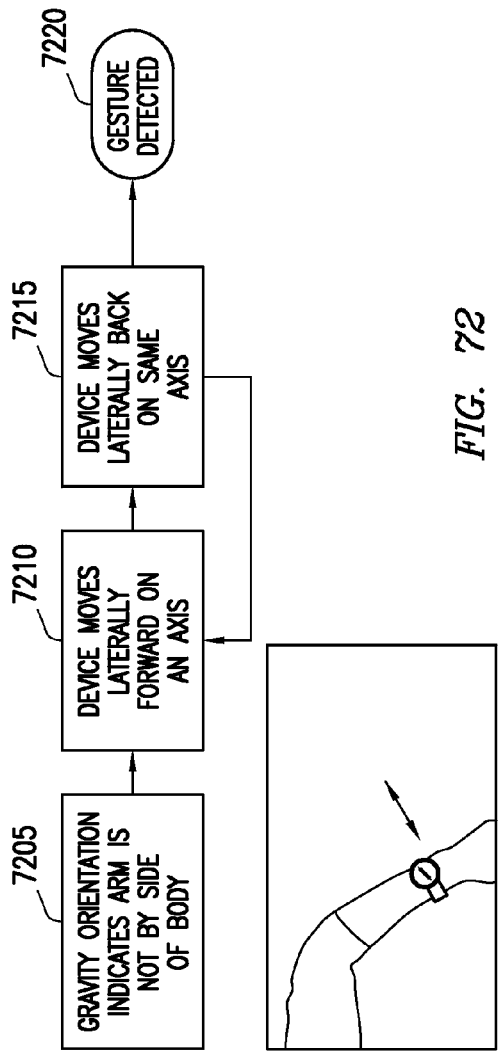
Figure 73:
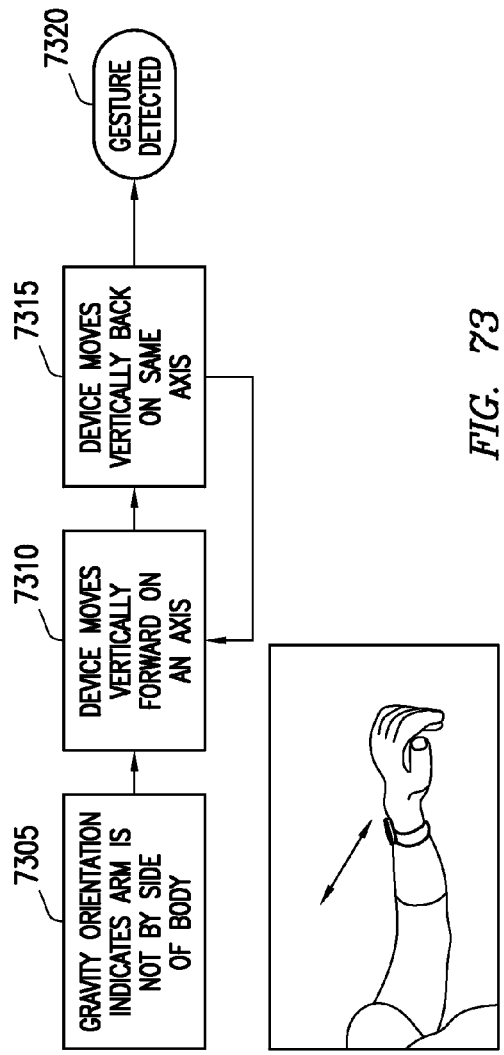

FIGS. 72-73 illustrate example gestures involving periodic motion of the device, such as shaking of the arm the device is on in the lateral or vertical direction. FIG. 72 illustrates a gesture including detecting the gravity vector indicating the arm is not beside the body in step 7205, detecting the device moving laterally forward on an axis in step 7210, detecting the device moving backwards on the same axis in step 7215, repeating the steps of 7210 and 7215 as is desirable, and detecting a gesture in step 7220. FIG. 73 illustrates a gesture including detecting the gravity vector indicating the arm is not beside the body in step 7305, detecting the device moving vertically forward on an axis in step 7310, detecting the device moving backwards on the same axis in step 7315, repeating the steps of 7310 and 7315 as is desirable, and detecting a gesture in step 7220. FIG. 74 illustrates an example gesture involving an adjustment of the position/orientation of the device relative to the user's body. For example, the gesture of FIG. 74 may include including detecting the gravity vector indicating the arm is beside the body in step 7405, detecting the gravity vector indicating the arm is beside the body in step 7410, detecting a gesture in step 7415. Any suitable functionality may be associated with the gestures of FIGS. 72-75, such as, for example, waking the device from a low-power state. FIG. 75 illustrates an example gesture involving the height of the device or the relative change in height of the device from start to stop of the device. In addition to the height of the device, a gesture may include the orientation of the device before, during, or after the gesture. For example, a gesture may include detecting the gravity vector indicating the arm is not beside the body in step 7505, detecting upward motion in step 7510, detecting halt of upward motion in step 7515, detecting that the gravity vector points through the side of the device's base in step 7520, and detecting a gesture in step 7525. Any suitable functionality may be associated with the gesture of FIG. 75, such as, for example, activating equipment paired with the device, turning on one or more lights in a room, or activating equipment near the device.

Figure 76:
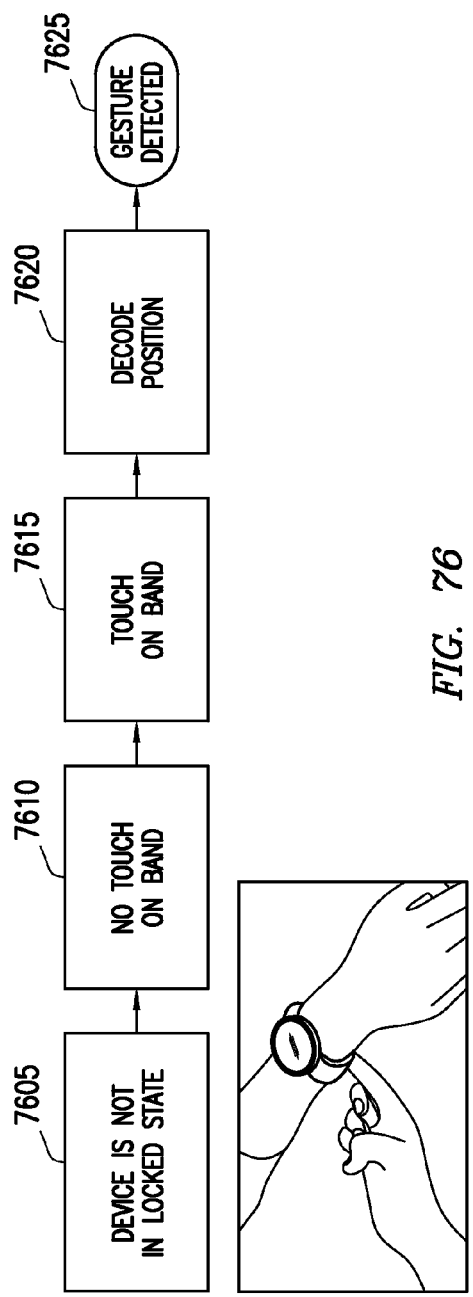
Figure 77:
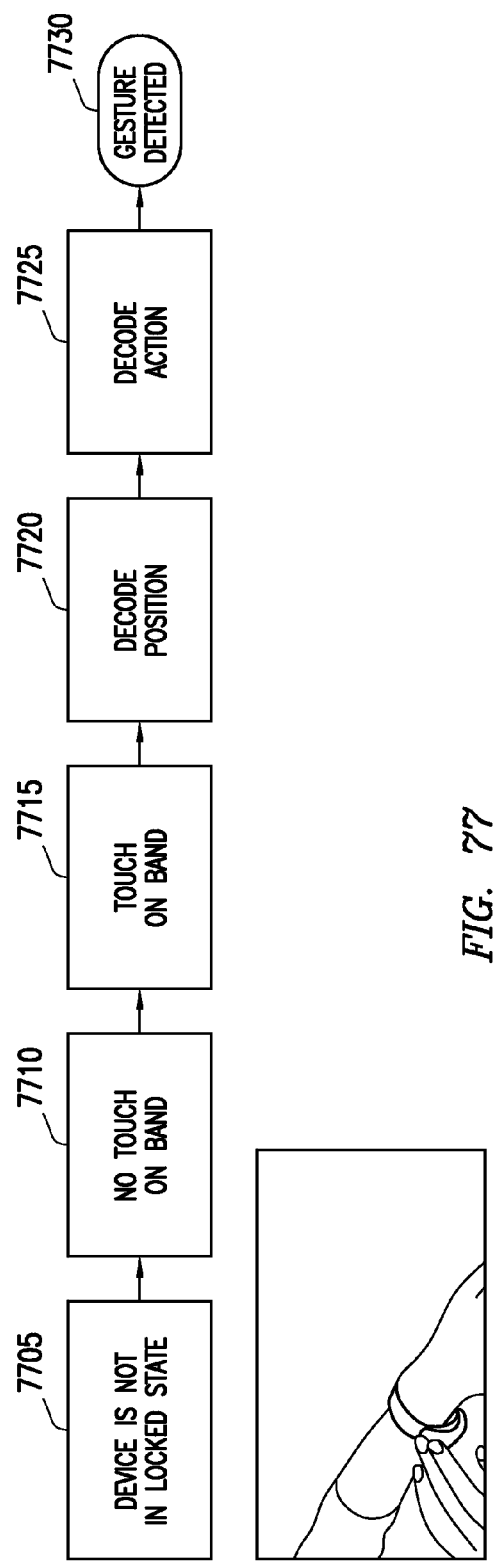
Figure 78:
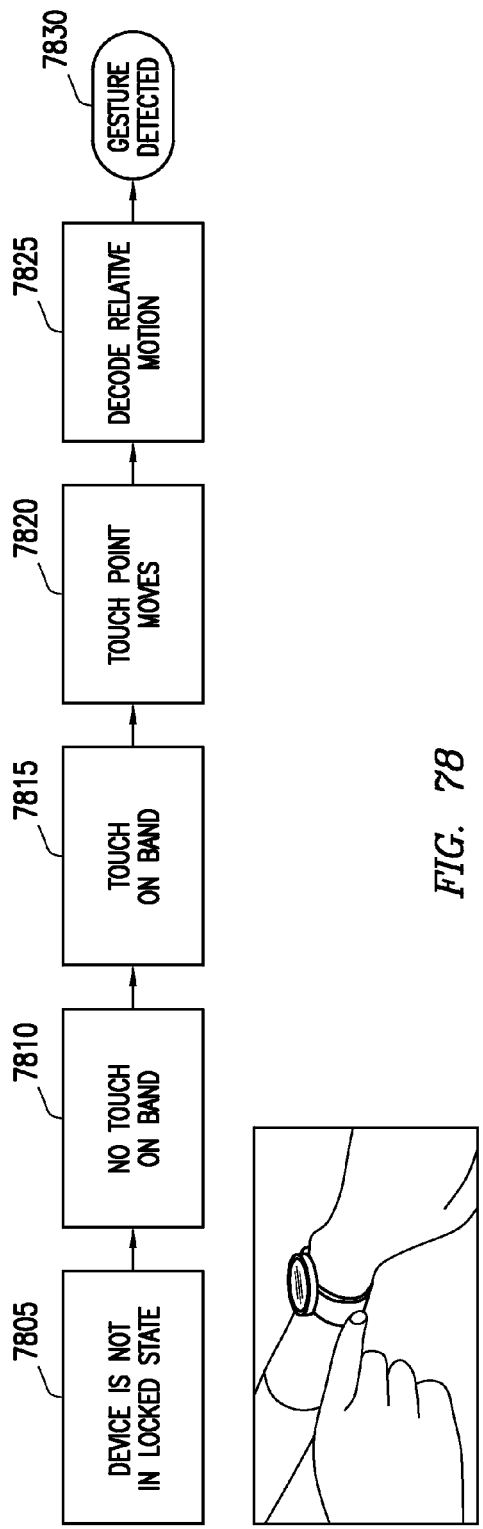
Figure 79:
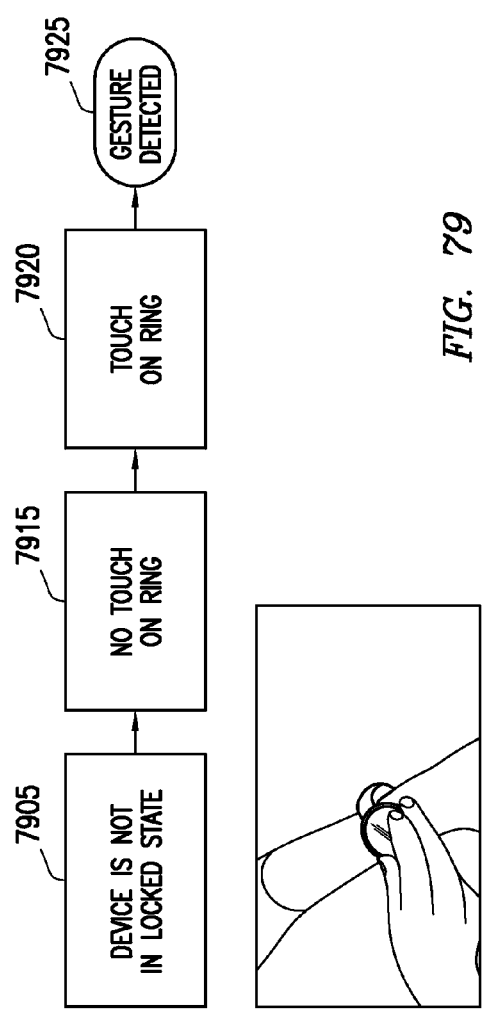

In particular embodiments, a gesture may include interacting directly with the body or band of a wearable device. For example FIG. 76 illustrates a gesture involving contact with a touch-sensitive area of a band worn about the user's wrist. The gesture may include detecting that the device is not in a locked state in step 7605, detecting an absence of touch on a band in step 7610, detecting touch on the band in step 7615, decoding the position of the ouch in step 7620, and detecting a gesture in step 7625. FIG. 77 illustrates that touches in multiple positions may be determined to be a single gesture, such as, for example, to unlock a device or aspects of the device. The gesture may include detecting that the device is not in a locked state in step 7705, detecting an absence of touch on a band in step 7710, detecting touch on the band in step 7715, decoding the position of the ouch in step 7720, decoding an action in step 7725, and detecting a gesture in step 7730. FIG. 78 illustrates that a gesture may include contacting a touch-sensitive area of a device and sliding across a touch-sensitive area while maintaining contact with the device. The gesture may include detecting that the device is not in a locked state in step 7805, detecting an absence of touch on a band in step 7810, detecting touch on the band in step 7815, detecting movement of the touch point(s) in step 7820, decoding relative motion in step 7825, and detecting a gesture in step 7830. In particular embodiments, a gesture may include the duration of contact, physical area of contact (e.g. with one finger or two fingers), the sequence of contact, pressure generated by contact, or any other suitable contact-related attribute. While FIGS. 76-78 illustrate contact with a touch-sensitive area on a band, this disclosure contemplates that a gesture may involve contact on a touch-sensitive area on any suitable location of the device, such as the device band, ring, display, or any suitable combination thereof. For example, FIGS. 79-80 illustrate contact with touch sensitive areas on a ring of the device, similar to the gestures of FIGS. 77-78. For example, a gesture may include detecting that the device is not in a locked state in step 7905, detecting lack of touch on a ring in step 7915, detecting touch on the ring in step 7920, and detecting a gesture in step 7925. As another example, a gesture may include detecting that the device is not in a locked state in step 8005, detecting lack of touch on a ring in step 8010, detecting touch on the ring in step 8015, detecting movement of the touch point in step 8020, decoding relative motion in step 8025, and detecting a gesture in step 8030. FIG. 81 illustrates a gesture involving multi-touch contact with a touch-sensitive area of a device face, and detecting subsequent motion of the contact points, caused by, e.g., motion of the fingers contacting the touch-sensitive area or by movement of the wrist/hand on which the device is worn. The gesture may include detecting that the device is not in a locked state in step 8105, detecting lack of touch on a surface in step 8110, detecting at least two fingers touching the surface in step 8115, detecting movement of the touch points in step 8120, decoding relative motion in step 8125, and detecting a gesture in step 8130. Motion of the wrist/hand may be detected by, e.g., inertial sensors in the device, allowing the different ways of moving touch points to be two distinct gestures. FIG. 82 illustrates a gesture involving initial contact with a device, which may detected by one or more proximity sensors on or in the device, or inertial sensors on or near the device. The gesture may involve detecting that the contact persists, indicating that, e.g., the user has put the device on. For example, the gesture may include detecting no contact with the rear or band proximity sensor in step 8205, detecting contact by the proximity sensor in step 8210, detecting that the contact persists in step 8215, and detecting a gesture in step 8220. The gesture of FIG. 82 may unlock or power on a sleeping device, or provide any other suitable functionality.

Figure 84:
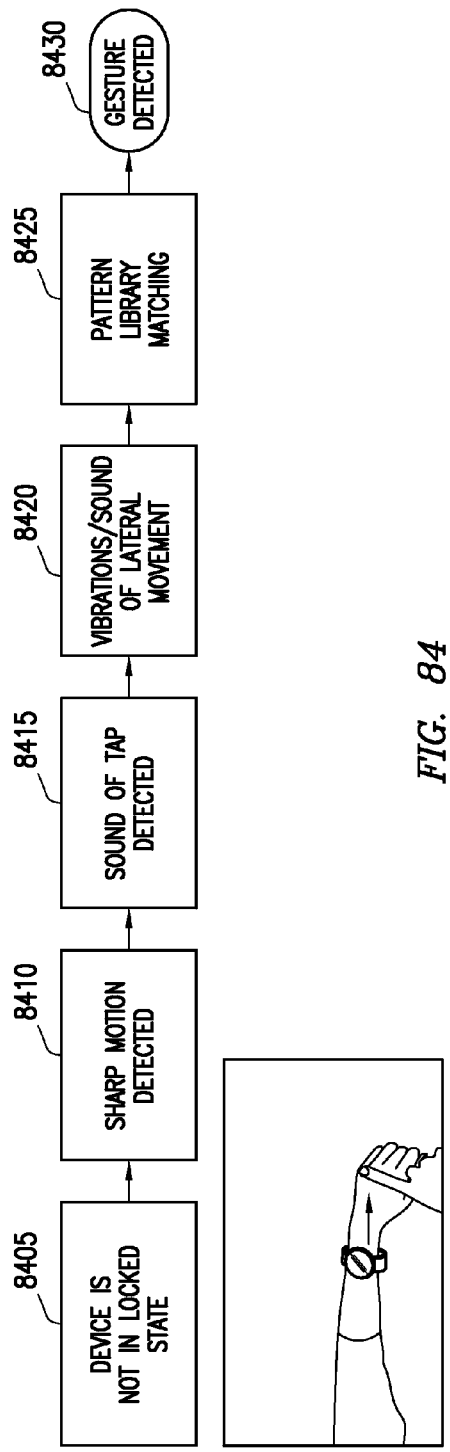

In particular embodiments, a gesture may include contact with skin near the device. FIG. 83 illustrates a gesture involving tapping on the skin near where the device is worn. The tapping may be detected by vibration sensors in the device. The tapping motion may be confirmed by, e.g., one or more acoustic sensors detecting sound generated by the tapping gesture. For example, the gesture may include detecting that the device is unlocked in step 8305, detecting motion with a relatively high acceleration in step 8310, detecting the sound of, for example, a tap in step 8315, matching the motion or sound to a pattern in step 8320, and detecting a gesture in step 8325. FIG. 84 illustrates a gesture involving swiping of the skin near the device, which may be detected and confirmed by the sensors described in FIG. 83, above. For example, the gesture may include detecting that the device is unlocked in step 8405, detecting motion with a relatively high acceleration in step 8410, detecting the sound of, for example, a tap in step 8415, detecting the vibrations or sound of lateral movement on the skin in step 8420, matching the motion or sound to a pattern in step 8425, and detecting a gesture in step 8430.

Figure 85:
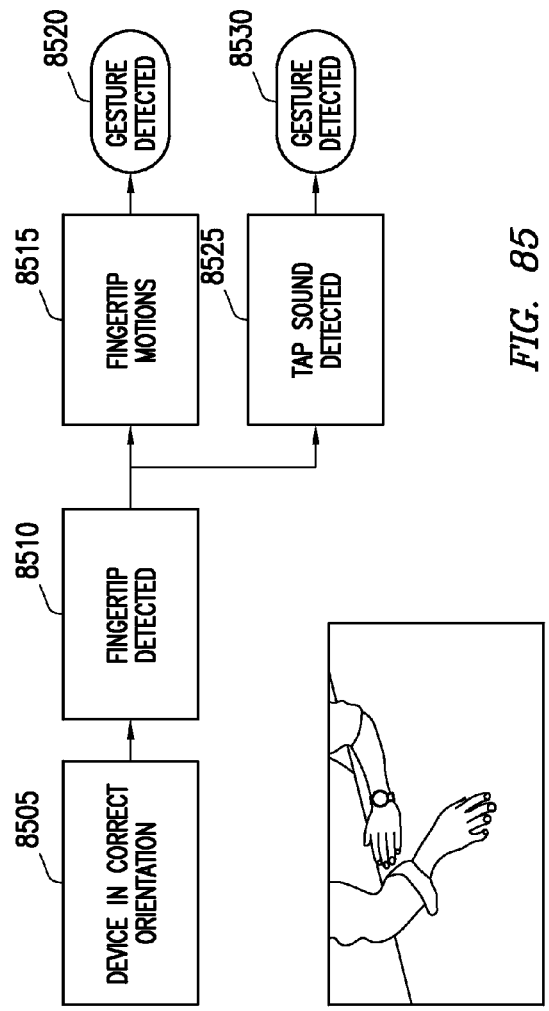
Figure 86:
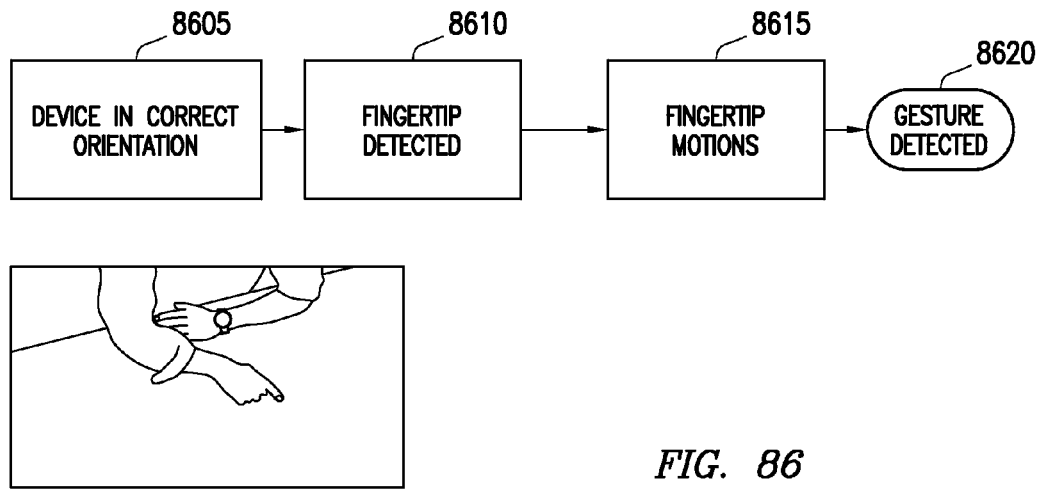
Figure 87:
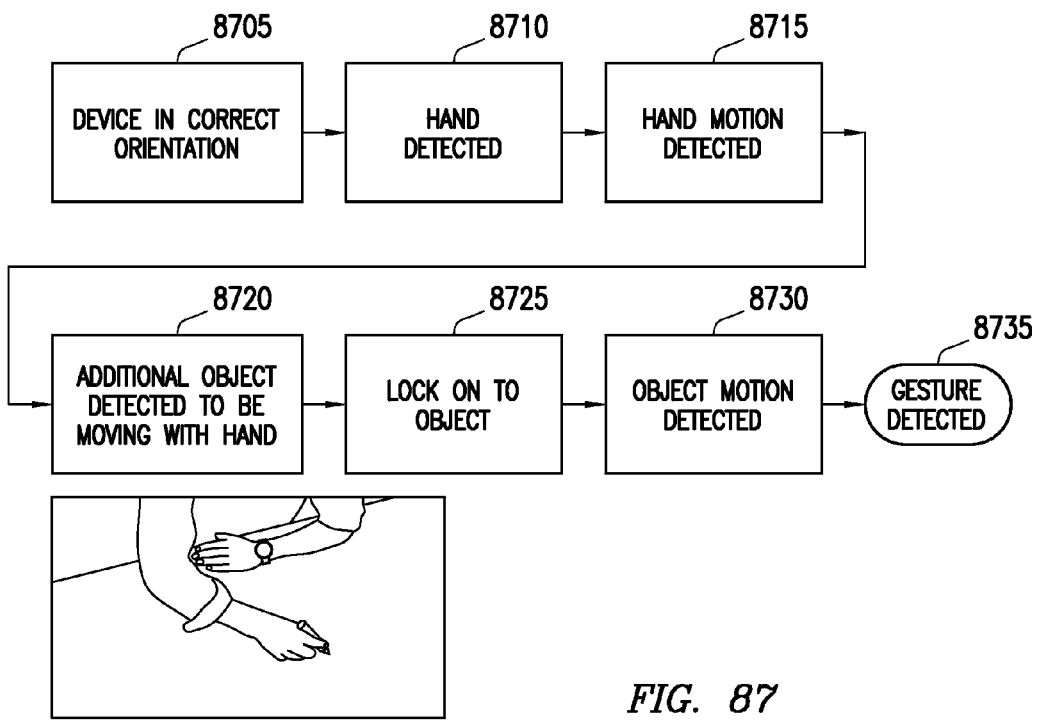
Figure 88:
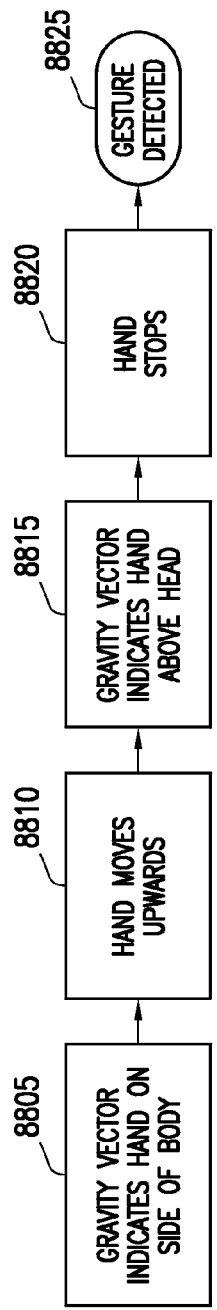
Figure 89:
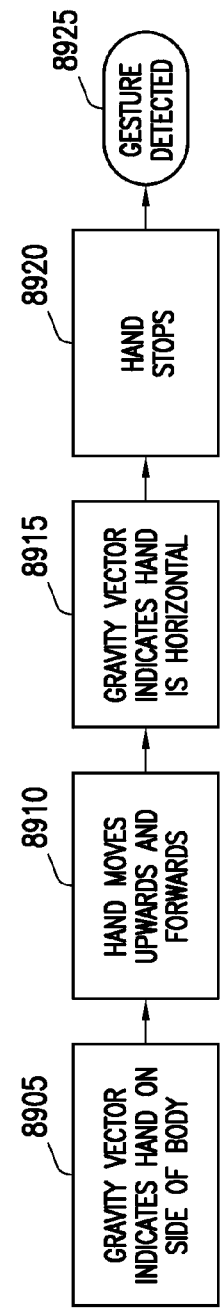
Figure 92:
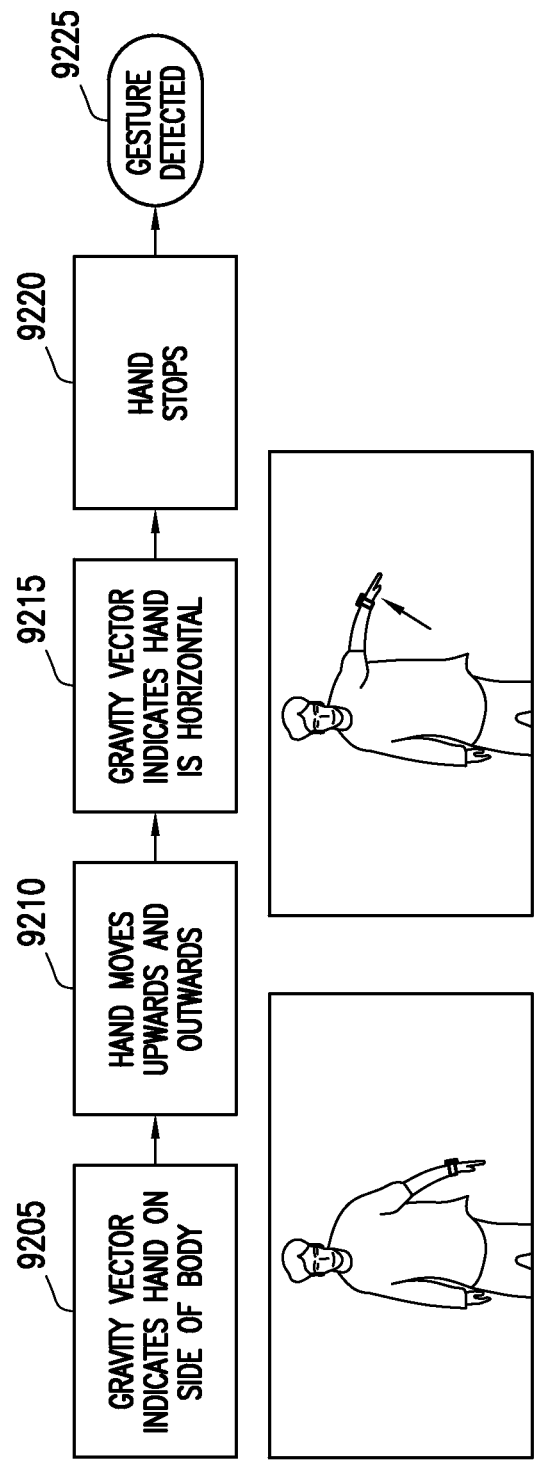

In particular embodiments, gestures may involve detecting metaphoric gestures made by the hand not wearing the device. For example, such gesture may be detected by, e.g., any suitable front-facing sensor on or near the display of the device oriented such that the hand not wearing the device is in the angle of view of the sensor. FIG. 85 illustrates an example gesture involving a front-facing sensor detecting motion of multiple fingers, such as tapping of the fingers. For example, the gesture may include determining that the device is in a predetermined orientation in step 8505, detecting a fingertip in step 8510, detecting motion of the fingertip in step 8515 or detecting a tap sound in step 8525, and detecting one or more gestures in steps 8520 and 8530. FIG. 86 illustrates an example gesture involving motion of a single finger. For example, the gesture may include determining that the device is in a predetermined orientation in step 8605, detecting a fingertip in step 8610, detecting motion of the fingertip in step 8615 or detecting a tap sound in step 8525, and detecting one or more gestures in step 8620. FIG. 87 illustrates a gesture involving detecting movement of a hand holding an object, detecting the motion of the object, locking on to the object, and then detecting subsequent motion of the object. As a specific example, the gesture may include detecting that the device is in a predetermined orientation in step 8705, detecting a hand in step 8710, detecting motion of the hand in step 8715, detecting an additional object to be moving the hand in step 8720, locking on the object in step 8725, detecting motion of the object in step 8730, and detecting a gesture in step 8735. For example, an object may be a pen or other stylus-like implement, and the front-facing sensor on the device may detect writing motions of the implement to, e.g., generate/store text on the device or on another device communicating with the wearable device. The example of FIG. 87 may allow a user to generate drawings, notes, or other written content without actually generating written content on a display or other writing surface. As described more fully herein, any suitable gesture or combination of gestures may be used to impact or initiate augmented-reality ("AR") functionality, and may be used to perform tasks using AR functionality. For example, the gestures of FIGS. 85-87 may used to capture a user's interaction with a virtual keyboard, virtual mouse, or virtual touchscreen and those interactions may generate input on the wearable device or any other suitable paired device. While this disclosure describes specific examples of metaphoric gestures and object detection (and associated functionality), this disclosure contemplates any suitable metaphoric gestures, detection of any suitable objects, and such gestures associated with any suitable functionality.

In particular embodiments, a gesture may involve the entire appendage on which a device is affixed or worn. For example, FIGS. 88-92 illustrate example gestures involving motion of the arm on which the device is worn. The gestures may include detecting the initial position of the arm (e.g. via an accelerometer detecting the direction of the gravity vector), detecting the motion of the device (via the arm), detecting the corresponding change in the gravity vector, and detecting that the arm has stopped moving. Such gestures may also include detecting the duration of movement, the amount of movement (e.g. detecting a large radius of motion, confirming that the entire arm has moved), the acceleration of movement, or any other suitable movement-related attributes. As illustrated by FIGS. 88-92, gestures may involve detecting arm movements above the head, to the front, to the side, to the back, or down from an initially-higher starting position. For example, a gesture may include detecting a gravity vector indicating a hand is on the side of the body in step 8805, detecting upward movement of the hand in step 8810, detecting that the gravity vector indicates the hand is above the head in step 8815, detecting the hand stopping movement in step 8820, and detecting a gesture in step 8825. As another example, a gesture may include detecting a gravity vector indicating a hand is on the side of the body in step 8905, detecting upward and forward movement of the hand in step 8910, detecting that the gravity vector indicates the hand is horizontal in step 8915, detecting the hand stopping movement in step 8920, and detecting a gesture in step 8925. As another example, a gesture may include detecting a gravity vector indicating a hand is horizontal in step 9005, detecting the hand moving downward and backward in step 9010, detecting that the gravity vector indicates the hand is by the side in step 9015, detecting the hand stopping movement in step 9020, and detecting a gesture in step 9025. As another example, a gesture may include detecting a gravity vector indicating a hand is by the side of the body in step 9105, detecting the hand moving upward and backward in step 9110, detecting that the gravity vector indicates the hand is horizontal in step 9115, detecting the hand stopping movement in step 9120, and detecting a gesture in step 9125. As another example, a gesture may include detecting a gravity vector indicating a hand is by the side of the body in step 9205, detecting the hand moving upward and outward in step 9210, detecting that the gravity vector indicates the hand is horizontal in step 9215, detecting the hand stopping movement in step 9220, and detecting a gesture in step 9225. In particular embodiments, gestures may involve motion of the entire body rather than just of the appendage on which the device is worn.

In particular embodiments, a user may interact with the device via a variety of input mechanisms or types including, for example, the outer ring, touch-sensitive interfaces (e.g. the touch-sensitive layer), gestures performed by the user (described herein), or a speech interface (e.g. including voice input and speech recognition for applications including text input, communication, or searching). Additionally, in particular embodiments, a user may interact with a graphical user interface presented on a circular display of the device via any of the input mechanisms or types.

A user of the wearable electronic device may interact with the device (including, e.g., a graphical user interface presented on the circular display) by using the outer ring. In particular embodiments, the outer ring may be touch-sensitive, such that a user's touch on one or more portions of the ring may be detected as an input to the device and interpreted, causing one or more actions to be taken by the device (e.g. within a graphical user interface of the device). As an example, a touch-sensitive outer ring may be a capacitive ring or inductive ring, and a user of the device may perform any suitable touch gesture on the touch-sensitive ring to provide input to the device. The input may, for example, include swiping the ring with one finger, swiping the ring with two or more fingers, performing a rotational gesture with one or more fingers, or squeezing the ring. In particular embodiments, the outer ring may be rotatable, such that a physical rotation of the ring may serve as an input to the device. Additionally, in particular embodiments, the outer ring may be clicked (e.g. pressed down) or squeezed. Any of the embodiments of the outer ring may be combined, as suitable, such that the ring may be one or more of touch-sensitive, rotatable, clickable (or pressable), or squeezable. Inputs from the different modalities of the outer ring (e.g. touch, rotation, clicking or pressing, or squeezing) may be interpreted differently depending, for example, on the combination of the modalities of input provided by a user. As an example, a rotation of the outer ring may indicate a different input than a rotation in combination with a clicking or pressing of the ring. Additionally, feedback may be provided to the user when the user provides input via the outer ring, including haptic feedback, audio feedback, or visual feedback, described herein.

Figure 93A:
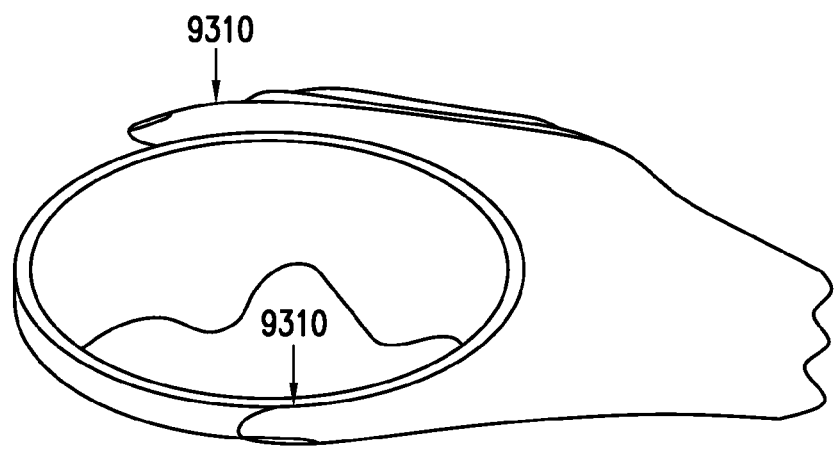
FIGS. 93A-93B illustrate example user inputs to a device.
Figure 93B:
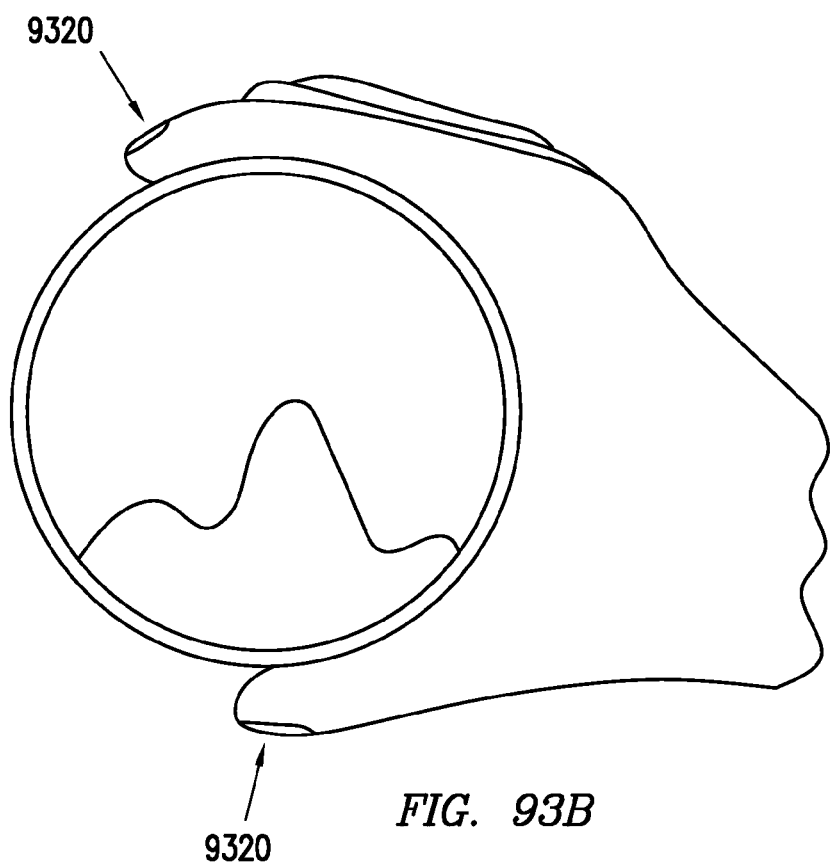

FIG. 93A illustrates an example of a user clicking (e.g. pressing down) on the outer ring, indicated by arrows 9310. FIG. 93B illustrates an example of a user squeezing the outer ring, indicated by arrows 9320. FIG. 94A illustrates an example of a user rotating the outer ring, such that content 9410 of a graphical user interface of the device changes in accordance with the rotation (e.g. to the right). FIG. 94B illustrates an example of a user performing a rotating gesture on a touch-sensitive ring, without the ring itself rotating, such that content 9420 of a graphical user interface of the device changes in accordance with the rotation (e.g. to the right). FIG. 94C illustrates an example of a user rotating the outer ring while simultaneously pressing or clicking the ring, such that content 9430 of a graphical user interface of the device changes in accordance with the rotation (e.g. to the right) and the pressing or clicking.

Figure 95A:
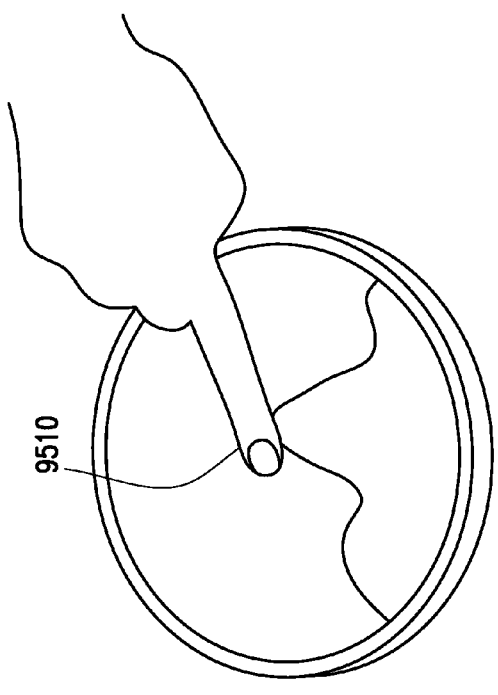
Figure 95B:
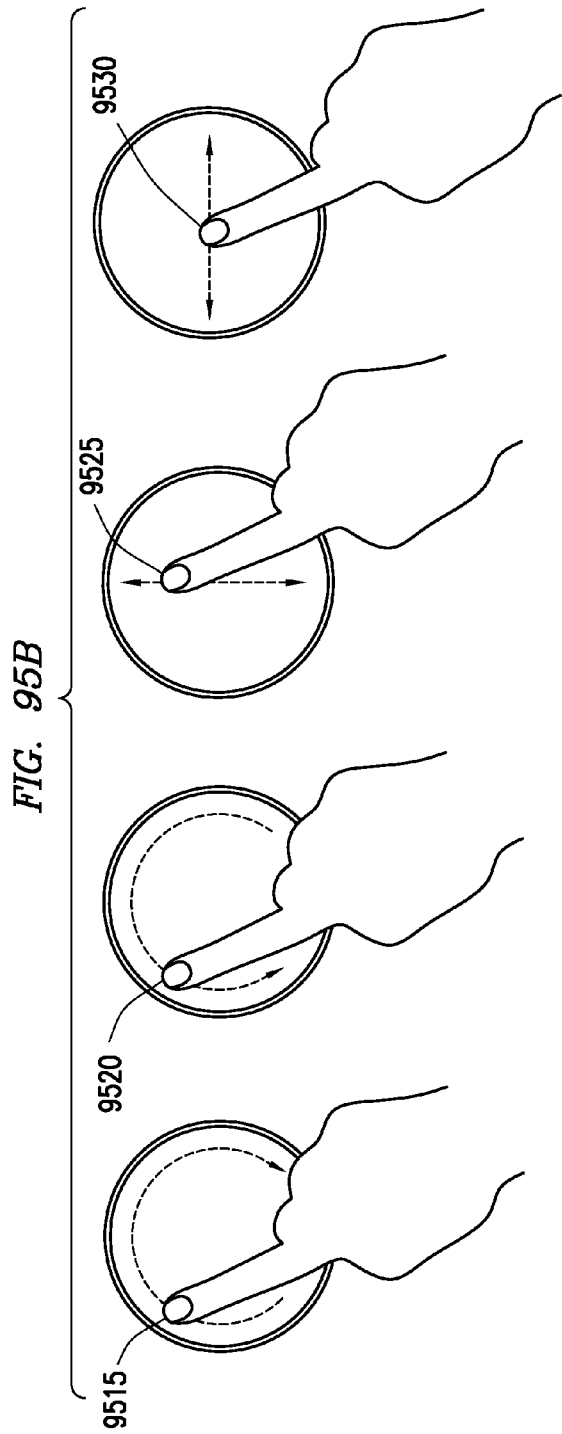

In particular embodiments, a touch-sensitive interface of the device (e.g. the touch-sensitive layer) may accept user touch input and allow the device to determine the x-y coordinates of a user's touch, identify multiple points of touch contact (e.g. at different areas of the touch-sensitive layer), and distinguish between different temporal lengths of touch interaction (e.g. differentiate gestures including swiping, single tapping, or double tapping). Touch gestures (described herein) may include multi-directional swiping or dragging, pinching, double-tapping, pressing or pushing on the display (which may cause a physical movement of the display in an upward or downward direction), long pressing, multi-touch (e.g. the use of multiple fingers or implements for touch or gesturing anywhere on the touch-sensitive interface), or rotational touch gestures. FIG. 95A illustrates an example of a user tapping 9510 a touch-sensitive interface (e.g. the touch-sensitive layer) to provide input to the device. The precise x-y coordinates of the user's tapping may be determined by the device through input from the touch-sensitive interface (e.g. the touch-sensitive layer). FIG. 95B illustrates an example of a user performing, respectively, a clockwise rotational gesture 9515, a counter-clockwise rotational gesture 9520, a vertical swipe gesture 9525, and a horizontal swipe gesture 9530. FIG. 95C illustrates an example of a user touching the display (including a touch-sensitive layer with multi-touch sensing capability) using, respectively, one, two, or three points of contact 9535 (e.g. with one, two, or three fingers or implements) simultaneously. FIG. 95D illustrates an example of a user performing touch gestures having multiple points of contact with the touch-sensitive interface. The user may, in this example, perform an expanding gesture 9540, a pinching gesture 9545, a clockwise rotational gesture 9550, or a counter-clockwise rotational gesture 9555 with two fingers.

In particular embodiments, a graphical user interface of the device may operate according to an interaction and transition model. The model may, for example, determine how modes including applications, functions, sub-modes, confirmations, content, controls, active icons, actions, or other features or elements may be organized (e.g. in a hierarchy) within a graphical user interface of the device.

In one embodiment, the graphical user interface (GUI) includes multiple top-level screens that each correspond to a different mode or application (or sub-mode, function, confirmation, content, or any other feature) of the device. Each of these applications may be on the same level of the hierarchy of the interaction and transition model of the GUI. FIG. 96A illustrates an example layout of a hierarchy within the GUI in which multiple top-level screens 9602-9606 and 9610-9614 each correspond to a different application, and one of the top-level screens 9608 (the home screen) corresponds to a clock. State transitions within the GUI may be events triggered by input from an input source such as the user of the device. An input from a user of the device or from another input source (e.g. via any of the variety of input mechanisms or types including the outer ring, touch-sensitive interfaces, gestures, speech, or sensors) may cause a transition within the GUI (e.g. from one top-level screen to another). For example, an input may cause the GUI to transition from the home screen 9608 (e.g. the clock) to an application (e.g. 3 or 4) or from an application to another application. If the user rotates the outer ring to the right, for example, the GUI may transition from the home screen 9608 to Application 4 9610, and if the user rotates the outer ring to the left, the GUI may transition from the home screen 9608 to Application 3 9606. In yet other embodiments, context (e.g. as determined by sensors or other input sources on the device) may cause the GUI to transition from the home screen to an application or from an application to another application.

In one embodiment, the model may include operability for differentiation of the "left" and "right" sides in relation to the home screen. As an example, one or more of the top-level screens may be associated with modes or applications (or other features) in the hierarchy of the interaction and transition model of the GUI that are fixed (e.g. always available to the user) or contextual or dynamic (e.g. available depending on context). The contextual screens may, for example, reflect the modes, applications, or functions most recently used by the user, the modes, applications, or functions most recently added (e.g. downloaded) by the user, ad-hoc registered devices (that may, for example, enter or exit the communication range of the device as it is used), modes, applications, or functions that are "favorites" of the user (e.g. explicitly designated by the user), or modes, applications, or functions that are suggested for the user (e.g. based on the user's prior activity or current context). FIG. 96B illustrates an example layout of a hierarchy within the GUI in which contextual or dynamic applications 9616-9620 and fixed applications 9624-9628 are grouped separately, with the left side (in relation to the home clock screen 9622) including contextual applications, and the right side including fixed applications. As an example, Dynamic Application 01 9620 may be the most recently used application, and Dynamic Application 02 9618 may be the second most recently used application, and so forth.

Figure 97:
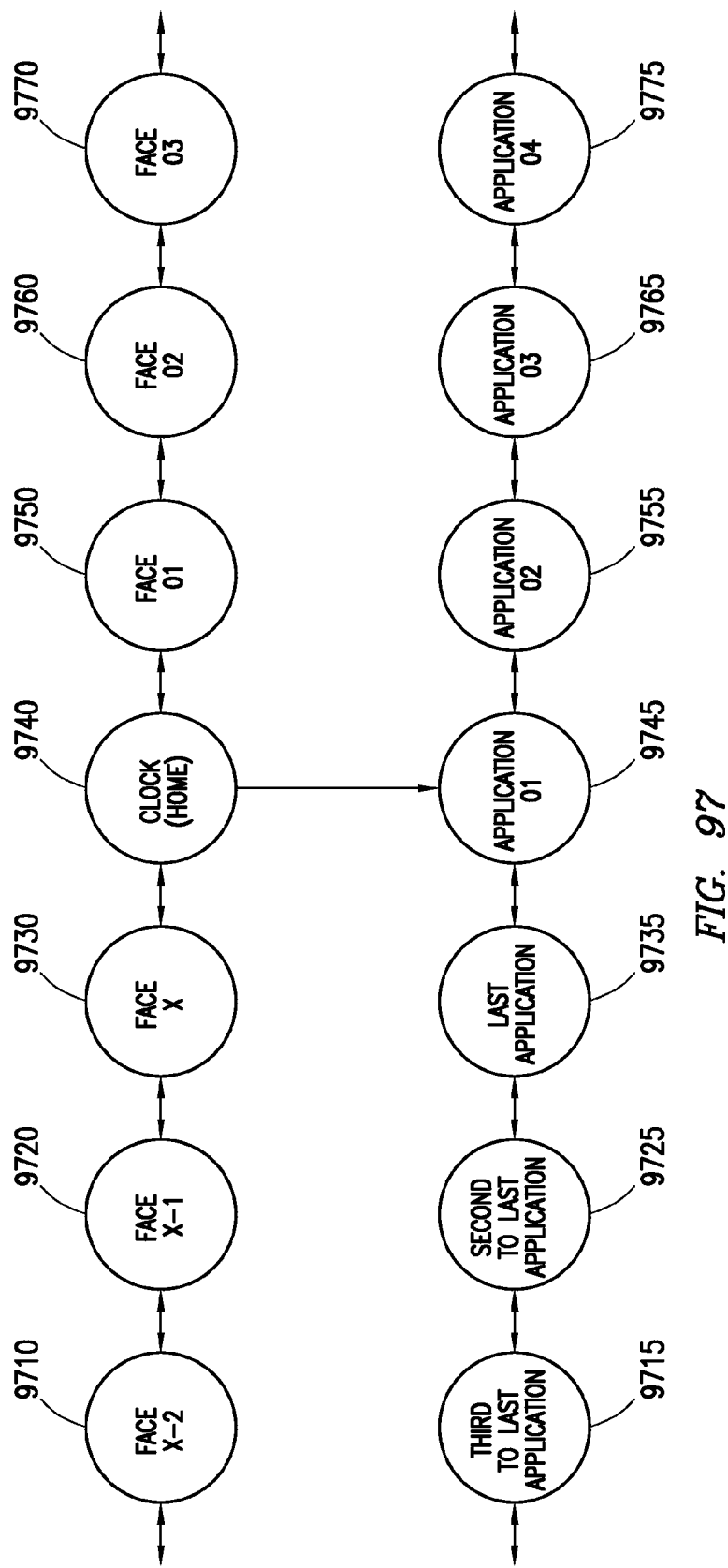
FIG. 97 illustrates an example graphical user interface model of a device.

In particular embodiments, the top level of the hierarchy of the interaction and transition model of the GUI may include only "faces," and the next level of the hierarchy may include applications (or any other features). As an example, the top level of the hierarchy may include a home screen (e.g. the clock), and one or more faces, each face corresponding to a different type of background, mode, or activity such as a wallpaper (e.g. customizable by the user), weather information, a calendar, or daily activity information. Each of the faces may show the time in addition to any other information displayed. Additionally, the face currently displayed may be selected by the user (e.g. via any suitable input mechanism or type) or automatically change based on context (e.g. the activity of the user). The faces to the left of the home screen may be contextual, and the faces to the right of the home screen may be fixed. FIG. 97 illustrates an example layout of a hierarchy within the GUI in which the top level of the hierarchy includes faces 9710-9770 (including clock face 9740) and the next level of the hierarchy includes applications 9715-9775.

In particular embodiments, an input from a user of the device or an input from another input source (e.g. via any of the variety of input mechanisms or types including the outer ring, touch-sensitive interfaces, gestures, speech, or sensors), or a context of use of the device may cause a transition within the GUI from a screen at one level of the hierarchy of the interaction and transition model of the GUI to a screen at another level of the hierarchy. For example, a selection event or input by the user (e.g. a touch or tap of the display, voice input, eye gazing, clicking or pressing of the outer ring, squeezing of the outer ring, any suitable gestures, internal muscular motion detected by sensors, or other sensor input) may cause a transition within the GUI from a top-level screen to a screen nested one level deeper in the hierarchy. If, for example, the current screen is a top-level screen associated with an application, a selection event (e.g. pressing the ring) selects the application and causes the GUI to transition to a screen nested one layer deeper. This second screen may, for example, allow for interaction with a feature of the selected application and may, in particular embodiments, correspond to a main function of the selected application. There may be multiple screens at this second, nested layer, and each of these screens may correspond to different functions or features of the selected application. Similarly, a "back" selection input or event by the user (e.g. a double pressing of the outer ring or a touch gesture in a particular part of the display) may cause a transition within the GUI from one screen (e.g. a feature of a particular application) to another screen that is one level higher in the hierarchy (e.g. the top-level application screen).

FIG. 98A illustrates an example of the operation of the interaction and transition model with respect to a function or a mode 9805 of a particular application of the device and the use or application of the function 9810. As an example, if the application is a camera, the functions, modes, or other elements of the camera application may include picture mode, video mode (e.g. with a live view), and turning on or off a flash. The various functions, modes, or other elements may be accessed via transitions within a single layer of the model hierarchy. These intra-layer transitions may occur upon receiving or determining a particular type of transition event or input from an input source such as the user of the device (e.g. a rotation of the outer ring counterclockwise or clockwise), or upon determining a particular context of use of the device. In particular embodiments, a transition event input may also include, e.g., a touch or tap of the display, voice input, eye gazing, clicking or pressing of the outer ring, squeezing of the outer ring, any suitable gesture, internal muscular motion detected by sensors, or other sensor input. To select and use a function, mode, or other element of the application, the user may provide a particular type of selection event or input (e.g. a tap or touch of the display, a press or click of the outer ring, a particular gesture, or sensor input), causing an inter-layer transition within the GUI to a deeper layer of the hierarchy. As an example, to take a video, the user may tap a screen associated with the video mode feature of the camera application. Once in this deeper layer of the hierarchy, taking a video, the user may cause the GUI to transition between different options in that layer, if available (e.g. options related to video mode). In particular embodiments, the user may select one of the options in the deeper layer, causing the GUI to transition to an even deeper layer. As an example, once recording video in video mode, the user may again tap the display to transition the GUI to a deeper layer, which in this case may include the option to stop recording video. Additionally, the user may return to a higher layer of the hierarchy by providing a particular type of selection event or input (e.g. a "back" input, described herein). As an example, once recording video in video mode, the user may touch a particular "back" portion of the display, causing video recording to be canceled and causing the GUI to transition to the screen associated with the video mode feature of the camera application (e.g. in the features layer of the hierarchy). The interaction and transition model hierarchy of the GUI may have any number of layers and any number of elements (e.g. functions or content) within a single layer. FIG. 98B illustrates an example of the operation of the interaction and transition model with respect to content 9815 on the device. In this example model, content may behave similarly to an application, except that if the user selects the content 9815 (e.g. a photo) and the GUI transitions to a deeper layer in the hierarchy, the first option 9820 in a menu of options related to the content may be shown (e.g. options such as deleting the photo or sharing the photo). FIG. 98C illustrates an example of the operation of the interaction and transition model with respect to a control 9825 on the device. A control element may function like a knob, in that it may modify a value over a range of possible values. User input to the device (e.g. rotating the outer ring to the right or left) may modify the value or state 9830 associated with the control element 9825. The value modified by a control element may be substantially continuous in nature (e.g. the zoom level of a camera, or the volume level of a television) or may be substantially discrete in nature (e.g. the channel of a television). In particular embodiments, in cases where the value modified by a control is discrete in nature, a particular user input (e.g. pressing the outer ring) may "commit" the selection of the value. FIG. 98D illustrates an example of the operation of the interaction and transition model with respect to an application 9835 on the device and a main function 9840 of the application. As an example, each mode or function of the device (e.g. camera or augmented reality functions) may be an application on the device. Transitions within a single layer (e.g. performed upon receiving a particular user input such as a rotation of the outer ring) allow the user to change applications, modes, or functions of the device. Transitions between layers (e.g. performed upon receiving a particular user input such as a tap on the display) allow the user to enter deeper layers (or exit deeper layers) of the hierarchy associated with the selected application, mode, or function.

Figure 98F:
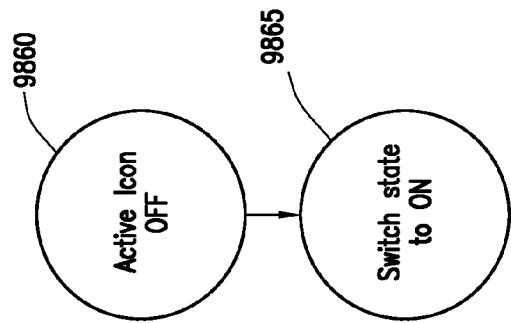
Figure 98E:
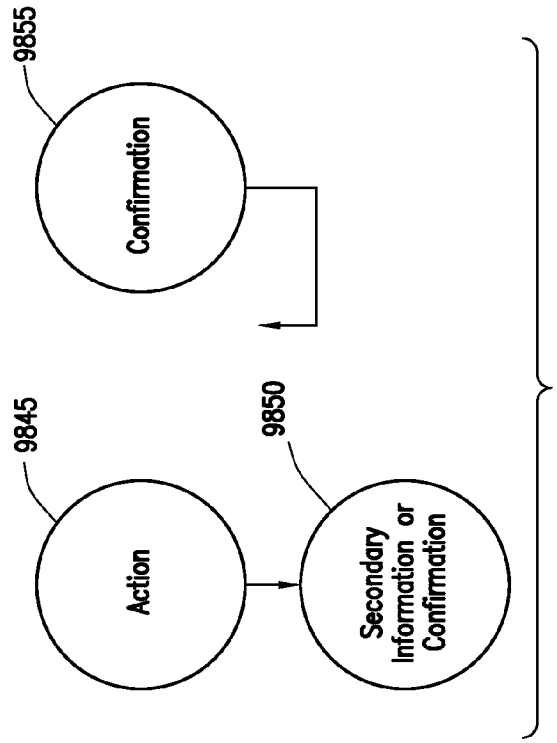
Figure 98G:
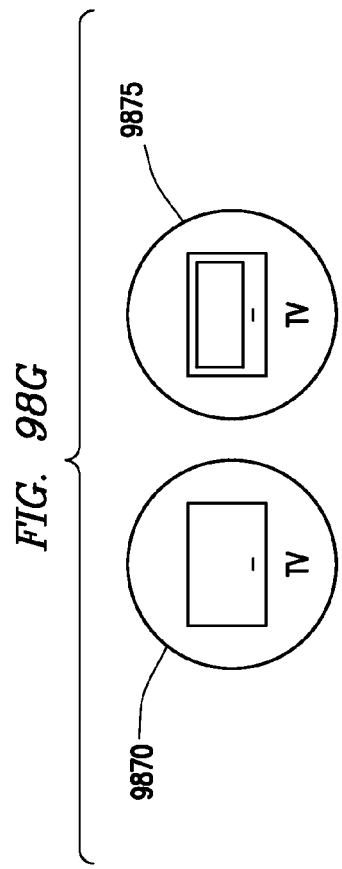

FIG. 98E illustrates an example of the operation of the interaction and transition model with respect to an action 9845 (e.g. within an application) on the device. As an example, within the camera application, a captured image may be selected, and one or more actions may be available for the selected image, such as deleting the image, sharing the image on FACEBOOK, sharing the image on TWITTER, or sending an e-mail with the image. In this example, GUI transitions within the "action" layer (e.g. performed upon receiving a particular user input such as a rotation of the outer ring) allow the user to view different actions to take. Transitions between layers (e.g. performed upon receiving a particular user input such as a tap on the display) allow the user to enter deeper layers (or exit deeper layers) of the hierarchy associated with the selected action. In this example, the deeper layer entered by selecting an action 9845 shows secondary information 9850 or a confirmation (e.g. that the application is sending the image information to a selected sharing service). A confirmation 9855 (e.g. that the image has been sent) may also be shown in this deeper layer. The GUI may automatically transition back to a higher layer (e.g. the action layer). There may, however, be a deeper layer of the hierarchy including the confirmation information, and this deeper layer may be entered by the GUI upon user input or automatically. FIG. 98F illustrates an example of the operation of the interaction and transition model with respect to an icon (e.g. an active icon 9860 including a top-level on/off option) and the switching of the state of the icon 9865. As an example, a television communicatively paired with the device may be indicated by an active icon, for example, a television screen. In this example, GUI transitions within the device/application top layer (e.g. performed upon receiving a particular user input such as a rotation of the outer ring) allow the user to view different applications, device, or other features. The television may appear in a menu in the GUI of the device even when the television is off, but the television must be turned on before it may be used. If the user selects the television (e.g. by tapping on the display when the television icon is displayed by the GUI) when it is off 9860, the GUI may transition to a state in a deeper layer of the interaction and transition model hierarchy in which the television is turned on 9865. When the television is turned on, the icon associated with the television (displayed, for example, in the top layer of the model in the GUI) 9870 may change to directly represent that the television has been turned on 9875, as illustrated in FIG. 98G. If the user again selects the television (now on), the GUI may transition to an even deeper layer of the hierarchy in which functions or capabilities of the television (e.g. volume or channel changing) are exposed. In particular embodiments, the option to turn the television off again may be the first menu item in this deeper layer of the hierarchy, to enable quick access to the off function (e.g. in case the user has accidentally turned on the television). In particular embodiments, if the user selects the television when it is off, the television may be turned on and the icon associated with the television may change to directly represent that the television has been turned on without the GUI transitioning to a different layer of the hierarchy or to a different user interface. The active television icon may, therefore, directly indicate within the top level of the hierarchy (e.g. a main menu) the state of the paired television.

Figure 99:
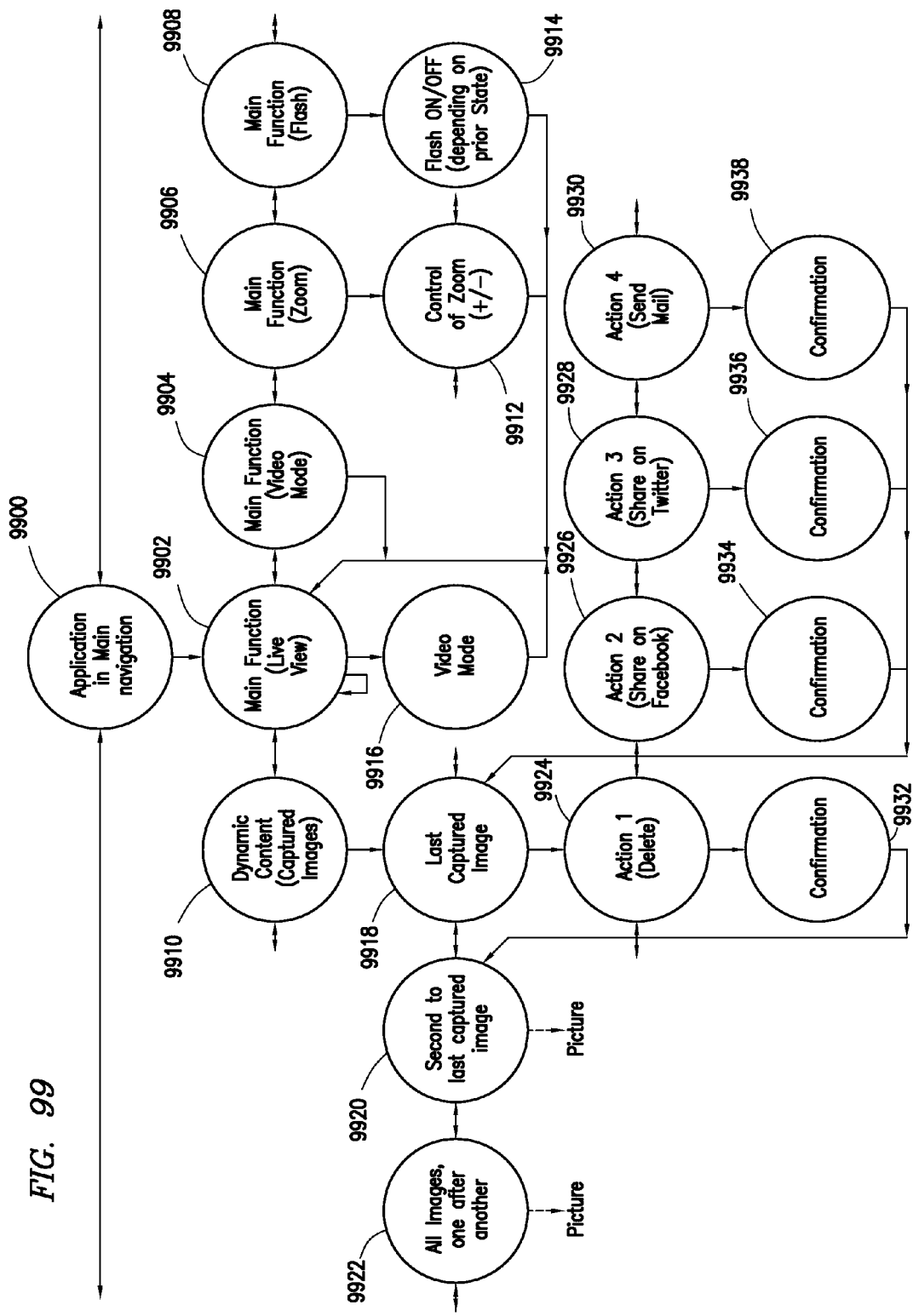
FIG. 99 illustrates an example graphical user interface model of a device.

FIG. 99 illustrates an example of the interaction and transition model hierarchy of a GUI for an image capture application. In this example, the first screen 9902 arrived at after selection of the application (at screen 9900) may correspond to a "live view" function of the application. Other fixed features of the image capture application, including video mode 9904, zoom 9906, or flash 9908, may be available to the right of the home main function screen 9902 of the selected application. Dynamically or contextually available features (e.g. captured images 9910) of the selected application may be available to the left of the home main function screen. A selection event at this functional layer of the hierarchy may cause a transition within the GUI to another nested layer even deeper within the hierarchy. If, for example, the user selects the "zoom" function, the GUI may transition to a screen 9912 in which the user may control the zoom setting of a camera with any suitable input (e.g. a rotation of the outer ring to the right to increase zoom or a rotation of the outer ring to the left to decrease zoom). Similarly, the user may be able to control the state of different features (e.g. turning a flash feature on or off 9914, or switching from a picture mode to a video mode 9916), browse content (e.g. 9918-9922), enter a deeper layer of the hierarchy in which actions 9924-9930 may be taken, or enter yet another, even deeper layer of the hierarchy in which confirmations 9932-9938 are provided once an action is selected.

In particular embodiments, an interaction layout may structure an interaction and transition model of a GUI of the device. An interaction layout may be applied to any suitable interaction model and need not be dependent on any specific type of motion or animation within a GUI of the device, for example. Although specific examples of interaction layouts are discussed below, any suitable interaction layout may be used to structure an interaction and transition model.

As one example, a panning linear interaction layout may structure an interaction and transition model of a GUI of the device. In a panning-linear-type GUI, elements or features within a layer may be arranged to the left and right of the currently displayed element or feature. User input such as a rotation of the outer ring in a clockwise or counterclockwise direction navigates within a single layer of the model hierarchy. As an example, a rotation of the outer ring clockwise one rotational increment may display the element or feature to the right (e.g. the next element), and a rotation counterclockwise one rotational increment may display the element or feature to the left (e.g. the previous element). In particular embodiments, a fast rotation clockwise or counterclockwise may cause the GUI to perform accelerated browsing. In such an embodiment, a single turn may cause the GUI to transition through multiple elements or features, rather than a single element or feature, as described herein. Different user input may navigate between layers (e.g. either deeper layers or higher layers) in the model hierarchy. As an example, if the user touches or taps the touch-sensitive layer of the display, the GUI may transition one layer deeper in the model hierarchy (e.g. confirming the user's selection or providing options related to the selection). Any suitable input by the user may cause the GUI to transition between layers in the model hierarchy, either in place of or in addition to touch- or tap-based input.

As another example, if the user presses a particular region of the touch-sensitive layer of the display (e.g. designated as a "back" button), or if the user double-taps the touch-sensitive layer of the display, the GUI may transition one layer higher in the model hierarchy (e.g. to the previous layer). If, for example, the user performs a long press of the display or screen, the GUI may transition back to the home screen (e.g. a clock). Without additional user input, the GUI may also transition back to the home screen after a pre-determined period of time (e.g. a timeout period). As described herein, as a user begins, for example, to rotate the outer ring in a clockwise or counterclockwise fashion, the GUI transitions within the same layer, and the next user interface element or feature (e.g. a breadcrumb icon in the same layer) to the right or left, respectively, may begin to appear while the current user interface element or feature may begin to disappear.

Figure 100A:
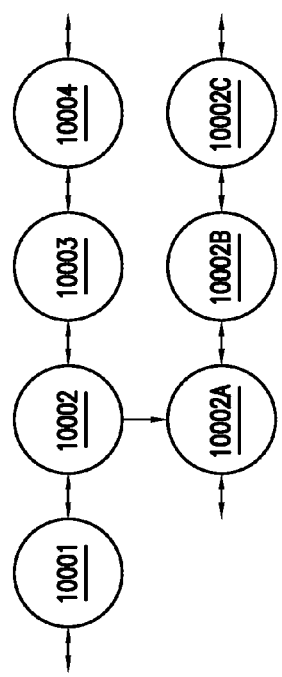
FIGS. 100A-100C illustrate example graphical user interface models of a device.

FIG. 100A illustrates an example of the panning linear interaction layout. In this example, GUI elements 10001, 10002, 10003, and 10004 are in the same layer of the interaction and transition model hierarchy of the panning-linear-type GUI. GUI elements 10002A, 10002B, and 10002C are elements in a second, deeper layer of the hierarchy and are sub-elements of element 10002. As an example, the first layer may include devices paired with the device—element 10001 may represent an automobile, element 10002 may represent a television, element 10003 may represent a mobile phone, element 10004 may represent a home thermostat. Element 10002A may be a volume control element for the television, element 10002B may be a channel control element for the television, and element 10002C may be a picture control element for the television. As yet another example, the GUI may transition one layer deeper in the hierarchy if the user clicks the ring (e.g. presses down on the ring once), and then sub-elements in the deeper layer may be panned by rotating the ring. Alternatively, the user may pan the sub-elements in the deeper layer by rotating the ring while simultaneously pressing down on the ring. The device may include a switch to select how the user input is used to navigate between layers.

Figure 100B:
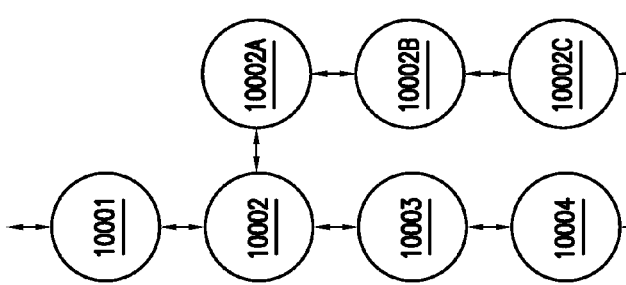

As another example, a panning radial (or panning circular) interaction layout may structure an interaction and transition model of a GUI of the device. In a panning-radial-type GUI, elements or features in a layer may be arranged above and below the currently displayed element or feature. User input such as a rotation of the outer ring in a clockwise or counterclockwise direction navigates between layers of the model hierarchy. As an example, a rotation of the outer ring clockwise one increment may cause the GUI to transition one layer deeper in the model hierarchy (e.g. entering a particular application's layer or confirming selection of the application), and a rotation counterclockwise one increment may cause the GUI to transition one layer higher in the model hierarchy (e.g. exiting a particular application's layer to the previous layer). In particular embodiments, a fast rotation clockwise or counterclockwise may cause the GUI to perform accelerated browsing, as described herein. In such an embodiment, a single rotational increment may cause the GUI to transition through multiple layers of the hierarchy, rather than a single layer. Different user input may navigate within a single layer in the model hierarchy. As an example, if the user touches or taps the touch-sensitive layer of the display, the GUI may transition to the next element or feature (e.g. the element below the currently displayed element). As another example, if the user presses a particular region of the touch-sensitive layer of the display (e.g. designated as a "back" button), or if the user double-taps the touch-sensitive layer of the display, the GUI may transition to a previous element or feature (e.g. the element above the currently displayed element). If, for example, the user performs a long press of the display or screen, the GUI may transition back to the home screen (e.g. a clock). Without additional user input, the GUI may also transition back to the home screen after a pre-determined period of time (e.g. a timeout period). As described herein, as a user begins, for example, to rotate the outer ring in a clockwise or counterclockwise fashion, the GUI transitions to a different layer, and the next user interface element or feature (e.g. in a different layer) may begin to appear while the current user interface element or feature may begin to disappear. FIG. 100B illustrates an example of the panning radial interaction layout. In this example, GUI elements 10001, 10002, 10003, and 10004 are in the same layer of the interaction and transition model hierarchy of the panning-radial-type GUI. GUI elements 10002A, 10002B, and 10002C are elements in a second, deeper layer of the hierarchy and are sub-elements of element 10002. As before, the first layer may include devices paired with the device—element 10001 may represent an automobile, element 10002 may represent a television, element 10003 may represent a mobile phone, element 10004 may represent a home thermostat. Element 10002A may be a volume control element for the television, element 10002B may be a channel control element for the television, and element 10002C may be a picture control element for the television.

Figure 100C:
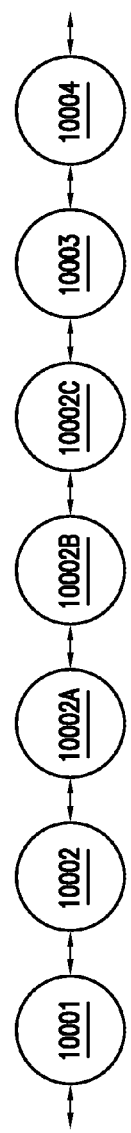

As yet another example, an accordion-type interaction layout may structure an interaction and transition model of a GUI of the device. In an accordion-type GUI, elements or features of multiple layers may be arranged in a circular list structure. For example, rotating within the list structure (e.g. by rotating the outer ring) in a first direction past a screen associated with the last element or feature in that direction (e.g. the last fixed application of the device) may cause the GUI to transition to a screen associated with the last element or feature in a second direction (e.g. the least-recently used contextual application of the device). Continuing to rotate in the first direction may cause the GUI to transition through screens associated with contextual applications in "reverse" order (e.g. from least-recently used to most-recently used). Similarly, rotating in the second direction past the screen of the least-recently used contextual application may cause the GUI to transition to the screen associated with the last fixed application, and continuing to rotate in the second direction may cause the GUI to transition through the screens of the fixed applications in reverse order (e.g. from the last fixed application to the first, adjacent to the home screen). In an accordion-type GUI, the element or feature currently displayed may be "expanded" (e.g. if selected by the user) such that its sub-elements or sub-features may become part of the single-layer list structure. In particular embodiments, an element or feature with sub-elements may indicate (when displayed) that it has sub-elements through, for example, visible edges of the sub-elements. User input such as a rotation of the outer ring in a clockwise or counterclockwise direction navigates within a single layer of the model, which may include elements or features, as well as sub-elements or sub-features of a selected element or feature. As an example, a rotation of the outer ring clockwise one increment may display the element or feature to the right (e.g. the next element), and a rotation counterclockwise one increment may display the element or feature to the left (e.g. the previous element). In particular embodiments, a fast rotation clockwise or counterclockwise may cause the GUI to perform accelerated browsing. In such an embodiment, a single rotational increment may cause the GUI to transition through multiple elements or features, rather than a single element or feature. Different user input may cause the selection and expansion of an element or feature in the model. As an example, if the user touches or taps the touch-sensitive layer of the display, the GUI may expand the displayed feature or element within the existing layer and transition to a sub-element or sub-feature. As another example, if the user presses a particular region of the touch-sensitive layer of the display (e.g. designated as a "back" button), or if the user double-taps the touch-sensitive layer of the display, the GUI may collapse the expanded sub-elements or sub-features and transition to an element or feature in the list. If, for example, the user performs a long press of the display or screen, the GUI may transition back to the home screen (e.g. a clock). Without additional user input, the GUI may also transition back to the home screen after a pre-determined period of time (e.g. a timeout period). As described herein, as a user begins, for example, to rotate the outer ring in a clockwise or counterclockwise fashion, the GUI transitions within the same layer, and the next user interface element or feature (e.g. a breadcrumb icon in the same layer) to the right or left, respectively, may begin to appear while the current user interface element or feature may begin to disappear. FIG. 100C illustrates an example of the accordion-type interaction layout. In this example, GUI elements 10001, 10002, 10003, and 10004 are in the same layer of the interaction and transition model of the accordion-type GUI. Because element 10002 has been selected by the user, GUI sub-elements 10002A, 10002B, and 10002C are expanded and also included in the list structure in the same layer of the model. Thus, the GUI may transition from sub-element 10002C to either sub-element 10002B or directly to element 10003. If, however, the user desires to collapse the sub-elements (e.g. through a "back" input such as tapping the screen associated with element 10002 again), then the list structure will only include GUI elements 10001, 10002, 10003, and 10004 again.

Figure 101A:
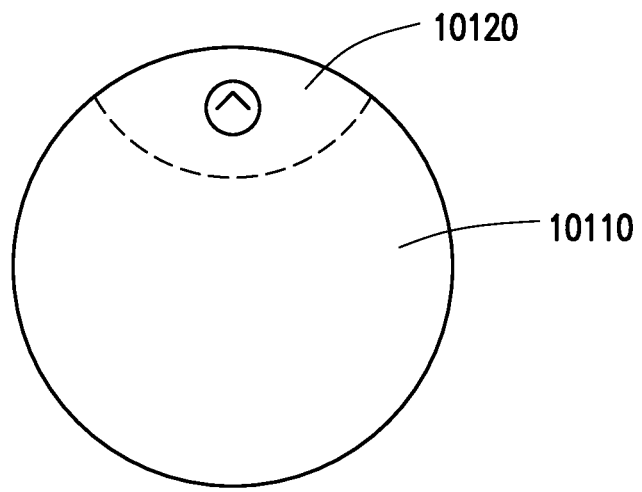
FIGS. 101A-101B illustrate example screens of a graphical user interface of a device.
Figure 101B:
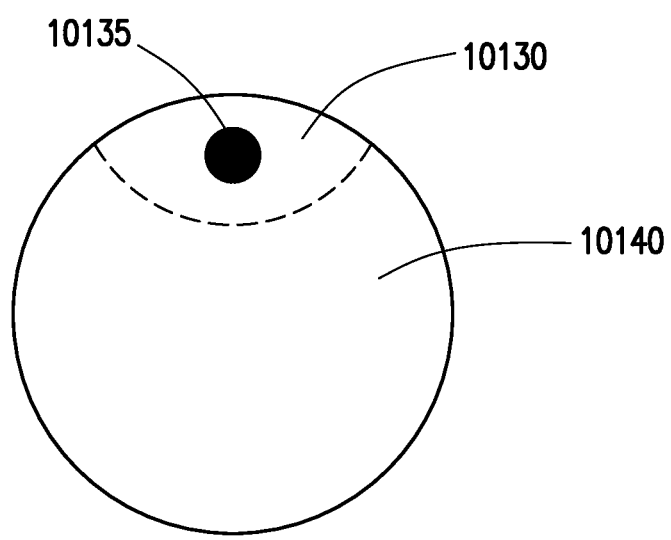

In particular embodiments, the GUI may navigate to a home screen based on input received by a user of the device. The user input may include, for example, pressing and holding (e.g. a long press) the touch-sensitive layer, pressing and holding the display, pressing (e.g. clicking) and holding the outer ring, squeezing and holding the outer ring, covering the face (e.g. the display) of the device, covering a particular sensor of the device, turning the face of the device in a downward direction, pressing a software button (discussed herein), pressing a hardware button on the device, or shaking the device (or any other suitable gesture). Any of these inputs or any variation of these inputs (including, for example, shorter durations) may be used as user inputs to go "back" within an interaction and transition model. FIGS. 101A-101B illustrate examples of a "back" software button layout in the GUI. In FIG. 101A, receiving user touch input in the bottom portion 10110 of the display causes the GUI to confirm a selection or transition one layer deeper in the model hierarchy. Receiving user touch input in the top portion 10120 of the display causes the GUI to transition "back" or one layer higher in the model hierarchy. FIG. 101B illustrates a similar layout, with the "back" region 10130 including a breadcrumb icon 10135 to indicate to the user where navigating "back" will transition. In particular embodiments (e.g. when the touch-sensitive layer is operable to determine precise x-y coordinates of a touch), any region of the display may be designated as a "back" region, a "confirm/select" region, or any other suitable functional region.

Figure 102A:
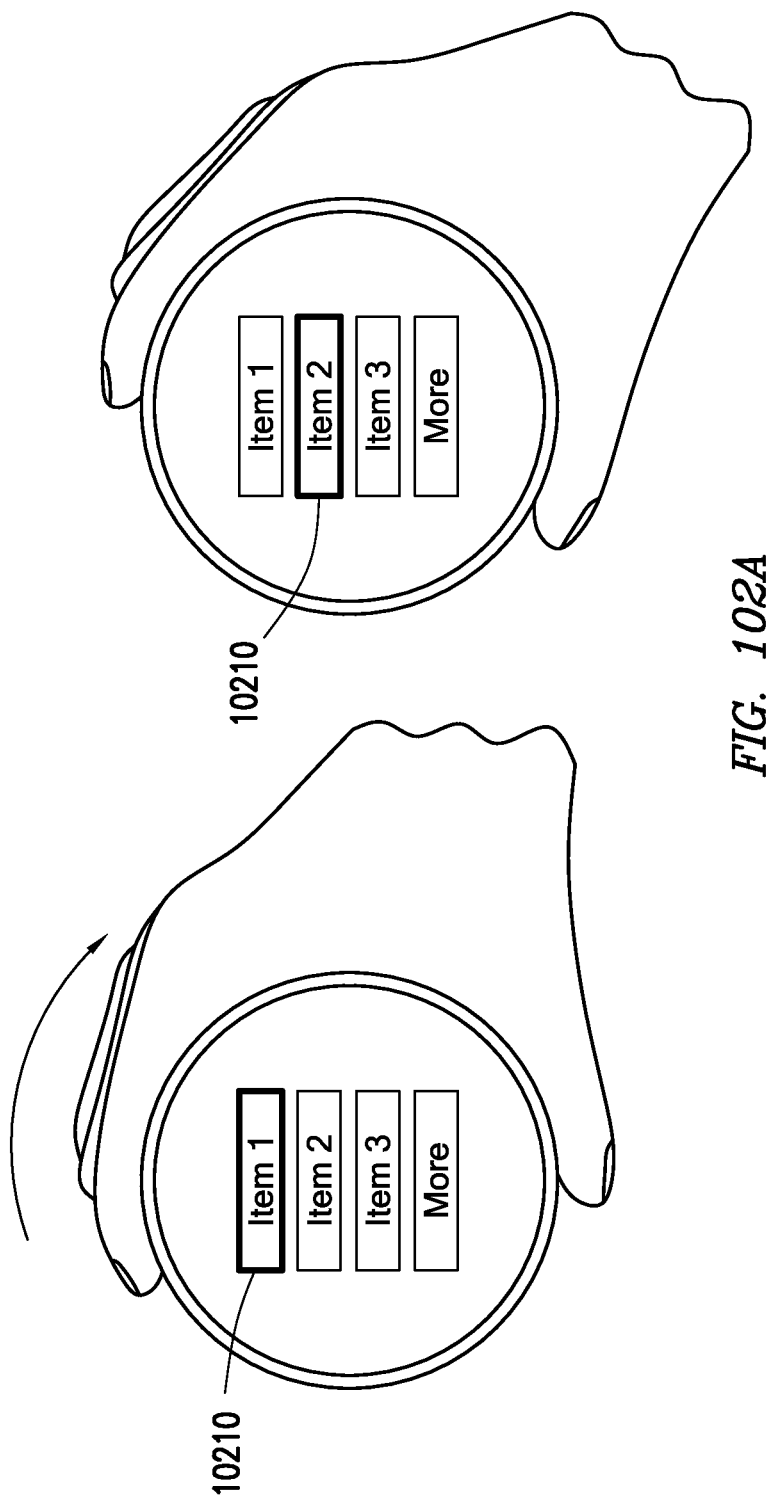
Figure 102B:
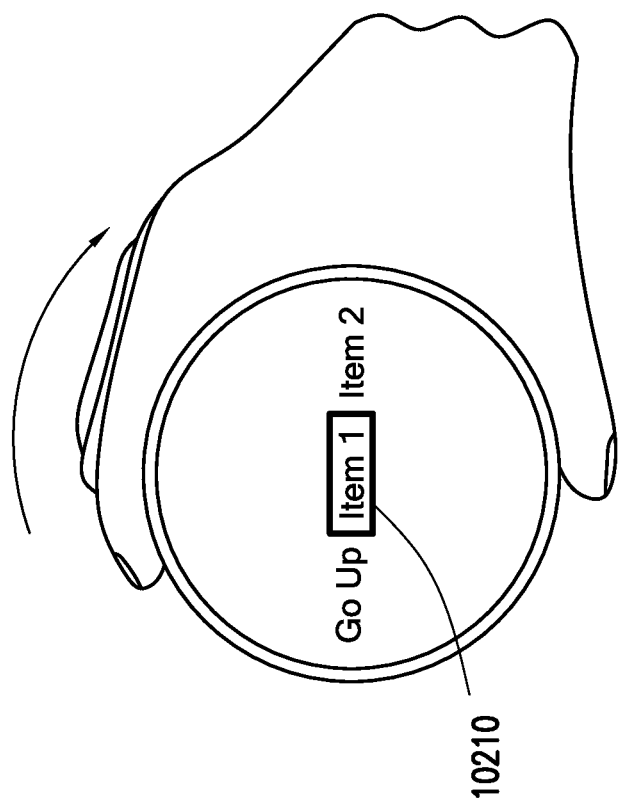
Figure 102B:
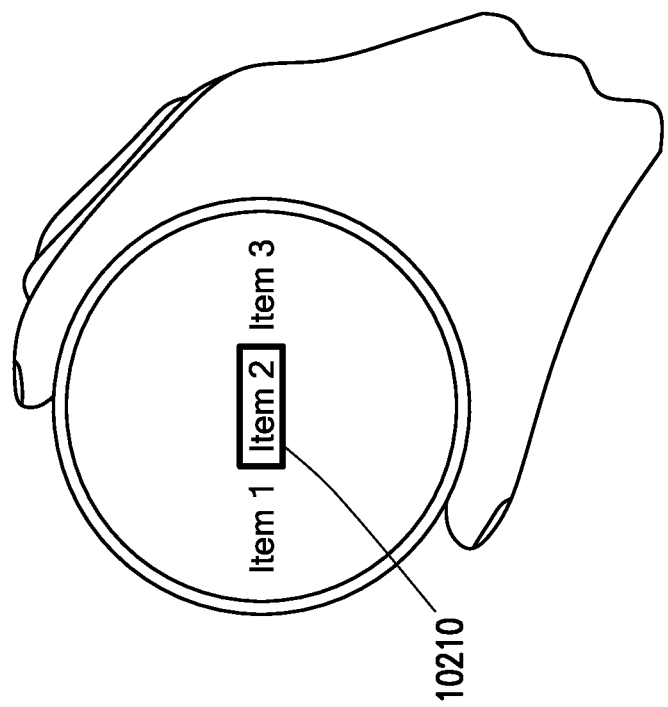

In particular embodiments, the GUI of the device may display particular types of content including, for example, lists. FIG. 102A illustrates an example of the GUI displaying a vertical list of items. An input from the user (e.g. any suitable input mechanism or type) may cause a selection frame 10210 of the GUI to move through elements of the vertical list. As an example, if the user rotates right in a clockwise direction, the selection frame 10210 may move from the top of the vertical list toward the bottom of the vertical list. Each rotational increment of the outer ring (e.g. if the outer ring moves in discrete increments), causes the selection frame 10210 to move one item within the list. In the example of FIG. 102A, as the user rotates the ring clockwise, the displayed items of the list remain constant, and the selection frame 10210 moves downward through items of the list. In other embodiments, the selection frame may remain constant (e.g. in the center of the display), and items of the list may move upward or downward (e.g. one item at a time), depending on the direction of the ring's rotation. FIG. 102B illustrates an example of the GUI displaying a horizontal list of items. An input from the user (e.g. any suitable input mechanism or type) may cause a selection frame 10210 of the GUI to move through elements of the horizontal list. As an example, if the user rotates right in a clockwise direction, the selection frame 10210 may move from the left of the horizontal list toward the right of the horizontal list. Each rotational increment of the outer ring (e.g. if the outer ring moves in discrete increments), causes the selection frame 10210 to move one item within the list. In the example of FIG. 102B, as the user rotates the ring clockwise, the selection frame 10210 remains constant in the center of the display, and items of the list move toward the left (e.g. one item at a time) in response to the clockwise rotation. In other embodiments, the displayed items of the list remain constant, and the selection frame moves left or right through items of the list, depending on the direction of rotation of the outer ring.

Figure 102C:
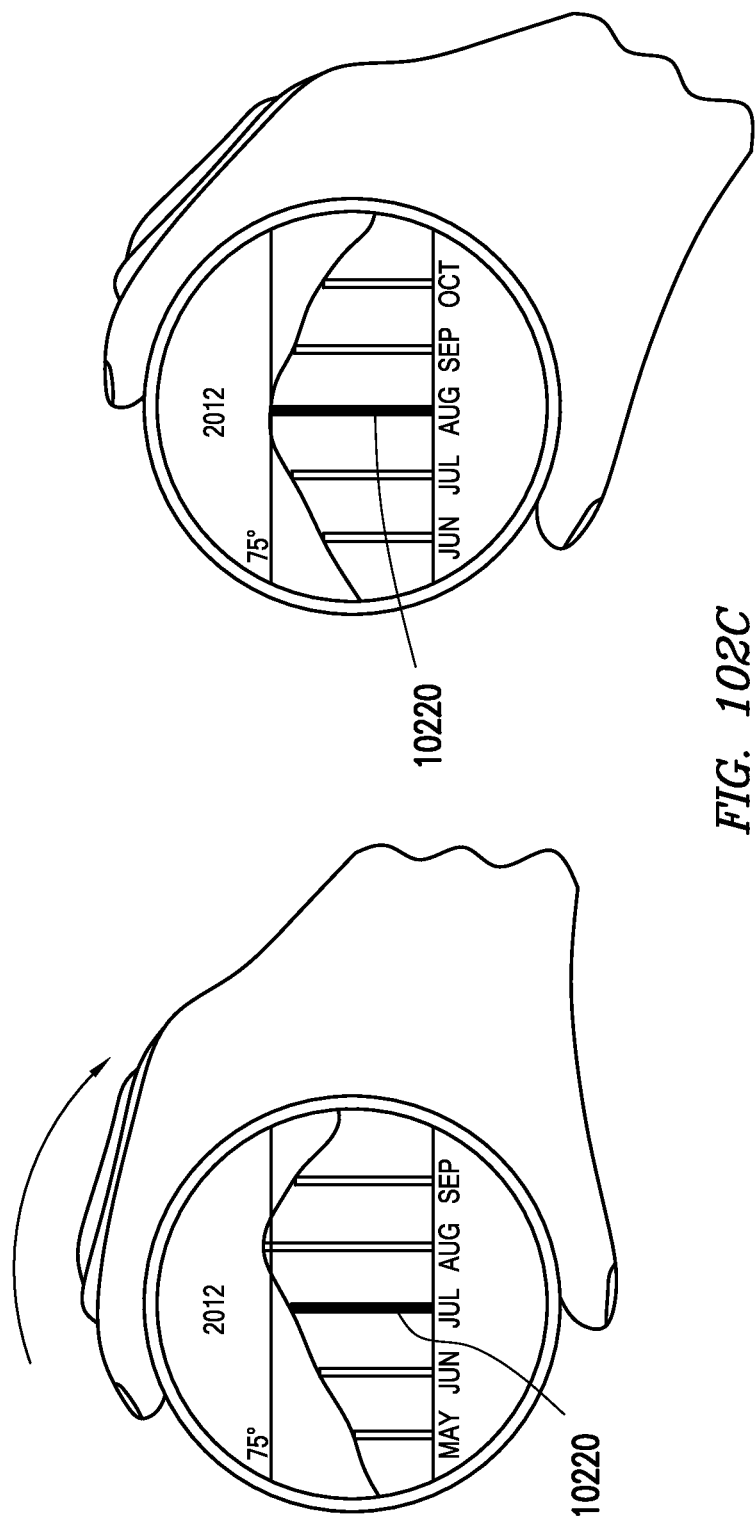
Figure 103A:
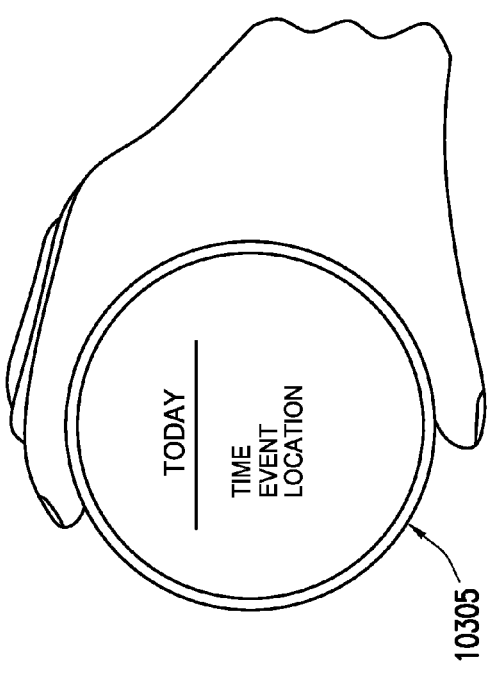
FIGS. 103A-103D illustrate example screens of a graphical user interface of a device.
Figure 103B:
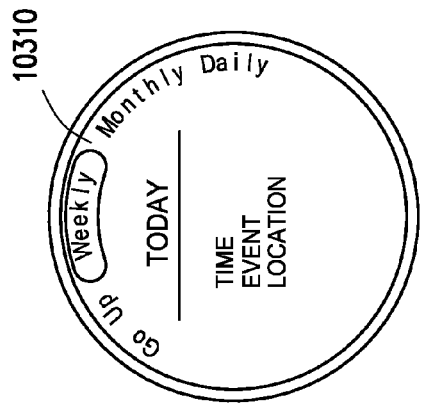
Figure 103C:
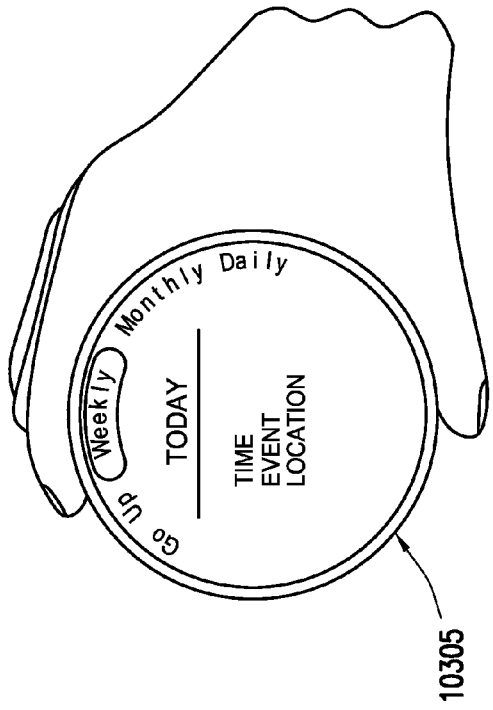
Figure 103D:
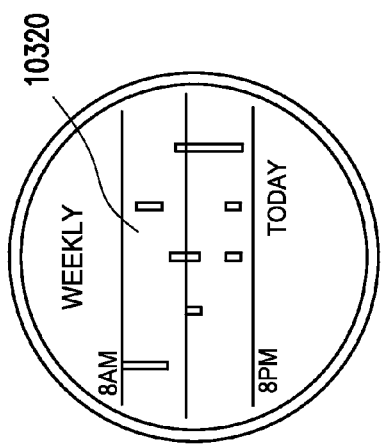

In particular embodiments, the GUI of the device may display vertically or horizontally continuous (or substantially continuous) content including, for example, charts or text. In particular embodiments, an input from the user (e.g. any suitable input mechanism or type) may cause a selection indicator of the GUI to move through the continuous content. In other embodiments, an input from the user may cause the content to move into and out of the display in a horizontal direction, vertical direction, or any other direction mapped to the user's input (and the selection indicator, if present, may remain in a constant position). In the example of FIG. 102C, a temperature chart is displayed. As the user rotates the outer ring in a clockwise fashion, the selection indicator 10220 remains in the center of the display, and the content moves into the display from the right and out of the display toward the left. In the example of FIG. 102D, a portion of a larger piece of text 10230 is displayed. As the user rotates the outer ring in a clockwise fashion, additional text enters the display from the bottom and exits the display toward the top. FIGS. 103A-103D illustrate an example calendar application displayed in GUI of the device. In FIG. 103A, a user may click or press the outer ring (indicated by arrow 10305), causing the GUI to display a circular menu 10310 with options "Go Up," "Weekly" (the default setting), "Monthly," and "Daily." In FIG. 103C, the user may again click or press the outer ring (indicated by arrow 10305), confirming selection of "Weekly" and causing the GUI to display the weekly view 10320 of the user's calendar.

In particular embodiments, the GUI may display content that is of a size larger than the display. In such embodiments, the GUI may scale or crop (or otherwise shrink or fit) the content so that all of the content may be displayed within the display at one time. In other embodiments, the GUI does not alter the size of the content, and instead provides the ability for the user to pan through the content one portion at a time, for example using scrolling (described herein).

In particular embodiments, the device includes the circular display, and the GUI includes circular navigation and menu layouts. This disclosure contemplates any shape for the display, however, and any suitable navigation or menu layout for the GUI. The menu layout may provide a user a visual indication of where the user is located within an interaction and transition model hierarchy of the GUI, for example. The menu layout may also provide visual indicators that allow the user to differentiate between different types of menu items, as well as show an overall view of menu options. Additionally, the menu may be displayed over any suitable background or content of the device.

Figure 104:
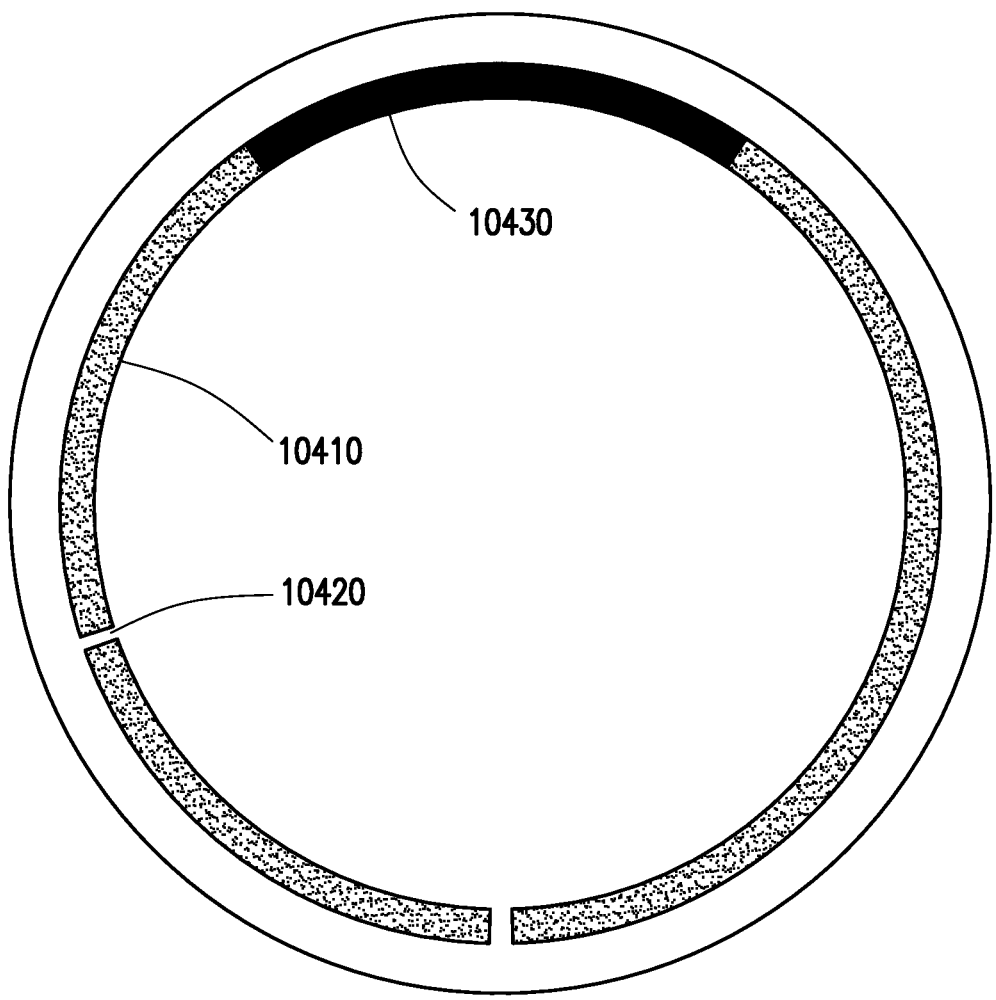
FIG. 104 illustrates an example menu of a graphical user interface of a device.

FIG. 104 illustrates an example circular menu layout in which each segment 10410 represents one item or option in the menu and visual gaps such as 10420 separate the items from one another. The default or currently selected item 10430 is on the top of the visual display (but may be anywhere on the display), and may remain at the top of the display as the user orients the device display in different ways during use. FIGS. 105A-105B illustrate an example of browsing the items in a circular menu. The user may provide input such as a clockwise rotation of the outer ring, and in response to this user input, the next item in the menu 10520 (e.g. to the right of the currently selected item 10510) may be highlighted for selection. The content in the center of the display 10530 may automatically change to reflect the user's rotation input or may, in particular embodiments, change only after the user provides another input (e.g. pressing or clicking the outer ring once the desired menu item is highlighted). FIGS. 105C-105D illustrate an example of browsing a circular menu by rotating the outer ring, causing the next item in the menu 10550 (e.g. clockwise or to the right of the currently selected item 10540) to be highlighted for selection. In this example, the user's input also causes the rotation of a central "pointer" 10560 that points at the highlighted menu segment corresponding to the currently-selected menu item. In this example, the content in the center of the display automatically changes to reflect the user's rotation.

Figure 106C:
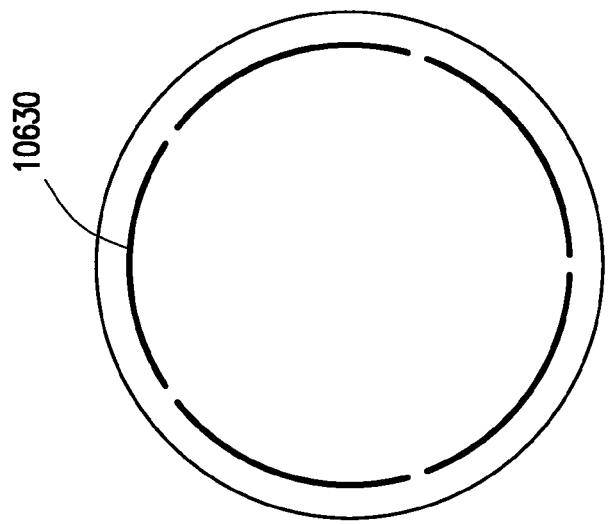
FIGS. 106A-106C illustrate example menus of a graphical user interface of a device.
Figure 106B:
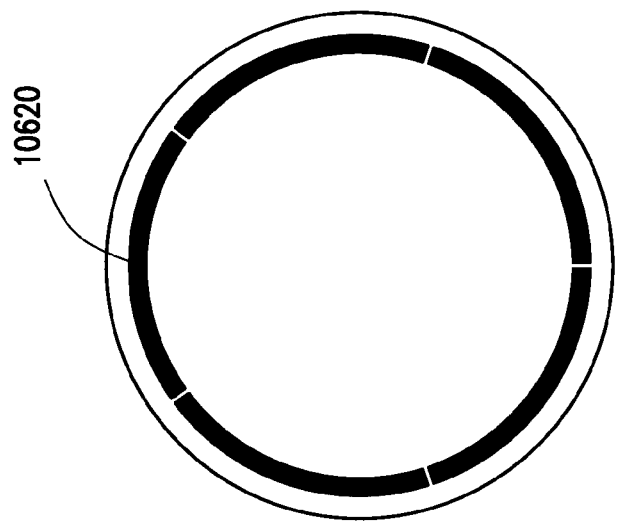
Figure 106A:
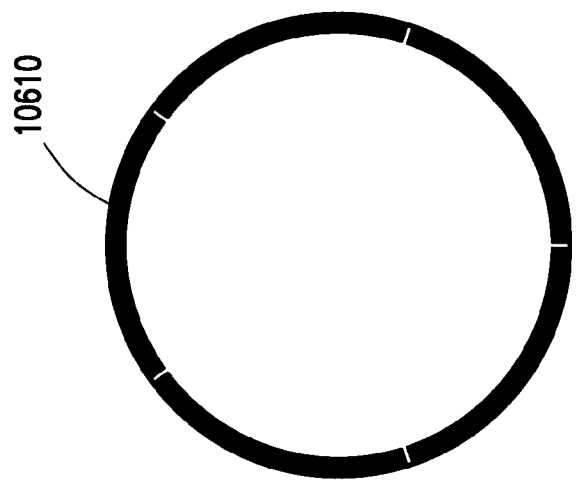
Figure 107B:
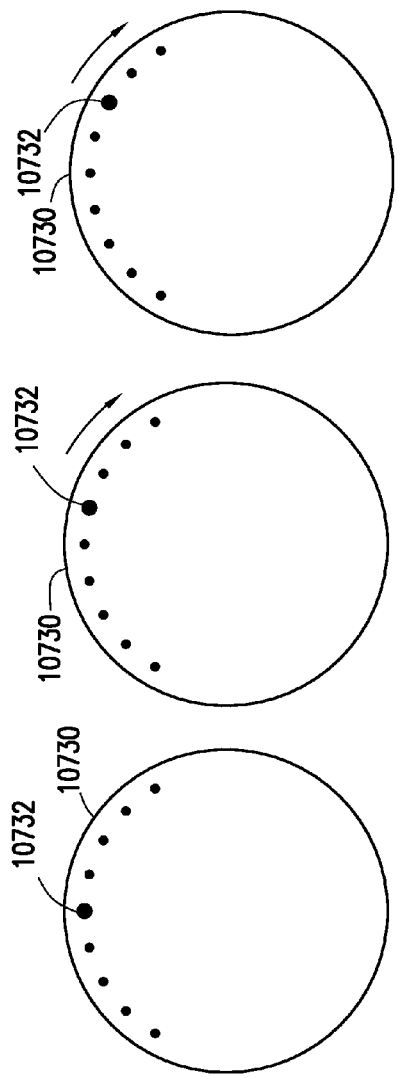
Figure 107C:
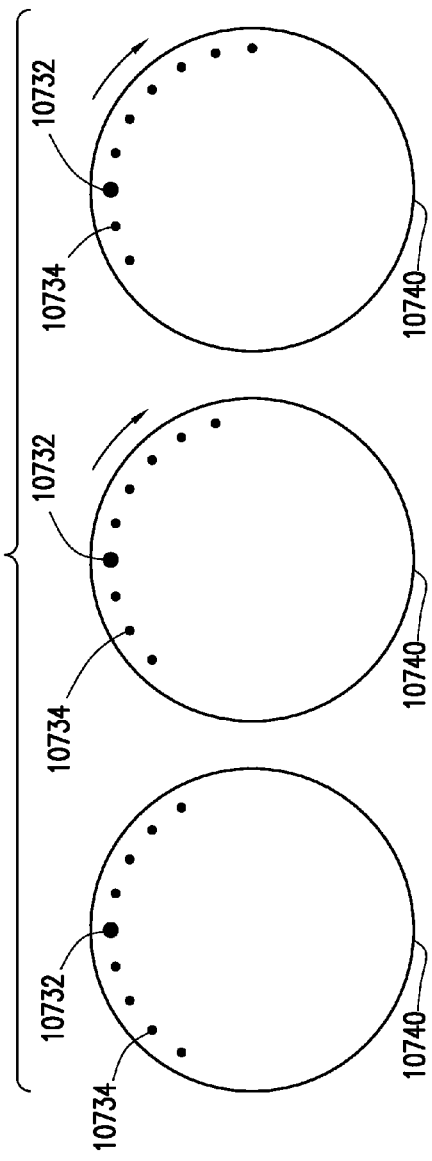
Figure 108:
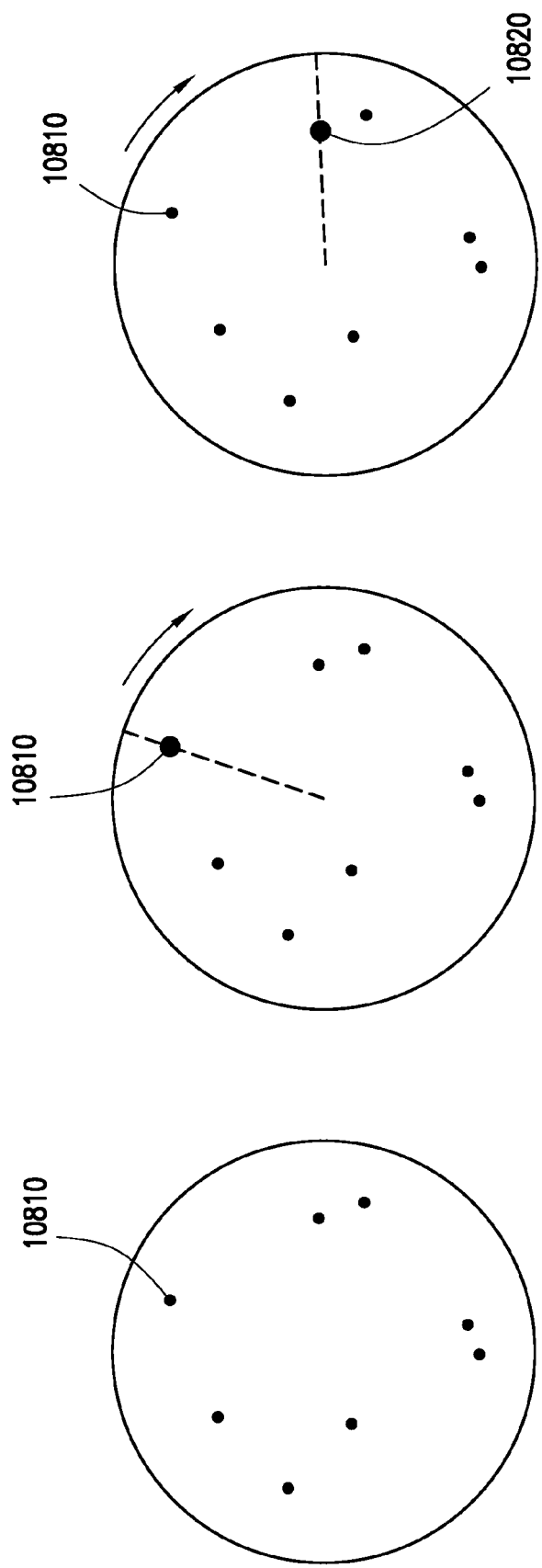
FIG. 108 illustrates an example menu of a graphical user interface of a device.

FIGS. 106A-106C each illustrate different alignments and arrangements of a circular menu layout for the GUI of the device. The circular menu may, for example, be displayed directly on the border of the display (as shown in FIG. 106A) or may be shown further inside the display, or as an overlay over a background of the device (shown in FIGS. 106B-106C). FIGS. 107A-107C illustrate other forms and alignments of a circular menu layout for the GUI of the device. As examples, the menu may consist of line segments (of various possible sizes) arranged in a circle 10710, line segments arranged in a semicircle 10720, or dots arranged in a circle or semi-circle, 10730 or 10740. In particular embodiments, the visual indicator of the currently selected or default menu item 10732 may remain at the top center of the display, and the visual indicators of items in the menu 10734 may shift left or right based on user input (FIG. 107C). In other embodiments, the visual indicator of the currently selected or default item 10732 may move through the indicators of the items of the menu, which remain fixed in position (FIG. 107B). In particular embodiments, instead of segments or dots, the visual indicators of items in the menu may be icons (e.g. breadcrumb icons) associated with the menu items. FIG. 108 illustrates that the menu layout need not be circular and may be any suitable layout, including a layout in which indicators of menu items 10810 are scattered throughout the display. With user input (e.g. a rotation of the outer ring), different items may be selected according to their position in the menu layout. As an example, if the user rotates in a clockwise manner, the next menu item 10820 in a clockwise direction may be selected.

Figure 110B:
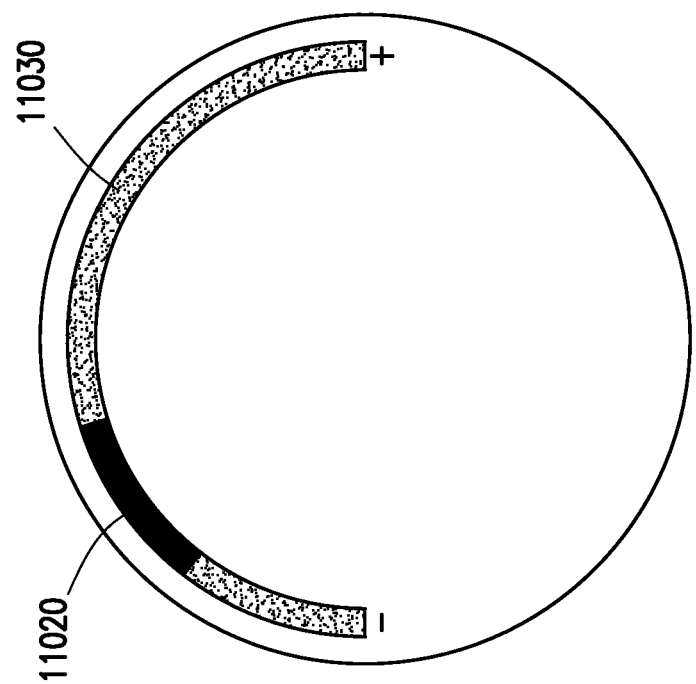
FIGS. 110A-110B illustrate examples of scrolling in a graphical user interface of a device.
Figure 110A:
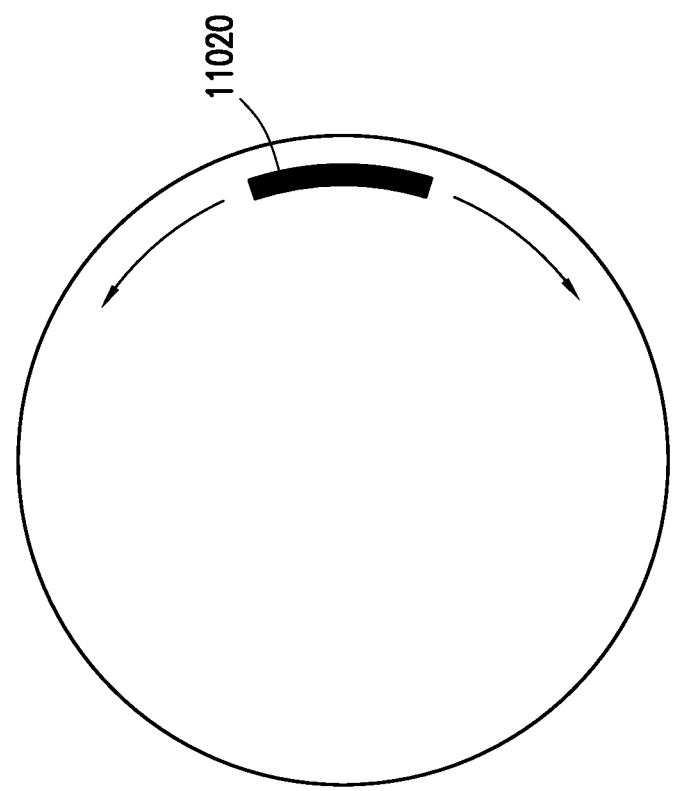
Figure 111C:
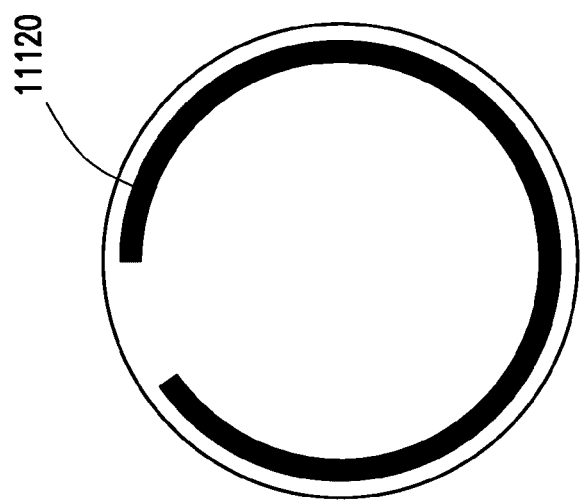
FIG. 111A-111C illustrate examples of scrolling in a graphical user interface of a device.
Figure 111B:
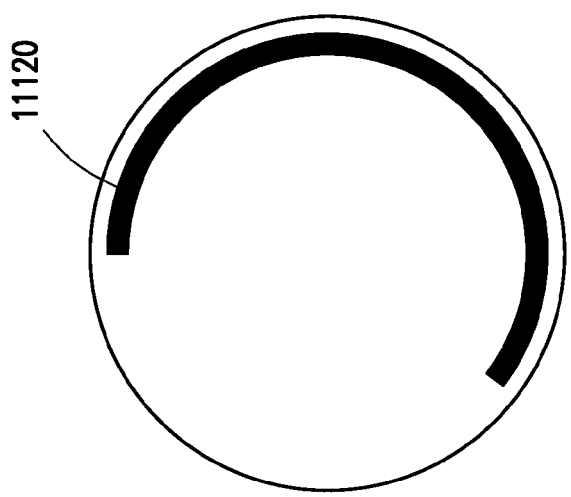
Figure 111A:
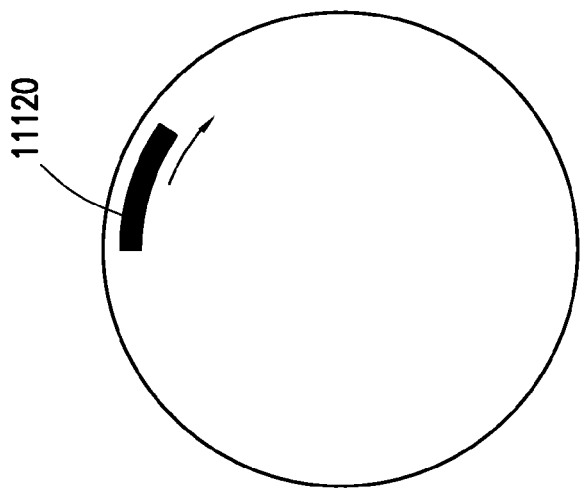

FIGS. 109A-109C illustrate different menu layouts with respect to menu items to the "left" and to the "right" (e.g. in the interaction and transition model hierarchy) of the currently selected or displayed menu item 10915. In FIG. 109A, all menu items 10910 are equally distributed on the circular menu around the display. In FIG. 109B, the menu includes a gap which indicates a differentiation of items 10910 to the left and items to the right of the currently-displayed or selected menu item 10915 (e.g. in accordance with the interaction and transition model described herein). FIG. 109C illustrates an example in which there are more items 10910 to the left than to the right of the currently-selected or displayed item 10915, so that the left-hand segments of the circular menu are adjusted in size to accommodate the number of items available for selection. In the case of a large number of menu items (e.g. beyond a particular threshold such as 40 captured images), the segments of the circular menu may disappear, and the visual indicator presented to the user may be a scroll bar 11020 that allows the user to circularly scroll through the various menu items, as illustrated in FIG. 110A. In other embodiments, a similar scrollbar-type visual indicator 11020 may allow the user of the device to manipulate an absolute or fixed value (e.g. a camera zoom level) over a fixed range of values 11030, as illustrated in FIG. 110B. In yet other embodiments, the length of a scrollbar-type visual indicator may show the user the level of a certain value. For example, if the user is controlling the volume of a television using the outer ring of the device, as the user turns the ring (e.g. clockwise) to increase the volume level, the visual indicator 11120 will grow longer, until it encircles or nearly encircles the entire display, as illustrated in FIGS. 111A-111C.

Figure 112:
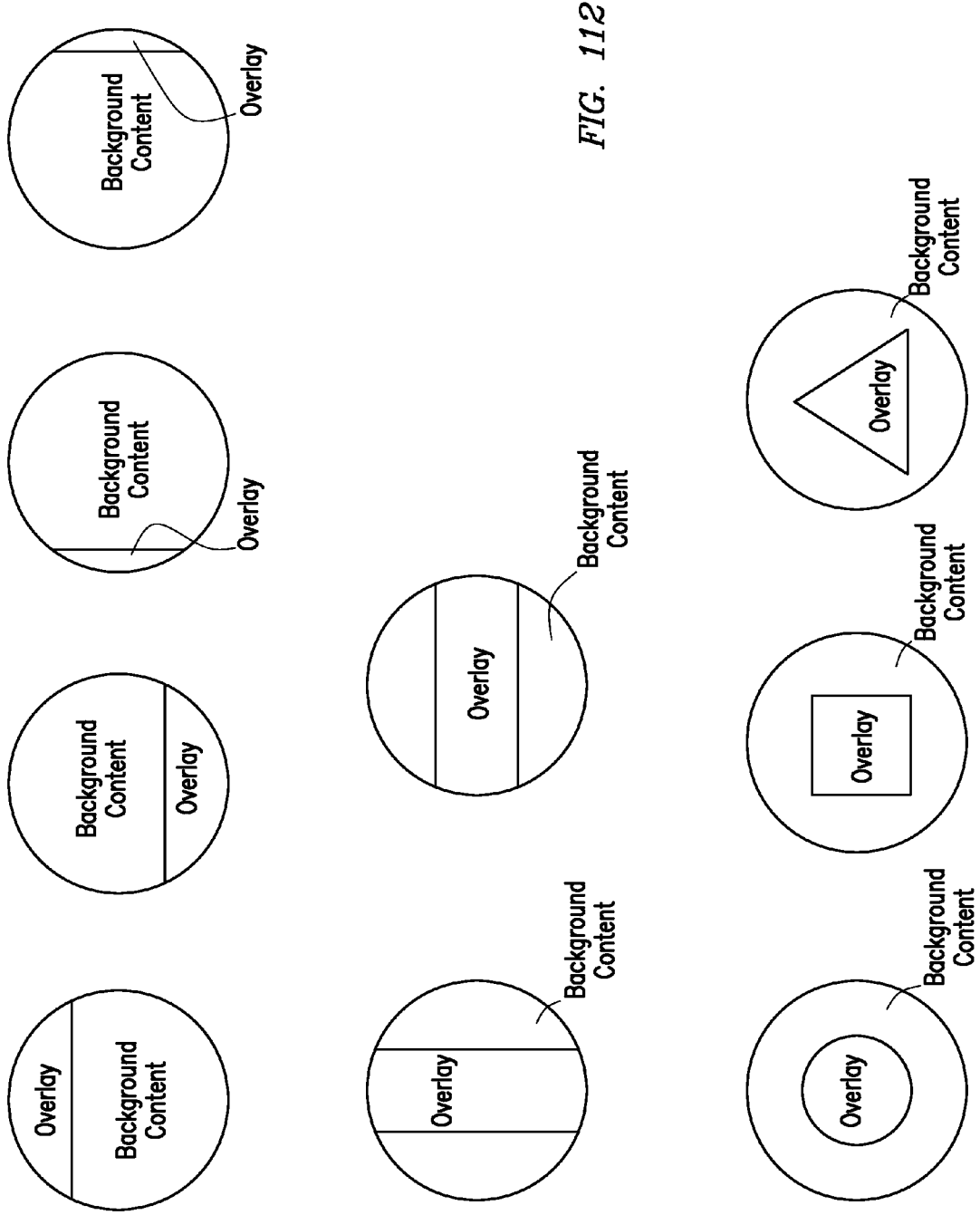
FIG. 112 illustrates examples of overlay and background content in a graphical user interface of a device.
Figure 113B:
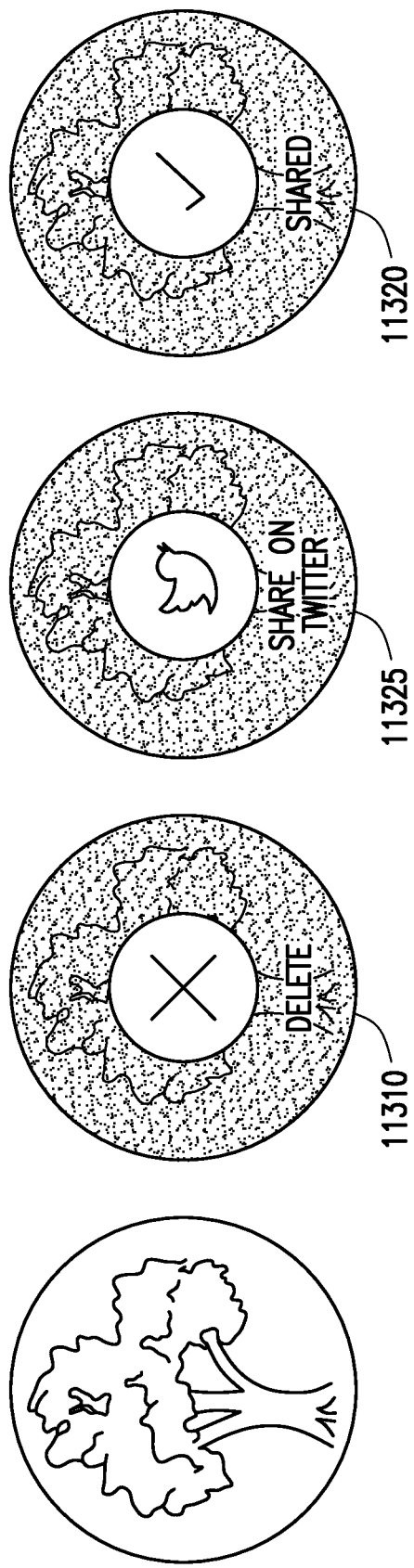

In particular embodiments, the GUI may display both an item of reference or background content as well as an indication of an available action or function to be performed with respect to the reference or background content. FIG. 112 illustrates example layouts within the GUI of reference content and contextual overlay actions or functions. Different types of layouts (e.g. including those illustrated) may be selected based on the different types of reference or background content presented, for example, to minimize obscuring the reference or background content. For example, if the reference or background content is a picture of a person, an overlay that does not obscure the center of the photo may be selected. In particular embodiments, the perceptual brightness of the pixels of the reference or background content (e.g. behind the overlay) may be determined on a pixel-by-pixel basis. In cases where the contrast between the contextual overlay and the reference or background content (e.g. an image) is too low (e.g. based on a pre-determined threshold), a blurred drop shadow that pushes the underlying colors in the opposite direction may be used. An example algorithm may include determining the pixels under the overlay, reducing their saturation, taking the inverse of the visual brightness (e.g. such that colors remain the same but the brightness is selected to produce contrast), blur, and create a composite between the underlying reference or background content and the overlay. FIGS. 113A-113C illustrate examples 11310-11350, of contextual overlays composed with background or reference content (here, images captured by a camera of the device). As illustrated, the contextual overlay may allow the user to perform actions or functions (e.g. deleting an image 11130 or sharing an image 11325, searching for coffee 11330, searching for restaurants 11340, or making a location a "favorite" location 11350), provide confirmation to the user (e.g. that an image has been shared 11320), or provide any other type of information to the user. In particular embodiments, contextual overlays may be used anywhere within a menu layout of a GUI except for the top level of the interaction and transition model hierarchy.

In particular embodiments, icons displayed in the GUI of device may optimize the energy or battery usage of the device. As an example, an icon may include primarily black background with the icon itself being composed of thin white strokes. This may allow for the amount of white color on the display screen to be very low, allowing for reduced energy consumption of the display while the GUI is used. The icons displayed in GUI may also include real-time notifications. For example, a mobile phone icon may include a notification with the number of new voicemails, an e-mail icon may include a notification with the number of new e-mails, a chat icon may include a notification with the number of new chat messages, and a telephone icon may include a notification with the number of missed calls. In particular embodiments, the GUI of the device only displays colors other than black and white for user-generated content (e.g. pictures, files, contacts, notifications, or schedules). Other information, including menu items, may be displayed in black and white.

In particular embodiments, as the GUI transitions from one element (e.g. feature, content item, or icon) to another (e.g. upon receiving input from a user), the GUI may display visual transition effects. These transition effects may depend, for example, on the type of input received from a user of device. As an example, a single touch on the display may trigger particular transition effects, while a rotation of the outer ring may trigger a different (potentially overlapping) set of transition effects.

Figure 114A:
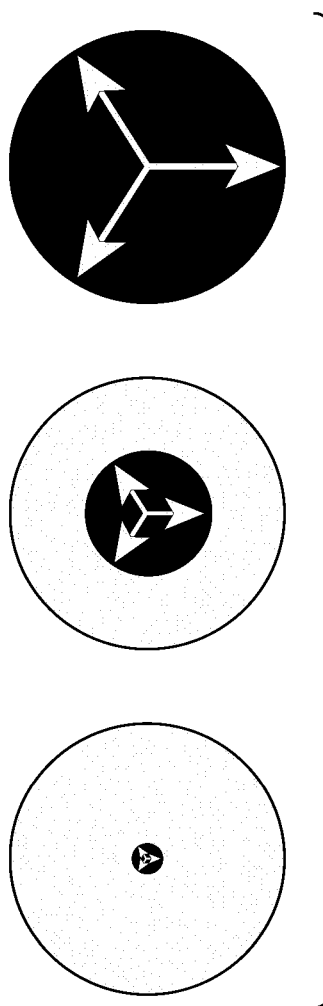
FIGS. 114A-114B illustrate example visual transition effects in a graphical user interface of a device.
Figure 114B:
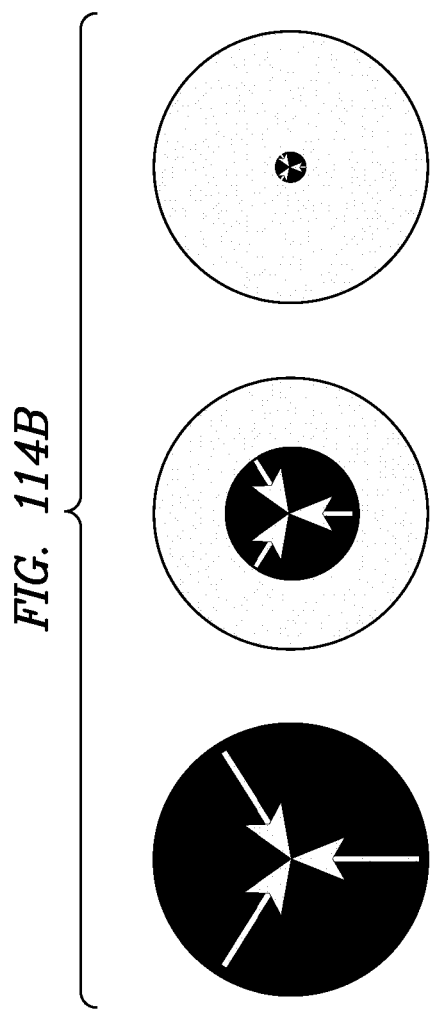

In particular embodiments, a user's touch input on the touch-sensitive layer may trigger transition effects including center-oriented expansion, directional sliding, and scaling in or out. FIG. 114A illustrates center-oriented mode or function expansion or scaling up. FIG. 114B illustrates center-oriented mode or function collapsing or scaling down. FIG. 115A illustrates center-oriented scaling up of an icon. FIG. 115B illustrates center-oriented scaling down of an icon. FIG. 116A illustrates an example of center-oriented icon scaling up with a twisting motion. FIG. 116B illustrates an example of center-oriented icon scaling down with a twisting motion. FIG. 117A illustrates an example of center-oriented unfolding and expansion outward of an icon. FIG. 117B illustrates an example of center-oriented folding and collapsing inward of an icon. FIG. 118A illustrates an example of text vertically sliding into the display, where the text is revealed by unmasking FIG. 118B illustrates an example of text horizontally sliding in from the left to the right of the display. FIG. 118C illustrates an example of text horizontally sliding in from the left to the right of the display within a masked region (e.g. a contextual overlay). FIG. 119A illustrates a horizontal slide transition from right to left for content or an icon. FIG. 119B illustrates a horizontal slide transition from right to left, with fading effects; the icon or content exiting the screen fades out gradually once it reaches the screen's border, and the icon or content entering the screen fades in gradually as it crosses the screen's border. FIG. 119C illustrates an example of a horizontal slide transition from right to left with scaling effects; the content or icon exiting the screen is shrunk down, and the content or icon entering the screen is scaled up to full size.

Figure 121A:
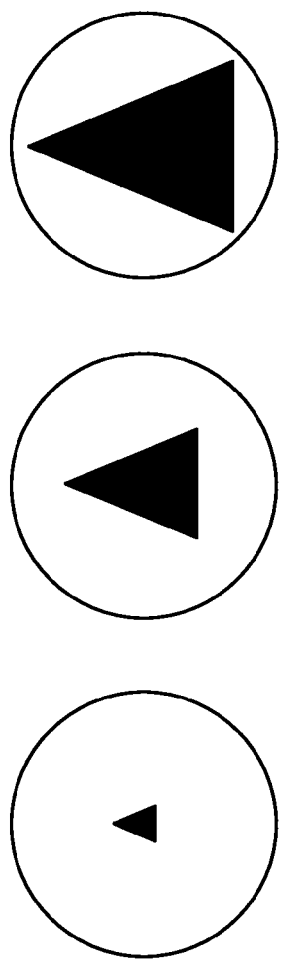
FIGS. 121A-121B illustrate example visual transition effects in a graphical user interface of a device.
Figure 121B:
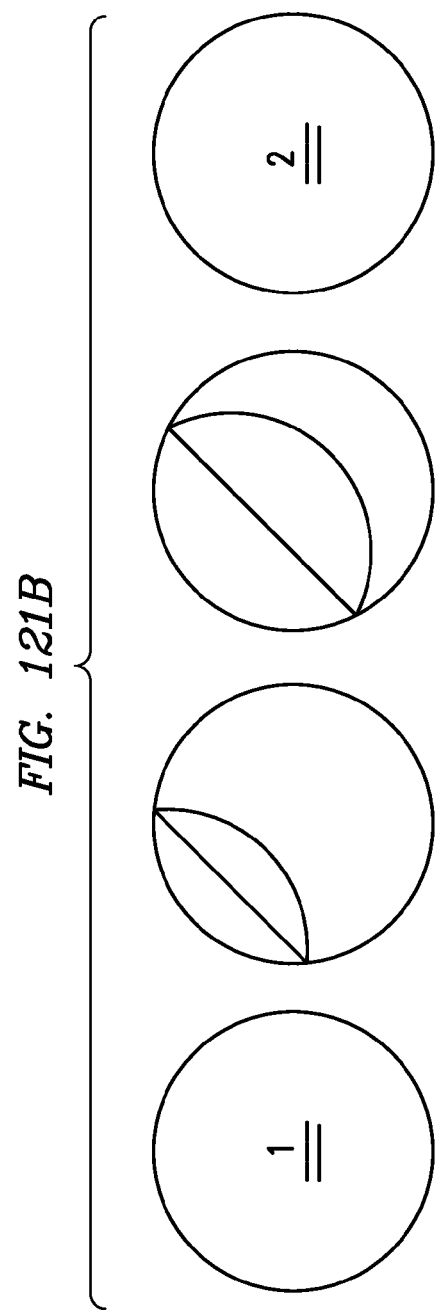

In particular embodiments, a user's rotation of the outer ring may trigger visual transition effects including zooming, directional sliding, blurring, masking, page folding, rotational movement, and accelerated motion. FIG. 120A illustrates an example of a transition in response to a low-acceleration rotation of the outer ring. In this example, a single rotational increment may correspond to a single item, such that one turn (e.g. rotational increment) counterclockwise causes the next element (e.g. icon or content item) to enter the screen from the left toward the right, and no scaling of elements occurs. FIGS. 120B-120C together illustrate an example of a transition in response to a high-acceleration rotation of the outer ring. In this example, a single turn (e.g. rotational increment) counterclockwise causes the GUI to pan quickly through multiple elements (which may scale down in size, enter the screen from the left, and exit the screen from the right) until the user stops turning the ring. When the user stops turning the outer ring, the element may scale up to normal size, and a single icon or content item may fill the display. FIG. 121A illustrates an example of a transition within the GUI in which content is zoomed-in in response to rotation of the outer ring. FIG. 121B illustrates an example of a transition within the GUI in which a first screen 1 "folds over" in an animation, resulting in a second screen 2 (e.g. for the next feature or content item) being displayed to the user.

In particular embodiments, the GUI of the device may include a physical model that takes into account motion of the user and produces visual feedback reflecting the user's movements. As an example, once there is activation input (e.g. in the form of a particular gesture) by the user, the user's motion may be continuously tracked through input from one or more of the sensors of the device. The visual feedback may reflect the user's motion in the user interface, while the underlying content stays still, so that gestures may be registered and parallax may be used to distinguish between UI features or controls and underlying content. In particular embodiments, the physical model may include a generalized spring model with damping. In such a model, items may be arranged in layers. Deeper layer may have a "stiffer" spring in the physical model holding items in place. This may cause bottom layers of the user interface to move slightly when the device is moved, while top layers may move more, creating a sense of parallax. Additionally, the spring model may include damping, which causes motion to lag, creating a more fluid, smooth motion. FIG. 122 illustrate an example of using a physical model in the GUI. The user wears the device 100 on her arm. Once the user moves her arm in a downward fashion, the icon 12210 displayed on the screen (e.g. a light bulb) moves in a manner reflecting the user's movement. The underlying content (e.g. the background image) on the screen does not move, however. This type of floating icon or menu item may, for example, be helpful when the display is of a size that does not allow for many icons or menu items to be displayed simultaneously due to visual crowding. Additionally, this type of floating behavior may also be used with notification means for presenting an event to the user.

Figure 123:
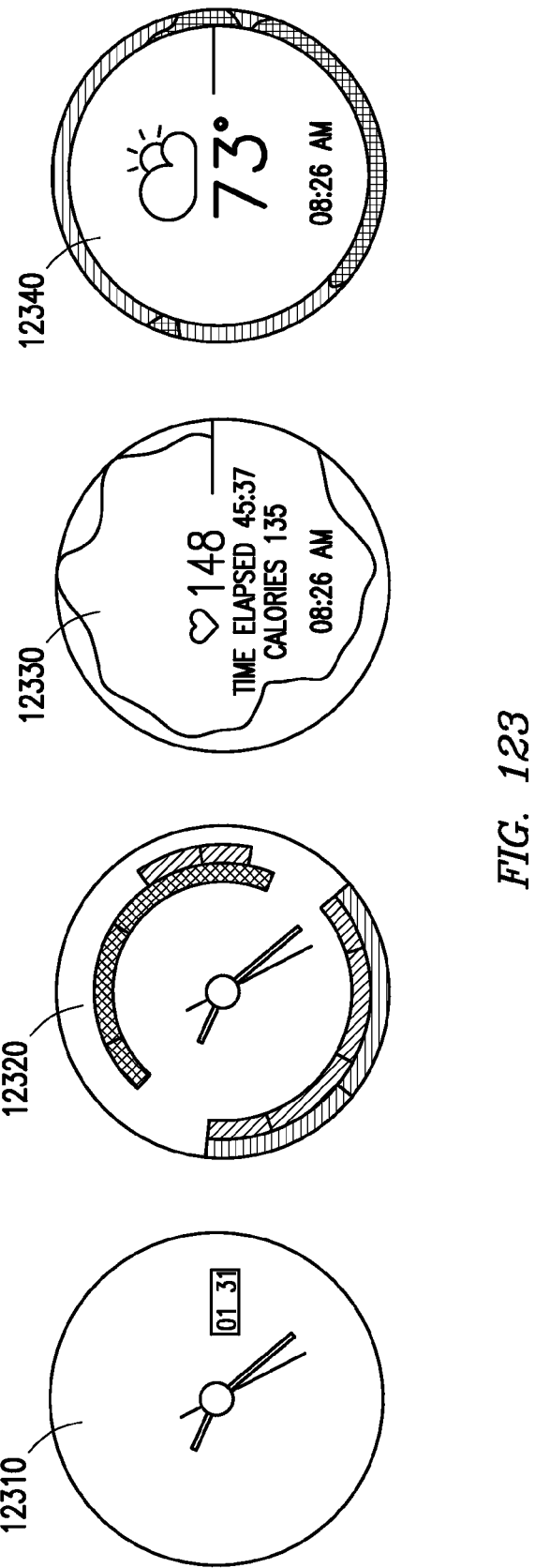
FIG. 123 illustrates example screens of a graphical user interface of a device.
Figure 124:
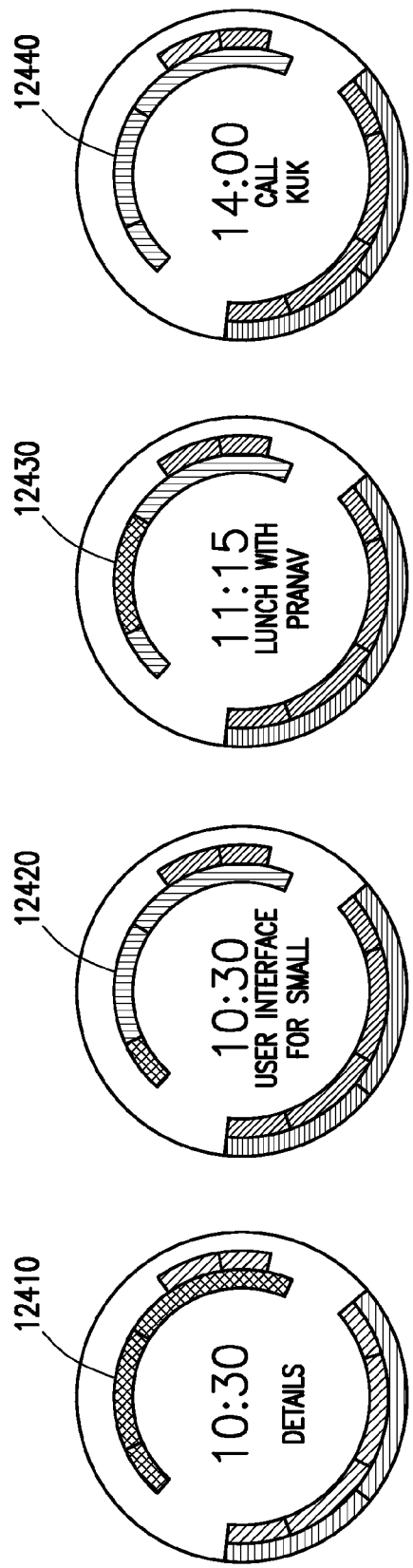
FIG. 124 illustrates example screens of a graphical user interface of a device.

In particular embodiments, the GUI of the device may include faces as default screens or wallpapers for the device, and these faces may be part of an interaction and transition model hierarchy (e.g. in the top layer of the hierarchy or as a home screen). As described herein, these faces may be changeable applications or modes that may automatically respond contextually to a user's activity. As an example, the faces may change depending on the user's environment, needs, taste, location, activity, sensor data, gestures, or schedule. The availability of a face (or the transition in the GUI from one face to another) may be determined based on contextual information. As an example, if the user has an upcoming event scheduled in her calendar, the face of the device may change to a calendar face that displays the upcoming event information to the user. As another example, if the user is determined to be in the vicinity of her home (e.g. based on GPS data), the face of the device may change to a face associated with a home-automation application. As yet another example, if the user is determined (e.g. based on various biometric sensors such as heart rate or arousal sensors, or based on accelerometers) to be moving vigorously, the face of the device may change to a fitness mode, showing the user's measured pulse, calories burned, time elapsed since the activity (e.g. a run) began, and the time. Any suitable sensor data (e.g. from sensors including biometric sensors, focus sensors, or sensors which may determine a user's hand position while driving a car) may be used to determine a context and appropriate face to display to the user. The user's historical usage of the device (e.g. a particular time of day when the user has used a fitness application, such as in a fitness class) may also determine which face is displayed on the device. As an example, the device may anticipate the user's need for the fitness mode at the particular time of day when the user tends to exercise. Contextual faces may also be associated with the suppression of notifications (e.g. if the user is determined to be driving or if the device is not being worn) or a change in how notifications are expressed (e.g. visually, or audibly). In particular embodiments, the faces of the device need not be associated with any application on the device and may be wallpapers or backgrounds on the display of the device. Faces may be dedicated to specific channels of information (e.g. calendar feeds, health or activity feeds, notifications, weather feeds, or news). As an example, a severe weather notification or alert (received, e.g., from a weather feed) may cause the weather face to be displayed on the display along with the notification. Faces may display the time (e.g. in analog or digital format) regardless of the type of face. The faces may be customizable by the user. The user's customizations or tastes may be input explicitly by the user (e.g. to management software on the device or a paired device) or learned directly by the device (e.g. using sensor and usage data to create a model over time). FIG. 123 illustrates example faces, including an analog watch 12310, an analog watch with a circular menu layout 12320, a health-mode face 12330, and a weather face 12340. FIG. 124 illustrates an example set of faces 12410-12440 for the device in which calendar and appointment information is displayed.

In particular embodiments, the device may be worn on a limb of a user (without obscuring the user's face and without requiring the user to hold the device) and may include augmented reality (AR) functionality. This AR functionality may be based on the use of body motion for aiming a camera of the device, which may allow for aiming with higher accuracy due to a user's sense of proprioception. This type of system may allow the user of the device to view an object in the real world at the same time that the user views a version of the object (e.g. captured by a camera of the device) on the display. An example of this AR capability is illustrated in FIG. 16. Such an AR system may allow for "see-through" capability using an aligned camera and sensor on opposite sides of a user's limb. Various AR applications may be enabled by this type of arrangement, described herein. In particular embodiments, applications may be designed specifically for the device to allow for immediate, opportunistic use. Additionally, a delegation model may be provided on the device, allowing for the use of external resources to improve the breadth of applications available to run on the device while incurring less (or no) penalty in terms of processing requirements or energy use. In particular embodiments, the device may control or be controlled by other devices (e.g. nearby devices discovered via a network and communicatively paired with the device). This type of control may be achieved via proximity, gestures, or traditional interfaces. Pairing may be achieved using a variety of technologies including a camera of the device, discussed in further detail herein.

Figure 125:
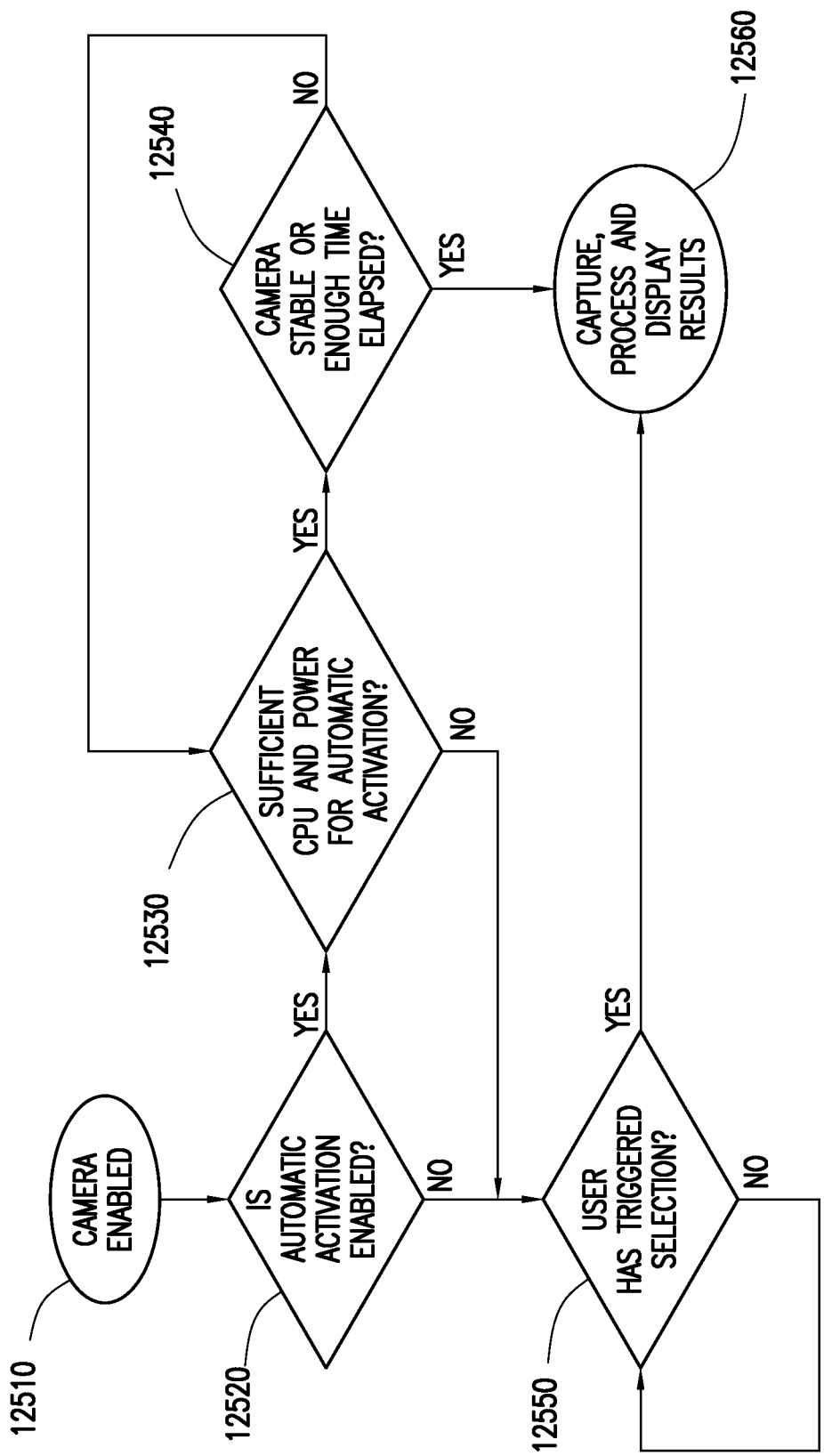
FIG. 125 illustrates an example method for automatic camera activation in a device.

FIG. 125 illustrates an example of an automatic camera activation decision flow for the device. In particular embodiments, whether the camera is enabled and whether automatic activation of the camera (e.g. for object recognition) is enabled may depend on the application or mode the device is currently in. In particular embodiments, automatic camera activation may be enabled on the device 12510. If this feature is enabled (determined at step 12520) and if there is sufficient CPU capacity and power available on the device (e.g. to calculate features of interest from an image, determined at step 12530), then a camera of the device (e.g. an outward-facing camera) may automatically capture, process, or display 12560 one or more images if the camera is held steadily in an aiming position by the user for a pre-determined amount of time (e.g. as detected by an inertial measurement unit on the wearable device or as calculated by the blurring of the image, determined at step 12540). In other embodiments, the camera may be activated and searching for images at all times. In yet other embodiments, the camera may capture an image and perform feature recognition only if the user manually triggers image capture (e.g. pressing or clicking the outer ring, or tapping the display, determined at step 12550). In particular embodiments, when the camera is activated (by any suitable method), augmented reality (AR) functionality may be enabled. The AR functionality may be automatically enabled (depending, e.g., on CPU capacity and power available on the device). In other embodiments, AR functionality may be explicitly enabled by the user via any suitable input by the user. The user may, for example, provide touch input on the display to enable AR functionality. As an example, a user may capture an object such as a bird (e.g. by pointing a camera of the device at the bird), and the user may touch the image of the bird as displayed on the display. This action may enable the AR functions of the device, causing, for example, the device to recognize the bird as an object and return information about the bird to the user. In other embodiments, as described herein, the user may perform one or more gestures to enable AR functionality, as well as to perform tasks using AR functionality (e.g. using a "virtual" keyboard by performing typing gestures in view of a camera of the device).

In particular embodiments, if the device does not have the capability to calculate features of interest itself, the device may capture an image, transfer the image to a communicatively coupled device (e.g. a nearby device such as a phone or personal computer) or to an Internet-based service, where the features of interest may be calculated remotely. Once the features of interest are determined, an Internet-based service or local data catalog may be consulted for additional information about a recognized object. If information is found, the relevant data may be displayed to the user on the device along with the recognized feature.

The device may, in particular embodiments, have a small form factor and be constrained in terms of available memory, processing, and energy. A delegation model may allow the device to delegate portions of one or more processing tasks (e.g. tasks related to AR functionality) to nearby devices (e.g. phone or personal computer) or to network- or Internet-based services, for example. As an example, for delegable tasks, the application requiring the task provides the system (e.g. a kernel of an operating system of the device) with characteristics or a profile of the task, including the task's latency sensitivity, processing requirements, and network payload size. This may be done for each delegable subtask of the overall delegable task. Since tasks are often pipelined, contiguous chunks of the task pipeline may be delegated. The system may, in particular embodiments, take measurements of or build a model of one or more characteristics of the device. Characteristics of the device may include static properties of the device, e.g. properties of hardware components of the device including total memory installed, maximum CPU speed, maximum battery energy, or maximum bandwidth of a network interface. Characteristics of the device may also include dynamic properties of the device, e.g. operating properties of the device including available memory, current CPU capacity, available energy, current network connectivity, availability of network-based services, a tally of average user behavior among one or more users, or a predicted or expected processing time of a task (e.g. given a particular usage scenario). In particular embodiments, the device may have a model that incorporates previous and current measurements of device characteristics to aid in determining future device behavior. Based on the task characteristics or profile and these measurements or models, as well as based on whether the task may be executed on the device, the system may delegate (or not delegate) one or more portions of the task or task pipeline. For example, if the available memory on the device cannot support the processing of a task (e.g. playing a video), one or more portions of the task may be delegated. As another example, if the CPU capacity of the device cannot support processing a task (e.g. if the CPU is running at capacity due to its existing load), one or more portions of the task may be delegated. As another example, if a battery level of the device is low and the battery is not expected to provide energy to the device for as long as the expected processing time of the task, one or more portions of the task may be delegated. As another example, if the network connectivity of the device is low or non-existent, one or more portions of the task may not be delegated (e.g. if the device also has enough available memory, CPU capacity, and energy). As another example, if one or more network-based services are available to the device (e.g. cloud-based services for processing) and the device has suitable network connectivity (e.g. good available bandwidth), one or more portions of the task may be delegated. As another example, if a user of the device typically (e.g. historically) delegates the playing of videos, one or more portions of the task of playing a video may be delegated. As another example, if a predicted processing time of the task (e.g. predicted based on a model incorporating previous and current measurements of device characteristics) is beyond a certain threshold (e.g. several minutes), the task may be delegated. Any suitable characteristics of the device (e.g. static or dynamic properties) in any suitable combination may be used to determine whether to delegate a task. Furthermore, any suitable characteristics of a task of the device (e.g. including a task profile or characteristics of the task including latency sensitivity, processing requirements, or network payload size) may be used to determine whether to delegate a task, either alone or in conjunction with device characteristics. Additionally, any model of the device (e.g. device behavior) may be used, either alone or in conjunction with device or task characteristics, may be used to determine whether to delegate a task. In particular embodiments, devices paired with the device may also include a delegation model, such that the paired device (e.g. a phone) performs the same steps, delegating tasks based on its own models of energy, connectivity, runtime requirements, and feasibility. The delegated task may be processed or run to completion on the paired device (e.g. phone), and the results of processing the delegated task may be returned to the device. In particular embodiments, the device may operate in standalone mode (e.g. without delegating any processing tasks) when it does not have any network connectivity or when no paired devices are in range of the device. Once the device regains connectivity, or when a device is paired with the device, delegation of tasks may resume.

Figure 126:
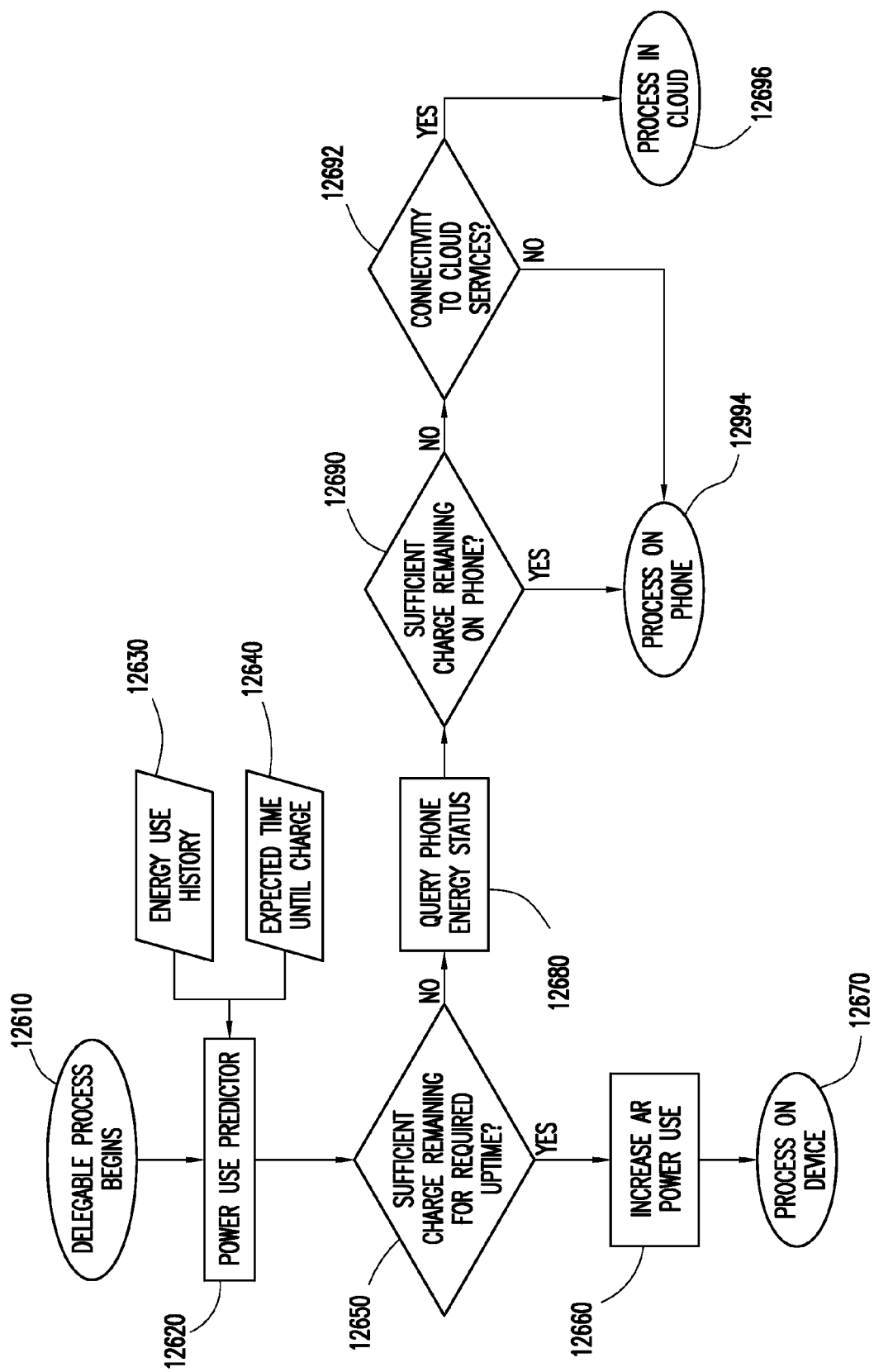
FIG. 126 illustrates an example method for delegation by a device.

An example algorithm of a delegation model of the device is illustrated in FIG. 126. In this example, a delegable task process begins on the device (12610). The system of the device performs a power use analysis and prediction (12620) (based, e.g., on the user's historical energy usage 12630 and the expected time until a charge of the device 12640). Based on this, the system determines at step 12650 whether there is sufficient charge remaining for the required uptime of the delegable task. If sufficient charge remains, the system of the device may increase the power usage 12660 and process the delegable task on the device itself 12670. If, however, the device does not have sufficient charge for the required uptime, the device may query a paired device (e.g. a phone) 12680 to determine the energy status of the paired device (12690). If, in the example of a phone, there is sufficient charge remaining on the phone for the required uptime, the task may be processed on the phone 12694. If, however, there is not sufficient charge on the phone, the system may determine at step 12692 if the device has connectivity to an Internet-based (e.g. cloud) or other network-based service. If not, the device may delegate the process to the phone 12694. If there is connectivity, the device may delegate the process to the cloud 12696, where the task is processed and the results later returned to the device. In particular embodiments, delegable tasks may be delegated by the device in a divided fashion to one or more paired devices (e.g. mobile phones or personal computers) or network/Internet services. That is, delegable sub-tasks of a delegable task or process may be delegated by the device to different locations.

It is contemplated by this disclosure that a delegation model for a particular the device (or for a family or range of devices) may be dynamic or contextual. As an example, a delegation model may take into account available memory, CPU capacity, and available energy of a particular the device (or a family of devices), factors which may all change over time. The delegation model may also take into account the availability of network- or cloud-based services (and the capacity of each), as well as network connectivity (e.g. bandwidth and latency), which may also change over time. For example, with reference to FIG. 127, according to a first delegation model 12710 (which may, e.g., be applicable for devices manufactured in the next year), most processing may be evenly divided between the device and a paired device (e.g. smartphone), with only a small amount of delegation to a server of a cloud-based service. According to a second delegation model 12720 (which may, e.g., be applicable for devices manufactured in a three-year timeframe), most processing may be handled locally by the device (e.g. due to predicted advances in memory, CPU, and energy capacity in a small form factor). In this second model, some processing may be delegated to a server (e.g. more than in the first delegation model, due to improved network connectivity) and only a small amount of delegation may occur to the locally paired device. According to a third delegation model 12730 (which may, e.g., be applicable for devices manufactured in a five-year timeframe), all or almost all processing tasks may be evenly divided between the device and a server of a cloud-based service, with no or almost no processing being delegated to a locally-paired device. Any number of delegation models may be created, as the factors taken into account by a delegation model are dynamic. As an example, all or almost all tasks may be performed locally on the device according to one delegation model, and all or almost all tasks may be delegated by the device in another delegation model.

The device may choose to delegate functionality to a paired processing-rich device (e.g. phone, computer, tablet, television, set-top box, refrigerator, washer, or dryer) or to the Internet based on the energy reserves or connectivity bandwidth to each of these locations. For example, a device with a powerful processor may delegate to the paired device when low on energy, or it may choose to delegate to the Internet service when the paired device does not have sufficient power reserves. Likewise, the system of the device may choose to process locally if the connection to the Internet is showing higher latency to reduce the size of the data transfer.

In particular embodiments, an entire application or a portion of an application may be delegated by a user of the device to a paired device or vice versa. This may occur on a per-application basis. When the application on a target device (e.g. a television) is to be delegated to the device, the target device may send a request over the paired connection (possibly via an intermediary device, such as a smartphone or personal computer) to load the application on the device. The device may then act as a client to a server running on the paired device (e.g. television). Similarly, an application running on the device may be delegated to the paired device (e.g. a video playing on the device may be delegated to playing on a paired television). For example, if the device is running a first application, and a user of the device wants to interact with a second application, the device may automatically delegate a task of the first application to be processed by another device (e.g. a paired television).

Figure 128:
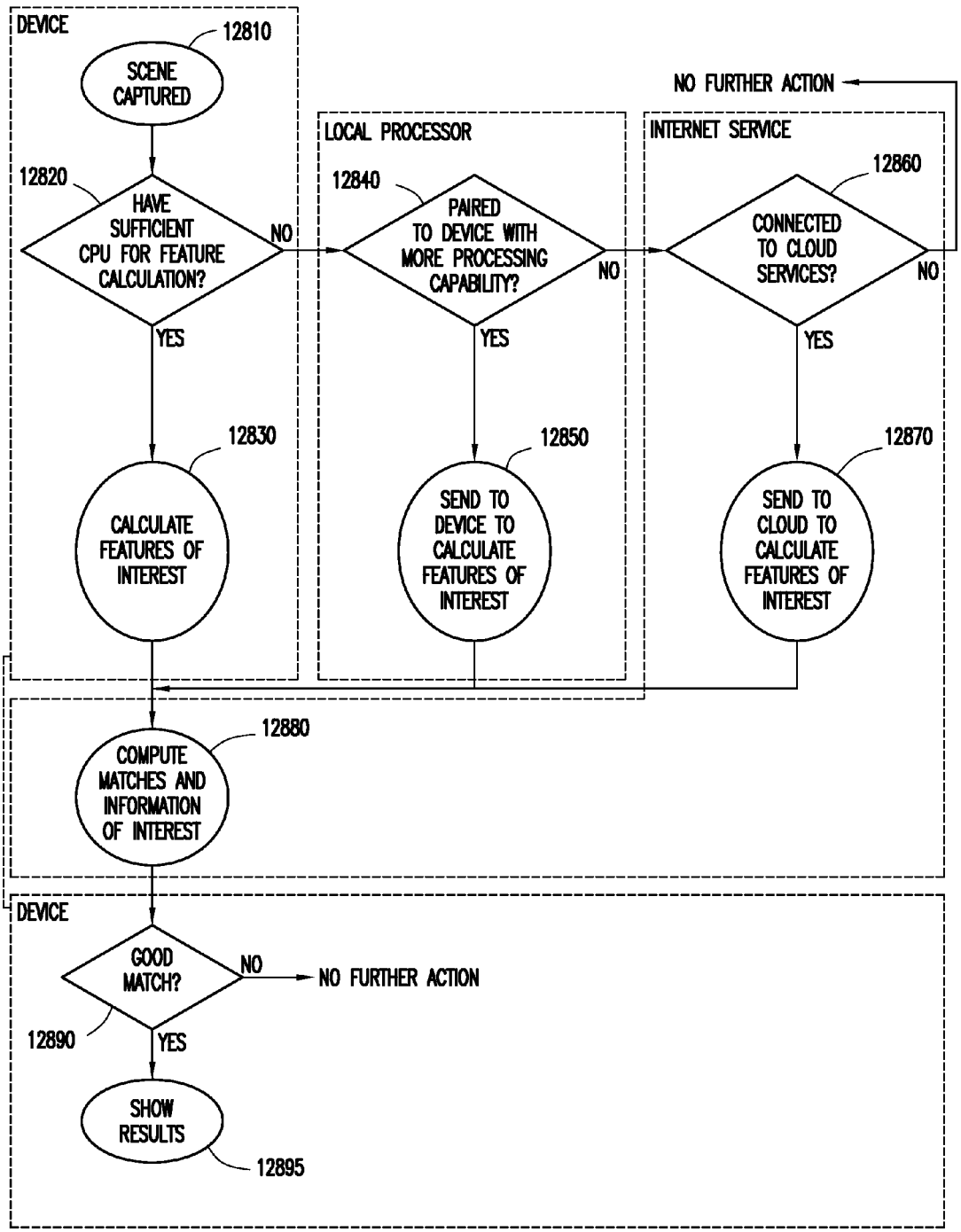
FIG. 128 illustrates an example method for delegating by a device.
Figure 129D:
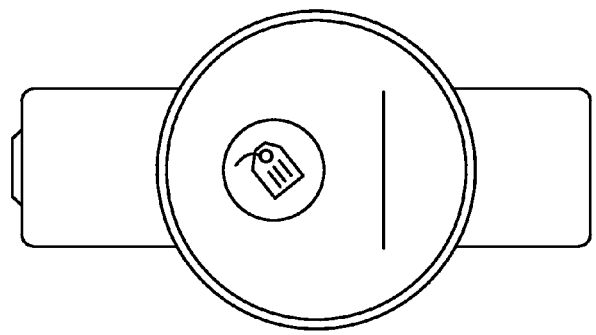
FIGS. 129A-129D illustrate example modes of a device.
Figure 129C:
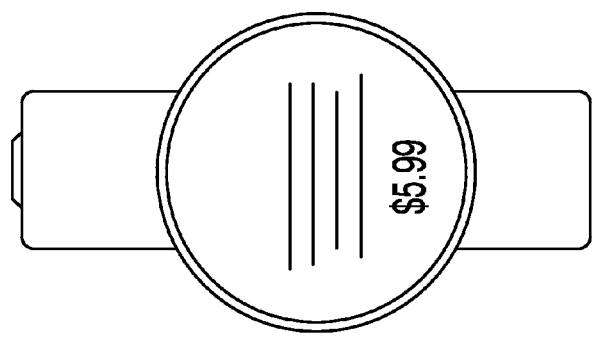
Figure 129B:
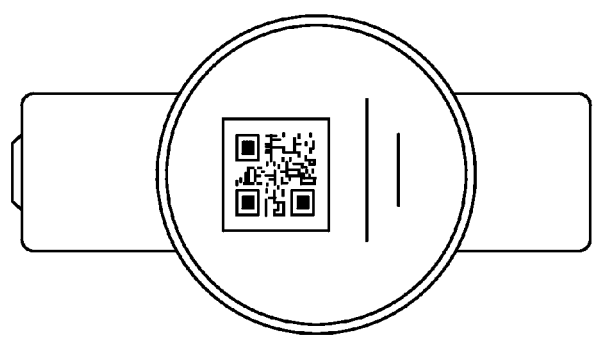
Figure 129A:
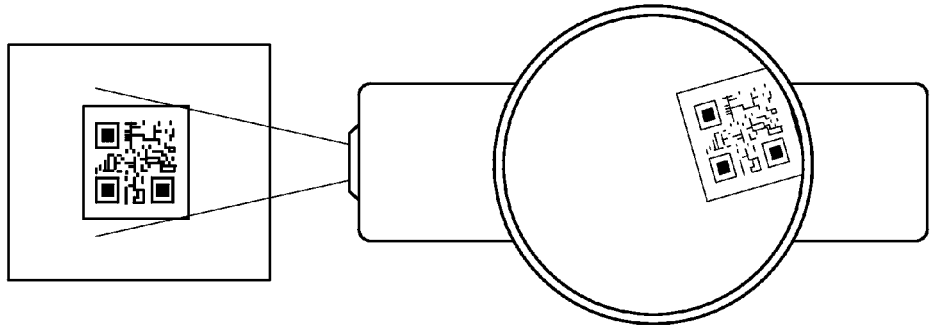

FIG. 128 illustrates an example of a decision flow in the device operating according to a delegation model. In this example, an image-capture application is running on the device. A scene is captured on the device 12810, and the device determines 12820 if it has sufficient CPU capacity for image feature calculations. If the device does have enough CPU capacity, it calculates the features of interest in the scene locally 12830. If the device does not have sufficient CPU capacity, it may first determine 12840 if it is paired communicatively with another device with more processing capability (e.g. a mobile phone or a personal computer). If it is paired with such a device, the device may send data to the paired device so the paired device may calculate features of interest in the image 12850. If the device is not paired with such a device, it may determine if it is connected to an Internet-based (e.g. cloud) service 12860. If not, the device performs no further action. If so, the device may send data to the cloud service so the service may calculate features of interest in the scene 12870. Features of interest may be calculated (wherever they are calculated) using any suitable algorithm including, for example, SURF. In this example, the features of interest may be compared to a local catalog or an Internet-based service to determine whether any matches are found (and if so, relevant information of interest) 12880. If a match is found 12890, the result may be presented to a user on the device 12895. If no match is found, no further action is taken.

In particular embodiments, a camera or other optical sensor of the device may be used to recognize any gestures performed by the user (e.g. in the space between the camera and a target in the real world). These gestures may, for example, be used to act upon the data presented (e.g. the real world target, such as a sign including text) or may be used to point to particular items upon which augmented reality functions may be performed. For example, the user may point to a word on a sign, causing the device to translate it and display the translation to the user. FIG. 17 illustrates two examples of images captured by a camera of the device. In one example, a truck 1725 and the hand 1720 of a user of the device are both within the angle of view of a camera 1705 of the device and displayed by the device (shown at 1710). As such, gestures performed by the user upon the truck may be recognized by the device and processed by device to provide, for example, AR functionality. In the second example, only the truck is within the angle of view of the camera (shown at 1715), and as such, gestures performed by the user are not captured or recognized by the device. Gesture recognition may also be delegated by the device.

In particular embodiments, objects or images may be recognized by the device when they are within the frame of view of a camera of the device. As described herein, there may be multiple ways for the device to recognize an object. As one example, a gesture performed by the user (e.g. a pointing gesture indicating a particular object) may enable AR functionality on the device and cause the device to recognize the object. As another example, automatic object recognition may occur when, for example, the user positions the camera for a certain amount of time on a particular object (e.g. a section of text). As a third example, object recognition or AR functionality may be enabled explicitly by the user when, for example, the user taps or touches the display (or, e.g., clicks the outer ring) when the camera of the device has captured an object of interest. Global object recognition may, in some instances, be computationally intensive and error-prone. As such, in particular embodiments, a limiting set (e.g. the pages of a magazine or catalog or a catalog of a particular type of object such as plant leaves or book covers) may be applied to improve accuracy. There exist a number of choices for calculation of feature vectors from images, which the designer of the system for the device may select from. In some instances, the conversion of feature vectors between different approaches may be computationally expensive, so that the choice of the database of possible matches is replicated on the device. The calculation of feature vectors may be delegated, as described herein.

In particular embodiments, barcodes of various types may be recognized by the device. These barcodes may be used to query Internet-based services for additional data, as well as options to purchase, review, or bookmark the barcoded item for future review. While two-dimensional barcodes may generally be read directly, the system of the device may offer an addition close-focus mode for particularly small or one-dimensional barcodes to improve recognition rate. Should the system lack the ability to decode the barcode, it may simply focus the camera, take a picture, and delegate recognition to a remote service, as described herein. FIGS. 129A-129D illustrate an example of barcode recognition mode. The device may be pointed at an item (129A), recognize the item (129B), display additional information obtained from the Internet about the item (129C), and provide the user an interface to purchase the item (129D).

Figure 130:
FIG. 130 illustrates an example mode of a device.

In particular embodiments, the device may perform translation. Translation functionality may be divided into two portions: optical character recognition (OCR), and translation of recognized characters, words, or phrases. OCR may be completed on the device or delegated (e.g. to a paired processing device) to reduce the amount of data to be translated by the device. Simple word translations may be performed on the device or delegated (e.g. to a paired processing device). As with other functionality described herein, part or all of the recognition or translation process may be delegated as needed. The user may optionally use a gesture to indicate the word to be translated, as shown in FIG. 130 (e.g. the word "Warning"). Since individual words may be circumscribed by white space, the system may segment the word before attempting translation. Additionally, if the device can perform OCR with low latency, it may show the text to the user so that the user knows when the device is targeting and correctly recognizing the correct text. If automatic OCR is enabled, then the device may automatically identify images in the angle of view of an outward-facing camera and present on the device display information about the identified images. If automatic translation is enabled, then the device may automatically translate text in the angle of view of the outward-facing camera and present the translated text on the device display.

FIGS. 131A-131D illustrate examples of the device operating in various augmented reality modes described herein, including barcode recognition mode (131A), image recognition mode (131B), OCR and translate mode (131C), and object recognition mode (131D).

Figure 132:
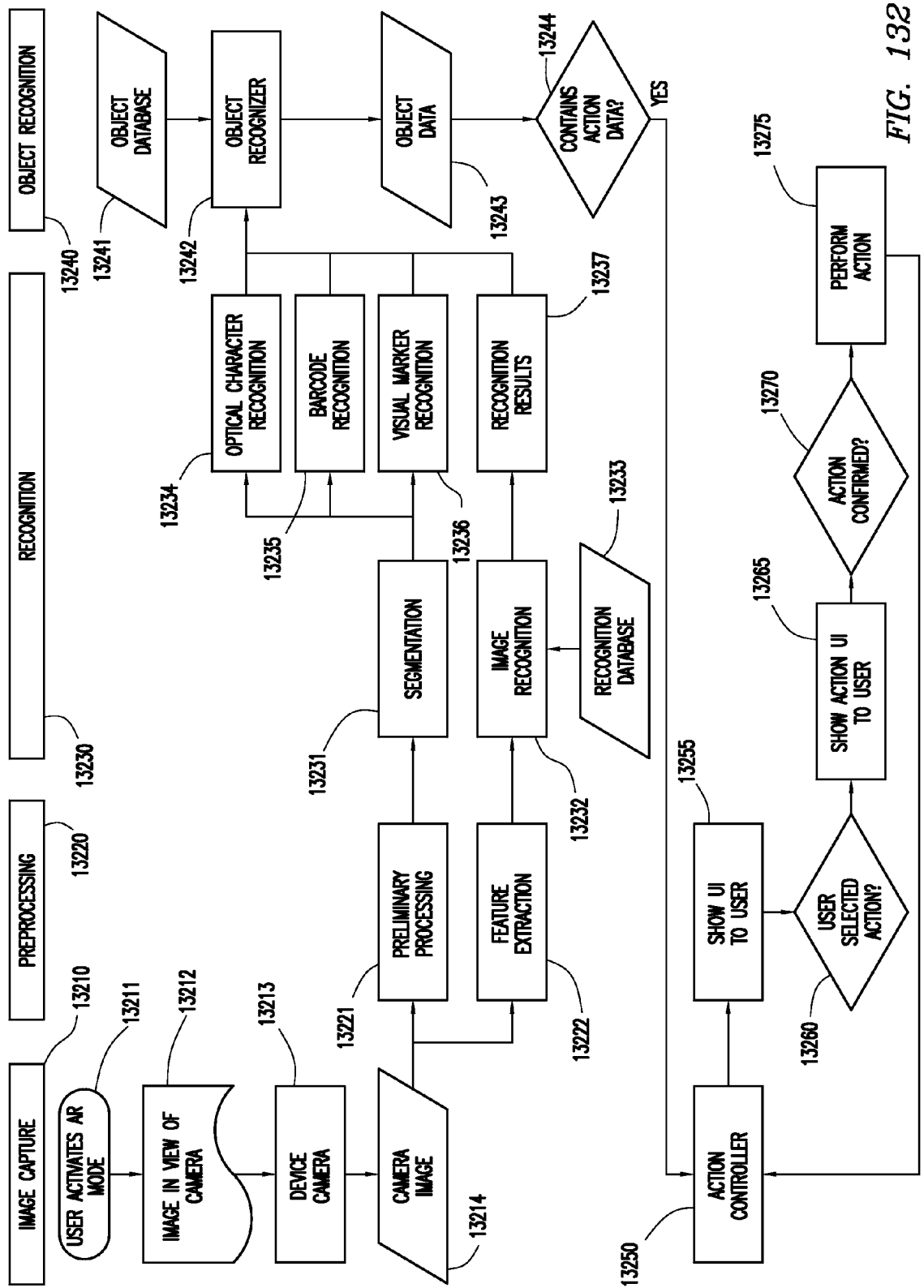
FIG. 132 illustrates an example method for providing augmented reality functions on a device.

FIG. 132 illustrates an example of the overall flow of actions for an augmented reality system for the device. Although this example illustrates an image capture application, any suitable task or process on the device may follow a similar flow. Additionally, any task after the device captures an image and before the device displays results to the user may (as suitable) be delegable by the device. In this example, an image from a camera of the device is captured (in the image capture section 13210), pre-processed (in section 13220), features are extracted and recognized to produce image recognition results (in section 13230), and any objects may be recognized (in section 13240). Object data may be formatted for action by a user of the device. The user may activate the augmented reality mode of the device 13211 (e.g. via a user gesture or pointing the camera of the device at an object for a pre-determined amount of time), and an image in the view of the camera 13212 may be captured (e.g. based on a trigger event such as a user input or automatic camera activation) by device camera 13213 to produce a camera image 13214. At this point, the pre-processing stage 13220 may be entered. Pre-processing 13220 may, for example, include contrast enhancement, grayscale conversion, sharpening, or down-sampling. In particular embodiments, the camera may operate in a general augmented reality mode in which anything in front of the camera may be processed and recognized. In other embodiments, the camera may operate in specific modes (e.g. OCR, barcode, or visual marker) and recognize only particular items when in such a mode. In particular embodiments, if it is determined that the image may include known shapes, symbols, or organizations of shapes or symbols (e.g. if the camera or device is in OCR mode, barcode mode, or visual marker mode), AR image processing may proceed on a first path. This first path begins with preliminary processing 13221, proceeds to segmentation 13231 (which may, for example, determine symbol or symbol group boundaries such as letters or words), and commences with one or more of optical character recognition 13234 (e.g. if it is determined the image may contain characters, determining what those characters are), barcode recognition 13235 (e.g. if it is determined the image may contain a barcode, recognizing the barcode), or visual marker recognition (e.g. recognizing other types of visual markers) 13236 (e.g. for all other types of visual markers). The results of this first path are sent to object recognizer 13242. In particular embodiments, if it is determined that the image may include features that are not necessarily known, AR image processing may proceed on a second path. The second path begins with feature extraction 13222 (e.g. in which the presence of edges or lines, changes in angles of lines, edges, points of interest, or patterns. are detected in the captured image). The second path proceeds to image recognition 13232, in which the features of the image are compared with feature data from a recognition database 13233 (which may, for example, reside on the device, on a locally-paired device, or on a remote server or computer). The results of the image recognition comparison are provided 13237 and sent to the object recognizer 13242. In the object recognition section 13240, the first and second paths converge at the object recognizer 13242. Here, results from an object database 13241 are used to recognize objects (e.g. that a phone recognized using the image recognition database 13233 is a particular brand and model of phone).

Object data 13243 about the object recognized by recognizer 13242 (e.g. the price of the model of phone recognized, or where the phone may be available for purchase) may be provided. For text, there may be definitions or translations that occur and are displayed to the user. For barcodes, there may be product information and links to buy the recognized object that are displayed to the user. In particular embodiments, the data may be purely descriptive (e.g. the price of the phone) or may be active (e.g. a link where the user may purchase the phone). If the data includes action data 13244, then an action controller 13250 (which controls, formats, and outputs a GUI for the user of the device) may show a UI to the user 13255 including the active data (e.g. the link for purchasing the phone). If the user selects an action 13260 (e.g. clicking the link), then the action controller shows the action UI to the user 13265 (e.g. opening of the link), and if the action is confirmed 13270, then the action (e.g. the actual opening of the webpage associated with the link) is performed 13275.

Figure 133:
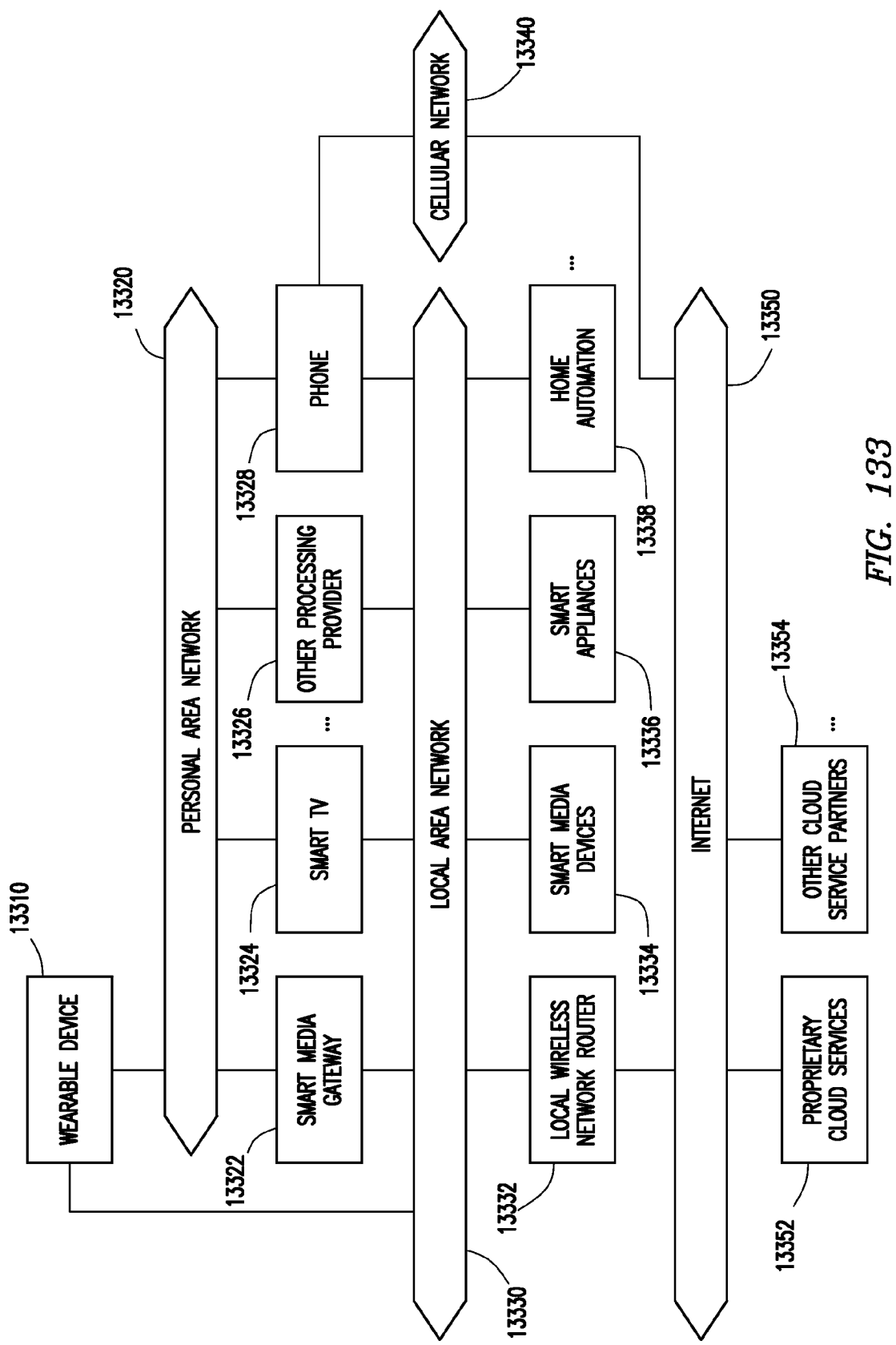
FIG. 133 illustrates an example network environment in which a device may operate.

FIG. 133 illustrates an example of a network environment. As described herein, in particular embodiments, the device 13310 may be paired with other devices (e.g. nearby devices). The device may connect directly to a personal area network 13320 (which may bridge via other devices on the same network to a local area network), or the device may connect to a local area network 13330 directly. The personal area network may include, for example, non-WI-FI radio technology, such as BLUETOOTH, NFC, or ZIGBEE. The personal area network may, for example, include a smart media gateway 13322 (e.g. a media server), a smart TV 13324, another processing provider 13326, or a phone 13328. Phone 13328 may allow the device to connect to a cellular network 13340, and from there to the Internet 13350. The local area network 13330 may include, for example, WI-FI with or without authentication. The local area network may, for example, include a local wireless network router 13332, smart media devices 13334, smart appliances 13336, and home automation technology 13338. The local area network may, in turn, connect to the global Internet 13350 via, for example, local router 13332 that connects to an Internet service (e.g. a proprietary cloud service 13352 or other cloud service partners 13354). Some devices may be reached by the device either via direct access (e.g. through the personal area network) or through the local area network. Those devices reachable by the device may be paired with the device and may be controlled by the device or control the device. The device may connect to the personal area network or the local area network using, for example, any suitable RF technology. As shown in FIG. 133, pairing to a target device in the periphery may first occur over the RF network. This allows the device to know what is "nearby". This may happen over the personal area network (e.g. an ad-hoc or peer-to-peer network), or may use a mediated network such as 802.11 wireless (e.g. the local area network). Once a neighborhood is established, the device may request that nearby devices enter pairing mode. This may be done either directly or via a paired processing device with a greater gamut of connectivity options, such as a mobile phone. Once the target devices have entered pairing mode, they may exhibit their pairing signals. For example, devices with displays may show a visual tag on their display, while others may enable an NFC tag allowing for a scanner to identify them. Other approaches such as selection from a list or by pin code may also be used. Once a device is uniquely identified as a pairing target, the device may exchange a security token with the target device to finalize the pairing.

Figure 134:
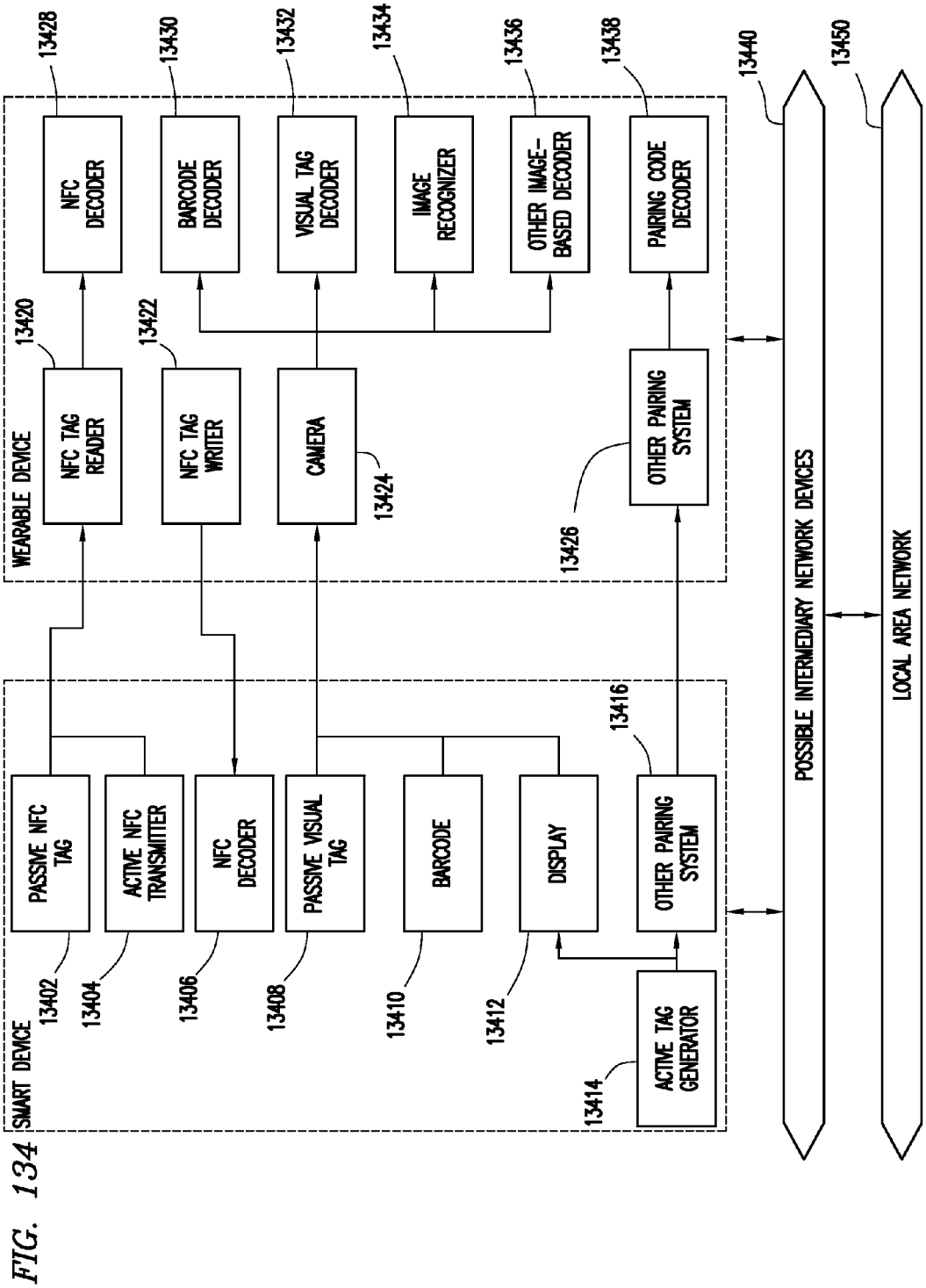
FIG. 134 illustrates an example of pairing between a device and a target device.

FIG. 134 illustrates an example of different types of pairing technology that may be used to pair a target device with the device. The target device, which may be a smart device such as a phone, may include passive NFC tags 13402 or active NFC transmitters 13404 (which may be recognized by a NFC tag reader 13420 and NFC decoder 13428 of the device); an NFC decoder 13406 (which may recognize NFC tags written by the NFC tag writer 13422 of the device), passive visual tags 13408 (e.g. stickers), barcodes 13410, or other display information 13412 (which may be recognized by a camera 13424 of the device); or other pairing system 13416. An active tag generator 13414 of the target device may create the display information 13412 or provide information to the other pairing system 13416 of the target device (which is recognized by a mirror pairing system 13426 with pairing code decoder 13438 of the device). The device may write data to NFC tags (e.g. with an NFC tag writer 13422) to transmit this data to other target devices that may be paired to the device. Tags written by the device may be recognized by NFC tag decoders 13406 on a target device. The device may include any of a number of decoders including barcode decoder 13430, visual tag decoder 13432, image recognizer 13434, or other image-based decoder 13436 (e.g. a decoder for QR codes, logos, or blink patterns of LEDs), all taking input from camera 13424 of the device. After the device receives and recognizes pairing information, it may decode (e.g. through a variety of decoders) the relevant information to proceed with pairing with the target device. In particular embodiments, pairing may be achieved using motion—a motion-sensitive target device (e.g. mobile phone or remote) may be paired with the device by holding and moving the target device in the same hand as the device (e.g. if both devices include accelerometers, the similar pattern of motion may be detected and used to pair the devices). As another example, a fixed target device may be paired with the device by, for example, tapping the fixed target device with a random pattern while holding the fixed target device in the same hand as the device (e.g. if both devices include touch detection, the similar pattern of tapping may be detected and used to pair the devices). Additionally, pairing may be done using audio—if the device and a target device both have audio reception capabilities, a user may make a sound (e.g. say a phrase) that both devices detect and then set up a pairing. Any suitable technology (including, e.g., augmented reality functions) of the device may be used to pair with and control local devices. The device and target device may each connect to other possible intermediary network devices 13440, and also to a local area network 13450.

Figure 135:
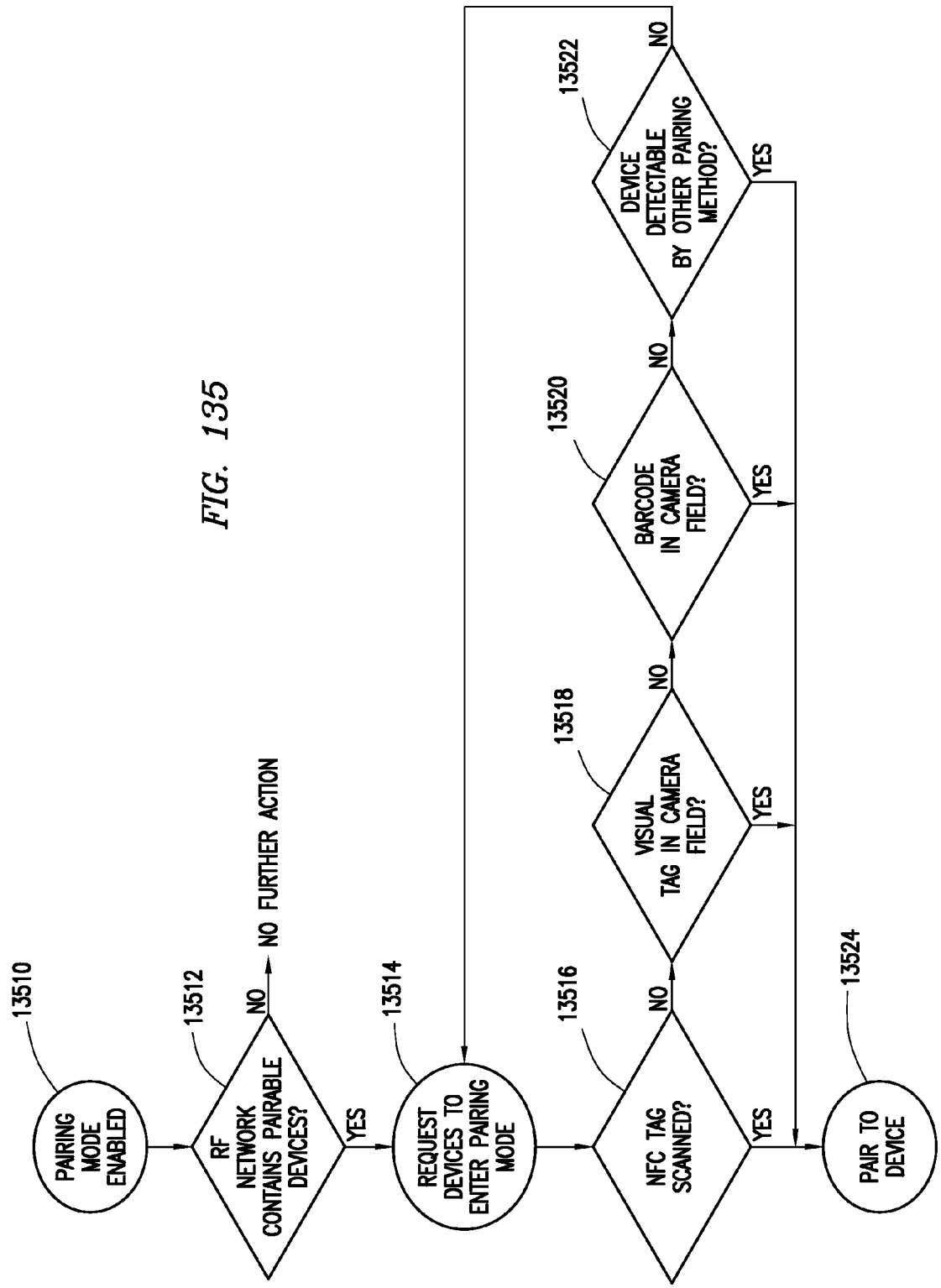
FIG. 135 illustrates an example method for pairing a device with a target device.
Figure 136:
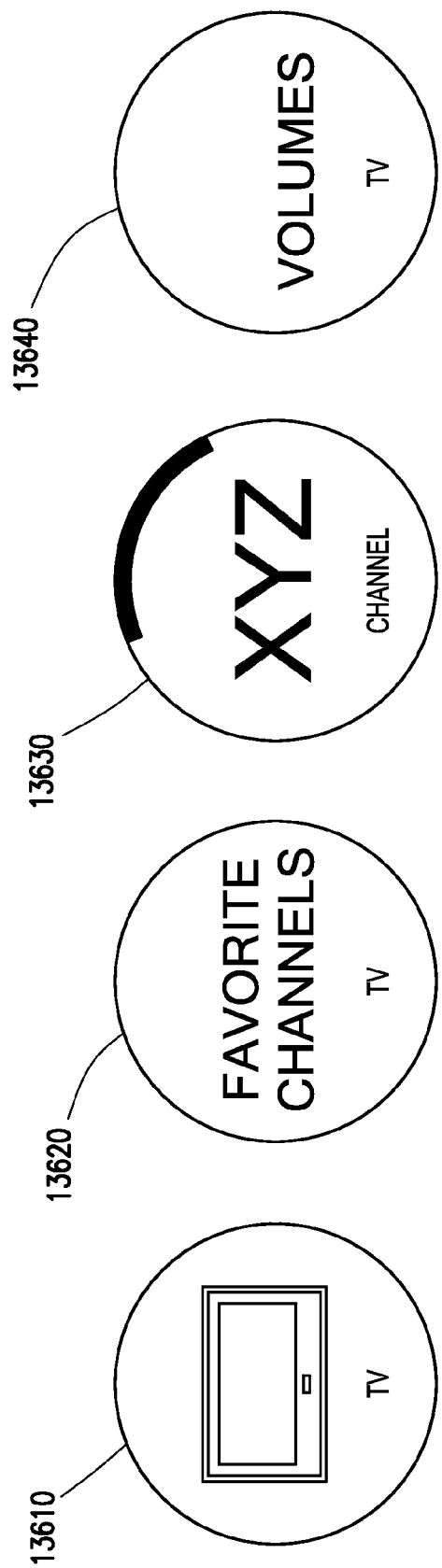
FIG. 136 illustrates example screens of a graphical user interface of a device.

FIG. 135 illustrates an example process for pairing a target device (e.g. using any of the methods described herein) with the device. Once pairing mode is enabled 13510, the device determines if the RF network contains pairable target devices 13512. If not, no further action is taken (e.g. the device may continue to scan periodically). If so, the device may request that the pairable devices enter pairing mode 13514. The device may then proceed (in any order, or in a parallel fashion) to scan, via different available technologies, for available target devices. These may include NFC tag scans 13516, visual tag scans in the camera's angle of view 13518, barcode scans in the camera's angle of view 13520, or any other method 13522. If a target device is detected via one of these methods, the target device is paired to the device 13524. Once the pairing has occurred, the device may show menu items to the user for controlling the paired device(s). The device may allow for both visual and motion-based gestural control of the paired devices. For example, the user may gesture (e.g. wave her hand) to change channels on a paired television, or may make a pinching gesture to transfer video media from the device to a paired display (using, e.g., AR functionality). Device control mediated over an RF network may be both local and securable. FIG. 136 illustrates example controls enabled on the device for a paired and controlled television including an active ON/OFF icon 13610, favorite channels 13620, a current channel display 13630, and volume 13640. As described herein, any suitable input from the user may be used to control functionality of a paired device. For example, gesture input, click or press input, or touch input may be used, for example, to change channels, adjust volume, or control other functions of the paired television.

In particular embodiments, a pairing and control model for the device may include the following characteristics. The device may function as the host for an application that interacts with or controls one or more functions of a remote device (e.g. an appcessory such as a controllable thermostat). A smartphone (or other locally-paired device), which may have previously been the host for the application, may now function merely as a local target device to which the device may delegate certain functions related to the interaction or control of the remote device (e.g. longer-range wireless connectivity to the remote device, sending commands to the remote device, receiving data from the remote device, or processing tasks). Control of the remote appcessory device may be done by the device using any suitable means including, for example, visual means (e.g. using the camera) or motion-based gestures. In other embodiments, the locally-paired smartphone may continue to function as the host for the application that interacts with the remote appcessory, but the device may provide some or all of the user interface for data input and output to and from the application (e.g. a "light" version of the application hosted by the smartphone). For example, the user may control the application using the device, but the smartphone may still function as the host of the application.

In particular embodiments, the device may be operable with one or more services. These services may fall in categories including security, energy, home automation and control, content sharing, healthcare, sports and entertainment, commerce, vehicles, and social applications.

Example security applications include the following. The device may authenticate a user (who is wearing the unlocked device) to another device near the user (e.g. paired with the device). The device may be unlocked with a code entered by the user using any suitable input including, for example, rotating the outer ring of the device. As an example, while a user rotates (or presses or clicks) the outer ring, the display may show alphanumeric or symbolic data corresponding to the rotation (or press or click) by the user. If, for example, the user rotates the outer ring one rotational increment in a clockwise direction (or, e.g., clicks or presses the outer ring once), the display may show the user a "1," and if the user rotates the outer ring two rotational increments (e.g. within a certain period of time, such as a millisecond) in a clockwise direction (or, e.g., clicks or presses the outer ring twice), the display may show the user a "2." In particular embodiments, the display of alphanumeric or symbolic data corresponding to a rotation (or press or click) by the user may allow the user to unlock the device using the metaphor of a combination lock. The device may also be unlocked using biometric data (e.g. by skin or bone signatures of the user).

In an example energy application, the device may automatically display information about the energy consumption of the room or other location in which the user is located. The device may also be able to display information about the energy consumption of other paired devices and update all of this information dynamically as the user changes location.

In an example home control application, the user may select and directly control paired home-control devices using, for example, rotation of the outer ring or a gesture input.

The user may use gestures to control the sharing or transfer of content to or from the device (e.g. transferring video playing on the device to a paired television, as described herein). Additionally, auxiliary information (e.g. movie subtitles) may be provided on the device for content shown on another, larger device (e.g. television screen playing the movie).

The device may automatically determine a healthcare context (e.g. if the user is exercising or sleeping). When it determines this context, the device may open applications corresponding to the healthcare context (e.g. for recording heart rate during exercise, movement during exercise, duration of exercise, pulse oximetry during exercise, sleep patterns, duration of sleep, or galvanic skin response). The device may, for example, measure a user's health-related data (e.g. heart rate, movement, or pulse oximetry) and send some or all of this data to a paired device or a server. Although illustrated in the healthcare context, the determination of a relevant context (e.g. based on a user's behavior), opening of corresponding applications, recording of data, or transmission of this data may be applicable in any suitable context.

The device may assist in sports-related applications such as, for example, automatically assessing a golf swing of the user and suggesting corrections.

In a commercial setting, the device may automatically identify a product (e.g. using RFID, NFC, barcode recognition, or object recognition) when the user picks up the product and may provide information about the product (e.g. nutrition information, source information, or reviews) or the option to purchase the product. Payment for the product may, for example, be accomplished using visual barcode technology on the device. In particular embodiments, the device may be used to pay for a product using NFC, RFID, or any other suitable form of short-distance communication. During payment, the user's information may, for example, be authenticated by the device, which may detect the user's biometric information (e.g. bone structure or skin signature). The device may also automatically provide an indication to the user (e.g. a vibration) when the user is near a product on her shopping list (e.g. stored in the device) or another list (e.g. a wish list of the user's friend).

The device may function as a key for unlocking or turning on one or more vehicles. The user may, for example, enter a code using the outer ring to unlock or turn on the vehicle (e.g. using NFC technology), as described earlier. In particular embodiments, both user biometric information and a code entered by the user may be required to unlock the car, allowing for enhanced security for a car-based application. Additionally, the device may include profiles for one or more users, each profile containing vehicle settings (e.g. temperature or seat position). As another example, biometric information of a particular user may be used not only to unlock the device, but also to determine which user profile to load during the car's operation. The proximity of the device to the vehicle may automatically cause the vehicle to implement the vehicle settings of the profile of the user. The device may also be operable for GPS navigation (either directly on the device or when paired with and controlling a phone, for example).

The device may access and operate in conjunction with a service that provides support for mixed-reality games or massively multi-player reality-based games. This functionality may, for example, include registration, management of user data (e.g. user profiles and game-related data such as levels completed or inventories of supplies), and management of accomplishment lists. The functionality of the device and the service may also include management of connectivity (e.g. concentrator functionality) that handles fragile wireless communication channels and provides a unified API to third party game servers.

The device may access and operate in conjunction with a service that allows a user of the device to publish locations, check-ins, or other location-based data that allows various services to access a consistent reservoir of the most current information regarding the position and status of the user. As an example, the user of the device may find friends using similar devices. The service and device together may handle status updates, profile management, application access permissions, blacklists, or user-to-user access permissions. The service may be a trusted and centralized touchpoint for private data. By combining access to a unified location service, energy and battery life may, in particular embodiments, be conserved. In particular embodiments, certain functionality tokens may be made available based on the position of the user. An application may, for example, check on the device to see if this token is available and act accordingly. On the server side, APIs may allow developers to see use of the tokens or allow for redemption. In particular embodiments, information may be distributed by the device to other users (e.g. a single other user, or in broadcast mode to multiple users).

The device may access and operate in conjunction with a service that provides a unified polling interface that allows devices to receive and send polls. The device and service together may manage distribution lists, scoring criteria, and poll availability frames (both temporal and geographic, for example). This service may be exposed on the device and on a server such that third parties may use APIs to write applications and receive results back via online APIs.

In particular embodiments, the device may access and operate in conjunction with a service that provides optimizations for the presentation of text, images, or other information on a circular display of the device. As an example, a web site may be rendered or formatted for display on a computer monitor, but a service may customize the rendering and formatting for a smaller, circular display by emphasizing images and truncating text. The customized rendering and formatting may, for example, be a task delegable among the device and one or more servers or locally-paired devices. This service may also include news or advertising services.

Figure 137:
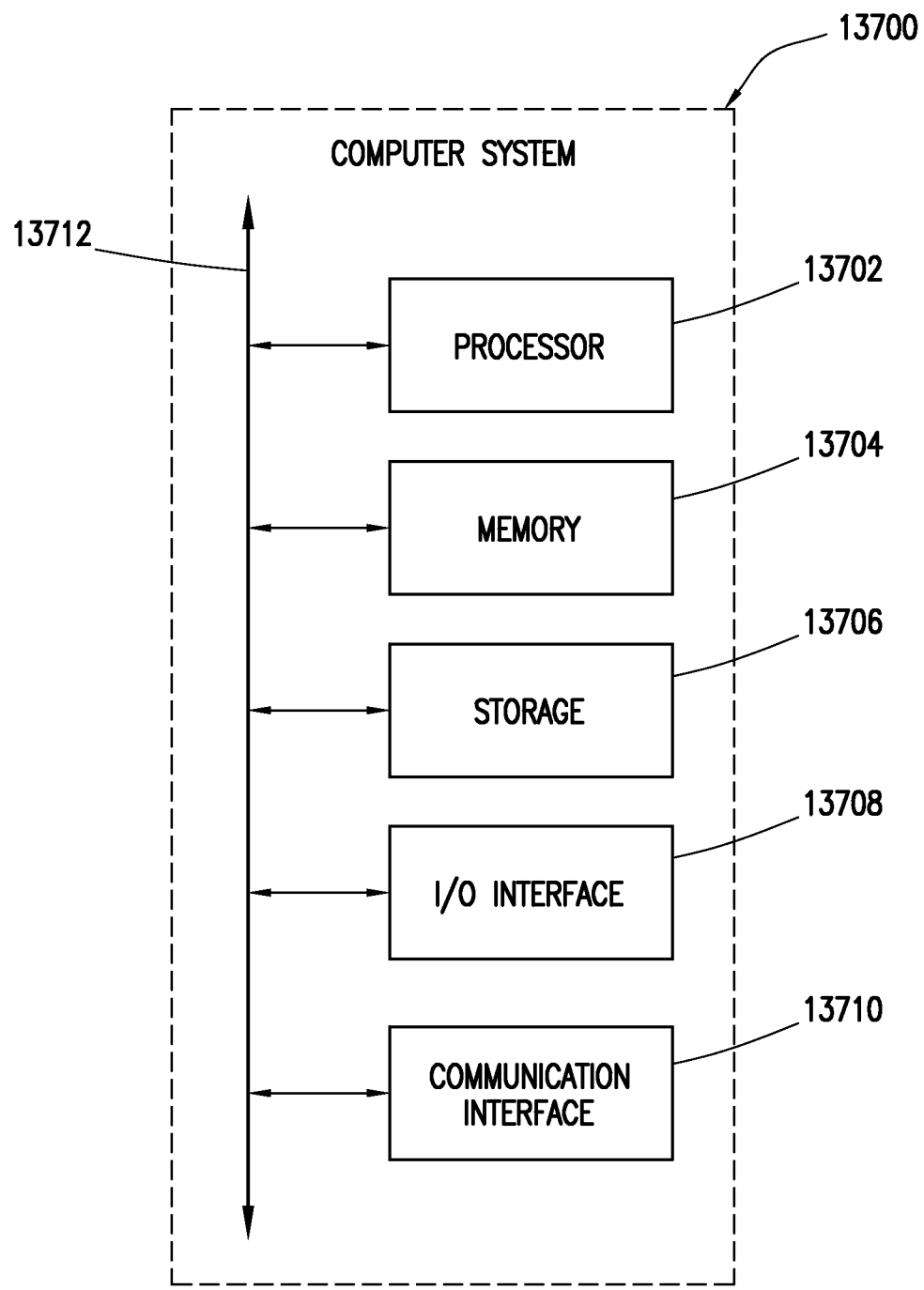
FIG. 137 illustrates an example computer system comprising a device.

FIG. 137 illustrates an example computer system 13700. In particular embodiments, one or more computer systems 13700 perform one or more steps of one or more methods described or illustrated herein. In particular embodiments, one or more computer systems 13700 provide functionality described or illustrated herein. In particular embodiments, software running on one or more computer systems 13700 performs one or more steps of one or more methods described or illustrated herein or provides functionality described or illustrated herein. Particular embodiments include one or more portions of one or more computer systems 13700. Herein, reference to a computer system may encompass a computing device, and vice versa, where appropriate. Moreover, reference to a computer system may encompass one or more computer systems, where appropriate.

This disclosure contemplates any suitable number of computer systems 13700. This disclosure contemplates computer system 13700 taking any suitable physical form. As example and not by way of limitation, computer system 13700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 13700 may include one or more computer systems 13700; be unitary or distributed; span multiple locations; span multiple machines; span multiple data centers; or reside in a cloud, which may include one or more cloud components in one or more networks. Where appropriate, one or more computer systems 13700 may perform without substantial spatial or temporal limitation one or more steps of one or more methods described or illustrated herein. As an example and not by way of limitation, one or more computer systems 13700 may perform in real time or in batch mode one or more steps of one or more methods described or illustrated herein. One or more computer systems 13700 may perform at different times or at different locations one or more steps of one or more methods described or illustrated herein, where appropriate.

In particular embodiments, computer system 13700 includes a processor 13702, memory 13704, storage 13706, an input/output (I/O) interface 13708, a communication interface 13710, and a bus 13712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 13702 includes hardware for executing instructions, such as those making up a computer program. As an example and not by way of limitation, to execute instructions, processor 13702 may retrieve (or fetch) the instructions from an internal register, an internal cache, memory 13704, or storage 13706; decode and execute them; and then write one or more results to an internal register, an internal cache, memory 13704, or storage 13706. In particular embodiments, processor 13702 may include one or more internal caches for data, instructions, or addresses. This disclosure contemplates processor 13702 including any suitable number of any suitable internal caches, where appropriate. As an example and not by way of limitation, processor 13702 may include one or more instruction caches, one or more data caches, and one or more translation lookaside buffers (TLBs). Instructions in the instruction caches may be copies of instructions in memory 13704 or storage 13706, and the instruction caches may speed up retrieval of those instructions by processor 13702. Data in the data caches may be copies of data in memory 13704 or storage 13706 for instructions executing at processor 13702 to operate on; the results of previous instructions executed at processor 13702 for access by subsequent instructions executing at processor 13702 or for writing to memory 13704 or storage 13706; or other suitable data. The data caches may speed up read or write operations by processor 13702. The TLBs may speed up virtual-address translation for processor 13702. In particular embodiments, processor 13702 may include one or more internal registers for data, instructions, or addresses. This disclosure contemplates processor 13702 including any suitable number of any suitable internal registers, where appropriate. Where appropriate, processor 13702 may include one or more arithmetic logic units (ALUs); be a multi-core processor; or include one or more processors 13702. Although this disclosure describes and illustrates a particular processor, this disclosure contemplates any suitable processor.

In particular embodiments, memory 13704 includes main memory for storing instructions for processor 13702 to execute or data for processor 13702 to operate on. As an example and not by way of limitation, computer system 13700 may load instructions from storage 13706 or another source (such as, for example, another computer system 13700) to memory 13704. Processor 13702 may then load the instructions from memory 13704 to an internal register or internal cache. To execute the instructions, processor 13702 may retrieve the instructions from the internal register or internal cache and decode them. During or after execution of the instructions, processor 13702 may write one or more results (which may be intermediate or final results) to the internal register or internal cache. Processor 13702 may then write one or more of those results to memory 13704. In particular embodiments, processor 13702 executes only instructions in one or more internal registers or internal caches or in memory 13704 (as opposed to storage 13706 or elsewhere) and operates only on data in one or more internal registers or internal caches or in memory 13704 (as opposed to storage 13706 or elsewhere). One or more memory buses (which may each include an address bus and a data bus) may couple processor 13702 to memory 13704. Bus 13712 may include one or more memory buses, as described below. In particular embodiments, one or more memory management units (MMUs) reside between processor 13702 and memory 13704 and facilitate accesses to memory 13704 requested by processor 13702. In particular embodiments, memory 13704 includes random access memory (RAM). This RAM may be volatile memory, where appropriate, and this RAM may be dynamic RAM (DRAM) or static RAM (SRAM), where appropriate. Moreover, where appropriate, this RAM may be single-ported or multi-ported RAM. This disclosure contemplates any suitable RAM. Memory 13704 may include one or more memories 13704, where appropriate. Although this disclosure describes and illustrates particular memory, this disclosure contemplates any suitable memory.

In particular embodiments, storage 13706 includes mass storage for data or instructions. As an example and not by way of limitation, storage 13706 may include a hard disk drive (HDD), a floppy disk drive, flash memory, an optical disc, a magneto-optical disc, magnetic tape, or a Universal Serial Bus (USB) drive or a combination of two or more of these. Storage 13706 may include removable or non-removable (or fixed) media, where appropriate. Storage 13706 may be internal or external to computer system 13700, where appropriate. In particular embodiments, storage 13706 is non-volatile, solid-state memory. In particular embodiments, storage 13706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 13706 taking any suitable physical form. Storage 13706 may include one or more storage control units facilitating communication between processor 13702 and storage 13706, where appropriate. Where appropriate, storage 13706 may include one or more storages 13706. Although this disclosure describes and illustrates particular storage, this disclosure contemplates any suitable storage.

In particular embodiments, I/O interface 13708 includes hardware, software, or both, providing one or more interfaces for communication between computer system 13700 and one or more I/O devices. Computer system 13700 may include one or more of these I/O devices, where appropriate. One or more of these I/O devices may enable communication between a person and computer system 13700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 13708 for them. Where appropriate, I/O interface 13708 may include one or more device or software drivers enabling processor 13702 to drive one or more of these I/O devices. I/O interface 13708 may include one or more I/O interfaces 13708, where appropriate. Although this disclosure describes and illustrates a particular I/O interface, this disclosure contemplates any suitable I/O interface.

In particular embodiments, communication interface 13710 includes hardware, software, or both providing one or more interfaces for communication (such as, for example, packet-based communication) between computer system 13700 and one or more other computer systems 13700 or one or more networks. As an example and not by way of limitation, communication interface 13710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 13710 for it. As an example and not by way of limitation, computer system 13700 may communicate with an ad hoc network, a personal area network (PAN), a local area network (LAN), a wide area network (WAN), a metropolitan area network (MAN), body area network (BAN), or one or more portions of the Internet or a combination of two or more of these. One or more portions of one or more of these networks may be wired or wireless. As an example, computer system 13700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 13700 may include any suitable communication interface 13710 for any of these networks, where appropriate. Communication interface 13710 may include one or more communication interfaces 13710, where appropriate. Although this disclosure describes and illustrates a particular communication interface, this disclosure contemplates any suitable communication interface.

In particular embodiments, bus 13712 includes hardware, software, or both coupling components of computer system 13700 to each other. As an example and not by way of limitation, bus 13712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 13712 may include one or more buses 13712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

While this disclosure describes particular structures, features, interactions, and functionality in the context of a wearable device, this disclosure contemplates that those structures, features, interactions, or functionality may be applied to, used for, or used in any other suitable electronic device (such as, for example, a smart phone, tablet, camera, or personal computing device), where appropriate.

What is claimed is:

1. A wearable apparatus comprising:
   an optical sensor;
   a processor coupled to the optical sensor; and
   memory coupled to the processor that comprises instructions executable by the processor, the processor being operable when executing the instructions to:
   determine an orientation of the wearable apparatus;
   compare the orientation of the wearable apparatus to a predetermined orientation; and
   in response to a determination that the orientation of the wearable apparatus corresponds to the predetermined orientation:
   detect by the optical sensor at least a portion of a hand of a user;
   determine, at least in part based on output from the optical sensor, that the hand detected by the optical sensor is holding a tangible object;
   detect, at least in part by the optical sensor, the tangible object held by the hand of the user;
   detect, at least in part by the optical sensor, a movement of the tangible object; and
   process the movement of the tangible object as input to the wearable apparatus.

2. The wearable apparatus of claim 1, wherein the wearable apparatus is worn on the arm attached to the other hand of the user.

3. The wearable apparatus of claim 1, wherein the processor is further operable when executing the instructions to provide, based on the input, output for display on a display of another device.

4. The wearable apparatus of claim 1, wherein the portion of the hand comprises at least one finger.

5. The wearable apparatus of claim 1, wherein the processor is further operable when executing the instructions to:
   detect by the optical sensor a lack of movement of at least a portion of the tangible object; and
   process the lack of movement of the tangible object as input to the wearable apparatus.

6. The wearable apparatus of claim 1, wherein the processor is further operable when executing the instructions to process the movement based at least in part on a duration of the movement.

7. The wearable apparatus of claim 1, wherein the processor is further operable when executing the instructions to:
   output, based on the input, content on a display of the wearable device.

8. The wearable apparatus of claim 1, wherein the processor is further operable when executing the instructions to:
   detect an orientation of the tangible object; and
   process the movement based at least in part on the orientation.

9. The wearable apparatus of claim 8, wherein detecting an orientation of the tangible object comprises:
   detecting an initial orientation of the tangible object; and
   detecting a subsequent orientation of the tangible object.

10. The wearable apparatus of claim 1, wherein the processor is further operable to process the input based at least in part on a setting specified by a software application associated with the wearable apparatus.

11. The wearable apparatus of claim 1, wherein the processor is further operable to:
    detect a tangible surface nearby the tangible object;
    detect the movement of the tangible object relative to the surface; and
    process the relative movement as the input.

12. The wearable apparatus of claim 11, wherein the processor is further operable to process the tangible surface as a virtual keyboard or a virtual display.

13. The wearable apparatus of claim 1, comprising:
    a device body comprising:

a touch-sensitive display;
a rotatable element about the touch-sensitive display; and
an encoder for detecting rotation of the rotatable element;
a band for affixing the device body to the user; and
the optical sensor, comprising the optical sensor in or on the band communicably coupled to the touch-sensitive display.

14. One or more computer-readable non-transitory storage media embodying software that is operable when executed to:
   determine an orientation of a wearable apparatus;
   compare the orientation of the wearable apparatus to a predetermined orientation; and
   in response to a determination that the orientation of the wearable apparatus corresponds to the predetermined orientation:
      detect, by an optical sensor of the wearable computing apparatus, at least a portion of a hand of a user;
      determine, at least in part based on output from the optical sensor, that the hand detected by the optical sensor is holding a tangible object;
      detect, at least in part by the optical sensor, the tangible object held by the hand of the user;
      detect, at least in part by the optical sensor, a movement of the tangible object; and
      process the movement of the tangible object as input to the wearable apparatus.

15. The media of claim 14, wherein the wearable apparatus is worn on the arm attached to the other hand of the user.

16. The media of claim 14, wherein the software is further operable when executed to provide, based on the input, output for display on a display of another device.

17. The media of claim 14, wherein the portion of the hand comprises at least one finger.

18. The media of claim 14, wherein the software is further operable when executed to:
   detect by the optical sensor a lack of movement of at least a portion of the tangible object; and
   process the lack of movement of the tangible object as input to the wearable apparatus.

19. The media of claim 14, wherein the software is further operable when executed to process the movement based at least in part on a duration of the movement.

20. The media of claim 14, wherein the software is further operable when executed to:
   output, based on the input, content on a display of the wearable apparatus.

21. The media of claim 14, wherein the software is further operable when executed to:
   detect an orientation of the tangible object; and
   process the movement based at least in part on the orientation.

22. The media of claim 21, wherein, to detect an orientation of the tangible object, the software is operable when executed to:
   detect an initial orientation of the tangible object; and
   detect a subsequent orientation of the tangible object.

23. The media of claim 14, wherein the software is further operable when executed to process the input based at least in part on a setting specified by a software application associated with the wearable apparatus.

24. The media of claim 14, wherein the software is further operable when executed to:
   detect a tangible surface nearby the tangible object;
   detect the movement of the tangible object relative to the surface; and
   process the relative movement as the input.

25. The media of claim 24, wherein:
   the software is further operable when executed to process the tangible surface as a virtual keyboard or a virtual display.

26. The media of claim 14, wherein the wearable computing device comprises:
   a device body comprising:
      a touch-sensitive display;
      a rotatable element about the touch-sensitive display; and
      an encoder for detecting rotation of the rotatable element;
   a band for affixing the device body to the user; and
   the optical sensor in or on the band communicably coupled to the touch-sensitive display.

27. A method comprising:
   determining an orientation of a wearable apparatus;
   comparing the orientation of the wearable apparatus to a predetermined orientation; and
   in response to a determination that the orientation of the wearable apparatus corresponds to the predetermined orientation:
      detecting, by an optical sensor of the wearable computing device, at least a portion of a hand of a user;
      determining, at least in part based on output from the optical sensor, that the hand detected by the sensor is holding the tangible object;
      detecting, at least in part by the optical sensor, a tangible object held by the hand of the user;
      detecting, at least in part by the optical sensor, a movement of the tangible object; and
      processing the movement of the tangible object as input to the wearable device.

28. The method of claim 27, wherein the wearable computing device is worn on the arm attached to the other hand of the user.

29. The method of claim 27, further comprising providing, based on the input, output for display on a display of another device.

30. The method of claim 27, wherein the portion of the hand comprises at least one finger.

31. The method of claim 27, further comprising detecting by the optical sensor a lack of movement of at least some of the portion of the tangible object; and
   processing the lack of movement of the tangible object as input to the wearable apparatus.

32. The method of claim 27, wherein the movement is based at least in part on a duration of the movement.

33. The method of claim 27, further comprising outputting, based on the input, content on a display of the wearable device.

34. The method of claim 27, further comprising detecting an orientation of the portion of the tangible object, wherein the input is further based at least in part on the orientation.

35. The method of claim 34, wherein detecting an orientation of the portion of the arm of the user comprises:
   detecting an initial orientation of the tangible object; and
   detecting a subsequent orientation of the tangible object.

36. The method of claim 27, further comprising processing the input based at least in part on a setting specified by a software application associated with the wearable device.

37. The method of claim 27, further comprising:
   detecting a tangible surface nearby the tangible object;

detecting the movement of the tangible object relative to the surface; and processing the relative movement as the input.

38. The method of claim 37, further comprising processing the tangible surface as a virtual keyboard or a virtual display.

39. The method of claim 27, wherein the wearable computing device comprises:
- a device body comprising:
  - a touch-sensitive display;
  - a rotatable element about the touch-sensitive display; and
  - an encoder for detecting rotation of the rotatable element;
- a band for affixing the wearable computing device body to the user; and
- the optical sensor, comprising the optical sensor in or on the band communicably coupled to the touch-sensitive display.

* * * * *